(12) United States Patent
Haraszti et al.

(10) Patent No.: US 10,063,443 B2
(45) Date of Patent: *Aug. 28, 2018

(54) SYSTEM AND METHOD FOR MANAGING VOLTE SESSION CONTINUITY INFORMATION USING LOGICAL SCALABLE UNITS

(71) Applicant: OPENET TELECOM LTD., Dublin (IE)

(72) Inventors: Peter Haraszti, Dublin (IE); David Davoren, Dublin (IE); Brian J. Forde, Dublin (IE); Ross Andreucetti, Dublin (IE); Tony Doolin, Dublin (IE); Niall O'Connell, Dublin (IE)

(73) Assignee: OPENET TELECOM LTD., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,835

(22) Filed: Mar. 4, 2016

(65) Prior Publication Data

US 2016/0191363 A1    Jun. 30, 2016

Related U.S. Application Data

(63) Continuation-in-part of application No. 13/903,866, filed on May 28, 2013.
(Continued)

(51) Int. Cl.
*G06F 15/173* (2006.01)
*H04L 12/26* (2006.01)
(Continued)

(52) U.S. Cl.
CPC ...... *H04L 43/0888* (2013.01); *H04L 41/0896* (2013.01); *H04L 67/14* (2013.01); *H04L 67/2842* (2013.01)

(58) Field of Classification Search
CPC ............ H04L 43/0888; H04L 41/0896; H04L 43/0876; H04L 43/16; H04L 67/1029;
(Continued)

(56) References Cited

U.S. PATENT DOCUMENTS 5,774,670 A    6/1998  Montulli
7,197,547 B1   3/2007  Miller et al.
(Continued)

FOREIGN PATENT DOCUMENTS

WO    2009058067 A1    5/2009

OTHER PUBLICATIONS

Extended European Search Report, European Patent Application 16159043.5, Reference P116682EP00 dated Jun. 20, 2016.
(Continued)

*Primary Examiner* — Philip Chea
*Assistant Examiner* — Mohammed Ahmed
(74) *Attorney, Agent, or Firm* — The Marbury Law Group, PLLC

(57) ABSTRACT

Logical scalable units (LSU) can be used within a single network data center to provide stateful scalability. However, LSUs are not suitable for operating across multiple network data centers in order to provide geographical redundancy in active-active scenarios while providing high availability. This is because the latencies associated with replicating full session information are unacceptably slow. An additional component in the LSU (known as an LSU Frontend) can be used to replicate a small subset of session information between LSUs. This subset of session information may be enough to enable LSUs to process requests in an acceptable way rather than outright failing. This may be particularly advantageous in scenarios where the requests relate to Voice
(Continued)

over LTE calls, because outright failure is very perceivable to subscribers, and it causes resource leakage within the telecommunications network.

25 Claims, 63 Drawing Sheets

Related U.S. Application Data

(60) Provisional application No. 61/652,731, filed on May 29, 2012, provisional application No. 62/129,302, filed on Mar. 6, 2015.

(51) Int. Cl.
*H04L 29/08* (2006.01)
*H04L 12/24* (2006.01)

(58) Field of Classification Search
CPC ............. H04L 67/1002; H04L 63/0245; H04L 63/168; H04L 63/102
See application file for complete search history.

(56) References Cited

U.S. PATENT DOCUMENTS

| | | | |
|---|---|---|---|
| 9,420,607 B1* | 8/2016 | Jain | H04W 76/18 |
| 2006/0155758 A1 | 7/2006 | Arnegaard et al. | |
| 2007/0208799 A1 | 9/2007 | Hughes | |
| 2008/0147845 A1 | 6/2008 | Yoda et al. | |
| 2010/0158231 A1 | 6/2010 | Newberg et al. | |
| 2010/0205302 A1 | 8/2010 | Rechterman | |
| 2010/0299451 A1 | 11/2010 | Yigang et al. | |
| 2011/0069613 A1* | 3/2011 | Phillips | H04L 43/0876 370/229 |
| 2011/0165901 A1 | 7/2011 | Baniel et al. | |
| 2011/0202491 A1* | 8/2011 | Pandya | H04L 12/14 706/47 |
| 2012/0155389 A1* | 6/2012 | McNamee | H04L 45/306 370/328 |
| 2012/0155470 A1* | 6/2012 | McNamee | H04L 67/2819 370/392 |
| 2012/0158872 A1* | 6/2012 | McNamee | H04L 67/1095 709/206 |
| 2012/0158994 A1* | 6/2012 | McNamee | H04L 41/12 709/238 |
| 2012/0158995 A1* | 6/2012 | McNamee | H04L 45/24 709/238 |
| 2012/0159353 A1 | 6/2012 | Beerse et al. | |
| 2012/0331516 A1* | 12/2012 | Perez Martinez | H04L 63/0245 726/1 |
| 2013/0111542 A1 | 5/2013 | Shieh | |
| 2013/0231081 A1* | 9/2013 | Mo | H04L 41/5067 455/405 |
| 2013/0268357 A1* | 10/2013 | Heath | H04L 63/00 705/14.53 |
| 2013/0279494 A1* | 10/2013 | Panattu Sethumadhavan | H04L 65/1069 370/352 |
| 2013/0325984 A1* | 12/2013 | Brady | H04L 51/38 709/206 |
| 2013/0326058 A1* | 12/2013 | Brady | H04L 43/0888 709/224 |
| 2014/0089807 A1* | 3/2014 | Delrio | H04L 41/147 715/736 |
| 2014/0185490 A1* | 7/2014 | Holm | H04L 41/0893 370/259 |
| 2014/0256343 A1* | 9/2014 | Shaikh | H04W 28/22 455/452.2 |
| 2014/0325515 A1 | 10/2014 | Salmela et al. | |
| 2017/0135031 A1* | 5/2017 | Buckley | H04B 1/3816 |
| 2018/0062847 A1* | 3/2018 | Mildh | H04L 9/3239 |

OTHER PUBLICATIONS

European Search Report, EP Application No. 13169821, dated Dec. 9, 2013.
European Search Report, EP Application No. 13169822, dated Dec. 9, 2013.
European Search Report, EP Application No. 13169824, dated Dec. 9, 2013.
European Search Report, EP Application No. 13169823, dated Dec. 9, 2013.
Toshiki Hayashi, 'Evolved Packet Core (EPC) Network Equipment for Long Term Evolution (LTE)', XP-002713567, Fujitsu Sci Tech. J. vol. 48, No. 1, Jan. 2012.
Gouveia et al., 'Cloud Computing and EPC / IMS Integration: New Value-Added Services on Demand', Fraunhofer Institute FOKUS, Berlin, Germany, Technische Universität Berlin, Berlin, Germany, 2009.

* cited by examiner

Prior Art

Cache includes 3 entries

Entry #1
    Common Key:    Sub_3
    Delayed Deletion Time: N/A
    Session Continuity:
        GxClientID: pcef1.dra-realm
        RxClientID:
    Keys:
        MSISDN:    15124340003
        IMSI:    311180300700223
        IPv4:    143.165.0.3
        IPV6:    N/A
    Session-Id(s):
        Gx Session-Id:  Sub_3
        Rx Session-Id:  N/A

FIG. 35A

Cache includes 3 entries

Entry #1
    Common Key: Sub_3
    Delayed Deletion Time: N/A
    Session Continuity:
        GxClientID: pcef1.dra-realm
        RxClientID: pcef1.dra-realm
    rx-sess: A:Sub_3
    rx-rules: Partial Audio
    Keys:
        MSISDN: 15124340003
        IMSI: 311180300700223
        IPv4: 143.165.0.3
        IPV6: N/A
        Session-Id(s):
            Gx Session-Id: Sub_3
            Rx Session-Id: Sub_3

FIG. 36A

| Cache includes 3 entries |
|---|
| Entry #1<br>    Common Key:        Sub_3<br>    Delayed Deletion Time: N/A<br>    Session Continuity:<br>        GxClientID: pcef1.dra-realm<br>        RxClientID:<br>    Keys:<br>        MSISDN:        15124340003<br>        IMSI:           311180300700223<br>        IPv4:           143.165.0.3<br>        IPV6:           N/A<br>    Session-Id(s):<br>        Gx Session-Id: Sub_3<br>        Rx Session-Id: N/A |

FIG. 37A

SYSTEM AND METHOD FOR MANAGING VOLTE SESSION CONTINUITY INFORMATION USING LOGICAL SCALABLE UNITS

RELATED APPLICATIONS

This application is a continuation in part of U.S. patent application Ser. No. 13/903,866, titled "System and Method for Seamless Horizontal Scaling using Logical Scalable Units" filed May 28, 2013, which claims the benefit of priority to U.S. Provisional Application No. 61/652,731, titled "System and Method for Proportionally Scaling Stateful Application Servers within a Telecommunications Network" filed May 29, 2012, the entire contents of all of which are hereby incorporated by reference.

This application also claims the benefit of priority to U.S. Provisional Application No. 62/129,302, titled "System and Method for VoLTE Session Continuation using Logical Scalable Units" filed Mar. 6, 2015, the entire contents of which is hereby incorporated by reference.

BACKGROUND

Telecommunications networks have seen very rapid advances in their numbers of users, and the types of services available. In particular, the combination of data-orientated mobile telecommunications networks (e.g., 3G, 4G, LTE, Wi-Fi, etc.) and feature rich smart phones and tablet devices has enabled users to consume a greater variety of services. One such emerging service is Voice over LTE (VoLTE), which is a service that enables users to make voice calls over a data network (i.e., Voice over IP (VoIP)).

These increases in the number of users, and the types of services available, have increased the need for telecommunications network operators to deploy new nodes, such as policy application servers and charging application servers, within their infrastructures.

Another recent development within the computing industry has been the proliferation and availability of cheap computing resources, which in turn has facilitated scalable computing. Initially this was achieved through hardware advances, such as the transition from costly specialized mainframe hardware to the more readily available, and relatively inexpensive, commodity hardware. This commodity hardware is constantly becoming smaller and more efficient through economies of scale, and this has enabled datacenters to deploy an ever increasing amount of computer resources per cubic meter.

More recently, there has been a widespread adoption of virtualization technology, and this in turn has lead to the growth in popularity and use of cloud computing platforms. These cloud computing platforms enable the rapid (typically within seconds or minutes) scaling-up and scaling-down of computing resources in order to meet the current demand. Further, these computing resources are typically available for other uses when they would otherwise be underutilized. These computing resources are normally very cost effective, and they are only paid for the periods during which they are consumed.

Cloud computing environments may provide different types of resources as services, such as physical computing resources (known as Infrastructure-as-a-Service) or standardized software environments (known as Platform-as-a-Service). Cloud computing environments may be public, private, or hybrid. In public clouds, or community clouds, the infrastructure is shared between many organizations on a commercial basis. In private clouds the infrastructure is owned, operated, and used by a single organization. Hybrid clouds are a mix of public and private clouds.

Certain types of application servers, such as stateless application servers, can instantly benefit from being scaled using scalable computing resources, such as that provided by cloud computing environments. The throughput performance of these application servers is typically directly proportional to the performance of the scalable computing resources. However, other types of application servers, such as stateful application servers, are unable to scale linearly using existing scalable computing resources and solutions.

Many of the application servers required by telecommunications network operators are stateful. For example, both policy application servers and charging application servers need to maintain session stores that contain stateful information. Further, telecommunications network operators require that these application servers operate in a high-availability manner, such that they contain enough redundancy to ensure that there is not a single point-of-failure. New methods and systems that enable the scaling of such stateful and highly available application servers using scalable computing resources will be beneficial to telecommunication service providers and to consumers of services provided by telecommunication networks.

SUMMARY

The various embodiments include methods, devices and systems configured with processor-executable instructions to implement methods of ensuring VoLTE continuity in the event that a datacenter containing one or more Logical Scalable Units fails.

The various aspects include methods of communicating messages in communication system, including receiving a first request message in a processor of a multiprocessor computing system from a client component, extracting first information from the received first request message, using the extracted first information to obtain a common key, using the common key to identify an application component and to retrieve session continuity information from a cache memory of the multiprocessor computing system, generating an updated first request message that includes the retrieved session continuity information, sending the updated first request message to the identified application component, receiving a first response message from the identified application component in response to sending the updated first request message, forwarding the received first response message to the client component, receiving a second request message that includes updated session continuity information from the application component, extracting second information from the received second request message, determining the common key based on the extracted second information, using the common key to identify the cache memory, updating the information stored in the identified cache memory based on the updated session continuity information, and sending the received second request message to the client component.

In an aspect, the method may include generating an updated second request message that does not include the updated session continuity information included in the received second request message, in which sending the received second request message to the client component includes sending the updated second request message to the client component. In a further aspect, retrieving session continuity information from the cache memory includes retrieving Gx session information identifying a Gx session and an enforcement component associated with the Gx session.

In a further aspect, generating the updated first request message that includes the retrieved session continuity information includes generating the updated first request message to include Gx session information and the common key. In a further aspect, generating the updated first request message that includes the retrieved session continuity information further includes generating the updated first request message to include Rx session information. In a further aspect, receiving the second request message that includes updated session continuity information from the application component includes receiving a message that includes Rx session information, the Rx session information identifying an Rx session, an enforcement component associated with the Rx session, and one or more rules associated with the enforcement component.

In a further aspect, updating the information stored in the identified cache memory based on the updated session continuity information includes deleting information from the identified cache memory. In a further aspect, deleting information from the identified cache memory includes delaying deletion for a period of time so that a subsequent termination request message is processed correctly. In a further aspect, receiving the first request message from the client component includes receiving an Rx message generated in response to a VoLTE call request.

In a further aspect, the method may include receiving the updated first request message in the identified application component, determining whether session information relating to the received updated first request message may be obtained from a session store, extracting the session continuity information from the received updated first request message in response to determining that session information relating to the received first request message may not be obtained from a session store, using the extracted session continuity information to make a policy decision, and generating the updated session continuity information based on the policy decision.

Further aspects may include a server computing device that includes a cache memory and a processor coupled to the cache memory, in which the processor may be configured with processor-executable instructions to perform operations that may include receiving a first request message from a client component, extracting first information from the received first request message, using the extracted first information to obtain a common key, using the common key to identify an application component and to retrieve session continuity information from the cache memory, generating an updated first request message that includes the retrieved session continuity information, sending the updated first request message to the identified application component, receiving a first response message from the identified application component in response to sending the updated first request message, forwarding the received first response message to the client component, receiving a second request message that includes updated session continuity information from the application component, extracting second information from the received second request message, determining the common key based on the extracted second information, using the common key to identify the cache memory, updating the information stored in the identified cache memory based on the updated session continuity information, and sending the received second request message to the client component.

In an aspect, the processor may be configured with processor-executable instructions to perform operations such that retrieving session continuity information from the cache memory includes retrieving Gx session information identifying a Gx session and an enforcement component associated with the Gx session. In a further aspect, the processor may be configured with processor-executable instructions to perform operations such that generating the updated first request message that includes the retrieved session continuity information includes generating the updated first request message to include Gx session information, Rx session information, and the common key. In a further aspect, the processor may be configured with processor-executable instructions to perform operations such that receiving the second request message that includes updated session continuity information from the application component includes receiving a message that includes Rx session information, the Rx session information identifying an Rx session, an enforcement component associated with the Rx session, and one or more rules associated with the enforcement component. In a further aspect, the processor may be configured with processor-executable instructions to perform operations such that updating the information stored in the identified cache memory based on the updated session continuity information includes deleting information from the identified cache memory after waiting a period of time so that a subsequent termination request message may be processed correctly.

Further aspects include a non-transitory server-readable storage medium having stored thereon processor-executable instructions configured cause a server computing device to perform operations that may include receiving a first request message from a client component, extracting first information from the received first request message, using the extracted first information to obtain a common key, using the common key to identify an application component and to retrieve session continuity information from a cache memory, generating an updated first request message that includes the retrieved session continuity information, sending the updated first request message to the identified application component, receiving a first response message from the identified application component in response to sending the updated first request message, forwarding the received first response message to the client component, receiving a second request message that includes updated session continuity information from the application component, extracting second information from the received second request message, determining the common key based on the extracted second information, using the common key to identify the cache memory, updating the information stored in the identified cache memory based on the updated session continuity information, and sending the received second request message to the client component.

In an aspect, the stored processor-executable software instructions may be configured to cause a processor to perform operations such that retrieving session continuity information from the cache memory includes retrieving Gx session information identifying a Gx session and an enforcement component associated with the Gx session. In a further aspect, the stored processor-executable software instructions may be configured to cause a processor to perform operations such that generating the updated first request message that includes the retrieved session continuity information includes generating the updated first request message to include Gx session information, Rx session information, and the common key. In a further aspect, the stored processor-executable software instructions may be configured to cause a processor to perform operations such that receiving the second request message that includes updated session continuity information from the application component includes receiving a message that includes Rx session information, the Rx session information identifying an Rx session, an enforcement component associated with the Rx session, and one or more rules associated with the enforcement component. In a further aspect, the stored processor-executable software instructions may be configured to cause a processor to perform operations such that updating the information stored in the identified cache memory based on the updated session continuity information includes deleting information from the identified cache memory after waiting a period of time so that a subsequent termination request message may be processed correctly.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DESCRIPTION

Figure 1:
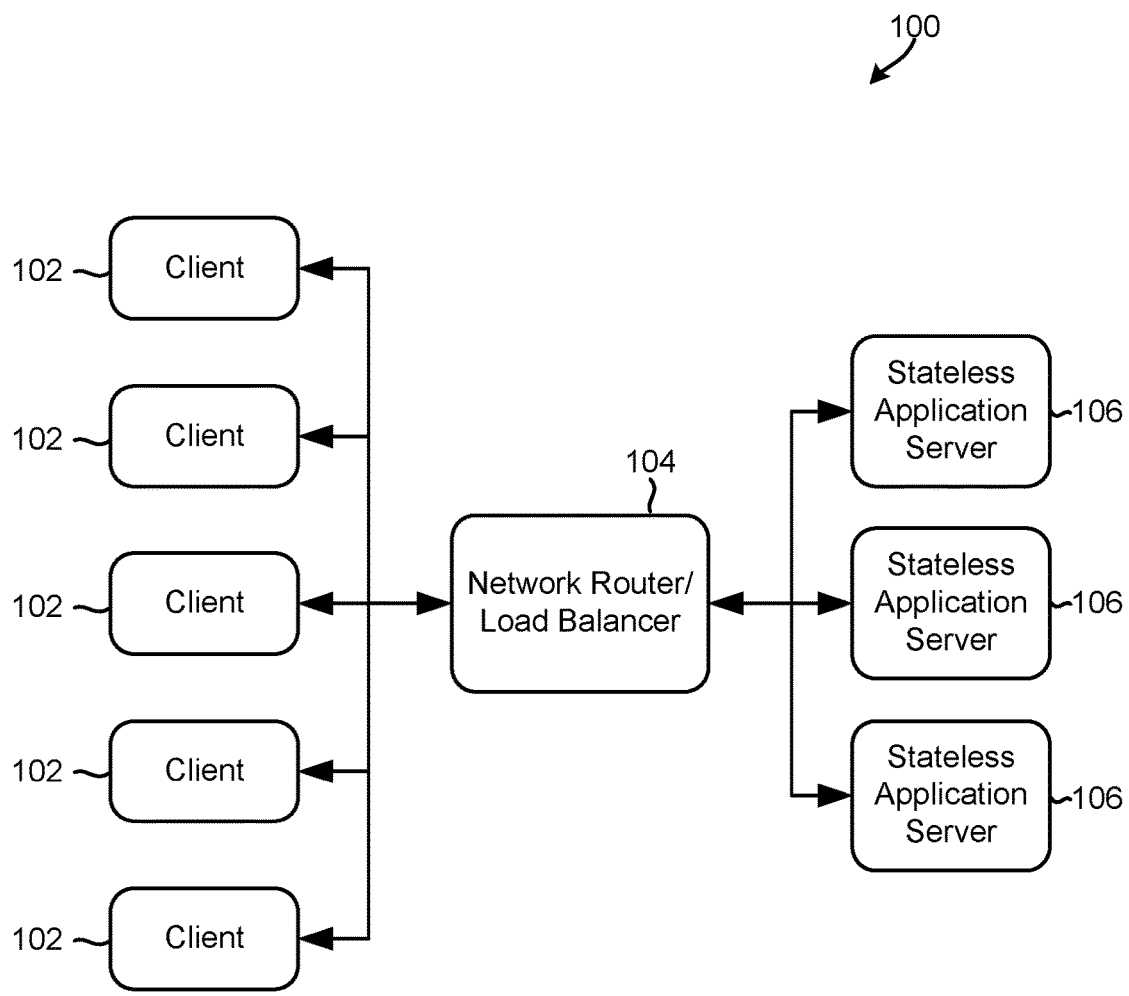
FIG. 1 is a block diagram illustrating a prior art system for connecting multiple clients to multiple stateless servers in a scalable computing environment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a single process and/or thread of execution. A component may be localized on one processor or core, or distributed between two or more processors or cores. In addition, components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

As used in this application, the phrase "data locality" refers to the proximity of data (or the component or memory storing the data) to the application or component that accesses the data or is tasked with processing the data.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

The various embodiments provide methods, devices and systems for managing communications in a network. The various embodiments include methods, and servers configured to implement the methods, of using scalable computing resources to allow stateful application servers within telecommunication networks to scale up or down commensurate with the computing demands, network traffic, or workload placed on the network.

FIG. 1 illustrates a prior art system 100 in which multiple clients 102 connect to multiple stateless application servers 106 via a router 104 configured to provide load balancing functionality. The load balancing functionality may be as simple as performing round-robin load balancing operations in which requests received from the clients 102 are distributed evenly across all the available stateless application servers 106. The clients 102 may include any type of software application, service or component that consumes any of the services provided by the stateless application servers 106.

Figure 2:
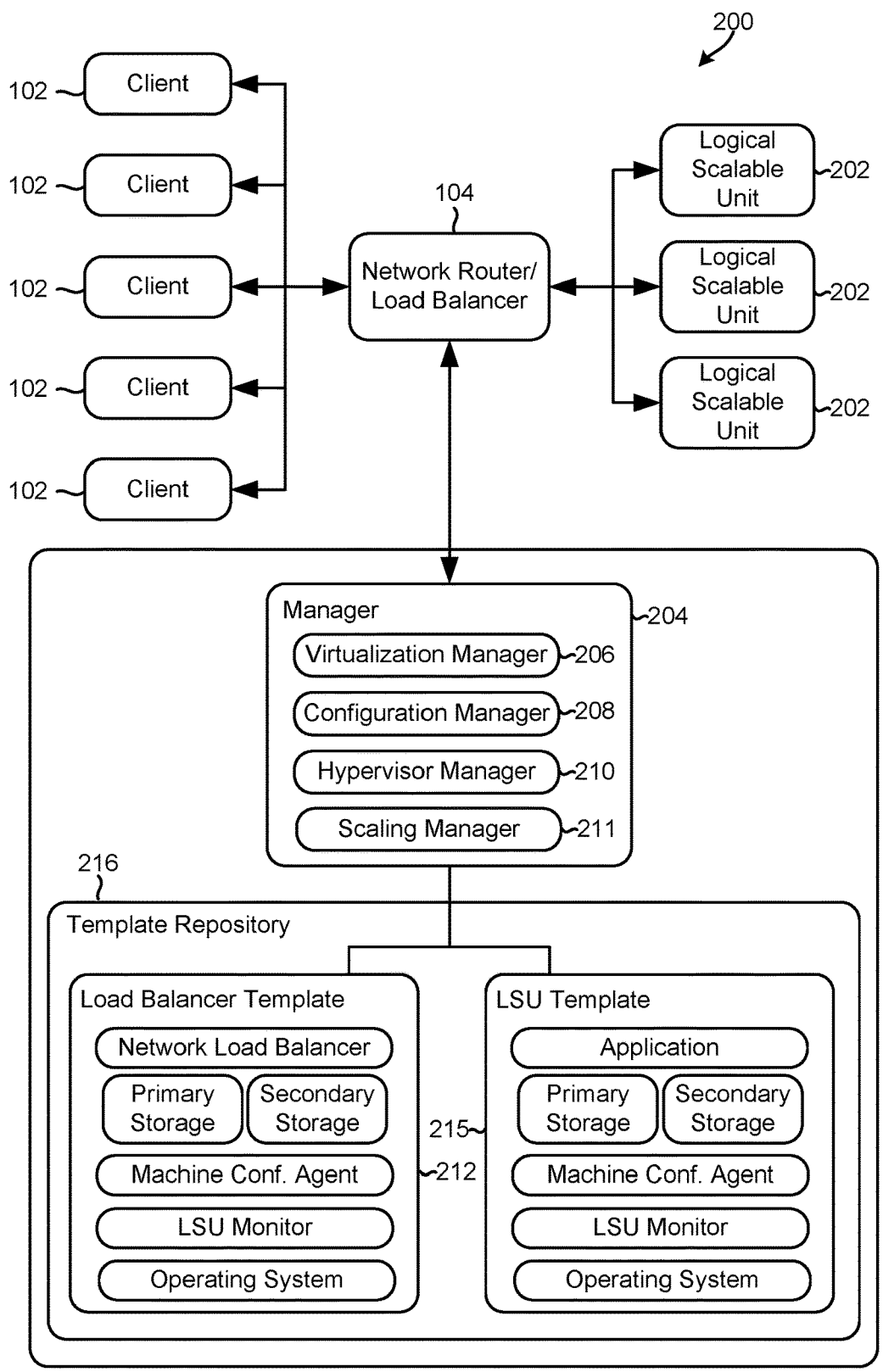
FIG. 2 is a block diagram illustrating an embodiment system for connecting multiple clients to logical scalable units in a scalable computing environment.

FIG. 2 illustrates an embodiment system 200 in which multiple clients 102 are connected to logical scalable units 202 in lieu of the stateless application servers 106. Each logical scalable unit 202 may include a collection of internal components having a single external service interface that operates as a façade/interface to the internal components. The internal components of the logical scalable unit 202 may include application servers, routers, memories, persistent storage units, and other similar components. Each logical scalable unit 202 may be configured to provide a quantifiable level of throughput or services (e.g., measured in transactions per second or "TPS"), and may operate independent of all of the other logical scalable units 202 included in the system 200. In an embodiment, each logical scalable unit 202 may be the smallest discrete grouping of components suitable for providing a defined functionality.

For embodiments suitable for deployment in a 3GPP network, the clients 102 may include a policy and charging enforcement functions (PCEFs) component and/or an application functions (AFs) component. The router 104 may be a Diameter routing agent (DRA) as described in 3GPP TS 23.203 and 3GPP TS 29.213, or a dynamic context router (DCR) as described in U.S. patent application Ser. No. 13/309,008 titled "Methods, Systems And Devices For Dynamic Context-Based Routing," the entire contents of both of which are hereby incorporated by reference.

The overall system throughput of the system 200 may be increased by adding additional logical scalable units 202 to the system 200. Each individual logical scalable unit 202 may be organized or configured to provide a number of features that enable the overall system 200 to be an elastic and/or horizontally scalable computing environment. The logical scalable units 202 may include online charging systems (OCSs), offline charging systems (OFCSs), and/or policy control and charging rules functions (PCRFs). The protocols used for communication between these nodes may be Diameter based protocols such as Gx, Gy, Rx, Sy, S9, Gxa, Gxc, Sd, Sh, etc.

In an embodiment, the network router 104 may be configured to load balance messages across the logical scalable units 202. The network router 104 may be configured to associate sessions with logical scalable units 202, and may route messages to the appropriate logical scalable units 202 when the messages are part of an existing session. The network router 104 may perform load balancing operations to route messages that are not part of an existing session to the logical scalable units 202, which may be accomplished by implementing a round-robin load balancing scheme or may be performed based on the measured or detected workloads of the logical scalable units 202.

The system 200 may be a scalable computing environment, which in an embodiment, may be realized by provisioning and/or enabling a single server rack/chassis within a datacenter to operate as a logical scalable unit 202.

In an alternative embodiment, the scalable computing environment may be realized via a cloud computing environment. In this embodiment, a logical scalable unit 202 may be provisioned, created, organized, and/or generated dynamically, using resources (e.g., application servers, persistent storage, load balancers, etc.) within a cloud computing environment, network, or service. Within such a cloud computing environment each application server may be realized using a virtual server, which along with other virtualization technologies, allows the physical servers and storage devices to be shared by many devices/clients. Virtualization technologies may also be used to replicate, transfer, or migrate stored data and applications from one physical location/server to another efficiently and without impacting the users or applications of the cloud computing system.

In an embodiment, the scalable computing environment may be realized in a multi-datacenter environment, in which case, a single logical scalable unit 202 may be distributed across two or more datacenters. A logical scalable unit 202 may provide or make use of geo-redundancy, in which data and/or functionality is replicated between two geographically distant sites so that clients and applications can switch from one site to another seamlessly and without impacting the operations of the system.

The system's 200 capabilities may be scaled up or down by increasing or decreasing the number of logical scalable units 202. In an embodiment, scaling up the scalable computing environment may include adding new logical scalable units 202 to the system 200 in response to an increase in the number of sessions. In an embodiment, scaling down the scalable computing environment may include stopping the sending of new messages to the logical scalable unit 202, and subsequently waiting for existing sessions of an existing logical scalable unit 202 to expire before removing that logical scalable unit 202 from the system 200. These embodiments are particularly well suited for use with data that has a short life cycle (e.g., policy-based sessions, etc.). In an embodiment, data may be migrated from one logical scalable unit 202 to another logical scalable unit 202 without interrupting the operation of system 200. This embodiment is particularly well suited for use with data that has a long life cycle (e.g., subscriber information, balance information, and Voice over LTE using IP Multimedia Subsystem (IMS), etc.).

In an embodiment, the system 200 may include a manager 204 component configured to dynamically increase and/or decrease the computing resources available or used by the system 200 to match detected increases or decreases in computing demands. The manager 204 may adjust the computing resources by implementing any of a number of known methods, any of the methods or solutions discussed herein, or any combination thereof. For example, the scalability manager may adjust the computing resources by increasing or decreasing the number of application servers within one or more logical scalable units and/or by increasing or decreasing the number of logical scalable units included in the scalable computing environment/system, etc.

In the example illustrated in FIG. 2, the manager 204 component includes a virtualization manager 206, a machine configuration manager 208, a hypervisor manager 210, and a scaling manager 211. The virtualization manager 206 may be configured to manage deployments and monitor the various virtual machine instances. The machine configuration manager 208 may be configured to automatically configure the operating systems and applications running on the virtual machines within the logical scalable units 202. The hypervisor manager 210 may be used to configure and provision new hypervisors, such as by creating new virtual hardware suitable for use in or as a virtual machine. The scaling manager 211 may be configured to monitor application level performance and/or the performance of the logical scalable units 202, and perform various operations to scale the system up or down based on the monitored performance.

The manager 204 component may include a template repository 216 that includes a plurality of templates 212, 215 suitable for use in creating/instantiating new instances of network routers/load balancers 104 (e.g., load balancer template 212) and logical scalable units 202 (e.g., LSU template 215). In an embodiment, each of the templates 212, 215 may be a component that includes an operating system and application. The operating system and application may be selected, grouped or packaged together so as to provide a specific functionality while balancing reliability, consistency, speed, latency, responsiveness, etc. In an embodiment, the templates 212, 215 may include well tested components that have been tested and determined to provide a high level of consistency or reliability. The templates 212, 215 may allow for additional functionality or components to be rapidly deployed in the system 200, and reduce the number or likelihood that the addition of components will cause deployment or configuration errors. In an embodiment, there may be multiple versions of the same LSU template in order to facilitate upgrades and roll-backs to the telecommunications network.

In various embodiments, the logical scalable units 202 may include virtualized data plane components and/or virtualized control plane components, such as virtualized routers, policy servers, online charging servers, offline charging servers, persistent storage, mobile application servers, deep packet inspectors (DPIs), gateways (e.g., PCEFs), etc. Mobile application servers that are suitable for inclusion in a logical scalable unit 202 are described in U.S. patent application Ser. No. 13/454,896 titled "Systems for Enabling Subscriber Monitoring of Telecommunications Network Usage and Service Plans," the entire contents of which is hereby incorporated by reference. Deep packet inspectors may be standalone, embedded in the gateway (e.g., a 3GPP Application Detection Control (ADC) within a PCEF), or a 3GPP-compliant Traffic Detection Function (TDF).

In an embodiment, one or more components in a logical scalable unit 202 may be virtualized, and the logical scalable unit 202 may be configured to provide various different types of functionality. For example, a logical scalable unit 202 may be configured to provide any or all of policy functionality, online charging functionality, offline charging functionality, analytics functionality, machine-to-machine (M2M) functionality, voice functionality, video functionality, audience measurement functionality, cable television functionality, etc.

Figure 3:
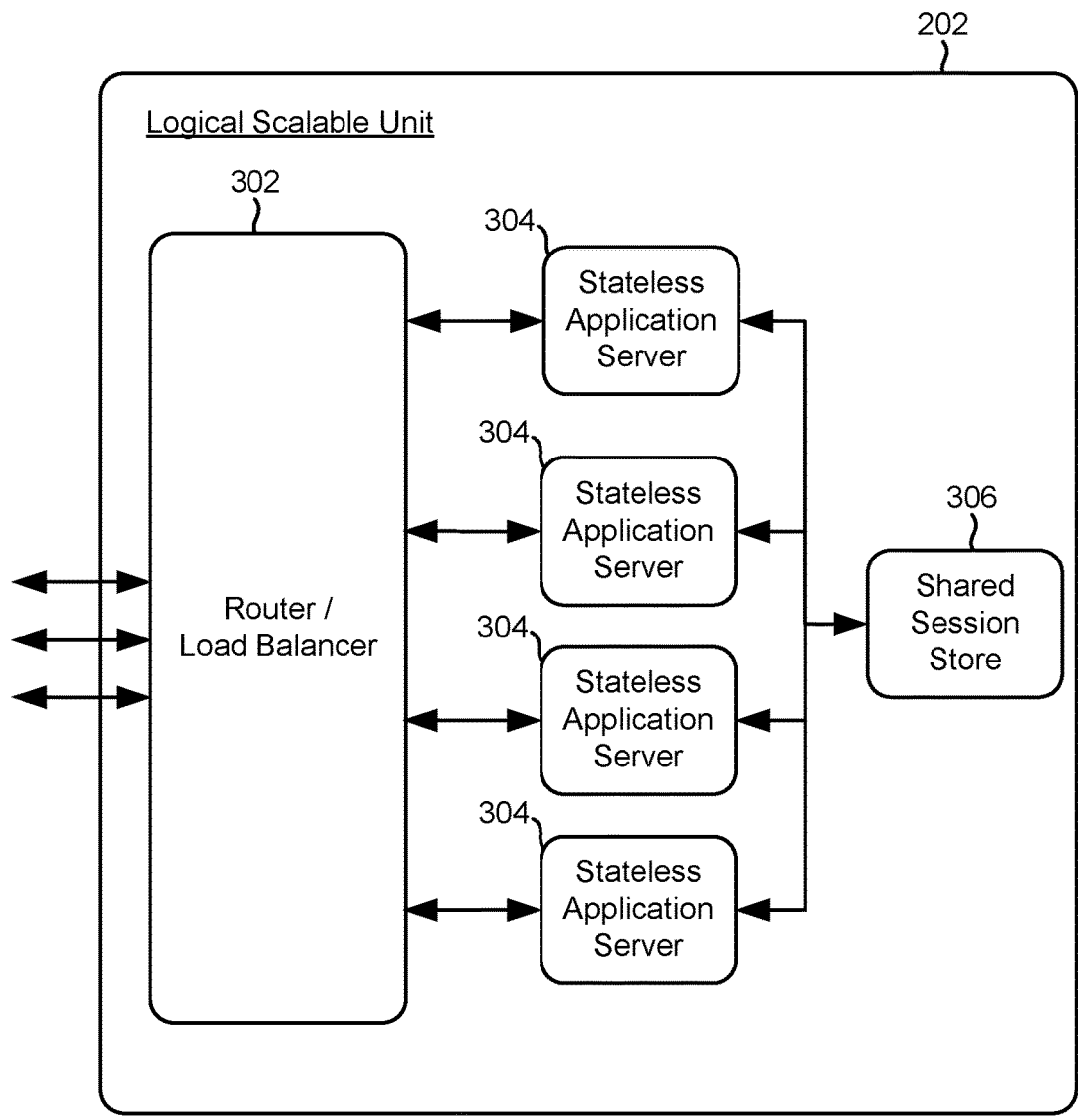
FIGS. 3 and 4 are block diagrams illustrating example logical and functional components in an embodiment logical scalable unit.

FIG. 3 illustrates example logical and functional components that may be included in an embodiment logical scalable unit 202. In the example illustrated in FIG. 3, the logical scalable unit 202 includes a router 302, a plurality of stateless application servers 304 and a shared session store 306 memory. The router 302 may be configured to operate as a load balancer. The router 302 may be aware of a session state within the logical scalable unit 202, and when the messages are part of an existing session, the router 302 may use the session state information to route messages to the appropriate stateless application servers 304.

The router 302 may perform load balancing operations to distribute messages that are not part of an existing session to the various application servers 304. Such load balancing operations may include performing a round-robin load balancing algorithm and/or distributing the messages based on the measured or detected workloads of the application servers 304.

Each application server 304 may be implemented on an independent server computing device, and all of the application servers 304 may have access to a shared session store 306.

In an embodiment, each logical scalable unit 202 may contain a subscription profile repository (SPR) and/or a unified data repository (UDR).

In an embodiment, the router 302 in the logical scalable unit 202 may be configured to send and receive information to and from a network router 104. In an embodiment, the router 302 may be a network router 104.

Figure 4:
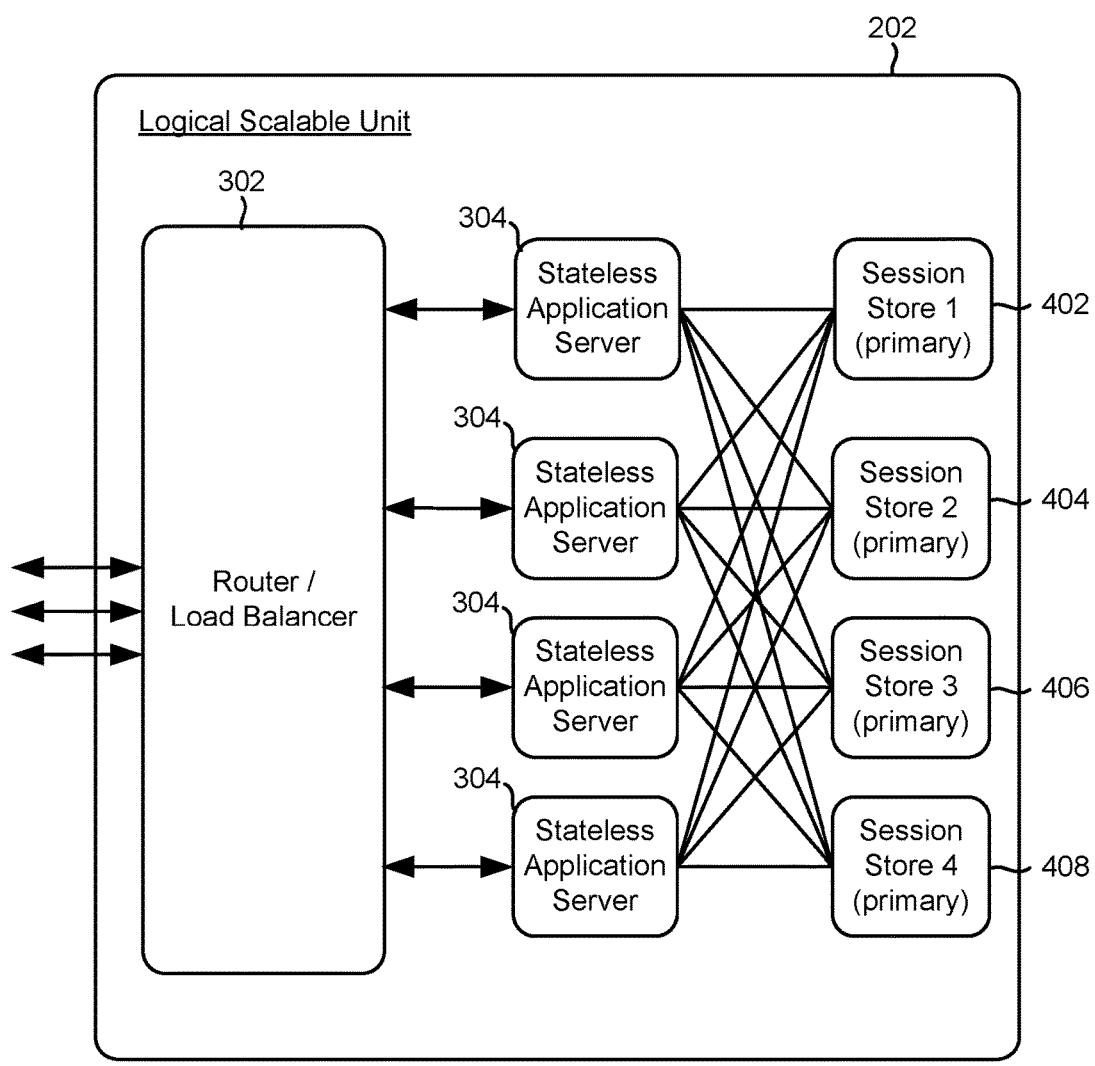

FIG. 4 illustrates example logical and functional components that may be included in another embodiment logical scalable unit 202. In the example illustrated in FIG. 4, the logical scalable unit 202 includes a shared session store made up of a plurality of session stores 402-408. Each session may be associated with a single session store 402-408, and each stateless application server 304 may be configured to communicate with each of the plurality of session stores 402-408.

In an embodiment, each session store 402-408 may be implemented in a separate or independent server computing device. In an alternative embodiment, each session store 402-408 may be implemented on a server that includes one or more of the stateless application servers 304.

In an embodiment, each session store 402-408 may be replicated on a second server, i.e. the primary session store 1 may be on server 1 and the secondary session store 1 may be on server 2, the primary session store 2 may be on server 2 and the secondary session store 2 may be on server 3, etc. This embodiment provides enhanced redundancy within the logical scalable unit 202 by ensuring that there is a replicated session store available in the event that one of them fails.

Figure 5:
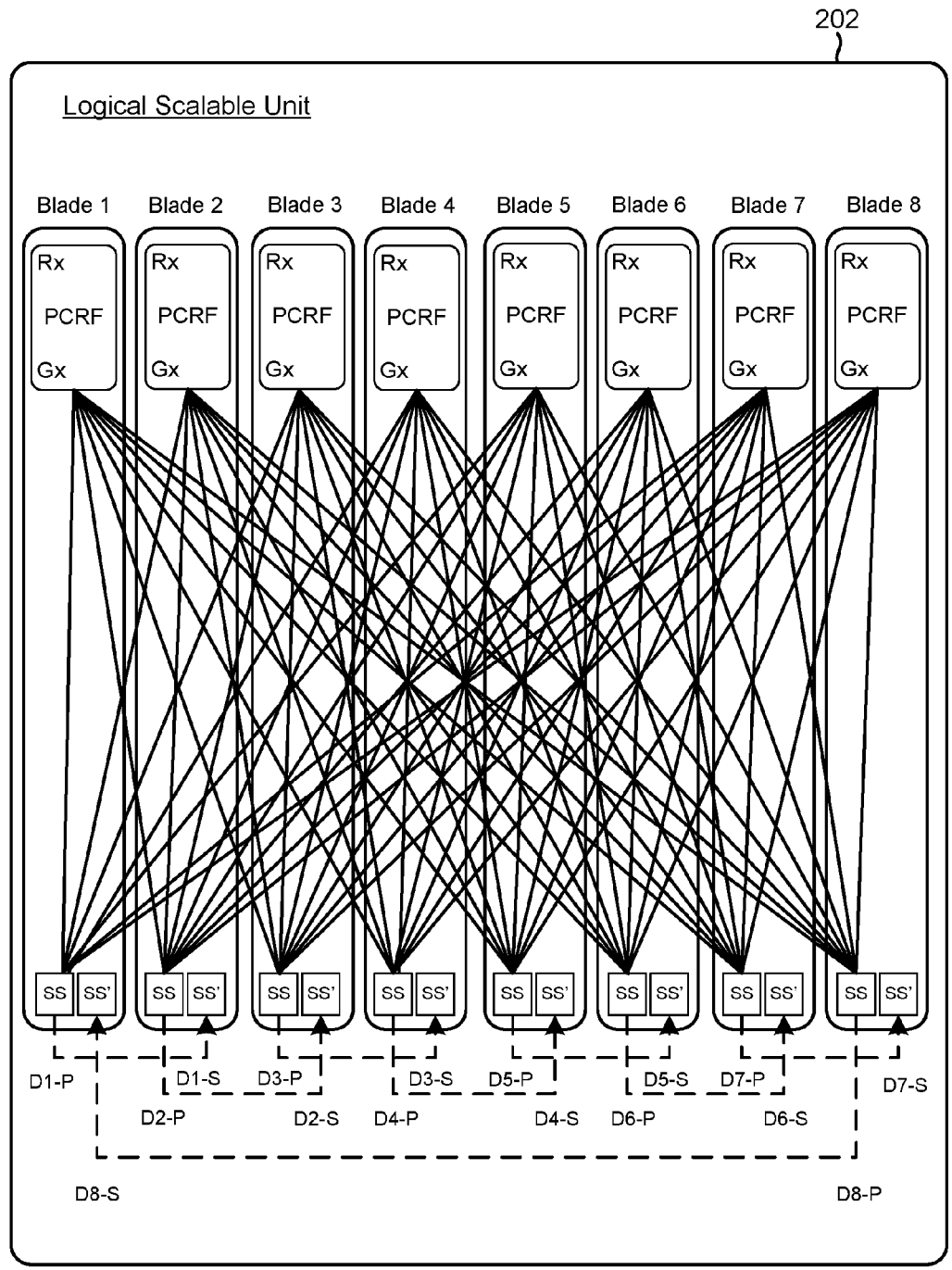
FIG. 5 is a block diagram illustrating an example logical and functional components in an embodiment logical scalable that suitable for use in a 3GPP network.

FIG. 5 illustrates example logical and functional components that may be included in another embodiment logical scalable unit 202 suitable for use with a 3GPP network. In the example illustrated in FIG. 5, the logical scalable unit 202 includes a router 302 (not shown in FIG. 5) configured to load balance Rx and Gx messages across eight PCRFs. The logical scalable unit 202 also includes a shared session store that is split into eight session stores (SS), and each session store has a primary and a secondary store to improve redundancy. For example, the logical scalable unit 202 may include eight servers, each of which may host a single PCRF, a primary session store (SS), and an unrelated secondary store (SS').

The logical scalable unit 202 may be configured so that when an application server fails (e.g., the PCRF on Blade 1), the router 302 redistributes the messages previously associated with the failed PCRF across the remaining seven PCRFs. In the event of such a failure, the session stores (i.e., D1-P and D8-S) may continue functioning so that the state or state information is not lost. When the logical scalable unit 202 is configured in this manner, components outside of the logical scalable unit 202 do not need to be informed of the PCRF failure, and can continue to communicate with the logical scalable unit 202 without an interruption in service.

In an embodiment, the logical scalable unit 202 may be configured to manage component failures by performing failover operations that automatically switch over to a redundant component (e.g., blade, server, memory, etc.) upon the failure or abnormal termination of a component. For example, when a primary session store fails (e.g., D1-P on Blade 1 in FIG. 5), a PCRF may failover or automatically switch to a secondary session store (i.e., D1-S on Blade 2). The associated secondary session store (i.e., D1-S on Blade 2) may be promoted to become the primary session store, and only the individual PCRF will be aware of this session store change/failover. In an embodiment, the session stores may use transparent connectivity technology that hides the detail of the primary and secondary session stores from the stateless application servers 304.

The logical scalable unit 202 may be configured so that when an entire server fails (e.g., Blade 1 in FIG. 5), the router 302 in the logical scalable unit 202 redistributes the messages previously associated with a PCRF associated with the failed server (e.g., the PCRF on Blade 1) across the remaining seven PCRFs. Further, the remaining seven PCRFs may failover from the failed primary session store (i.e., D1-P on Blade 1) to the associated secondary session store (i.e., D1-S on Blade 2). The associated secondary session store may be promoted to become the primary session store. In this case, one of the remaining primary session stores (i.e., D8-P on Blade 8) may no longer be associated with a secondary session store.

The various embodiment scalable computing environment and systems may be configured to support the addition and removal of additional or new logical scalable units 202 to best meet the current computing demands of the system, while the system continues performing its regular operations and without causing any interruptions or loss of service. This may be accomplished may implementing any or all of the components configurations discussed above with reference to FIGS. 1-5.

In an embodiment, the network router 104 (shown in FIG. 2) may be configured to provide enhanced routing capabilities that enable it to select both the logical scalable unit 202 and the stateless application server 304 within the logical scalable unit 202. In this embodiment, the network router 104 may be configured to perform load balancing operations (e.g., round-robin load balancing operations), which may include receiving communication messages from the clients 102 and distributing the received communication messages across the available application servers 304, choosing the stateless application servers 304 that are not associated with an existing session. The load balancer operations may also include routing messages belonging to existing sessions to another application server within the same logical scalable unit 202 in response to detecting the failure of a stateless application server 304. This may remove the requirement to include a router 302 within the logical scalable unit 202, but may require a more powerful network router that configured to be aware of both the logical scalable units 202 and the stateless application servers 304.

In an embodiment, the logical scalable unit 202 may be generated or organized to include other logical scalable units 202. For example, an embodiment scalable computing environment or system may include a parent logical scalable unit that includes one or more child logical scalable units. The parent and child logical scalable units may be organized into a hierarchical tree structure. In an embodiment, one or more child logical scalable units may be included in a parent logical scalable in lieu of one or more stateless application servers 304.

In various embodiments, a logical scalable unit 202 may be configured, generated, arranged, or organized to describe or provide a unit of processing power or functionality that can be replicated and/or used to horizontally scale a solution, deployment, system, or resource on a large (or unlimited) scale. The logical scalable unit 202 may make system data central to the system configuration/architecture and/or reduce the number of endpoints that are visible to the router components, reducing the system's complexly and improving its performance.

Each individual logical scalable unit 202 may be organized to include all the information and resources needed to process a defined number of tasks or events, and may operate independently of all other LSUs in the system (i.e., does not share stateful information with other LSUs, etc.). The logical scalable unit 202 may also be configured to allow additional processing units, components, or computing resources to be added or removed from the system/solution without requiring changes to other components in the system. The logical scalable unit 202 may be configured to allow for the federation or sharding or partitioning of data into logical units, which may split or distribute processing. The logical scalable unit 202 may allow the system to dynamically adjust its use of hardware and network resources so that they are commensurate with the demands placed on the system.

An embodiment scalable computing environment or system may include two or more logical scalable units 202 that share stateful information. By including two or more logical scalable units 202 that share stateful information in the scalable computing environment or system, the various embodiments systems may provide a telecommunication system with seamless scalability that requires very little or no downtime for expansion or addition of computing resources (i.e., is elastically scalable).

In an embodiment, the scalable computing environment or system may include two or more logical scalable units that do not share stateful information with one another. Each logical scalable unit may operate independently of the other logical scalable units in the system, and as a result, the system may achieve improved elasticity (i.e., because each logical scalable unit can be brought online and taken offline without impacting other logical scalable units in the system).

Generally, improving the scalability of applications and components (e.g., PCRF, OCS, etc.) that are deployed or included in a telecommunication system is an important design criterion for network engineers, telecommunications operators, and designers of telecommunication systems. Elastic scalability is the ability of a network or system to respond to changes in the workload, communications, signaling, and/or traffic demands of the telecommunication network, which may be accomplished by adding or removing various components (e.g., logical nodes, computing devices, memories, software applications, processes, etc.) to the network/system to adjust the system's overall throughput so that it is commensurate with the current or predicted future demands of the system.

It is often difficult to deploy or implement solutions that are elastically scalable in existing telecommunication systems due to the speed, latency, responsiveness, and availability requirements placed on such systems by their subscribers, client applications, and telecommunications operators. For example, many applications (e.g., PCRF, OCS, etc.) require access to subscriber information that is stored in a database, and as a result, the scalability of these applications often depends on the scalability of the underlying database solution. Yet, many existing scalable database solutions (e.g., solutions built on NUODB®, VOLTDB®, CASSANDRA®, MONGODB®, etc.) utilize a distributed or cloud-based architecture in which the actual or physical location (e.g., the datacenter, rack, server computing device, memory, database node, etc.) of the stored information changes frequently (i.e., as the database is scaled up or down) and/or cannot be determined in advance. As a result, requests to access information stored in a distributed database system typically require that the database system perform extra processing and/or routing operations to locate or identify the component in which the data is stored. These additional operations may increase data access times of the database or the latency of the requesting application. While such latencies (15-100 milliseconds) may be acceptable in web-based applications and solutions, they are not acceptable for many of the applications (e.g., PCRF, OCS, etc.) that are included in a high-speed telecommunication system, which often require that data access times and latencies be kept below 5 milliseconds.

Figure 6:
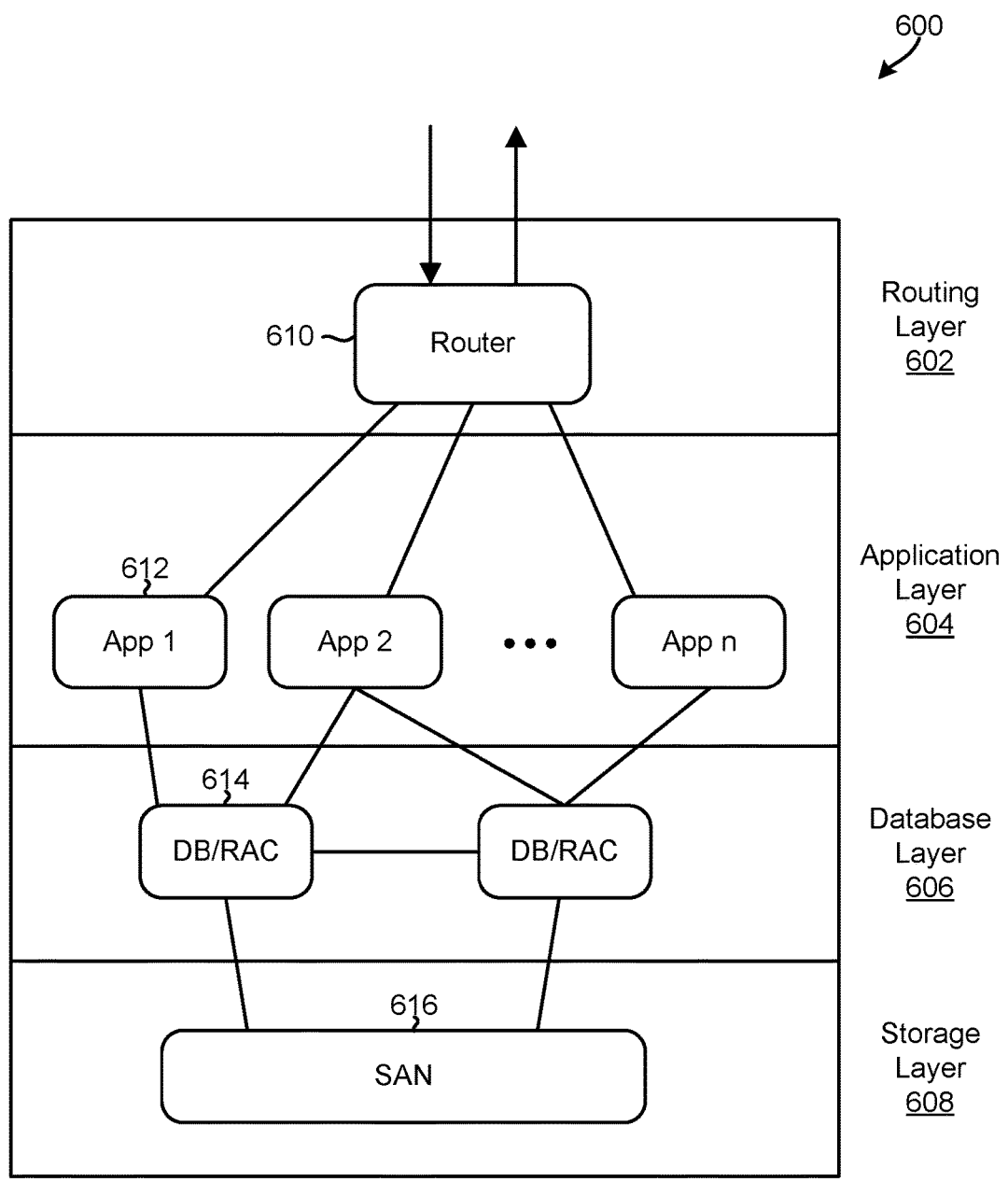
FIG. 6 is a block diagram illustrating the communication links and logical and functional components in an example telecommunication system having a centralized storage system.

FIG. 6 illustrates communication links and logical and functional components in an example telecommunication system 600 having a centralized storage system. The telecommunication system 600 is organized using a layered architecture that includes a routing layer 602, an application layer 604, a database layer 606, and a storage layer 608. In each of these layers, various hardware and/or software components may implement functionality that is commensurate with responsibilities or groups or categories of operations assigned to that layer. In the example illustrated in FIG. 6, the routing layer 602 includes a router 610 component, the application layer 604 includes a plurality of application server nodes (App 1-App n) 612, the database layer 606 includes two databases/real application clusters (RAC) 614, and the storage layer 608 includes a single centralized storage area network (SAN) 616. Each of the application server nodes 612 may be or include an application component (e.g., PCRF, OCS, etc.).

The telecommunication system 600 illustrated in FIG. 6 is not easily scalable because the database layer 606 is not horizontally scalable, and all the data is stored in a single centralized SAN 616. That is, the addition of a significant number of new applications or components in the system 600 may reduce the speed, performance or responsiveness of system 600. This is because the system uses a centralized storage solution, and each of the added clients/components would be required to read and write data to the same centralized SAN 616 as all the other clients/components in the system 600. This increase in the number of components accessing the same storage unit (i.e., SAN 616) may result in an increase in network communications, traffic, and contention, any or all of which may contribute to an unacceptable increase in the latencies of the applications. Furthermore, telecommunication systems that include centralized storage/database systems are difficult to scale while the system is live. For these and other reasons, telecommunication systems that include centralized storage/database system do not scale well and cannot make efficient use of cloud-based or distributed systems/solutions.

Figure 7:
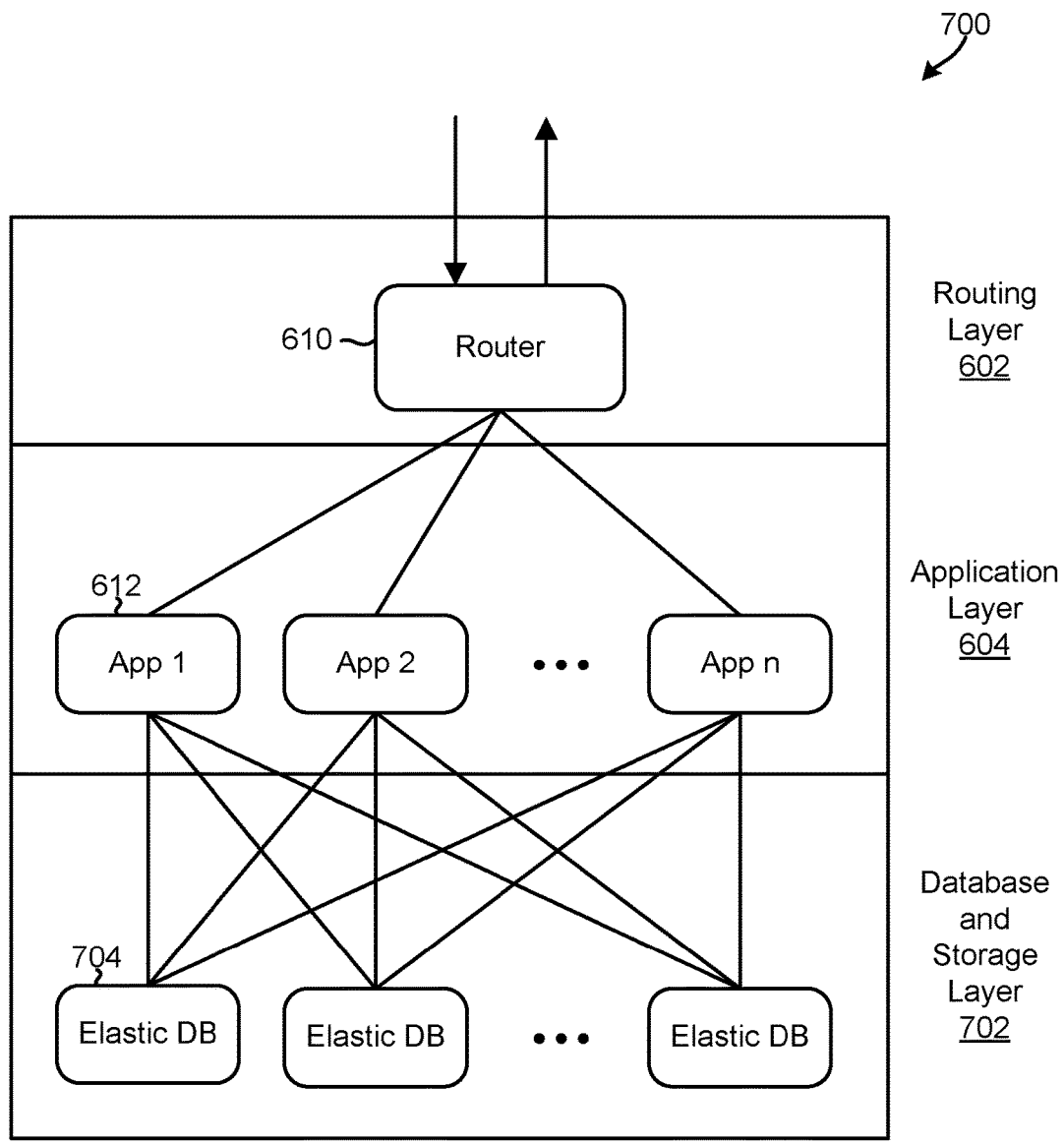
FIG. 7 is a block diagram illustrating the communication links and logical and functional components in an example telecommunication system having a "shared nothing" elastically scalable cloud architecture in which the data is distributed over a number of database nodes/components suitable for use with various embodiments.

FIG. 7 illustrates logical and functional components in an example telecommunication system 700 having a "shared nothing" elastically scalable cloud architecture in which the data is distributed over a number of database nodes/components. The system 700 is organized using a layered architecture that includes a routing layer 602, an application layer 604, and a combined database and a storage layer 702. In each of these layers, various hardware and/or software components may implement functionality that is commensurate with responsibilities or groups or categories of operations assigned to that layer. The routing layer 602 includes a router 610 component, and the application layer 604 includes a plurality of application server nodes (App 1-App n) 612, each of which may be or include an application component. The database and storage layer 702 includes the plurality of elastically scalable database 704 modules or components.

Each of the elastic database 704 modules may be stored or located on an independent database node/component (e.g., in a separate server device, etc.), and each of the application server nodes 612 may include a communication link to each of the elastic database 704 modules. The router 610 may be configured to distribute the system's workload between the application server nodes 612 (e.g., using a round robin node selection method), and each application server node 612 may retrieve data from any of the elastic database 704 modules.

The telecommunication system 700 illustrated in FIG. 7 does not require, use, or include a centralized database system (i.e., SAN 616), and as a result, is more scalable than the system 600 illustrated in FIG. 6. However, the system 700 may not be sufficiently fast or efficient because the stored data is always remote from the application server nodes 612. That is, the system 700 lacks sufficient "data locality" because the data is not stored in close proximity to the application/component that uses or accesses the data, and as a result, components in the system 700 may communicate over large distances via Ethernet, Internet, or other networks or network-based communications that are slow or susceptible to network traffic and network I/O latencies. For these and other reasons, the system 700 may experience slower response times when a significant number of additional components are added to the system 700, and thus such a system is not highly scalable.

The various embodiments include methods, devices and systems configured with processor-executable instructions to implement methods of storing, performing, and organizing data, communications, and components in a telecommunication system so that the system better supports elastically scalable databases, achieves improved data locality, reduces the latency of the components, and achieves faster response times.

Generally, improving a system's "data locality" includes storing the data in close physical, temporal, spatial, and/or logical proximity to the components that are most likely to require access to the data. In the various embodiments, this may be achieved by storing data in a memory that is in the same datacenter, rack, server computing device, virtual server, virtual machine, address space, module, register set, or process as the components that access the data or that are tasked with processing the data.

Using existing solutions, it is difficult to achieve improved data locality in systems that include elastically scalable databases (e.g., the system 700 illustrated in FIG. 7) because the data is stored remotely and the location/memory in which the stored data is not static or fixed. That is, scaling a system that includes an elastically scalable database typically includes performing load balancing operations in which the stored data is relocated to different partitions or shards (i.e., a different horizontal partition). The changing and remote nature of the data storage locations in such systems makes it more difficult to identify or locate the actual or physical component/memory that stores the data in advance, and may require that the system perform additional network input/output, routing, or processing operations to locate, access and/or retrieve the data. These additional operations and communications may increase the latencies of the applications/components in the telecommunication system. For these and other reasons, existing solutions are not suitable for use in highly scalable high-speed telecommunication systems.

The various embodiment methods, systems, and devices may achieve or improve "data locality" in a telecommunication system that includes a plurality of elastically scalable databases by merging and organizing the application, database and storage layers so that the data is (or is more likely to be) stored/located in the same component (e.g., same datacenter, rack, server device, service, process, etc.) as the applications/components that require or request access to that data. By improving data locality, the various embodiments reduce the number of network input/output transactions that must be performed in the telecommunications network, reduce the workload of the network and/or its sub-systems, and/or reduce the overall latency of the applications/components. The various embodiments also improve the efficiency, scalability, and speed of the telecommunication system, its sub-systems, and its applications and components. The various embodiments also allow the telecommunication system to use cloud-based and distributed systems/solutions more efficiently and without significantly impacting the speed or responsiveness of the system.

Figure 8:
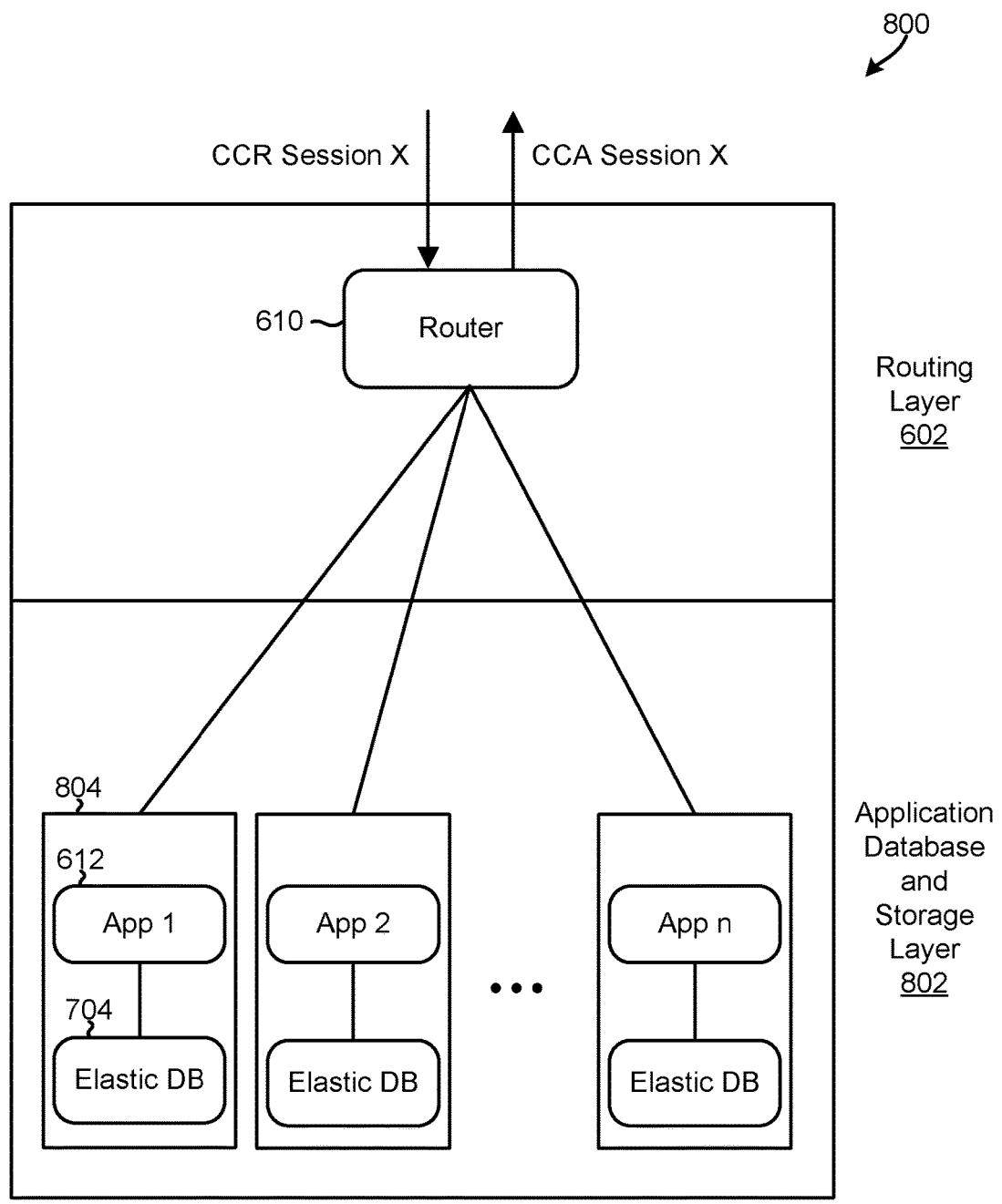
FIG. 8 is a block diagram illustrating the communication links and logical and functional components in an embodiment telecommunication system having a layered architecture in which the application, database, and storage layers are merged to achieve improved data locality.

FIG. 8 illustrates logical and functional components in an embodiment telecommunication system 800 having a layered architecture in which the application, database and storage layers are merged to achieve improved data locality. The system 800 may include a routing layer 602 having a router 610 component. The system 800 may also include a combined application, database, and storage layer 802 that includes a plurality of application server nodes (App 1-App n) 612 and elastic database 704 modules/components. Each of the elastic databases 704 may be stored or located on an independent database node/component (e.g., in a separate server device, etc.), and each of the applications server nodes (App 1-App n) 612 may be an application component that is coupled to an elastic database 704.

In an embodiment, the combined layer 802 may include, or may be organized into, a plurality of modules 804, each of which include an application server node 612 and an elastic database 704. In an embodiment, an entire module 804 may be located, stored or included in a single component (e.g., datacenter, rack, device, component, process, etc.). This may be achieved by storing both the applications and the data used by the applications in the same component (e.g., server computing device). In an embodiment, one or more of the modules 804 may be a logical scalable unit 202. In an embodiment, the system 800 may be a logical scalable unit 202.

The routing layer 602 may be horizontally scalable and/or include a plurality of router 610 components. Each router 610 component may be configured to receive request messages (e.g., a Credit-Control-Request (CCR) request, etc.) and route the received messages to the component (e.g., logical scalable unit 804, etc.) in which data corresponding to request message is stored (e.g., the session). By including a plurality of router 610 components in the routing layer 602, the various embodiments may better ensure redundancy by providing High Availability (HA). Further, the system may include a router 610 component for each of a variety of different message types. In an embodiment, the routing layer 602 may include a Gx router and an Rx router. In an embodiment, the Gx router may be read and write capable and the Rx router may be read-only.

The application server nodes 612 may be any component that may be tasked with processing a request message and requires access to subscriber related data stored in the elastic databases 704, such as a policy management system, charging system, etc. Further, each application server node 612 may include any part or combination of any existing telecommunication node, sub-system, or component. For example, an application server node 612 may include all or slices or portions of any combination of a policy and charging enforcement function (PCEF) component, a policy and charging rules function (PCRF) component, an application function (AF) component, and an online charging system (OCS) component. By combining two or more such functions in a single application, the various embodiments reduce latency and improve performance by reducing the amount of inter-component communications or signaling that is performed in the system. Further, by moving functions and data used by those functions into close proximity, the various embodiments improve the system's data locality.

In an embodiment, the telecommunication system 800 or its components may achieve improved data locality by performing methods and/or implementing solutions that organize, store, or locate all the components and data required to process a request message (e.g., a CCR, etc.) in a single logical scalable unit (i.e., module 804). For example, a single logical scalable unit or module 804 may be organized to include a policy management (e.g., PCRF) component, a subscription profile repository (SPR), reference tables, balance information, and session information in a single server computing device. Including all the components and data required to process a request in a single logical scalable unit (i.e., module 804) may reduce the number of synchronous remote communications that must be performed in the system 800, and reduces the amount of information that is communicated between the components in the system 800, when processing the request message. This may improve the speed, efficiency, and responsiveness of the system 800.

In addition to achieving improved data locality, the telecommunication system 800 may perform methods and/or implement solutions that minimize secondary key lookups (where related sessions are associated/bound with each other based on one or more non-primary session keys), minimize contention, and maximize parallelism of remote communications within the system, any or all of which may be achieved (or are made possible) by organizing the various logical and functional components (e.g., nodes, layers, applications, modules, etc.) in the manner illustrated in FIG. 8. In addition, this grouping/organization allows the telecommunication system 800 to perform methods and implement solutions that cause the system to become highly available, better support elastic scalability, reduce the incidence of failure/failover/recovery conditions, and eliminate the need to include or use a shared or centralized storage system.

As new or additional components are added or removed from the system 800, it is more likely that a component (server, memory, etc.) in the system 800 will fail or experience errors. To maintain high-availability, the system 800 may be required to manage component failures and errors by quickly switching over to (or failing over to) a redundant component when such failures/errors are detected. This is typically requires that the data stored in the elastic databases 704 be replicated, made redundant, or otherwise made durable. In addition, as more components are added or removed from the system 800, the software and/or data (e.g., subscriber data) stored in existing components may require migration or redistribution to or from the added or removed components. As a result, it may become difficult to ascertain or predict the exact locations or components in which specific information is stored. Further, since the logical scalable units (i.e., modules 804) may group/associate an application server node 612 to a specific elastic database 704 component, maintaining the groupings or relationships between each application server node 612 and the data in the databases 704 during data migrations, redistributions and failovers becomes a challenging design criterion.

The various embodiments include methods, and systems and server computing devices configured to implement the methods, of providing telecommunication network services and processing request messages so as to maintain the logical groupings and relationships between applications and their corresponding data/database as new components are added or removed from the telecommunication network, and in the presence of errors or failovers. By maintaining the logical groupings/relationships, the various embodiments may improve the network's performance, responsiveness, predictability, and efficiency, and allow the network to better utilize commodity hardware and/or cloud-based or distributed systems/sub-systems.

In an embodiment, the router 610 component may include a data locality table (DLT) that stores values suitable for use in identifying the component (e.g., logical scalable unit 804, application 612, etc.) in which data associated with the subscriber or group of subscribers is stored. The data locality table may be stored in the router 610 component as an independent table or in association with a surrogate key table. Each router 610 component may store one or more data locality tables for each subscriber, subscriber group, or message type (e.g., Gx, Rx, Gxa, etc.).

The router 610 may use the data locality table to route messages to the component (e.g., logical scalable unit 804, application 612, etc.) associated with the elastic database 704 that stores the relevant data for a subscriber (or group of subscribers) identified in the message. When the system 800 scales or the data is moved to a new component (e.g., logical scalable unit 804), the router 610 component may update the values in the data locality table to reflect changes in the component. In an embodiment, the router 610 component may be configured to poll the elastic databases 704 for such changes/updates. In another embodiment, the elastic database 704 components may be configured to push changes/updates to the router 610 component when the database 704 determines that there have been changes to the database topology.

In an embodiment, the system 800 may include a database proxy architecture (DPA) in which the router 610 component includes a client application programming interface (API) module suitable for use in identifying/locating a specific partition of the elastic database 704 in which data corresponding to a subscriber or group of subscribers is stored. In various embodiments, the client API module may provide or include any or all of the features/functionality provided by existing database client APIs (e.g., VoltDB client API, etc.) that are suitable for use in indentifying data storage locations.

In various embodiments, the router 610 component may use the client API module to route messages to, and store information in, a specific partition/shard of an elastic database 704 that is associated with an application server node 612 tasked with processing that message. The application server node 612 may then pull the relevant data from its associated elastic database 704. In these embodiments, data locality is achieved or improved because the application server node 612 processes requests from its associated elastic database 704 in the same logical scalable unit or module 804 and/or via the use of local or loopback communications. Further, in these embodiments, the elastic database 704 may act as a proxy between the router 610 component and the application server node 612. As such, the database layer is effectively situated between the router layer and the application layer (i.e., due to the information flowing from the router to the database, and then to the application). This logical organization of layers, components and/or functionality may be accomplished in part because the system 800 includes a combined application, database, and storage layer 802. In an embodiment, this combined layer 802 may further include the router 610 component.

In an embodiment, the router 610 component may be configured to perform learning or prediction operations to determine the location of a specific partition/shard of the elastic database 704 in which data corresponding to a subscriber or group of subscribers is stored. For example, the router 610 may monitor the scaling operations in the system 800, and collect heuristics and/or compute statistics regarding the monitored operations, such as the number of logical scalable units (i.e., modules 804) in the system before scale out, the number of logical scalable units or modules 804 in the system after scale out, when the scale out occurred, the duration of the scaling operations, the number of data retrieval misses before and/or after scaling, etc. Based on these heuristics and/or statistic values, the router 610 may predict which data units or data keys have been moved during the scaling operations and/or to which logical scalable units (i.e., modules 804) the data is most likely to have been moved.

Generally, components in a telecommunication network may be responsible for receiving, processing, and communicating many different types of messages and message formats. Not all of these different message types include a unique, common, or uniform identifier (e.g., IP address, etc.) that is suitable for use in identifying a specific database record (e.g., a record for a specific session, subscriber, group of subscribers, etc.). As a result, each component may be required to perform additional operations to determine whether a data record is associated with the same subscriber identified in a message. For these and other reasons, the data may be stored in the databases in association with both a primary key and one or more secondary keys. However, in many horizontally scalable databases (e.g., elastic database 704, etc.), data is shard/partitioned using only the primary key. Consequently, data access times are typically much greater when using a secondary key to locate a database record (i.e., as opposed to the primary key to locate the database record).

The various embodiments include methods, and systems and server computing devices configured to implement the methods, of organizing data in an elastic database so as to reduce the number of secondary key lookups that are required to identify specific data records when reading or writing information to and from a database (e.g., elastic database 704, etc.). In various embodiments, the data may be organized via a single common key method or via an independent key method.

FIGS. 9A-12B illustrate various embodiment methods of processing communication messages in a high-speed, highly available, and elastically scalable telecommunication system. Specifically, FIGS. 9A, 10A, 11A, and 12A illustrate embodiment methods of processing an initial Gx message, and FIGS. 9B, 10B, 11B, and 12B illustrate embodiment methods of processing a subsequent Rx message after the system has been scaled. For ease of reference, these methods are discussed using specific Diameter message formats and terminology. However, it should be understood that such references are for illustrative purposes only, and are not intended to limit the scope of the claims to a particular message type, communication, network or technology unless specifically recited in the claim language.

Figure 9A:
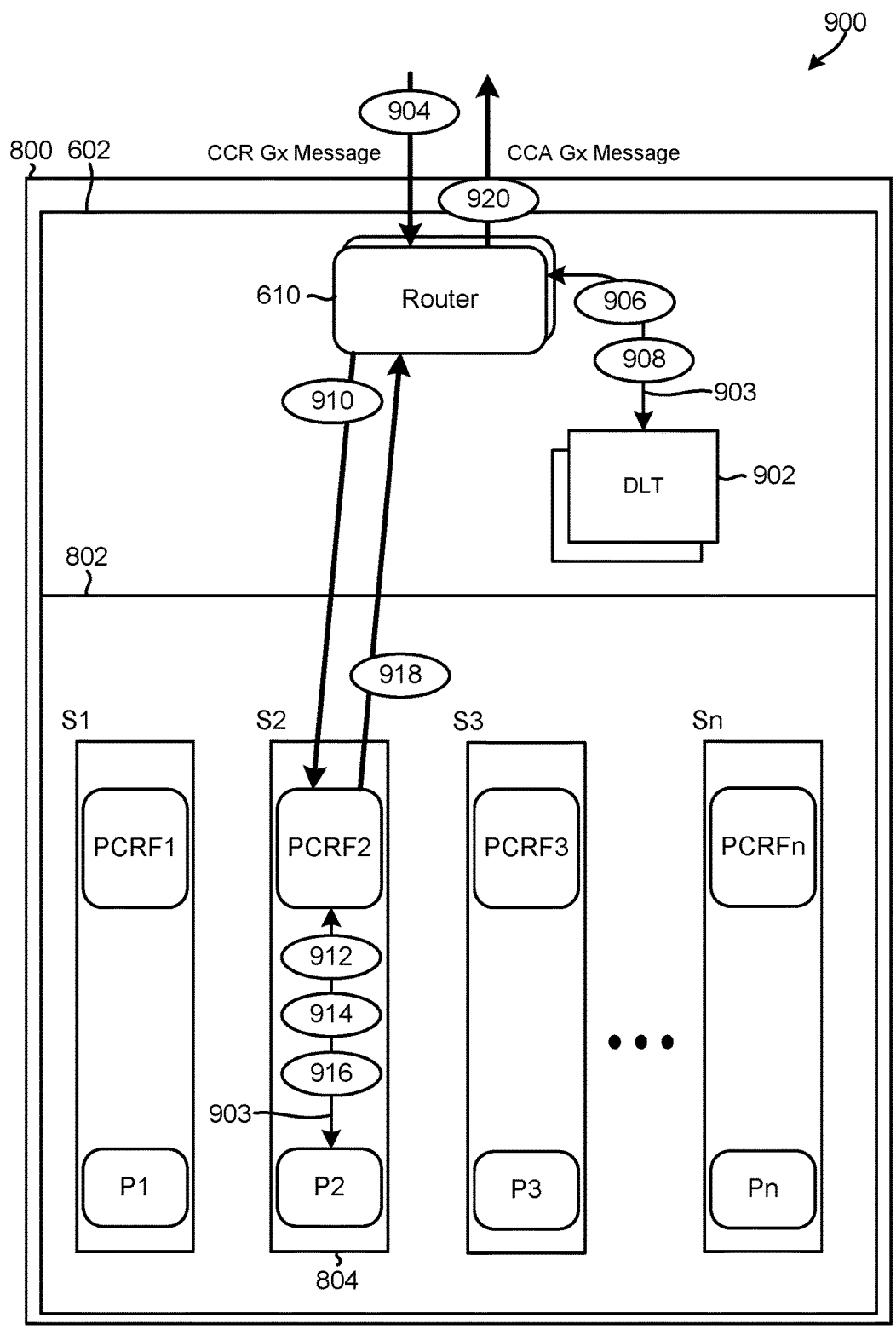
FIG. 9A is a block diagram illustrating the operations and interactions between various components configured to perform an embodiment system method of processing a communication message using a combination of a common key routing method and a data locality table method.

FIG. 9A illustrates an example system method 900 of processing a request message using a combination of a common key routing (CKR) method and a data locality table (DLT) method to achieve data locality and reduce secondary key lookups in accordance with an embodiment. The illustrated system method 900 may be performed by various components (e.g., router, application, etc.) in a high-speed, highly available, elastically scalable telecommunication system 800.

In the example illustrated in FIG. 9A, the system method 900 is performed in system 800 includes a routing layer 602 and a combined application, database, and storage layer 802. The combined layer 802 may include a plurality of logical scalable units or modules (S1-Sn), each of which include an application component (PCRF1-PCRFn) and an elastic database partition (P1-Pn). The routing layer 602 may include a router 610 component that stores, includes, or otherwise has read/write access to a data locality table 902.

In various embodiments, the data locality table 902 may be a table, map, hash table, nested hash table, or similar data structure. The data locality table 902 may store a mapping of key values to the applications (PCRF1-PCRFn) associated with the data or to the logical scalable units (S1-Sn). The data locality table 902 may store a single unique surrogate key (SK) for each subscriber or group of subscribers, and these surrogate keys may be the primary index key to records stored in the data locality table 902.

In an embodiment, the data locality table 902 may be included in a surrogate key table. In another embodiment, the data locality table 902 may include a surrogate key table. In a further embodiment, each of the surrogate key tables may be a hash table. Each logical scalable unit 804 may include multiple data locality tables 902, and each data locality table 902 may be distributed or replicated on multiple logical scalable units 804. Each record in each data locality table 902 may store references to more than one logical scalable unit 804. For example, each record in the data locality table 902 may contain a field identifying the primary application (PCRF1-PCRFn) associated with the data or the logical scalable unit (S1-Sn), a field identifying a secondary application (PCRF1-PCRFn) associated with the data or a logical scalable unit (S1-Sn) that provides rack-level redundancy, and a field identifying a tertiary application (PCRF1-PCRFn) associated with the data or a logical scalable unit (S1-Sn) that provides datacenter level redundancy, etc.

In operation 904 of method 900, the router 610 component may receive a Gx CCR-I request message (Request X) that includes a Mobile Subscriber Integrated Services Digital Network Number (MSISDN) field, a Frame-IP-Address (FIA) field (e.g., the IPv4 or IPv6 address associated with the subscriber), and Access-Point-Name (APN) field (e.g., from the Called-Station-ID). The value of the MSISDN field may uniquely identify a subscriber or a group of subscribers, and a combination of the values stored in the FIA and APN fields (herein FIA+APN) may also uniquely identify the subscriber or group.

In operation 906, the router 610 component may access or query the data locality table 902 via a local or loopback communication 903 to determine the location of subscriber data (e.g., SPR, balances, session information, etc.) based on the contents of the received Gx CCR-I request message (Request X), and a generated surrogate key. For example, in operation 906, the router 610 component may use the subscriber identifiers (e.g., MSISDN, FIA+APN) of the received message (Request X) to generate a surrogate key, and use the surrogate key to access the data locality table 902 to determine which of the logical scalable units (S1-Sn) 804 includes an application (PCRF1-PCRFn) associated with information corresponding to a subscriber identified in the received request message (Request X).

In an embodiment, generating the surrogate key may include using the value of the MSISDN field of the received request message (Request X) as the generated surrogate key. For example, in an embodiment, the unmodified MSISDN value may be used as a surrogate key. In other embodiments, generating the surrogate key may include performing a hash function, algorithm, or operation that includes generating a hash value or code by using the MSISDN value as an input or key to a hash function. For example, if the value of the MSISDN field is "3539876542," the router 610 component may perform hash operations to generate a surrogate key value of "112" (i.e., SK (MSISDN=3539876542)=112). This surrogate key value (i.e., 112) may itself be a key to a bucket or value (e.g., S2 or PCRF 2) of the data locality table 902.

In the example illustrated in FIG. 9A, in operation 906, the router 610 component may use the generated surrogate key (e.g., 112) to retrieve a record from the data locality table that identifies the logical scalable unit (S2) or application component (i.e., PCRF2) associated with the data corresponding to the subscriber identified in the request message (Request X).

In operation 908, the router 610 component may update or insert mappings into a surrogate key table and/or data locality table associated with a different message or message type (e.g., Rx, Gxa, etc.) via a local/loopback communication 903. For example, the router 610 component may update or insert mappings of the FIA+APN value, the generated surrogate key value (e.g., 112), and the determined data location (e.g., S2 or PCRF2) into a surrogate key table associated with an Rx message type. This surrogate key table may be used by the router 610 to locate subscriber data for a subsequent communication message, such as a subsequent Rx Authentication Authorization Request (AAR) message.

In operation 910, the router 610 component may route/send the message (Request X) to an application (PCRF2) in the logical scalable unit or module 804 determined to include the elastic database partition (P2) that stores information (e.g., SPR, balances, session, etc.) corresponding to the subscriber.

In operation 912, the application (PCRF2) may receive the message (Request X), and store information corresponding to the received message (e.g., session information) in the associated elastic database partition (i.e., P2) via a local/loopback communication 903.

In operation 914, the application (PCRF2) may query/request subscriber data (e.g., SPR, balances, session, etc.) from the associated elastic database partition (i.e., P2) via a local/loopback communication 903.

In operation 916, the local elastic database partition (P2) may send the subscriber data to its associated application (i.e., PCRF2) via a local or loopback communication 903.

In operation 918, the application component (PCRF2) may perform various policy and/or charging operations, generate a Credit Control Answer (CCA) Gx response message, and send the generated CCA Gx message to the router 610 component.

In operation 920, the router 610 component may receive and route the CCA Gx message to the appropriate component or system in the telecommunication network.

The performance of system method 900 by the various components (e.g., router, applications, etc.) in the system 800 improves the system's 800 overall efficiency and responsiveness by reducing the number of synchronous remote communications that must be performed when processing communication messages. For example, when implementing system method 900, the system 800 only incurs a performance penalty of four (4) remote synchronous communications (in operations 904, 910, 918, and 920) when processing a Gx request message. Since local/loopback communications are much less expensive than remote synchronous communications, configuring the components to perform system method 900 improves the performance, efficiency, and responsiveness of the entire system 800.

The performance of system method 900 may include the use of a common key routing method, which may allow all of the session information related to a common key to be stored in a single entry in the session store. This in turn allows the system method 900 to be performed by components in a system that includes elastically scalable No-SQL databases.

Figure 9B:
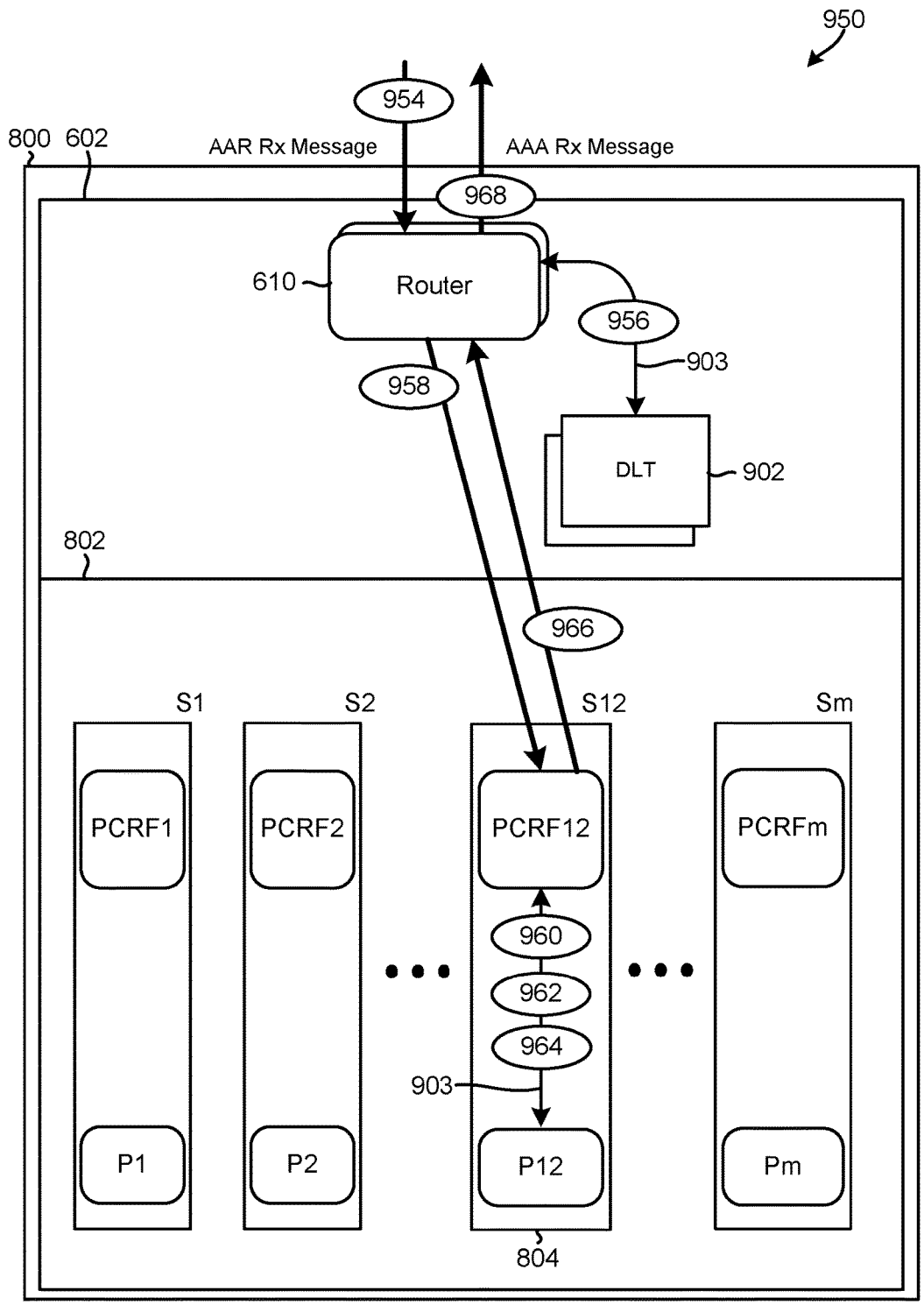
FIG. 9B is a block diagram illustrating the operations and interactions between various components configured to perform an embodiment system method of processing a second communication message using a combination of a common key routing method and a data locality table method.

FIG. 9B illustrates another example system method 950 of processing a request message using a combination of a common key routing (CKR) method and a data locality table (DLT) method. System method 950 may be performed by components in the system 800 after the performance of the system method 900 illustrated in FIG. 9A, after the system 800 has been scaled, and in response to the router 610 component receiving a subsequent request message (e.g., Rx AAR request message). More specifically, in the example illustrated in FIG. 9B, the system method 950 is performed after the logical scalable units have been scaled to include Sm logical scalable units (where Sm is greater than Sn), the subscriber data previously stored in the in the second partition (P2) contained in the second logical scalable unit (S2) has been moved to the twelfth partition (P12) contained in the twelfth logical scalable unit (S 12), and the data locality table 902 and surrogate keys have been updated to reflect the new data locations (S12 or PCRF12).

In operation 954 of method 950, the router 610 component may receive an Rx AAR message for a new Rx session (Request Y) that includes FIA+APN field that identifies a subscriber (or group of subscribers) and/or a session identifier. That is, in operation 954 the router 610 component may receive a communication message that identifies the subscriber/session via a different field, value, or identifier as that which is used by the communication message (Request X) received in operation 904 of method 900.

In operation 956 of method 950, the router 610 component may query a data locality table 902 via local or loopback communications 903. For example, the router 610 component may use the FIA+APN value to retrieve the common surrogate key, and use the common surrogate key to retrieve a record from the data locality table 902, and determine which of the logical scalable units (S1-Sm) 804 includes an application (PRF1-PCRFm) that is associated with information corresponding to the subscriber identified in the received message (Request Y) based on the retrieved record. Since, in this example, the data locality table 902 has been updated after the scaling operations, querying data locality table 902 using the common surrogate key (112) will return a data location of "S12" or "PCRF12".

In operation 958, the router 610 component may route/send the Rx AAR-I request message (Request Y) to the application (PCRF12) in the logical scalable unit or module 804 determined to be associated with the elastic database partition (P12) that stores information corresponding to the subscriber identified in the request message (Request Y). Alternatively, the router 610 component may generate a new communication message based on information included in the Rx AAR-I request message (Request Y), and send this new communication message to the application (PCRF12).

In operation 960, the application (PCRF12) may receive the message (Request Y), and store information corresponding to the received message (e.g., session information) in the corresponding elastic database partition (P12) via a local or loopback communication 903.

In operation 962, the application may query/request subscriber data (e.g., SPR, balances, session, etc.) from its associated elastic database partition (P12) via a local or loopback communication 903.

In operation 964, the elastic database partition (P12) may send the subscriber data to the application (PCRF12) via a local or loopback communication 903.

In operation 966, the application (PCRF2) may perform various policy and/or charging operations, generate an Authentication Authorization Answer (AAA) Rx message, and send the generated AAA Rx message to the router 610 component.

In operation 968, the router 610 component may route the AAA Rx message to the appropriate component or system in the telecommunication network.

Configuring the various components (e.g., router, database, application, etc.) to perform system method 950 improves the system's 800 overall efficiency and responsiveness by reducing the number of synchronous remote communications that must be performed when processing communication messages. For example, when implementing system method 950, the system 800 only incurs a performance penalty of four (4) remote synchronous communications (i.e., in operations 954, 958, 966, and 968). All other communication and interactions between the components are accomplished via local or loopback communications. Since such local/loopback communications are faster and less expensive than remote synchronous communications, configuring the components to perform system method 950 improves the performance, efficiency and responsiveness of the entire system 800.

Figure 10A:
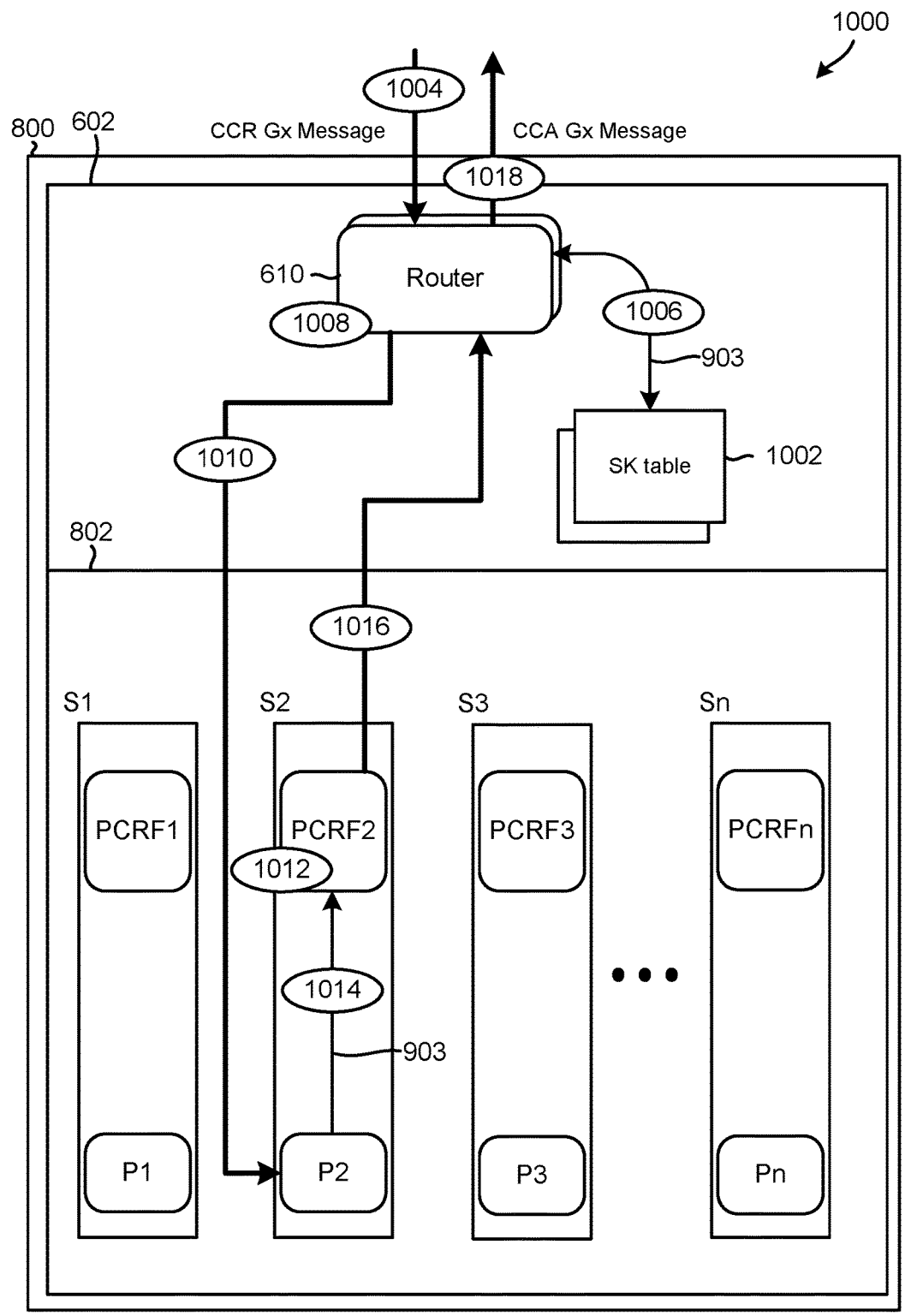
FIG. 10A is a block diagram illustrating the operations and interactions between various components configured to perform an embodiment system method of processing a communication message using a combination of a common key routing method and a database proxy architecture method.

FIG. 10A illustrates an example system method 1000 of processing a request message using a combination of a common key routing (CKR) method and a database proxy architecture (DPA) method to achieve data locality and reduce secondary key lookups in accordance with an embodiment. The system method 1000 may be performed by components in a system 800 having a combined layer 802 that includes a plurality of logical scalable units or modules 804 (S1-Sn), each of which includes an application (PCRF1-PCRFn) and an elastic database partition (P1-Pn). The router 610 component includes a client API module (not illustrated) configured to identify an elastic database partition (P1-Pn) that stores a particular database record based on a key value. The client API module may also include a database API that allows the router component to read and write information in the elastic database partitions (P1-Pn). In various embodiments, the router 610 component may be in a routing layer 602 or in the combined layer 802.

In operation 1004 of method 1000, the router 610 component may receive a Gx CCR-I request message (Request X) that includes all the identifiers (e.g., MSISDN, FIA+APN, etc.). In operation 1006, the router 610 component may use the value of the FIA+APN field to generate a surrogate key (e.g., via a hash operation), and store a mapping of the FIA+APN value to the generated surrogate key in an "Rx message SK table" 1002 via a local or loopback communication 903.

In operation 1008, the router 610 component may identify (e.g., via the client API module) the elastic database partition (P2) that is associated with an application (PCRF 2) tasked with processing the Gx request message (Request X) and/or which stores subscriber data suitable for use in processing the Gx request message (Request X). The router 610 component may identify the correct database partition (P2) using the generated surrogate key.

In operation 1010, the router 610 component may store (e.g., via the client API module) the Gx request message (Request X) in the identified elastic database partition (P2). In an embodiment, the router 610 component may also store the generated surrogate key in the identified elastic database partition (P2). In an embodiment, the router 610 component may store the generated surrogate key as a primary index key to the database record that includes the Gx request message (Request X).

In operation 1012, the application (PCRF 2) may poll a local request table, retrieve the next request in the request table for processing, and process the retrieved request. In an embodiment, operation 1012 may be performed concurrently with operation 1010. That is, the application (PCRF 2) may continue to process other request messages while information is being written to its associated database partition (P2).

In operation 1014, the application (PCRF 2) polls the local request table, determines that the next message in the local request table is the Gx request message (Request X), and pulls the Gx request message (Request X) and subscriber data from its associated elastic database partition (P2) via local/loopback communications 903.

In operation 1016, the application (PCRF 2) may perform various policy and/or charging operations based on the retrieved subscriber data/message, generate a CCA Gx message, and send the generated CCA Gx message to the router 610 component.

In operation 1018, the router 610 component may route the CCA Gx message to the appropriate component or system in the telecommunication network.

Configuring the various components (e.g., router, database, application, etc.) to perform system method 1000 improves the efficiency and responsiveness of the telecommunication system 800 by reducing the number of remote synchronous communications or hops that are performed when processing a Gx request message (Request X). For example, when implementing system method 1000, the system 800 only incurs a performance penalty of four (4) remote synchronous communications (i.e., in operations 1004, 1010, 1016, and 1018). Further, system method 1000 is an asynchronous message routing solution since the router does not communicate directly with the applications, and is therefore not required to block or wait for response messages from the application components. This allows these components to perform certain operations concurrently or in parallel to further improve the speed and efficiency of the system 800.

In addition, the performance of system method 1000 does not require that the system 800 include a data locality table and/or maintain data storage locations in a routing layer component. Rather, the router 610 component may use the generated surrogate key and client API module to insert the request messages directly into the correct elastic database partition.

Figure 10B:
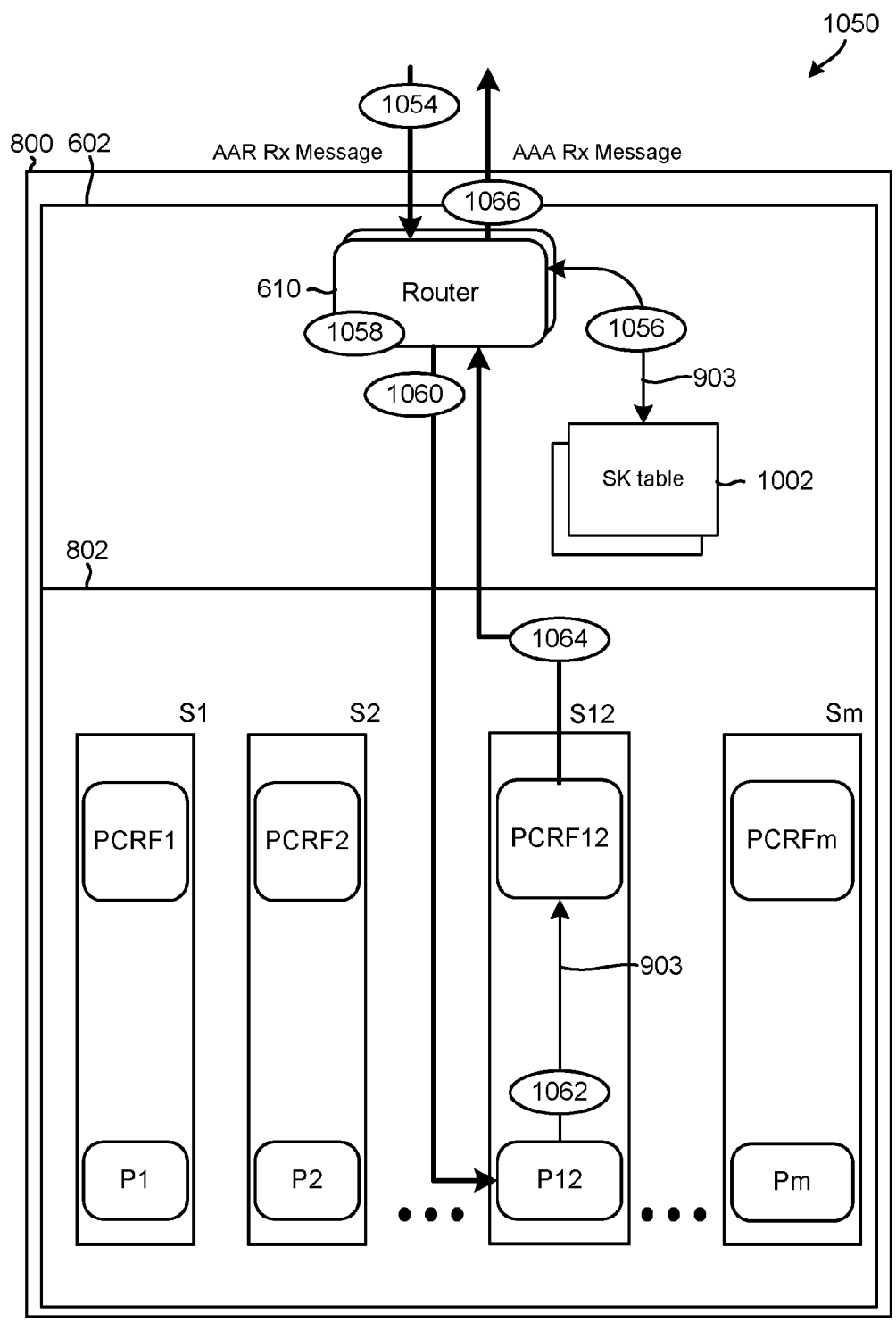
FIG. 10B is a block diagram illustrating the operations and interactions between various components configured to perform an embodiment system method of processing a second communication message using a combination of a common key routing method and a database proxy architecture method.

FIG. 10B illustrates another example system method 1050 of processing a request message using a combination of a common key routing (CKR) method and a database proxy architecture (DPA) method to achieve data locality and reduce secondary key lookups. System method 1050 may be performed by components in the system 800 after the performance of the system method 1000 illustrated in FIG. 10A, after the system 800 has been scaled so that the subscriber data previously stored in the second partition (P2) has been moved to the twelfth partition (P12).

In operation 1054, the router 610 component may receive an Rx AAR-I request message (Request Y) that includes FIA+APN field identifying the subscriber (or group of subscribers). That is, in operation 1054 the router 610 component may receive a communication message that identifies the subscriber via a different field, value, or identifier as that which is used by the communication message (Request X) received in operation 1004 of method 1000.

In operation 1056, the router 610 component may use the value of the FIA+APN field to retrieve the common surrogate key from the "Rx message SK table" 1002 via a local or loopback communication 903.

In operation 1058, the router 610 component may use the common surrogate key to identify (i.e., via the client API module) the elastic database partition (P 12) that is associated with an application (PCRF 12) tasked with processing the request message (Request Y) and/or which stores information corresponding to the subscriber identified in the request message (Request Y). In operation 1060, the router 610 component may store the request message (Request Y) in the identified elastic database partition (P 12) via the client API module.

In operation 1062, the application (PCRF 12) may poll a local request table, determine that the next message in the local request table is the Rx request message (Request Y), and pull the Rx message (Request Y) and/or subscriber data from the associated elastic database partition (P12) via local/loopback communications 903. In operation 1064, the application (PCRF 12) may process the Rx message (Request Y) by performing various policy and/or charging operations, generate an AAA Rx message, and send the generated AAA Rx message to the router 610 component. In operation 1066, the router 610 component may route the AAA Rx message to the appropriate component or system in the telecommunication network.

Configuring the various components (e.g., router, database, application, etc.) to perform system method 1050 improves the efficiency and responsiveness of the telecommunication system 800 by reducing the number of remote synchronous communications or hops that are performed when processing communication message (Request Y). For example, when implementing system method 1050, the system 800 only incurs a performance penalty of four (4) remote synchronous communications (i.e., in operations 1054, 1060, 1064, and 1066). Further, the performance of system method 1050 does not require that the system 800 include a data locality table and/or maintain data storage locations in a routing layer component. Rather, the router 610 component may use the common surrogate key and client API module to insert the request messages directly into the correct database partitions. In addition, system method 1050 is an asynchronous message routing solution since the router component does not communicate directly with the application components, and is therefore not required to block or wait for response messages from the application components.

Figure 11A:
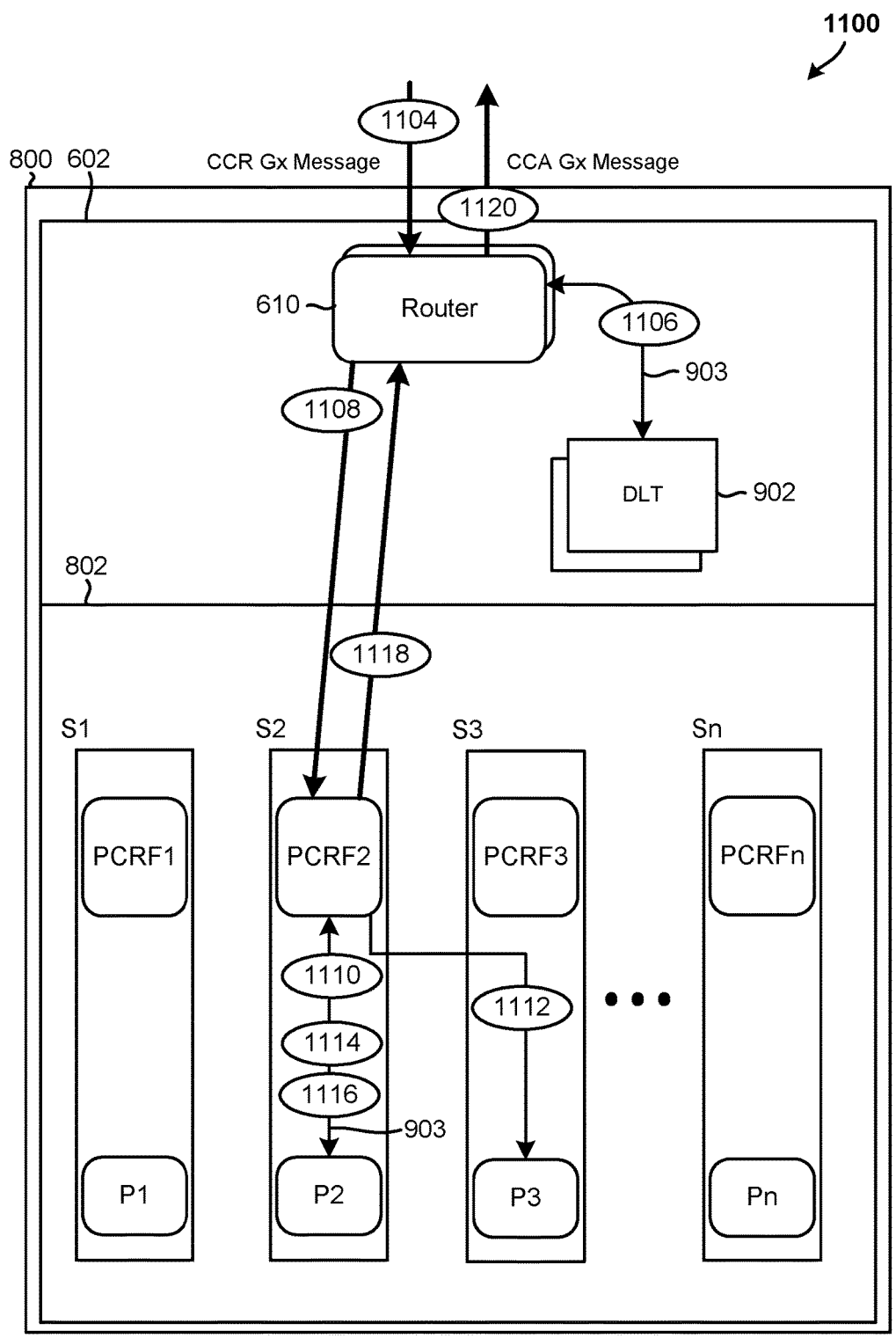
FIG. 11A is a block diagram illustrating the operations and interactions between various components configured to perform an embodiment system method of processing a communication message using a combination of an independent key routing method and a data locality table method.

FIG. 11A illustrates an example system method 1100 of processing a request message using a combination of an independent key routing (IKR) method and a data locality table (DLT) method to reduce secondary key lookups in accordance with an embodiment. System method 1100 may be performed by components in a high-speed, highly available, elastically scalable telecommunication system 800 in which subscriber data for a single subscriber (or a single group of subscribers) is partitioned across multiple database partitions (P1-Pn).

In the illustrated example of FIG. 11A, the system 800 includes a router 610 component that stores, includes, or otherwise has read/write access to a data locality table 902. The data locality table 902 may store information suitable for identifying one or more logical scalable units associated with information (e.g., SPR, balances, session, etc.) corresponding to a single subscriber (or a single group of subscribers). For example, the data locality table 902 may store information suitable for identifying a first logical scalable unit (e.g., S2) that includes a Gx session store associated with a subscriber and a second logical scalable unit (e.g., S3) that includes an Rx session store associated with the same subscriber. In addition, the router 610 component may be included in the combined layer 802 and/or the data locality table 902 may be replicated or otherwise made accessible to the application components (PCRF1-n).

In operation 1104 of method 1100, the router 610 component may receive a Gx CCR-I request message (Request X) that includes all the identifiers for a subscriber (e.g., MSISDN, FIA+APN, etc), and generate a plurality of surrogate keys.

In an embodiment, the router 610 component may generate a surrogate key value for each of a plurality of message types (e.g., Gx, Rx, etc.) based on the subscriber identifying values (e.g., MSISDN, FIA+APN, etc.) included in the received Gx request message (Request X). For example, the router 610 component may generate a Gx surrogate key value (SKGx) using the MSISDN value of the received message (Request X), and an Rx surrogate key value (SKRx) using the FIA+APN value of the received message (Request X). In an embodiment, the router 610 component may generate the SKGx and SKRx values so that no two SKRx values are the same, and so that no two SKGx values are the same.

In an embodiment, the router 610 component may generate the surrogate key values (e.g., SKGx, SKRx, etc.) by performing hash operations to functions. In this embodiment, the performance of method 1100 is not contingent on the system 800 including a single or centralized surrogate key table. By eliminating the requirement for and/or the use of a single surrogate key table, system method 1100 may reduce the potential for race conditions, contention issues, or other database errors occurring in the system 800 when processing/routing the communication message (Request X).

In operation 1106, the router 610 component may access or query the data locality table 902 via a local or loopback communication 903, using the generated Gx surrogate key value (SKGx) to retrieve a record identifying a logical scalable unit (S2) or application (PCRF2) that is associated with an elastic database partition (P2) that includes the Gx session store/memory associated with the subscriber identified in the received Gx request message (Request X).

In operation 1108, the router 610 component may send the Gx request message (Request X) and the generated surrogate keys (SKGx and SKRx) to the identified application (PCRF 2).

In operation 1110, the application (PCRF 2) may store the received Gx request message (Request X) in the associated partition (P2) via a local/loopback communication 903.

In operation 1112, the application (PCRF 2) may use the Rx surrogate key (SKRx) to identify the elastic database partition (i.e., P3) that includes the Rx session store/memory, and store the received Gx surrogate key (SKGx) as a record in the Rx session store/memory of the identified partition (P3).

In operation 1114, the application (PCRF 2) may query the associated partition (P2) for subscriber data, including SPR and balance information, via a local/loopback communication 903. In an embodiment, operations 1112 and 1114 may be performed concurrently.

In operation 1116, the elastic database partition (P2) may send the requested subscriber information (e.g., SPR and balance information) to its associated application (PCRF 2) via a local/loopback communication 903. In an embodiment, operations 1112 and 1116 may be performed concurrently.

In operation 1118, the application (PCRF 2) may receive subscriber data from its associated elastic database partition (P2), process the request message (Request X) by performing various policy and/or charging operations, generate a new message (e.g., CCA Gx message) and send the generated message to the router 610 component. In an embodiment, operations 1112 and 1118 may be performed concurrently.

In operation 1120, the router 610 component may receive and route the message (e.g., CCA Gx message) to the appropriate component or system in the telecommunication network.

The performance of system method 1100 by the various components (e.g., router, applications, etc.) in the telecommunication system 800 improves the system's 800 overall efficiency and responsiveness by reducing the number of synchronous remote communications that must be performed when processing communication messages (e.g., Request X). For example, when implementing system method 1100, the system 800 only incurs a performance penalty of four (4) remote synchronous communications (i.e., in operations 1104, 1108, 1118, and 1120) when processing a Gx request message. Since local/loopback communications are much less expensive than remote synchronous communications, configuring the components to perform system method 1100 improves the performance, efficiency, and responsiveness of the entire system 800.

Further, when routing messages using system method 1100, certain database read/write operations (e.g., operation 1112) may be performed in parallel with the message processing or generation operations (e.g., operation 1118), which further improves the speed and efficiency of the system 800.

In addition, when performing system method 1100, the system 800 does not experience any of the latencies typically associated with writing information to a centralized surrogate key tables, and these tables cannot become a point of contention or a source of database errors when the routing layer is scaled or additional routers are included in the system 800.

Figure 11B:
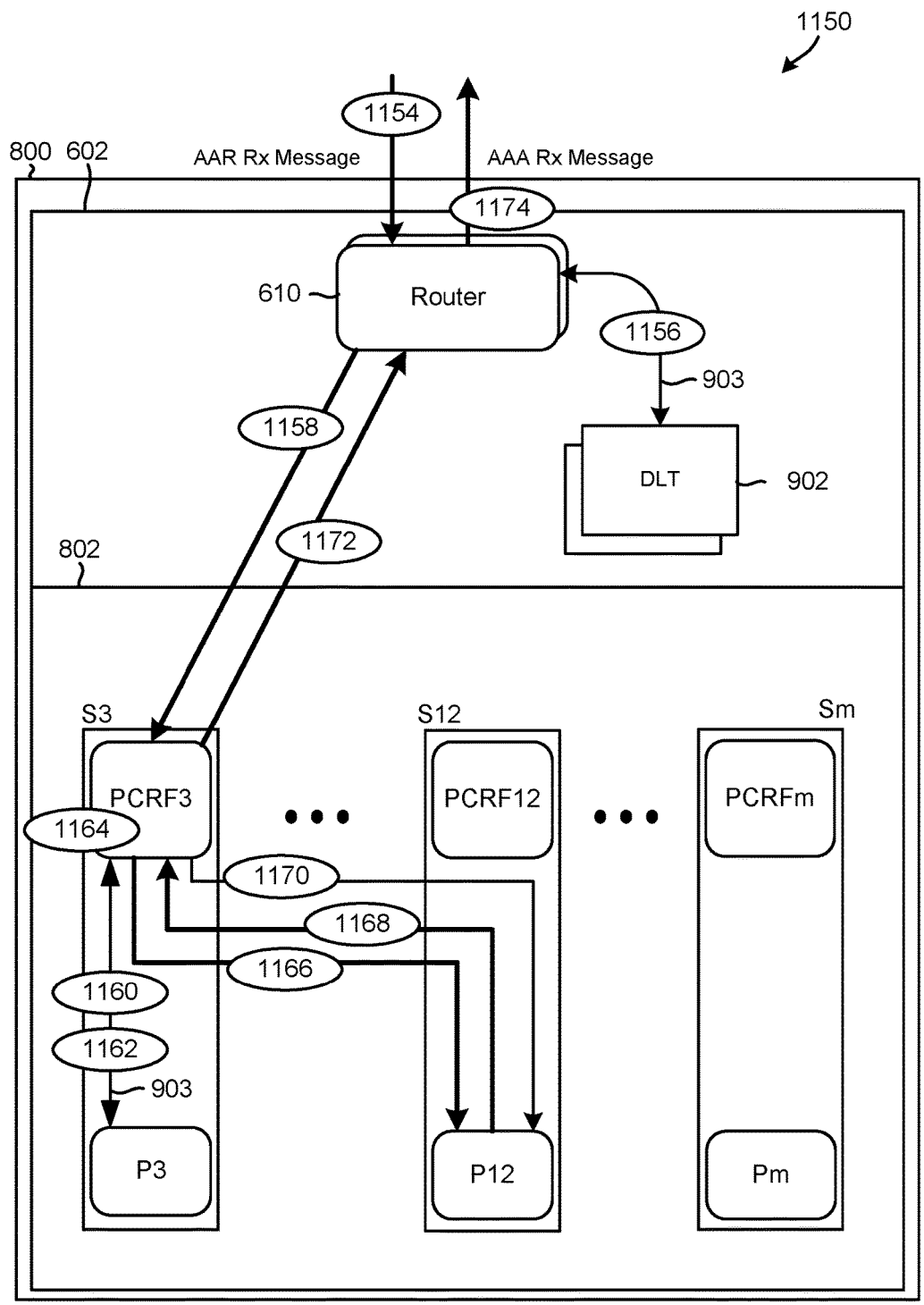
FIG. 11B is a block diagram illustrating the operations and interactions between various components configured to perform an embodiment system method of processing a second communication message using a combination of an independent key routing method and a data locality table method.

FIG. 11B illustrates another example system method 1150 of processing a request message using a combination of an independent key routing (IKR) method and a data locality table (DLT) method to reduce the number of secondary key lookups. System method 1150 may be performed by components in the system 800 after the performance of the system method 1100 illustrated in FIG. 11A, after the system 800 has been scaled so that the subscriber data previously stored in the second partition (P2) contained in the second logical scalable unit (S2) has been moved to the twelfth partition (P12) contained in the twelfth logical scalable unit (S 12), and after the data locality table 902 has been updated to reflect the new data locations for the Gx session stores (S12 or P 12).

In operation 1154, the router 610 component may receive an AAR Rx request message (Request Y) that includes FIA+APN field, and generate a surrogate key based on the value of the FIA+APN field.

In operation 1156, the router 610 component may query the data locality table 902 via a local or loopback communication 903, using the generated surrogate key to retrieve a record identifying the logical scalable unit (S3) that includes the Rx session store that is associated with the subscriber identified in the received Rx request message (Request Y).

In operation 1158, the router 610 component may send the Rx request message (Request Y) to the application (PCRF3) associated with the identified logical scalable unit (S3).

In operation 1160, the application (PCRF3) may store the Rx request message (Request Y) in its associated partition (P3) via a local/loopback communication 903.

In operation 1162, the application (PCRF3) may retrieve/pull the Gx surrogate key (SKGx) (which was stored as part of performance of operation 1112) and Rx session information from the Rx session store of its associated elastic database partition (P3) via a local/loopback communication 903.

In operation 1164, the application (PCRF3) may use the retrieved Gx surrogate key (SKGx) to identify the database partition (P12) to which the Gx session store of the subscriber identified in the Rx request message (Request Y) was moved during the scaling operations. This may be accomplished by the application component (PCRF3) accessing a local data locality table or using a local client API module, similar to that which is described above with reference to the router 610 component.

In operation 1166, the application (PCRF3) may query the Gx session store in the database partition (P12) that includes the Gx session store and/or subscriber data (e.g., SPR and balances).

In operation 1168, the application (PCRF3) may receive subscriber data from the identified database partition (P12).

In operation 1170, the application (PCRF3) may store updated information in the Gx session store in the identified database partition (P12).

In operation 1172, the application (PCRF3) may process the request message (Request Y) using the subscriber data received from the identified database partition (P12), perform various policy and/or charging operations, generate an AAA Rx message, and send the generated AAA Rx message to the router 610 component. In an embodiment, operations 1170 and 1172 may be performed concurrently or in parallel.

In operation 1174, the router 610 component may route the AAA Rx message to the appropriate component or system in the telecommunication network.

The performance of system method 1150 by the various components (e.g., router, applications, etc.) in the telecommunication system 800 improves the system's 800 overall efficiency and responsiveness by reducing the number of synchronous remote communications that must be performed when processing communication messages (e.g., Request Y). For example, when implementing system method 1150, the system 800 only incurs a performance penalty of six (6) remote synchronous communications (i.e., in operations 1154, 1158, 1166, 1168, 1172, and 1174) when processing an Rx request message.

Further, in system method 1150, certain database read/write operations (e.g., operation 1170) may be performed in parallel with the message processing or generation operations (e.g., operation 1172), which improves the speed and efficiency of the system 800.

In addition, when performing system method 1150, the system 800 does not experience any of the latencies typically associated with writing information to a centralized surrogate key tables, and these tables cannot become a point of contention or a source of database errors when the routing layer is scaled or additional routers are included in the system 800.

Figure 12A:
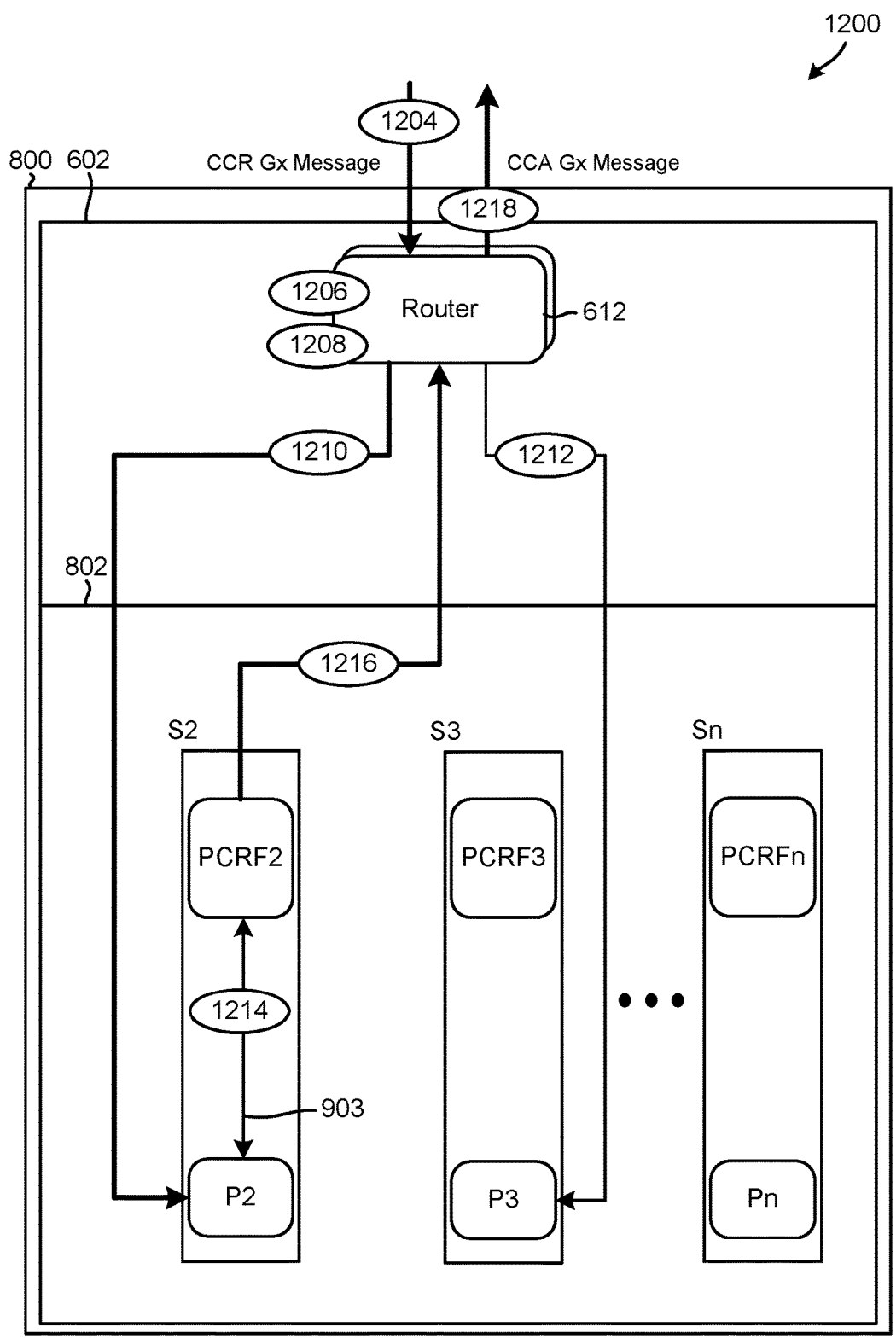
FIG. 12A is a block diagram illustrating the operations and interactions between various components configured to perform an embodiment system method of processing a communication message using a combination of an independent key routing method and a database proxy architecture method.

FIG. 12A illustrates an example system method 1200 of processing a request message using a combination of an independent key routing (IKR) method and a database proxy architecture (DPA) method to reduce secondary key lookups in accordance with an embodiment. System method 1200 may be performed by components in a high-speed, highly available, elastically scalable telecommunication system 800 in which subscriber data for a single subscriber (or a single group of subscribers) is partitioned across multiple database partitions (P1-Pn). The system 800 may also include a router 610 component having a client API (not illustrated) configured to identify an elastic database partition (P1-Pn) that stores a particular database record based on a key value. The client API module may also include a database API that allows the router component to read and write information in the elastic database partitions (P1-Pn). In various embodiments, the router 610 component may be in a routing layer 602 or in the combined layer 802.

In operation 1204 of method 1200, the router 610 component may receive a Gx CCR-I request message (Request X) that includes a MSISDN field and a FIA+APN field.

In operation 1206, the router 610 component may generate a Gx surrogate key value (SKGx) using the MSISDN value and an Rx surrogate key value (SKRx) using the FIA+APN value. In an embodiment, the router 610 component may be configured to generate the SKGx and SKRx values so that no two SKRx values are the same, and so no two SKGx values are the same.

In operation 1208, the router 610 component may identify (e.g., via the client API module) a first elastic database partition (P2) that is associated with an application (PCRF 2) tasked with processing the request message (Request X) and/or which stores information (e.g., subscriber data) needed to process the request message (Request X). Also in operation 1208, the router 610 component may identify (e.g., via the client API module) a second elastic database partition (P3) that includes an Rx session store for the subscriber.

In operation 1210, the router 610 component may store the Gx request message (Request X) and the Gx surrogate key (SKGx) in the first elastic database partition (P2) via the client API module.

In operation 1212, the router 610 component may store the Gx surrogate key (SKGx) in the second elastic database partition (P3). In an embodiment, operations 1210 and 1212 may be performed concurrently.

In operation 1214, the application (PCRF 2) associated with the first elastic database partition (P2) may retrieve/pull the request message (Request X) and subscriber data (e.g., SPR, balance, etc.) from its associated elastic database partition (P2) via a local/loopback communication 903. In an embodiment, if the application component (PCRF 2) determines that there is a shared balance, the application (PCRF 2) may generate a hash for the shared balance, use the generated hash to locate the remote database partition that stores relevant subscriber data, and pull the subscriber data (e.g., balance information) from the remote database partition.

In operation 1216, the application (PCRF 2) associated with the first elastic database partition (P2) may process the request message (Request X), perform various policy and/or charging operations using the subscriber data, generate an CCA Gx message, and send the generated CCA Gx message to the router 610 component.

In operation 1218, the router 610 component may receive and route the message (e.g., CCA Gx message) to the appropriate component or system in the telecommunication network.

Configuring the various components (e.g., router, database, application, etc.) to perform system method 1200 improves the efficiency and responsiveness of the telecommunication system 800 by reducing the number of remote synchronous communications or hops that are performed when processing a communication message (e.g., Request X). For example, when implementing system method 1200, the system 800 only incurs a performance penalty of four (4) remote synchronous communications (i.e., in operations 1204, 1210, 1216, and 1218) when processing a Gx message.

Further, the performance of system method 1200 does not require that the system 800 include a data locality table and/or maintain data storage locations in a routing layer component. Rather, the router 610 component may use the Rx and Gx surrogate keys and client API module to insert the information directly into the elastic database partitions.

Figure 12B:
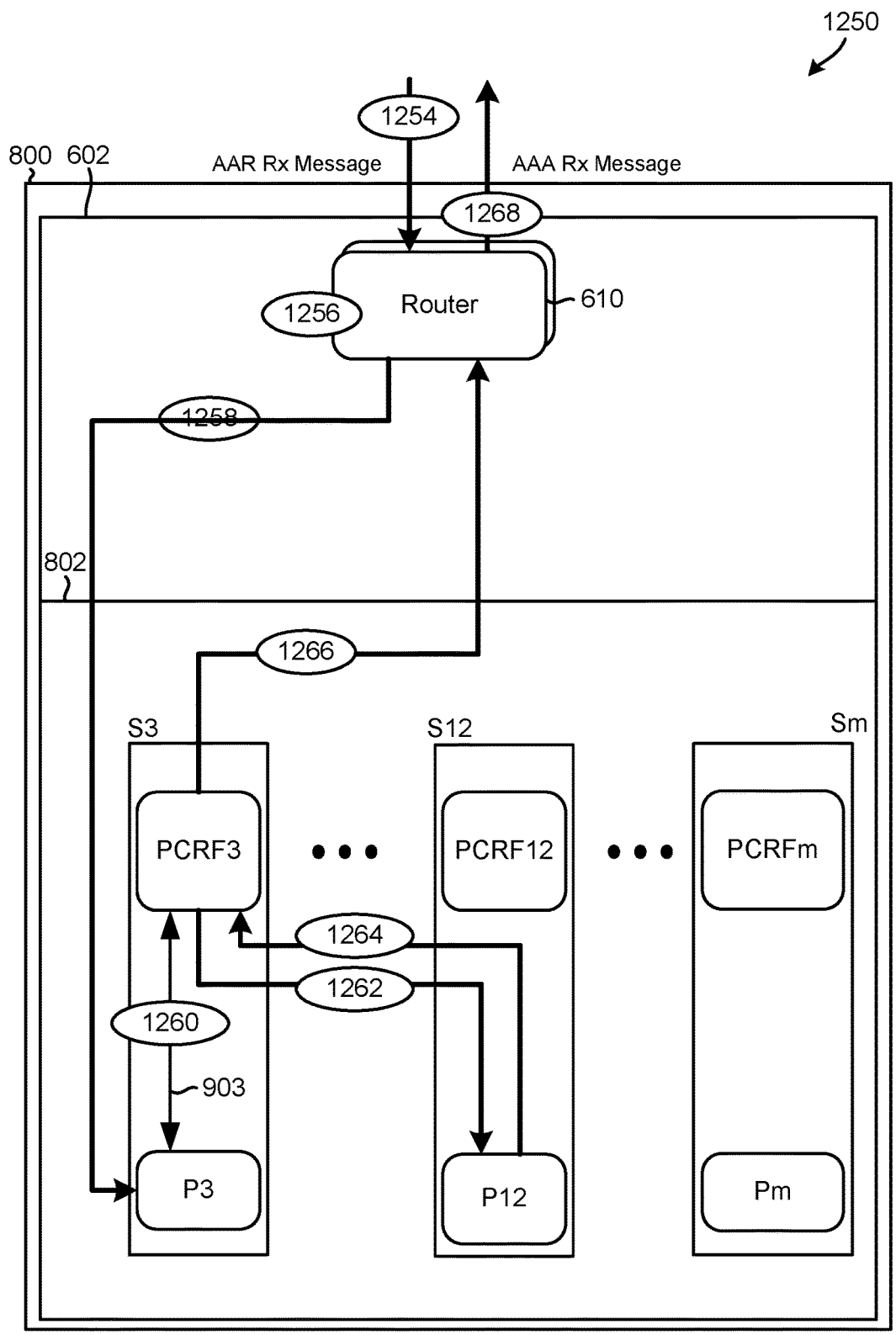
FIG. 12B is a block diagram illustrating the operations and interactions between various components configured to perform an embodiment system method of processing a second communication message using an independent key routing method and a database proxy architecture method.

FIG. 12B illustrates another example system method 1250 of processing a request message using an independent key routing (IKR) method and a database proxy architecture (DPA) method to reduce secondary key lookups. System method 1250 may be performed by components in the system 800 after the performance of the system method 1200 illustrated in FIG. 12A, after the system 800 has been scaled so that the subscriber data previously stored in the second partition (P2) has been moved to the twelfth partition (P12).

In operation 1254, the router 610 component may receive an Rx AAR-I request message (Request Y) that includes FIA+APN field.

In operation 1256, the router 610 component may use the value of the FIA+APN field to generate an Rx surrogate key (SKRx).

In operation 1258, the router 610 component may use the client API (not illustrated) to identify the elastic database partition (P3) that includes an Rx session store for the subscriber, and store the request message (Request Y) and generated Rx surrogate key (SKRx) in the identified database partition (P3).

In operation 1260, the application (PCRF 3) associated with the database partition (P3) may retrieve/pull the Rx request message (Request Y) and Gx surrogate key (SKGx) value from the database partition (P3) via local/loopback communications 903.

In operation 1262, the application (PCRF 3) may use the Gx surrogate key (SKGx) value to identify the elastic database partition (P12) to which the subscriber data was moved during the scaling operations, and request a Gx session data and subscriber data (e.g., SPR, balance information, etc.) from the database partition (P12).

In operation 1264, the application (PCRF 3) may receive the Gx session data and subscriber data from the database partition (P12).

In operation 1266, the application (PCRF 3) may use the subscriber data to process the request message (Request Y) by performing various policy and/or charging operations, generate an AAA Rx message, and send the generated AAA Rx message and a Gx Re-Authorization Request (RAR) to the router 610 component.

In operation 1268, the router 610 component may receive and route the AAA Rx message to the appropriate component or system in the telecommunication network.

Configuring the various components (e.g., router, database, application, etc.) to perform system method 1250 improves the efficiency and responsiveness of the telecommunication system 800 by reducing the number of remote synchronous communications or hops that are performed when processing an Rx request message (Request Y). For example, when implementing system method 1250, the system 800 only incurs a performance penalty of six (6) remote synchronous communications (i.e., in operations 1254, 1258, 1262, 1264, 1266, and 1268).

Further, the performance of system method 1250 does require that the system 800 include a data locality table and/or maintain data storage locations in a routing layer component. Rather, the router 610 component may use the Rx and Gx surrogate keys and client API module to insert the information directly into the correct elastic database partitions.

Figure 13:
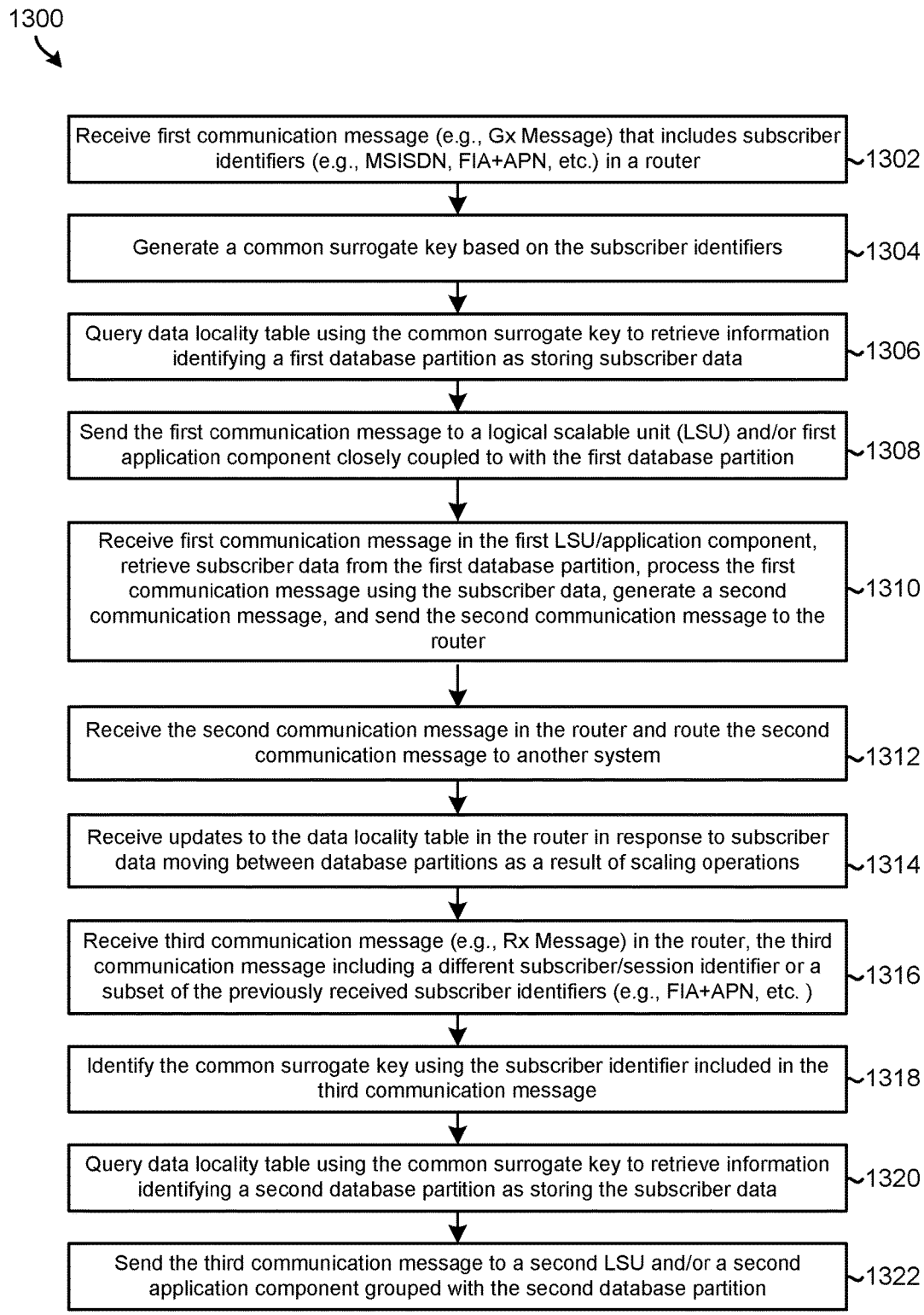
FIG. 13 is a process flow chart illustrating an embodiment common key routing and data locality table (CKR-DLT) method of processing communication messages.

FIG. 13 illustrates an embodiment CKR-DLT method 1300 of processing a request message. The CKR-DLT method 1300 may be performed by components (e.g., server computing devices, processors, processes, etc.) in a high-speed, highly available, elastically scalable telecommunication system 800.

In block 1302, a router processor in a multiprocessor computing system may receive a first communication message (e.g., Gx message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1304, the router processor may generate a common surrogate key based on the subscriber identifiers included in the first communication message. In block 1306, the router processor may query a data locality table and use the common surrogate key to retrieve information suitable for use in identifying a first logical scalable unit that includes a first database component that stores subscriber data that relates to the identified subscriber. Alternatively, in block 1306, the router processor may use the common surrogate key to retrieve information suitable for use in identifying a first application component that is closely coupled to the first database component.

In block 1308, the router processor may send the first communication message to a first application processor in the multiprocessor computing system that includes or is closely coupled to the first logical scalable unit, the first application component, and/or the first database component.

In block 1310, the first application processor may receive the first communication message in the first application component, retrieve subscriber data from the first database component, process the first communication message using the subscriber data, generate a second communication message, and send the second communication message to the router processor. In block 1312, the router processor may receive the second communication message and route the second communication message to another component or sub-system in the telecommunication network.

In block 1314, the router processor may receive communication messages that include information suitable for updating one or more data locality tables of one or more router components. In an embodiment, the router processor may receive the communication messages in response to subscriber data being moved between database components or partitions and/or in response to the telecommunication system being scaled. In various embodiments, the router processor may receive these communication messages from the first database component, the multiprocessor computing system, or the first logical scalable unit.

In block 1316, the router processor may receive a third communication message (e.g., Rx Message) for the same subscriber, but which includes a different subscriber/session identifier and/or a subset of the previously received identifiers (e.g., FIA+APN, etc.). In block 1318, the router processor may identify the common surrogate key using the subscriber identifier included in the third communication message.

In block 1320, the router processor may query a data locality table, and use the common surrogate key to retrieve information that identifies a second database component as storing the subscriber data previously stored in the first database component. Alternatively, in block 320, the router processor may use the common surrogate key to retrieve information suitable for use in identifying a second logical scalable unit that includes the second database component, or which is suitable for use in identifying a second application component that is closely coupled to the second database component.

In block 1322, the router processor may send the third communication message to a second application processor in the multiprocessor computing system that includes or is closely coupled to the second logical scalable unit, the second application component, and/or the second database component.

Figure 14:
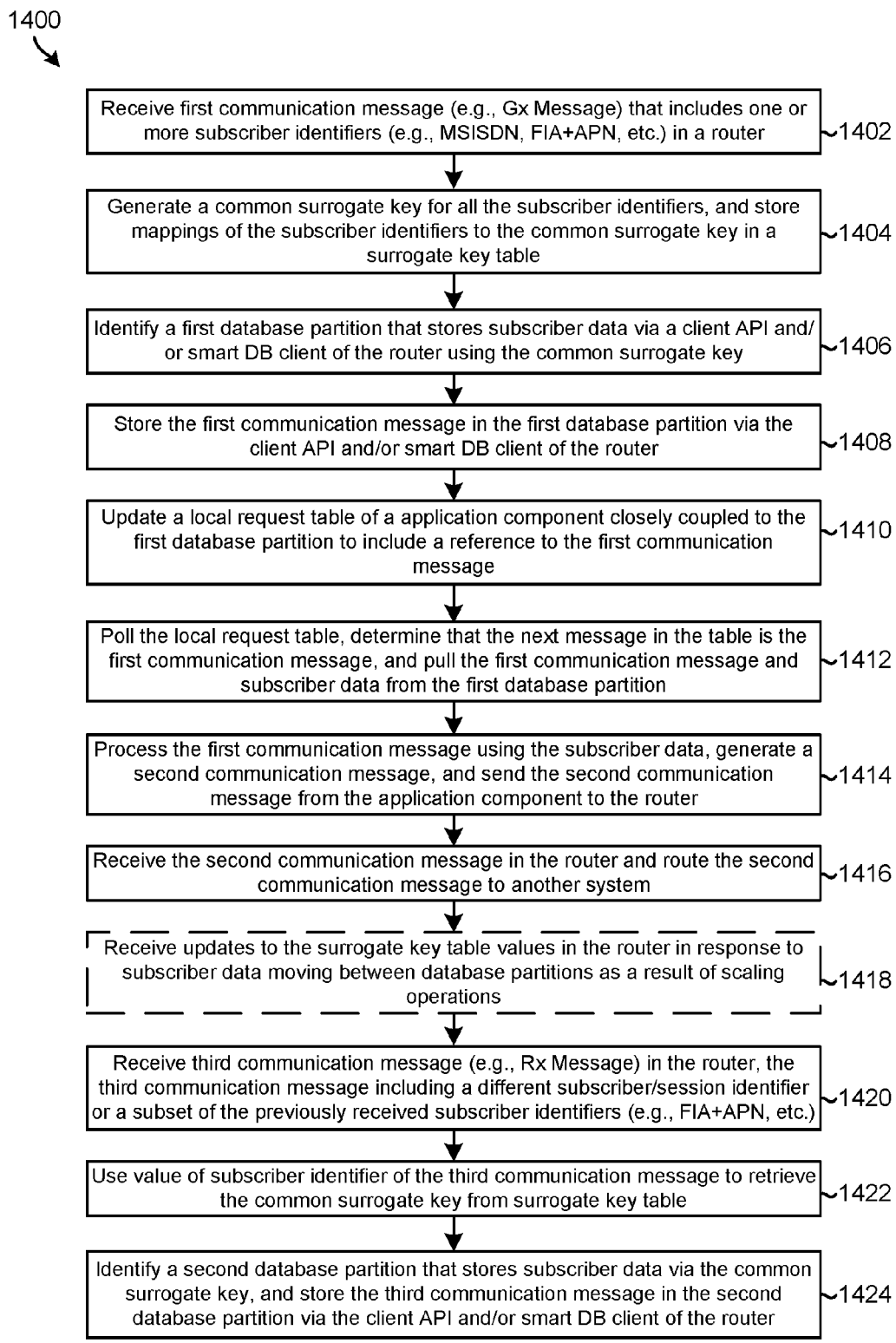
FIG. 14 is a process flow chart illustrating an embodiment common key routing and database proxy architecture (CKR-DPA) method of processing communication messages.

FIG. 14 illustrates an embodiment CKR-DPA method 1400 of processing a request message. The CKR-DPA method 1400 may be performed by various components (e.g., server computing devices, processors, processes, etc.) in a high-speed, highly available, elastically scalable telecommunication system 800.

In block 1402, a router processor in a multiprocessor computing system may receive a first communication message (e.g., Gx message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1404, the router processor may generate a common surrogate key for all the subscriber identifiers included in the first communication message, and store mappings of the subscriber identifiers to the common surrogate key in a surrogate key table. In an embodiment, the router processor may store the surrogate key in a local memory coupled to the router processor.

In block 1406, the router processor may use the common surrogate key to retrieve information that identifies a first database component/memory as storing subscriber data associated with the identified subscriber. In an embodiment, this may be accomplished via a client API and/or smart DB client. In various embodiments, identifying the first database component may include, or may be accomplished by, identifying a first logical scaling unit and/or a first application component that is closely coupled to the first database component. In an embodiment, the first database component may be closely coupled to a first application processor. In an embodiment, the first application processor may also be closely coupled to the first logical scaling unit and/or a first application component.

In block 1408, the router processor may store the first communication message in the first database component. In an embodiment, this may be accomplished via a client API and/or smart DB client. In an embodiment, in block 1408, the router processor may use the client API to store the first communication message in a memory that is closely coupled to the first application processor, the first logical scaling unit, a first application component, and/or the first database component.

In block 1410, the first application processor may update a request table stored in a local memory coupled to the first application component. For example, the memory may be in the same datacenter, rack, computing device, chip, or core as the processor executing the first application component (e.g., the first application processor). In embodiment, the first application processor may update the request table to store, or include a reference to, the first communication message.

In block 1412, the first application processor may poll the local request table and pull the first communication message and subscriber data stored in the first database partition or memory. In block 1414, the first application processor may process the first communication message using the subscriber data, generate a second communication message, and send the second communication message to the router processor.

In block 1416, the router processor may receive the second communication message and route the second communication message to another system or component in the telecommunication network.

In optional block 1418, the router processor may receive communication messages that include information suitable for updating the surrogate key table values. In an embodiment, the router processor may receive the communication messages in response to subscriber data being moved between database components/partitions/memories and/or in response to the telecommunication system being scaled. In various embodiments, the router processor may receive these communication messages from the first database component, the multiprocessor computing system, or the first logical scalable unit.

In block 1420, the router processor may receive a third communication message (e.g., Rx Message) for the same subscriber that includes a different subscriber/session identifiers or a subset of the previously received identifiers (e.g., FIA+APN, etc.). In block 1422, the router processor may use value of subscriber identifier of the third communication message to retrieve the common surrogate key from surrogate key table.

In block 1424, the router processor may identify a second database component/memory that stores subscriber data for the subscriber via the common surrogate key, and store the third communication message in the second database component via the client API and/or smart DB client. In an embodiment, the second database component may be included in the same component (e.g., server computing device) or logical scalable unit as the router processor. In another embodiment, the second database partition may be included in a different component or logical scalable unit as the router processor.

Figure 15A:
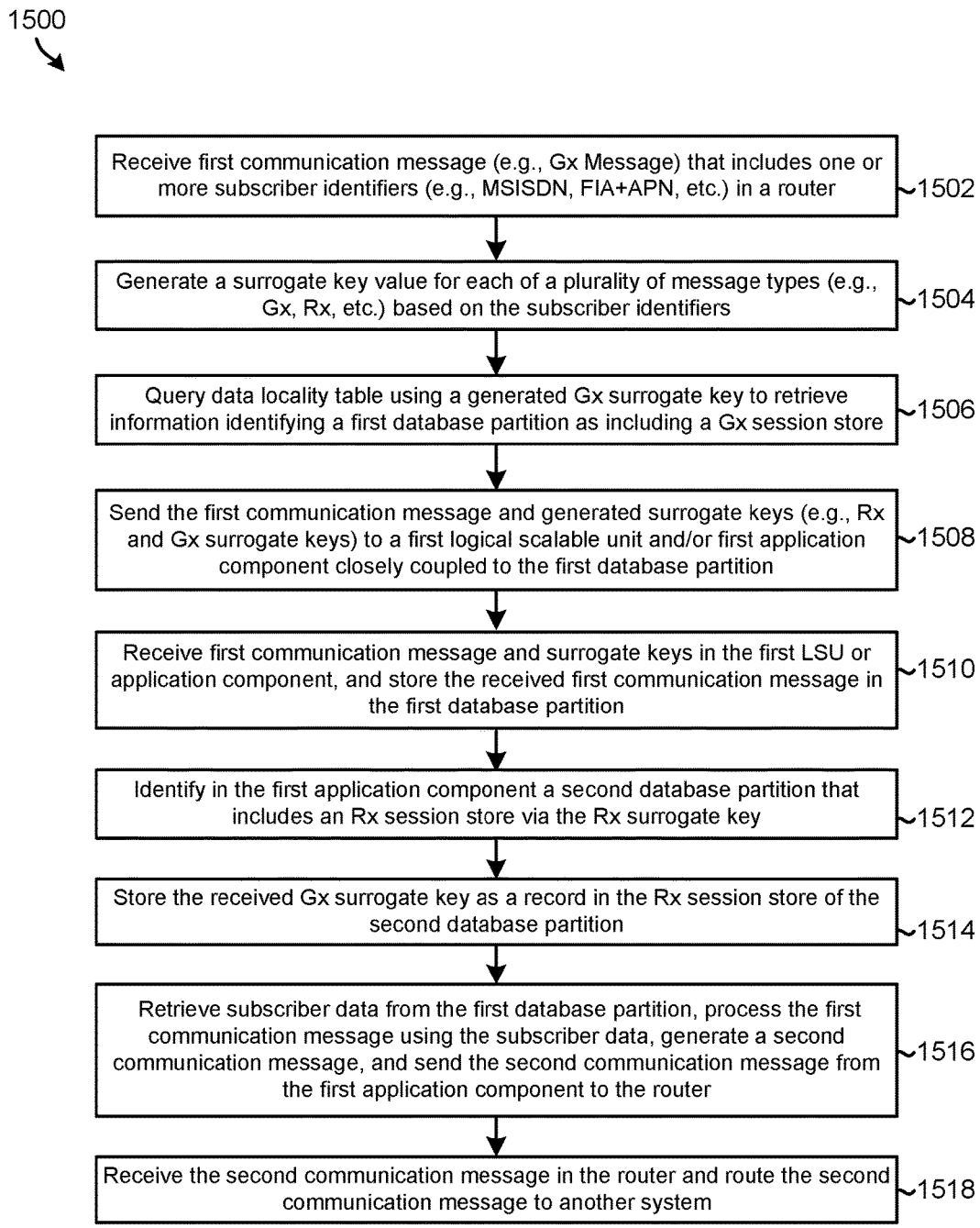
FIGS. 15A and 15B are process flow charts illustrating an embodiment independent key routing and data locality table (IKR-DLT) method of processing a request message.
Figure 15B:
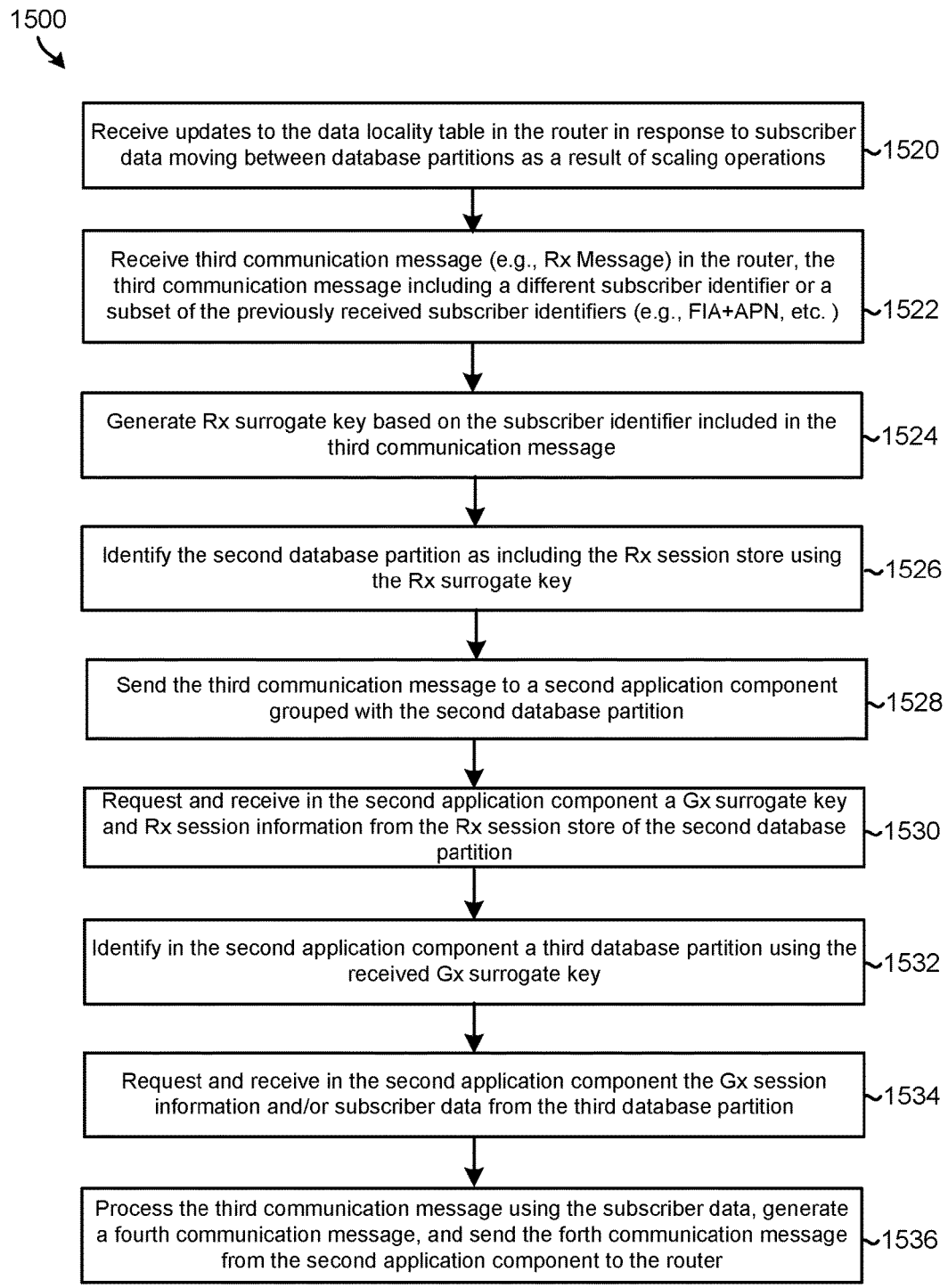

FIGS. 15A and 15B illustrate an embodiment IKR-DLT method 1500 of processing a request message. The IKR-DLT method 1500 may be performed by various components (e.g., server computing devices, processors, processes, etc.) in a high-speed, highly available, elastically scalable telecommunication system 800.

In block 1502 of FIG. 15A, a router processor in a multiprocessor computing system may receive a first communication message (e.g., Gx message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1504, the router processor may generate a surrogate key value for each of a plurality of message types (e.g., Gx, Rx, etc.) based on the subscriber identifiers included in the first communication message.

In block 1506, the router processor may query a data locality table using a generated first surrogate key (e.g., SKGx) to retrieve information suitable for use in identifying a first logical scalable unit that includes a first database component that includes a first session store (e.g., a Gx session store) and/or stores subscriber data that relates to the identified subscriber. Alternatively, in block 1506, the router processor may use the generated first surrogate key (SKGx) to retrieve information suitable for use in identifying a first application component that is closely coupled to the first database component.

In block 1508, the router processor may send the first communication message and generated surrogate keys (e.g., Rx and Gx surrogate keys) to a first application processor in the multiprocessor computing system that includes or is closely coupled to a first application component, the first logical scalable unit, and/or the first database component.

In block 1510, the first application processor may receive the first communication message and surrogate keys (e.g., Rx and Gx surrogate keys) in the first application component and store the received first communication message in the first database component/partition/memory.

In block 1512, the first application processor may identify a second database component that includes a second session store (e.g., Rx session store) that stores information for a different message type than that which is stored in the first session store. For example, the first application processor may use the Rx surrogate key (SKRx) received from the router processor to determine that the second database components includes an Rx session store that stores Rx information relating to the subscriber.

In block 1514, the first application processor may store the received first surrogate key (SKGx) as a record in the second session store/memory (e.g., Rx session store) of the second database component. In various embodiments, the router processor may store the first surrogate key in the second session store using a local or non-remote or asynchronous communication.

In block 1516, the first application processor may retrieve subscriber data from the first database component, process the first communication message using the subscriber data, generate a second communication message, and send the second communication message the router processor. In block 1518, the router processor may receive the second communication message in the router and route the second communication message to another system.

In block 1520 of FIG. 15B, the router processor may receive communication messages that include information suitable for updating one or more data locality tables of one or more router components. In an embodiment, the router processor may receive the communication messages in response to subscriber data being moved between database components or partitions and/or in response to the telecommunication system being scaled. In various embodiments, the router processor may receive these communication messages from the first database component, the multiprocessor computing system, or the first logical scalable unit.

In block 1522, the router processor may receive a third communication message (e.g., Rx Message) for the same subscriber that includes a different subscriber identifier or a subset of the previously received subscriber identifiers (e.g., FIA+APN, etc.). In block 1524, the router processor may generate or identify the second surrogate key (e.g., SKRx) based on the subscriber identifier included in the third communication message.

In block 1526, the router processor may use the generated second surrogate key (e.g., SKRx) to determine that the second database component includes the second session store/memory (e.g., Rx session store), and that the second session store/memory includes information related to the subscriber identified in the third communication message. Also in block, 1526, the router processor may use the generated second surrogate key (e.g., SKRx) to retrieve information suitable for use in identifying a second application processor, a second logical scalable unit, and/or a second application component that is closely coupled to the second database component.

In block 1528, the router processor may send the third communication message and the generated second surrogate key (e.g., SKRx) to the second application processor, second logical scalable unit, and/or second application component.

In block 1530, the second application processor may retrieve the first surrogate key (e.g., SKGx) and session information (e.g., Rx session information) from the second session store/memory (e.g., Rx session store) in the second database component/memory, and make this information available for use by the second application component.

In block 1532, the second application processor and/or second application component may use the retrieved first surrogate key (SKGx) to determine that the first session store/memory (e.g., Gx session store) is now located in the third database component. In an embodiment, the third database component may be closely coupled to a third application processor in the multiprocessor system and/or to a third logical scalable unit.

In block 1534, the second application processor may retrieve session information (e.g., Gx session information) and/or subscriber data from the first session store/memory (e.g., Gx session store) in the third database component/memory and make this information available to the second application. In block 1536, the second application processor may process the third communication message using the subscriber data, generate a fourth communication message, and send the forth communication message to the router processor.

Figure 16A:
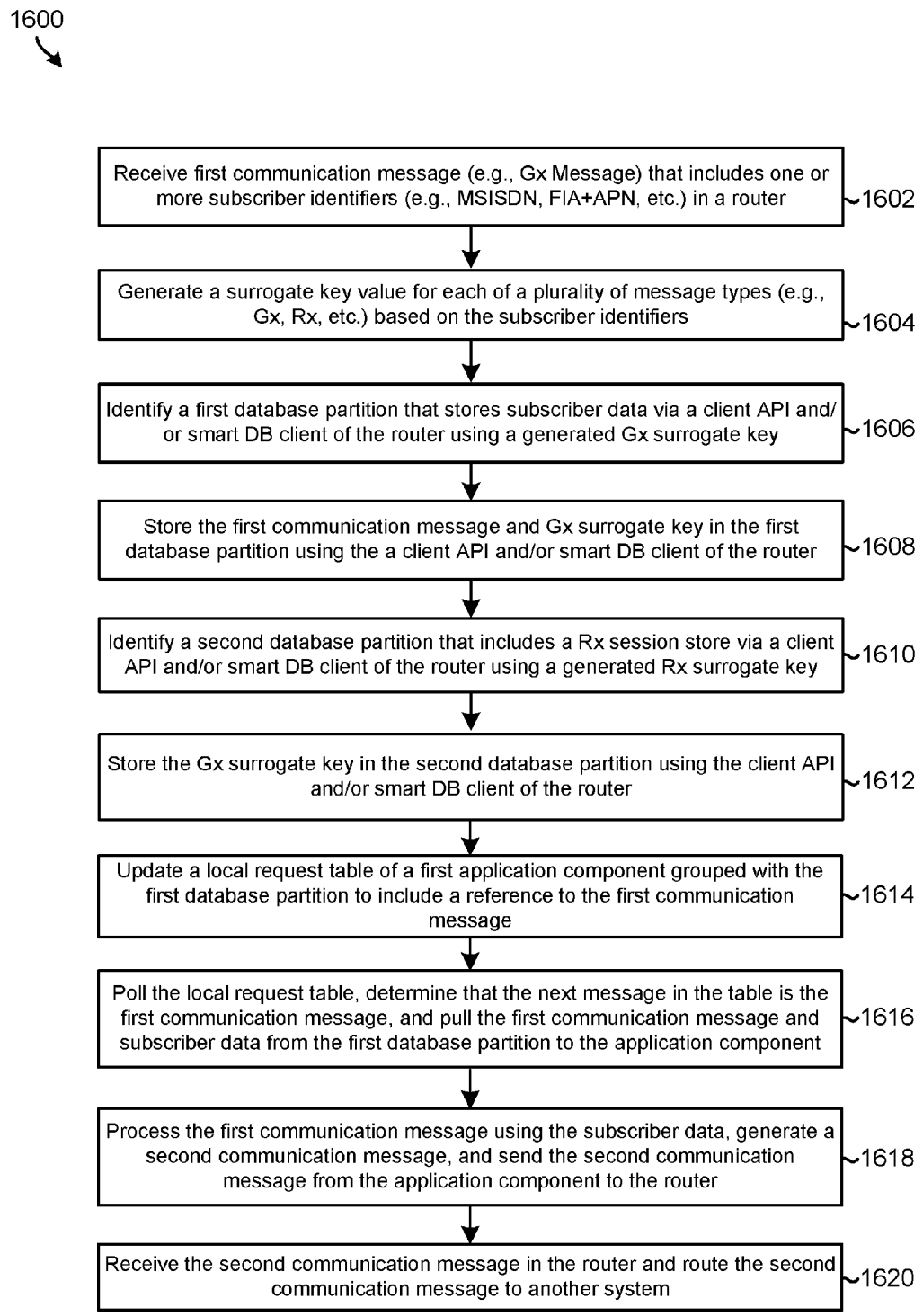
FIGS. 16A and 16B are process flow charts illustrating an embodiment independent key routing and database proxy architecture (IKR-DPA) method of processing a request message.
Figure 16B:
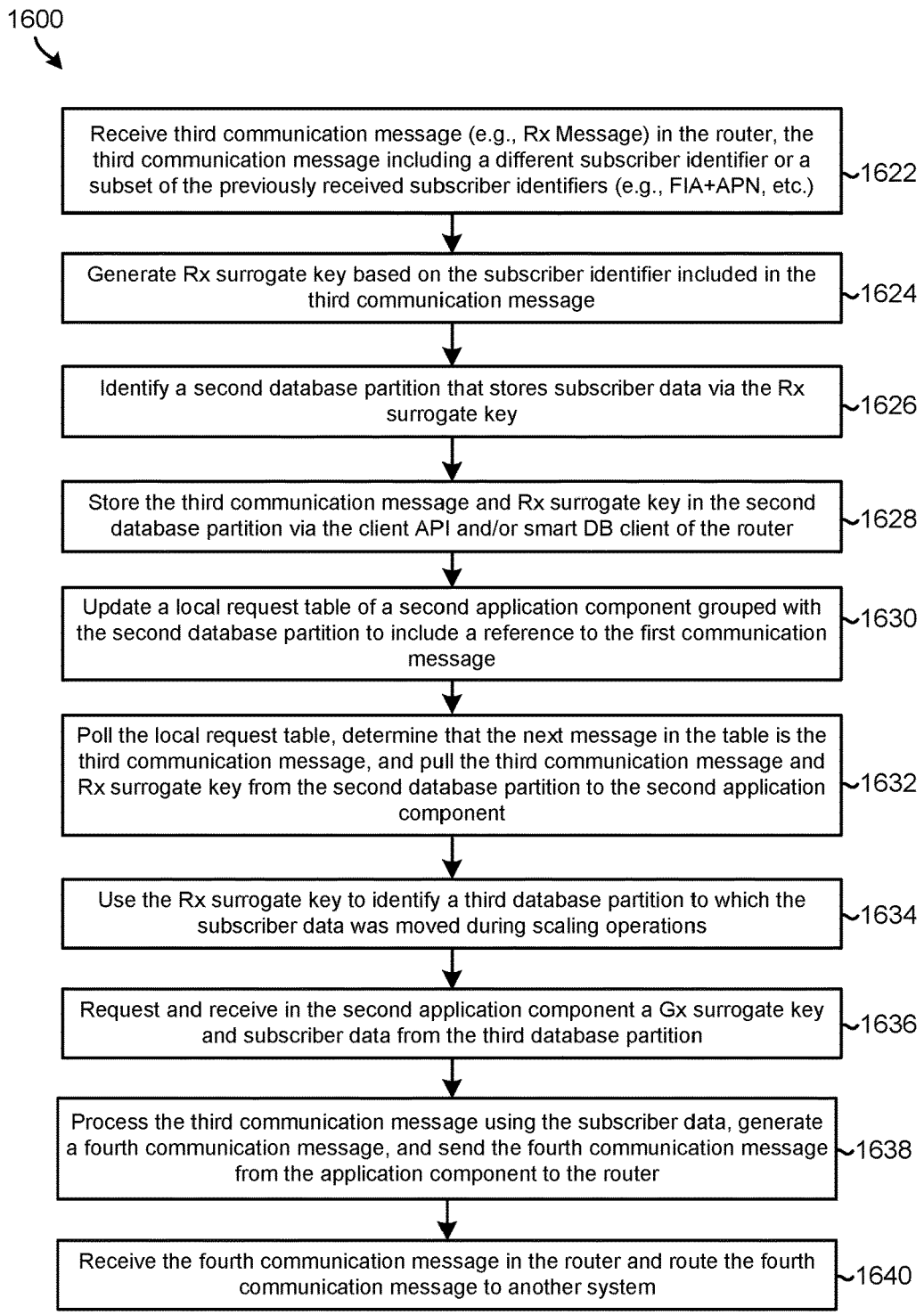

FIGS. 16A and 16B illustrate an embodiment IKR-DPA method 1600 of processing a request message. The IKR-DPA method 1600 may be performed by various components (e.g., server computing devices, processors, processes, etc.) in a high-speed, highly available, elastically scalable telecommunication system 800.

In block 1602, a router processor in a multiprocessor computing system may receive a first communication message (e.g., Gx message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1604, the router processor may generate a surrogate key value for each of a plurality of message types (e.g., Gx, Rx, etc.) based on the subscriber identifiers included in the first communication message.

In block 1606, the router processor may use a generated first surrogate key (e.g., SKGx) to identify a first database component that stores subscriber data. In an embodiment, this may be accomplished via a client API and/or smart DB client. In an embodiment, identifying the first database component may include, or may be accomplished by, identifying a first logical scalable unit and/or first application component that are closely coupled to the first database component.

In block 1608, the router processor may store the first communication message and generated first surrogate key (e.g., SKGx) in the first database component. In an embodiment, this may be accomplished via the client API and/or smart DB client. In an embodiment, in block 1608, the router processor may use the client API to store the first communication message and generated first surrogate key (e.g., SKGx) in a memory that is closely coupled to a first application processor in the multiprocessor computing system, the first logical scalable unit, the first application component, and/or the first database component.

In block 1610, the router processor may use a generated second surrogate key (e.g., SKRx) to identify a second database component that includes a second session store (e.g., Rx session store) that is associated with the subscriber identified in the first communication message and which stores information for a different message type (e.g., Rx message type) than that which is stored in the first session store. In an embodiment, this may be accomplished via the client API and/or smart DB client.

In block 1612, the router processor may store the first surrogate key (e.g., SKGx) in the second database component, which may also be accomplished via the client API and/or smart DB client. In an embodiment, in block 1608, the router processor may use the client API to store the first surrogate key (e.g., SKGx) in a memory that is closely coupled to a second application processor in the multiprocessor system, a logical scalable unit, a second application component, and/or the second database component.

In block 1614, the first application processor may update a request table stored in a local memory of the first application to include a reference to the first communication message. In various embodiments, the local memory may be in the same datacenter, rack, computing device, chip, or core as the first application processor.

In block 1616, the first application processor may poll the local request table and determine that the next message in the request table is the first communication message. Also in block 1616, the first application processor may pull the first communication message and subscriber data stored in the first database component or memory in response to determining that the next message in the table is the first communication message. In block 1618, the first application processor may process the first communication message using the subscriber data, generate a second communication message, and send the second communication message to the router processor. In block 1620, the router processor may receive the second communication message and route the second communication message to another system or component in the telecommunication network.

In block 1622, the router processor may receive a third communication message (e.g., Rx Message) for the same subscriber that includes a different subscriber identifier or a subset of the previously received subscriber identifiers (e.g., FIA+APN, etc.). In block 1624, the router processor may identify or generate the second surrogate key (SKRx) based on the subscriber identifier included in the third communication message.

In block 1626, the router processor may use the second surrogate key (SKRx) to determine that a second database component stores subscriber data for the subscriber identified in the third communication message. In block 1628, the router processor may store the third communication message and second surrogate key (SKRx) in the second database component. In an embodiment, this may be accomplished via the client API and/or smart DB client. The second database component may be closely coupled to a second application processor of the multiprocessor computing system, a second logical scalable unit, and/or a second application component.

In block 1630, the second application processor may update a request table stored in a memory that is closely coupled to the second application component to include a reference to the third communication message.

In block 1632, the second application processor may poll the local request table, determine that the next message in the table is the third communication message, and pull the third communication message and second surrogate key (SKRx) from the second database component/memory and make this information available to the second application.

In block 1634, the second application processor may use the second surrogate key (SKRx) to identify a third database component to which the subscriber data was moved during scaling operations. In an embodiment, the third database component may be closely coupled to a third application processor, a third logical scalable unit, and/or a third application component.

In block 1636, the second application processor may receive a first surrogate key (e.g., SKGx) and subscriber data from the third database component and make this information available to the second application component. In block 1638, the second application processor may process the third communication message using the subscriber data, generate a fourth communication message, and send the fourth communication message from the application to the router processor. In block 1640, the router processor may receive the fourth communication message in the router and route the fourth communication message to another system in the telecommunication network.

Figure 17:
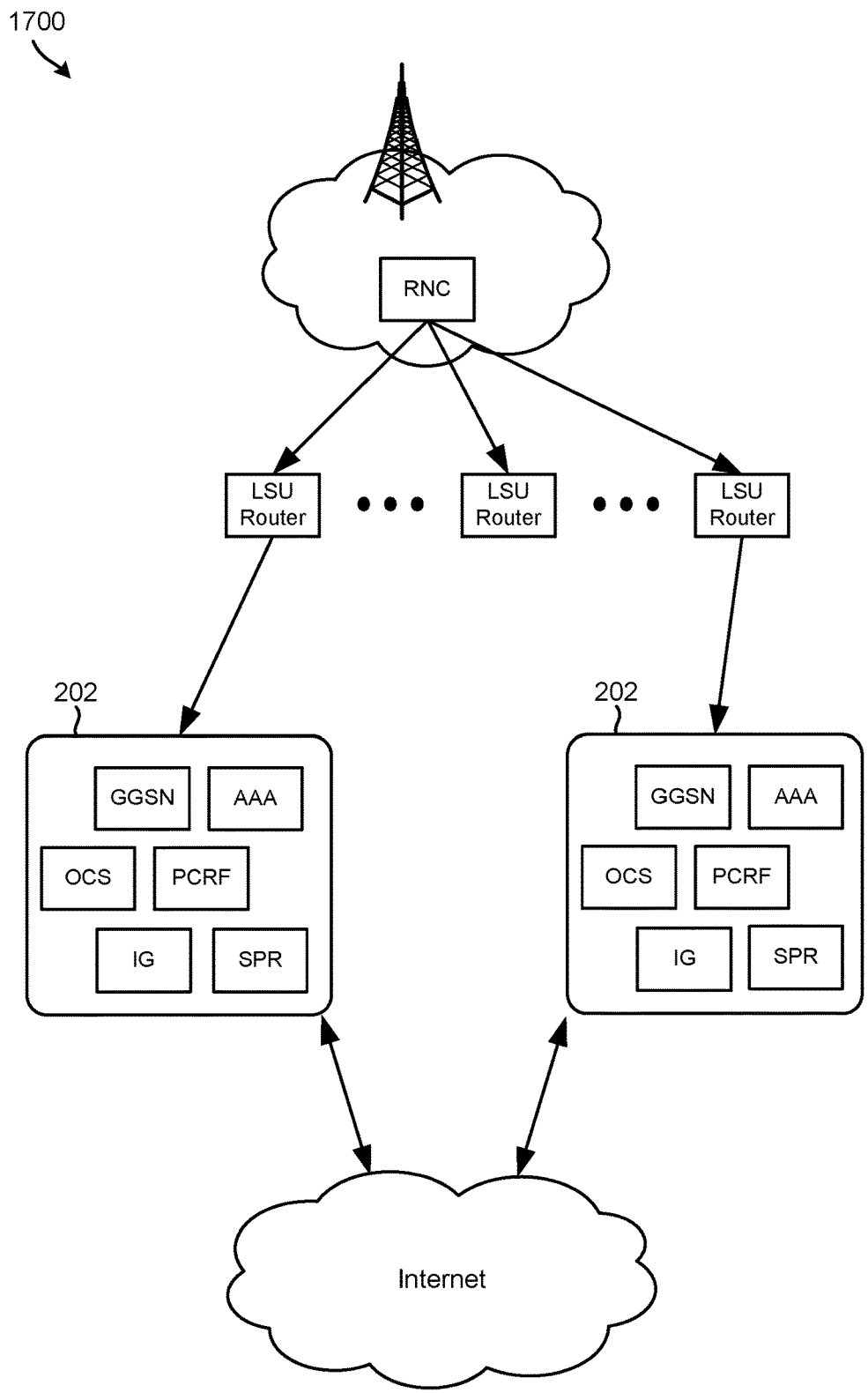
FIG. 17 is a block diagram illustrating an embodiment subscriber data-centric system that includes components configured achieve improved data locality.

FIG. 17 illustrates an embodiment subscriber data-centric system 1700 that includes components configured achieve improved data locality. The system may include a plurality of logical scalable units 202, each of which includes all the data and processing logic and resources for a limited number of users or subscribers. In an embodiment, the system 1700 may include a logical scalable unit 202 for each subscriber. In this embodiment, there may be many instances of each functional node (e.g., GGSN, PCRF, etc.), but each instance is used for a very limited number of subscribers.

The logical scalable units 202 may include both control plane components (OCS, PCRF, etc.) and data plane components (GGSN, deep packet inspector, etc.). Since the logical scalable units 202 are self contained, all of the control plane traffic for a subscriber may be kept within a single logical scalable unit 202. In this manner, the subscriber data-centric system 1700 may reduce network traffic and latencies, and improve the system's scalability and elasticity.

Figure 18:
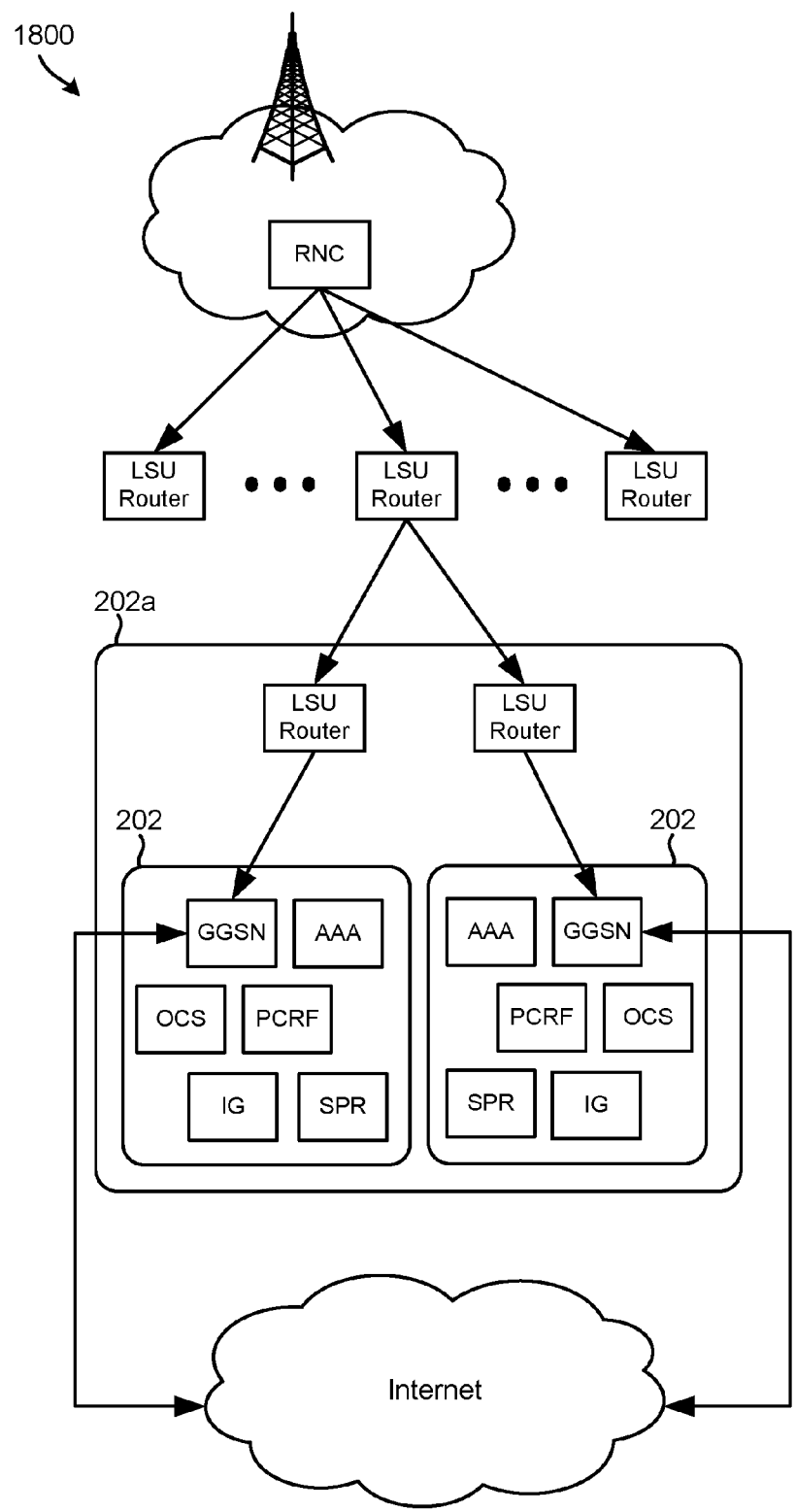
FIG. 18 is a block diagram illustrating an embodiment system that includes a plurality of logical scalable units organized into a hierarchy.

FIG. 18 illustrates an embodiment system 1800 in which logical scalable units 202 are organized in a hierarchical manner. In the example illustrated in FIG. 18, the system 1800 includes a parent logical scalable unit 202a that includes a plurality of child logical scalable units 202. The parent logical scalable unit 202a may be included in a single server blade having multiple multiprocessor server computing devices, and each of the child logical scalable units 202 may be included in one or more of the server computing devices. For example, a child logical scalable unit 202 may include multiple processors in a single server in the server blade.

Figure 19:
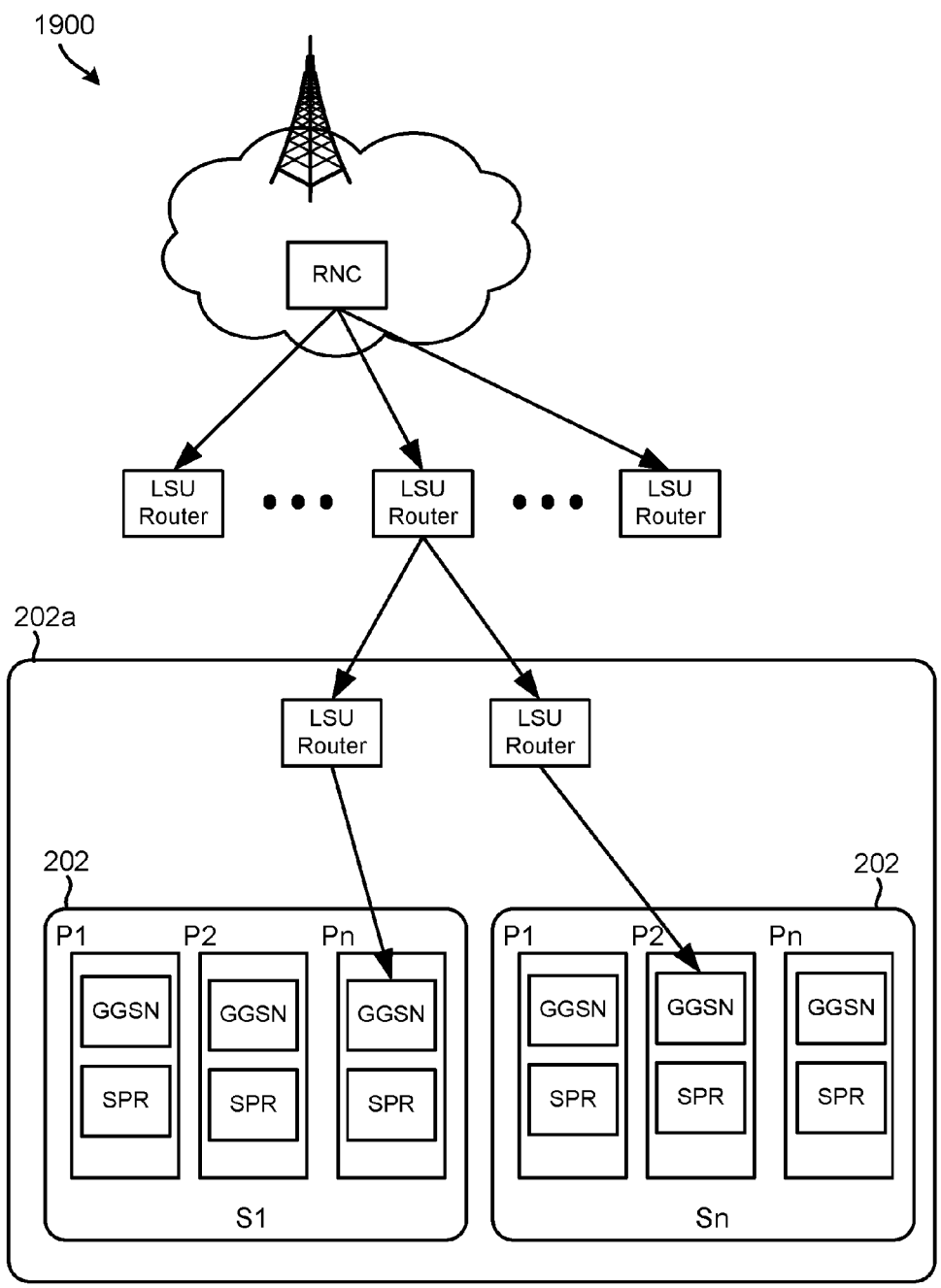
FIG. 19 is a block diagram illustrating another embodiment system that includes a plurality of logical scalable units organized into a hierarchy.

FIG. 19 illustrates another embodiment system 1900 in which logical scalable units 202 are organized in a hierarchical manner. In the example illustrated in FIG. 19, the system 1900 includes a parent logical scalable unit 202a that includes a plurality of child logical scalable units (51, S2) 202. The parent logical scalable unit 202a may be included in a single server blade having multiple multiprocessor server computing devices, and each of the child logical scalable units (S1, S2) 202 may be included in a multiprocessor server computing device. Further, each of the child logical scalable units (S1, S2) 202 may include a plurality of other logical scalable units (P1, P2, Pn) that are each included in a single processor of the multiprocessor server computing device. Each of these other logical scalable units (P1, P2, Pn) may be associated with a single subscriber, and thus the system may process subscriber requests without the use of threads or locks. This improves the speed and efficiency of the system 1900.

Figure 20:
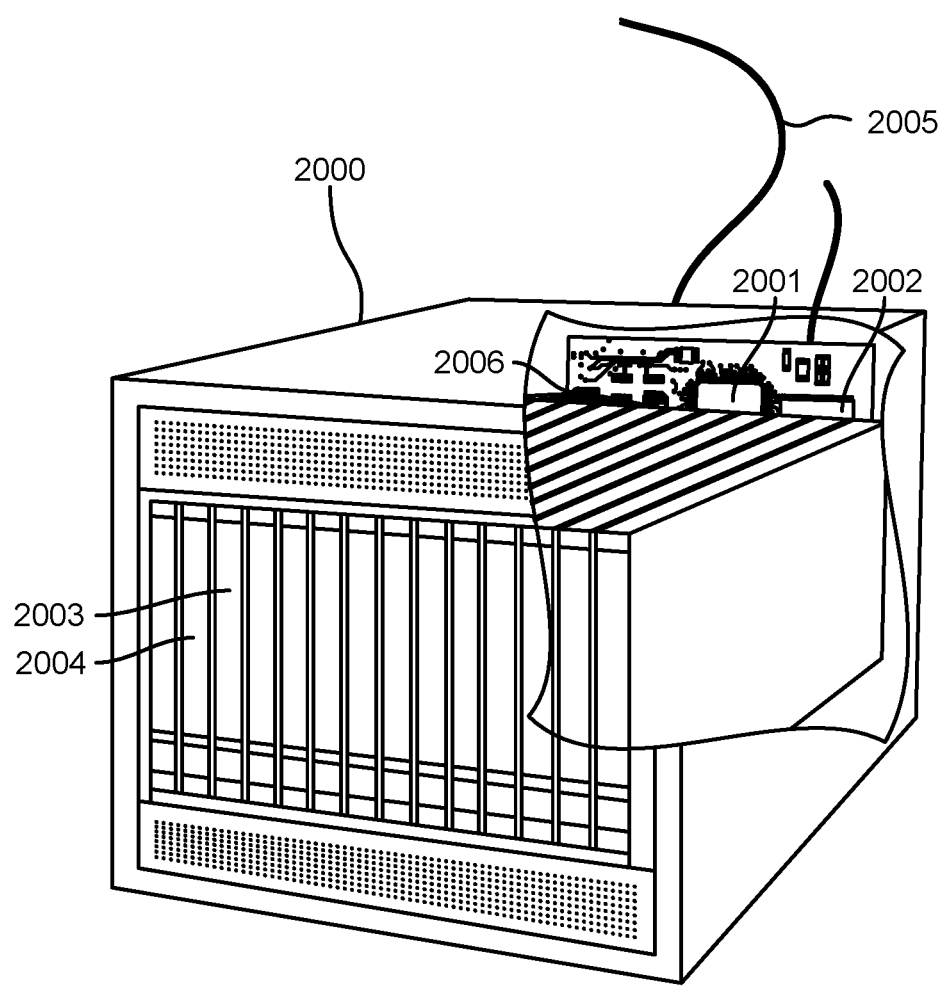
FIG. 20 is a system block diagram of a server suitable for implementing various embodiments.

The various embodiments may be implemented on any of a variety of commercially available server devices, such as the server 2000 illustrated in FIG. 20. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive 2004 coupled to the processor 2001. The server 2000 may also include network access ports 2006 coupled to the processor 2001 for establishing data connections with a network 2005, such as a local area network coupled to other operator network computers and servers.

The processor 2001 may be any programmable microprocessor, microcomputer or multiple processor chip or chips that can be configured by software instructions (applications) to perform a variety of functions, including the functions of the various embodiments described below. Multiple processors 2001 may be provided, such as one processor dedicated to wireless communication functions and one processor dedicated to running other applications. Typically, software applications may be stored in the internal memory 2002, 2003 before they are accessed and loaded into the processor 2001. The processor 2001 may include internal memory sufficient to store the application software instructions.

Figure 21:
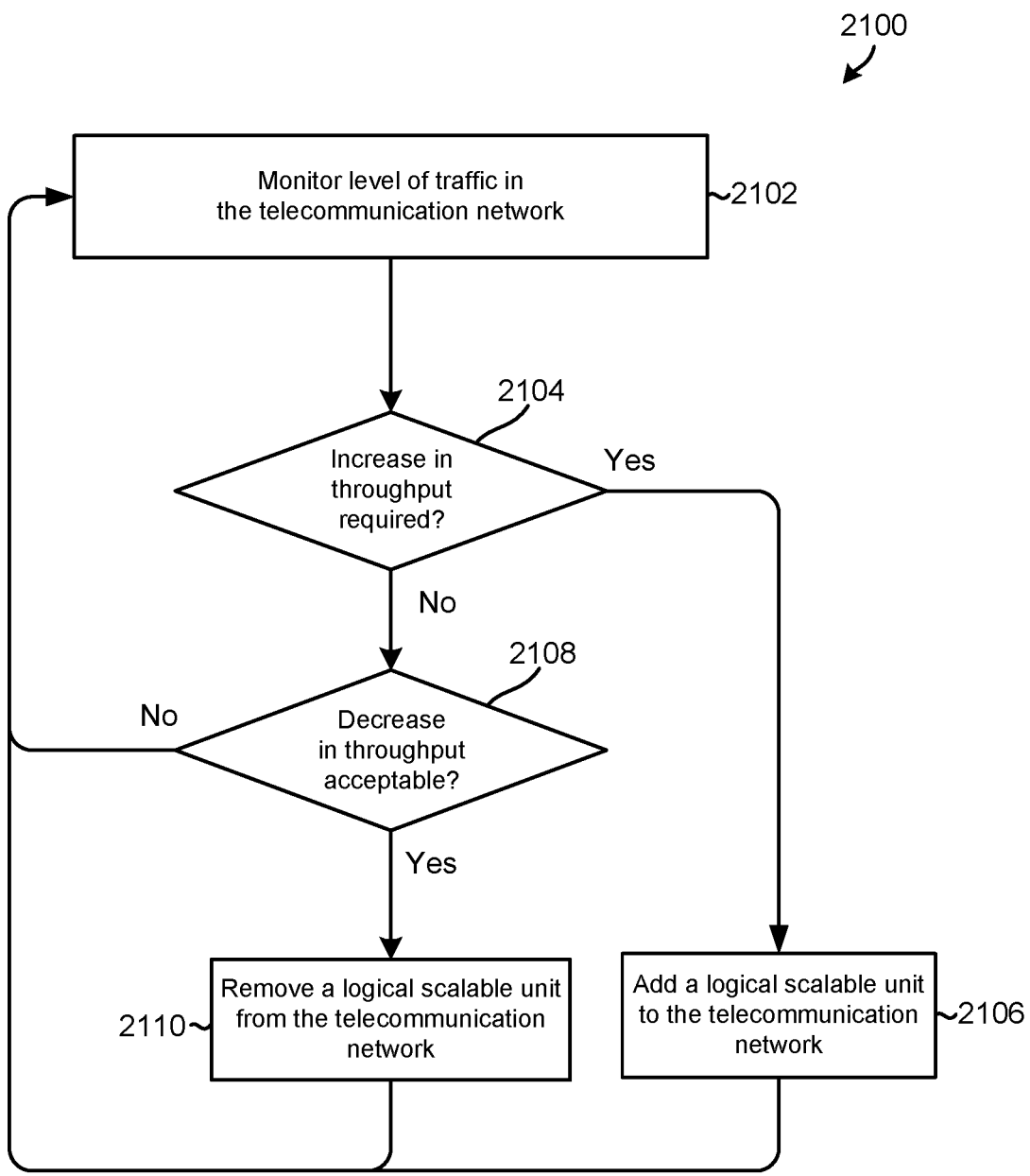
FIG. 21 is a process flow chart illustrating an embodiment method for dynamically deploying and withdrawing logical scalable units within a telecommunication network as network demands dictate.

As discussed above the implementation of logical scalable units enables the addition and removal of LSU's in response to the communication demands on the network. FIG. 21 illustrates an embodiment method 2100 for dynamically deploying and withdrawing logical scalable units within a telecommunication network as network demands dictate. In method 2100 a processor within the telecommunication network may monitor the level of traffic in the network. In determination block 2104 the processor may determine whether the network requires an increase in throughput in order to support current network demands. This may be accomplished by monitoring a number of sessions within the telecommunication network. If so (i.e., determination block 2104="Yes"), such as an increase in the number of sessions is detected in the telecommunication network, the processor may deploy another logical scalable unit (LSU) by configuring a server with the LSU processor-executable instructions and deploying the requisite data and network connections as described herein. This may involve adding a multiprocessor computing system configured to provide a portion of a functionality of an online charging system (OCS) and a portion of a functionality of a policy control and charging rules function (PCRF). This may involve adding a multiprocessor computing system configured to provide complete functionality of an online charging system (OCS) and a policy control and charging rules function (PCRF) for a small subset of the users in the telecommunication network. This may involve adding a multiprocessor computing system configured to provide complete functionality of an online charging system (OCS) and a policy control and charging rules function (PCRF) for a single user of the telecommunication network.

If the network does not require an increase in throughput, (i.e., determination block 2104="No") the processor may determine whether a decrease in throughput would be acceptable without impacting network capacity in determination block 2108. If so (i.e., determination block 2108="Yes"), the processor may remove an LSU from the network in block 2110. This may involve terminating transmissions of new communication messages to a selected logical scalable unit, waiting for existing sessions of the selected logical scalable unit to expire, and removing the selected logical scalable unit from the telecommunication network in response to determining that the existing sessions have expired. Alternatively, removing an LSU in block 2110 may involve terminating transmissions of new communication messages to a selected logical scalable unit, transferring existing sessions of the selected logical scalable unit to another logical scalable unit, and removing the selected logical scalable unit from the telecommunication network in response to determining that the existing sessions have been transferred.

As discussed above, components in a telecommunication network may be responsible for receiving, processing, communicating, maintaining and/or managing many different types of signaling messages, message formats, sessions and session stores, including Gx messages, Gx sessions, Gx session stores, Rx messages, Rx sessions and Rx session stores. For example, when a mobile device is powered on, various components in the network may communicate Gx messages to establish a Gx session, and begin storing information related to that session in a Gx session store or memory. Later, when the mobile device user answers an incoming VoLTE call request (or another similar event occurs), the network components communicate Rx messages to establish an Rx session, and begin storing information related to the Rx session in a different session store or memory (e.g., an Rx session store). The embodiments described above (e.g., with reference to FIGS. 8-16B) allow for correlating, processing, managing, and routing these related-but-different message types (e.g., Rx and Gx messages, etc.) in a high-speed, highly available and elastically scalable telecommunication system, even after scaling operations that change the physical locations in which the session information is stored. In further embodiments, these components (e.g., LSUs, etc.) may be configured to maintain session continuity for select services in the event of a failure, such as when a relevant session store, LSU, or datacenter fails (e.g., due to an emergency condition, an equipment failure, communication latencies, data corruption, etc.). Various embodiments accomplish this without replicating a large amount of information, thereby improving the performance and functionality of the telecommunication system. Some embodiments may accomplish this without replicating any session information.

Figure 22A:
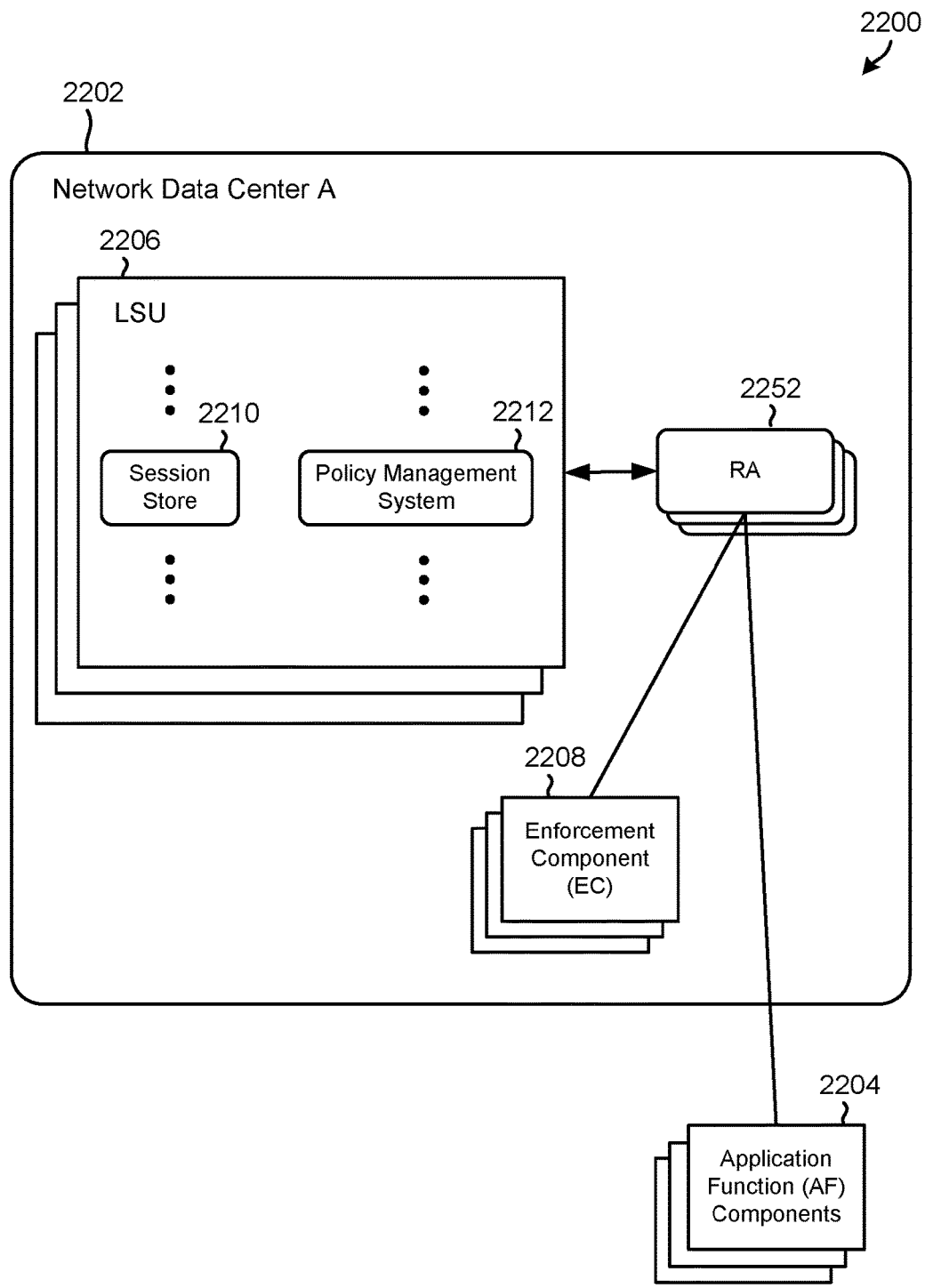
FIGS. 22A and 22B are block diagrams illustrating the communication links and logical and functional components in an embodiment telecommunication system having network datacenters.
Figure 22B:
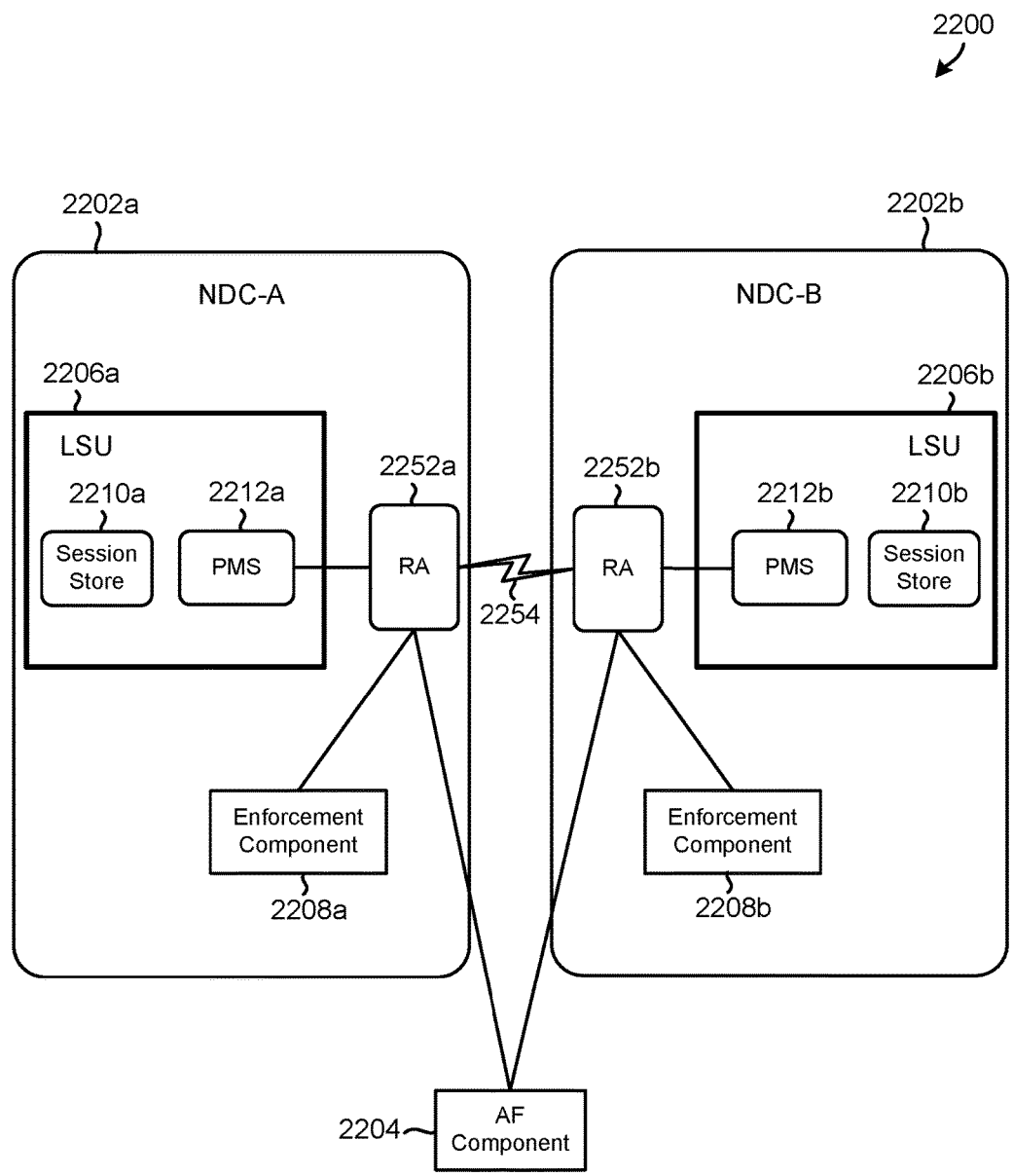
Figure 23:
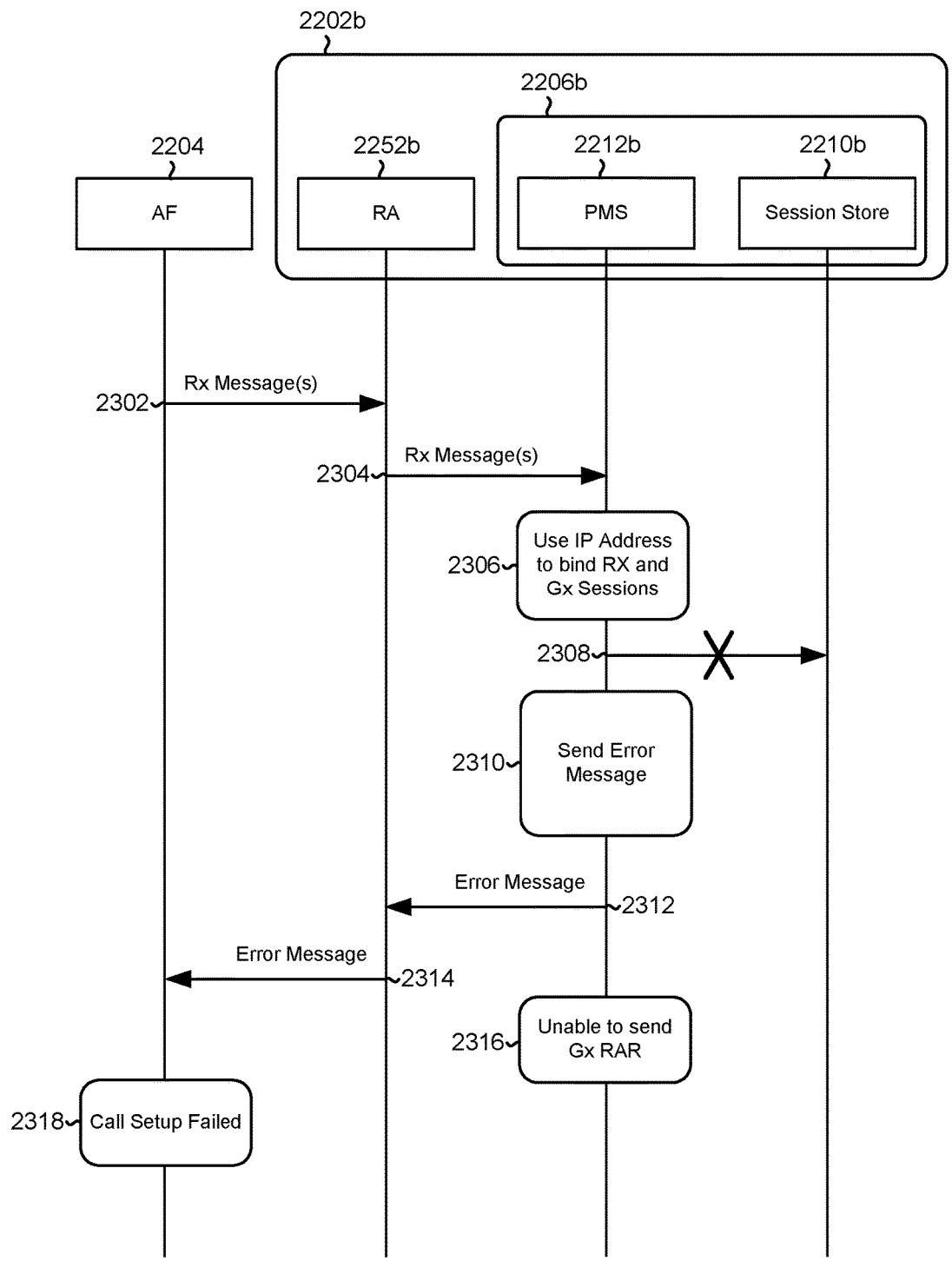
FIG. 23 is a message flow diagram illustrating the interactions between various components within embodiment system when a session cannot be found for a VoLTE call related Rx session.

FIGS. 22A and 22B illustrate an example communication system 2200 that includes an LSU in accordance with an embodiment. FIG. 23 illustrates example operations and information flows in the communication system 2200 when session stores are not replicated and a datacenter fails.

The communication system 2200 may include a layered architecture in which the application, database and storage layers are merged to achieve improved data locality. In addition to achieving improved data locality, the communication system 2200 may perform methods and/or implement solutions that minimize secondary key lookups (where related sessions are associated or bound with each other based on one or more non-primary session keys), minimize contention, and maximize parallelism of remote communications within the system, any or all of which may be achieved (or are made possible) by organizing the various logical and functional components (e.g., nodes, layers, applications, modules, etc.) in the manner described.

In addition, this grouping/organization allows the communication system 2200 to perform methods and implement solutions that cause the system to become highly available, better support elastic scalability, reduce the incidence of failure/failover/recovery conditions, and eliminate the need to include or use a shared or centralized storage system. To maintain high-availability, the communication system 2200 may be required to manage component failures and errors by quickly switching over to (or failing over to) a redundant component when such failures/errors are detected. This typically requires that the data stored in the elastic databases or session stores 2210 be replicated, made redundant, or otherwise made durable.

With reference to FIG. 22A, the communication system 2200 may include a network datacenter 2202 and an application function (AF) 2204 component. The network datacenter 2202 may include a logical scalable unit (LSU) 2206, a router agent (RA) 2252 component, and an enforcement component (EC) 2208. In various embodiments, the RA 2252 component may include all or portions of a DRA, DCR, router 610, etc. In some embodiments, the enforcement component 2208 may be a policy and charging enforcement function (PCEF) component.

As discussed above with reference to FIGS. 8-12B, each LSU 2206 may include one or more application components and one or more elastic database partitions. In the example illustrated in FIG. 22A and described below, the LSU 2206 includes a session store 2210 and a policy management system (PMS) 2212 component. However, it should be understood that, in various embodiments, the policy management system 2212 may be (or may include) a PCRF component, a charging component, or any of the application components or server nodes 612 discussed in this application (e.g., with reference to FIGS. 8-12B). Likewise, it should also be understood that the session stores 2210 may be elastically scalable databases, elastic databases 704, elastic database partitions (P1-Pn), or any other storage unit or database system discussed in this application (e.g., with reference to FIGS. 8-12B).

For ease of reference, some of the examples are described below with reference to a network datacenter 2202 that includes a single instance of each of an LSU 2206, a session store 2210, and a PMS 2212 component. However, it should be understood that each network datacenter 2202 may include many LSUs 2206, and that each LSU 2206 may include many session stores 2210 and many application components (e.g., many PMSs 2212, PCRFs, charging system components, etc.). It should also be understood that all these components (LSUs, application components, etc.) may be in an active configuration and/or active at the same time.

FIG. 22B illustrates that the communication system 2200 may include multiple datacenters. In particular, FIG. 22B illustrates that the communication system 2200 may include a first network datacenter (NDC-A) 2202a, a second network datacenter (NDC-B) 2202b, and an AF 2204 component. Each of the network datacenters 2202a, 2202b may include a RA 2252a, 2252b component, an LSU 2206a, 2206b component and an enforcement component 2208a, 2208b. The first LSU 2206a may include a first session store 2210a and a first PMS 2212a component. The second LSU 2206b may include a second session store 2210b and a second PMS 2212b component. The RA 2252a, 2252b components in different datacenters NDC-A 2202a, NDC-B 2202b may be coupled to one another via direct or indirect wired or wireless communication links 2254.

For select services and operations, the different datacenters (e.g., NDC-A 2202a and NDC-B 2202b) may be required to share session information. For example, when Voice over LTE using IMS ("VoLTE") is enabled, each of the datacenters (i.e., NDC-A 2202a and NDC-B 2202b) may be required to process a subset or portion of all the VoLTE call related sessions (e.g., Gx sessions, Rx sessions, etc.). As a result, the communication system 2200 may be required to replicate session information that is stored in, or associated with, a first application server (e.g., PMS 2212a) in a first datacenter (e.g., NDC-A 2202a) to/for a second application server (e.g., PMS 2212b) that is in a second datacenter (NDC-B 2202b). However, there are a number of limitations and drawbacks associated with replicating session stores (and the session information they include) across the different datacenters (e.g., across NDC-A 2202a and NDC-B 2202b).

Replicating session stores may have a significant negative impact on the performance of the telecommunication system and/or and its components (e.g., application servers, user equipment, etc.). This is due, in part, to the large amount of session information that could require replication and the high latencies associated with communicating such information between different datacenters (which are often geographically dispersed). Accordingly, reducing the amount of session information that is replicated and/or communicated between the datacenters (e.g., between NDC-A 2202a and NDC-B 2202b) would improve upon existing or conventional solutions. However, in order to maintain session continuity in the face of failure (i.e., in the event that a session store, LSU, or datacenter fails, etc.), many exiting solutions require replication of all or large portions of the session stores.

As a more detailed example, using existing or conventional solutions, the failure of a session store or datacenter may have a significant negative impact on VoLTE calls and/or the components that use or provide VoLTE services or functionality. This is because it is challenging to correctly update or terminate ongoing VoLTE calls so that dedicated Evolved Packet-switched System (EPS) bearer resources are updated or released as required by the audio and/or video media data. In addition, it is challenging to correctly establish new VoLTE calls so that dedicated EPS bearer resources are allocated for the audio and/or video media.

The various embodiments overcome these and other challenges and limitations of existing and conventional solutions by arranging and configuring network components (e.g., LSUs, etc.) to maintain session continuity for select services (e.g., VoLTE calls, etc.) in the face of a failure, without replicating the full session stores across datacenters. By eliminating the need to replicate large amounts of session information across datacenters, the various embodiments improve the performance, efficiency, and functionality of the telecommunication system.

FIG. 23 illustrates example operations and information flows in the communication system 2200 when session stores are not replicated and a datacenter fails. With reference to FIGS. 22B and 23, prior to performing operation 2302 illustrated in FIG. 23, a first subscriber (Subscriber 1) has its VoLTE-related Diameter messages (e.g., Gx and Rx messages) processed by a PMS 2212a component in LSU 2206a in NDC-A 2202a. As with VoLTE where a separate Access-Point-Name (APN) is used for IMS, the default EPS bearer for this APN may be established as the IMS-enabled user equipment is turned on. That is, the Gx session is established when the user equipment is turned on. The Gx session for the "IMS" APN is a long running session so that Session Initiation Protocol (SIP) signaling messages can be sent for Mobile Originating (MO) and received for Mobile Terminating (MT) audio/video calls by the user equipment at any time. SIP signaling messages for these MO/MT calls may drive the Rx messages from the AF 2204 component (which may also be referred to as "P-CSCF" in this application). The Gx session for Subscriber 1 has already been established with the PMS 2212a component in the LSU 2206a component in NDC-A 2202a, and then NDC-A 2202a fails (i.e., all PMSs 2212a in all of its LSUs 2206a are unresponsive, etc.).

In operation 2302, Subscriber 1 initiates a VoLTE call, which causes the AF 2204 component to generate and send Rx messages (e.g., Rx AAR messages) to a RA 2252. Generally, Authentication and Authorization Request (AAR) messages are used when the subscriber wants to create/launch and update an IMS application. An Rx Session-Termination-Request (STR) may be used when a subscriber wants to terminate the IMS application (e.g., VoLTE call).

Typically, as part of operation 2302, the Rx messages would be routed to the RA or PMS/LSU/datacenter where the Gx session for Subscriber 1 has been established (i.e., RA 2252a and/or PMS 2212a in LSU 2206a in NDC-A 2202a in this example). However, because NDC-A 2202a is down/failed, the messages are sent to RA 2252b in operation 2302 and routed to the PMS 2212b in operation 2304. Since PMS 2212b is in LSU 2206b in NDC-B 2202b, and the session stores were not replicated, session store 2210b does not include/store Gx session information for Subscriber 1.

In operation block 2306, the PMS 2212b component attempts to use an IP address to bind the Rx and Gx sessions. In operation 2308, the PMS 2212b component unsuccessfully attempts to access information in a corresponding session store 2210b (e.g., by sending a query message, etc.). The attempt is unsuccessful because the relevant information is stored in a session store 2210a of NDC-A 2202a (which was not replicated and has failed), and not in the session store 2210b that was queried.

In operation block 2310, the PMS 2212b component may determine that the Rx messages should be rejected and/or may begin performing various operations to reject the Rx messages. In the example illustrated in FIG. 23, the PMS 2212b component rejects the Rx messages in operations 2310 and 2312 by generating and sending error messages to the LSU 2206b component. In some embodiments, the error messages may include (or may be) an Rx AAA message with IP-CAN_SESSION_NOT_AVAILABLE (5065) error.

In various embodiments, the PMS 2212b component may determine that the Rx messages should be rejected in operations 2310 and/or 2312 in response to determining that it does not have the relevant session information for Subscriber 1, that attempts to access information in a corresponding session store 2210b were unsuccessful, and/or that it is otherwise unable to acquire the relevant session information (e.g., because NDC-A 2202a has failed, there are no relevant shared session stores available, etc.). In operation 2314, the RA 2252b component may send the error message(s) to the AF 2204 component.

In operation block 2316, the PMS 2212b component may determine that it is unable to generate or send the correct Gx messages (e.g., Gx RAR messages, which are discussed above with reference to FIG. 12B, etc.) because it does not have access to the relevant session information.

In operation block 2318, the AF 2204 may receive the error messages (e.g., Rx AAA error messages, etc.), and in response, cause the same or different error messages (e.g., a failed SIP-INVITE message, etc.) to be sent back to the user equipment device of Subscriber 1. In response, the user equipment device may trigger a circuit switched fall back (CSFB), which may drop the EUTRAN (LTE) connection to allow Subscriber 1 to make calls via a circuit switched network.

In the above example, the failure of NDC-A 2202*a* prevents the user equipment device from establishing and participating in a VoLTE call, and as a result, the user equipment device is forced to fall back on the use of a circuit switched network. Later, when PMS 2212*a* and NDC-A 2202*a* become operational again, the system may begin routing Rx messages to the network datacenter (i.e., NDC-A 2202*a*) where the Gx session for Subscriber 1 has been established (i.e., where the Gx session information is stored). However, the user equipment device still may not be able to establish or participate in a VoLTE call. This is because, due to NDC-A 2202*a* failing, the previous Gx session information (which is still active on the gateway or EC 2208) may be lost. As a result, the PMS 2212*a* component in NDC-A 2202*a* may reject the Rx messages, thereby preventing the user equipment device from participating in another VoLTE call. The user equipment may be forced to use circuit switched networks until the Gx session for the IMS APN is "flushed" from the gateway (e.g., the EC 2208 or PCEF), which may occur when the user reboots the user equipment device (or puts it in to, and out of, airplane mode, etc.).

Forcing the user to reboot the user equipment device before participating in another VoLTE call may degrade the user experience. In addition, there are a number of other limitations and drawbacks associated with forcing the components (e.g., user equipment device, etc.) to fall back on using circuit switched networks. One of these limitations/drawbacks is that the usage of a circuit switched network (instead of VoLTE) is often very visible to the subscriber. This is because: VoLTE audio-only calls using IMS provide high definition voice (HD-Voice) which is a superior audio quality/experience compared to the narrow band codecs employed by circuit switched networks; VoLTE using IMS provides noticeably shorter call setup times compared to circuit switched calls; VoLTE audio calls can be upgraded to audio and video calls (it is possible to do this with circuit switched calls on UTRAN networks, but it is not typically supported by the telecommunications network operator); and there is typically a noticeable long delay before the user equipment falls back to using the circuit switched network. In addition, leaving guaranteed bit rate (GBR) dedicated EPS bearers (herein "GBR bearers") operational might cause a variety of resource allocation issues for the telecommunications network operator, and reduce the performance and efficiency of the telecommunication system.

The various embodiments include methods, and systems and server computing devices configured to implement the methods, for overcoming these and other limitations of existing and conventional solutions.

Figure 24:
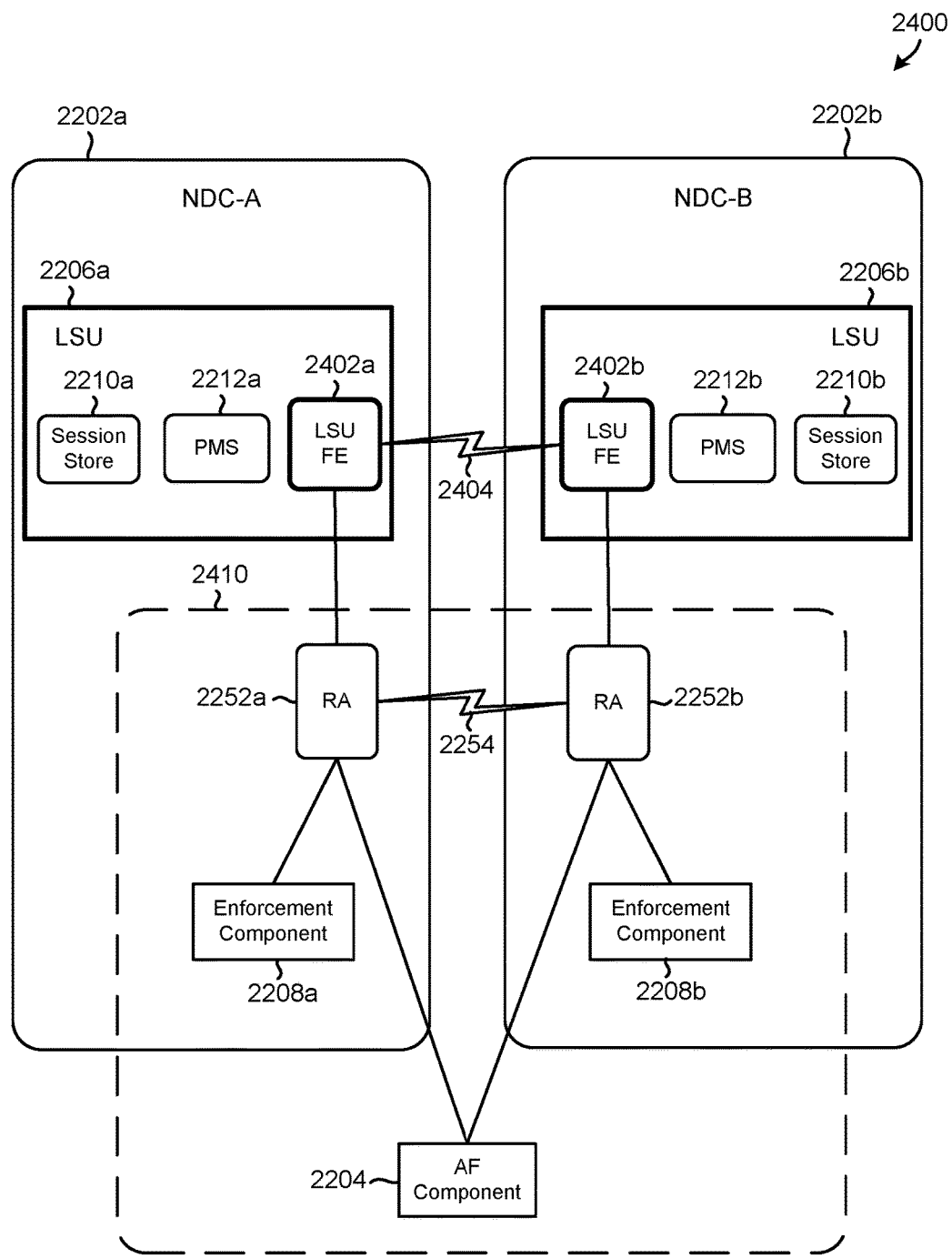
FIG. 24 is a block diagram illustrating the communication links and logical and functional components in an embodiment telecommunication system having two network data centers, in which the LSUs in one network datacenter are mated with LSUs in the other network data center.

FIG. 24 illustrates a communication system 2400 configured to maintain session continuity for select services (e.g., VoLTE services, etc.), without replicating session stores, in accordance with the various embodiments. The illustrated communication system 2400 may include components that are configured such that, when a session store 2210 or datacenter 2202 fails, the user equipment devices (and/or other components) are not forced to fall back on using circuit switched networks, thereby improving the user experience and the overall performance of the communication system and its components. In addition, by not replicating the session stores (yet maintaining session continuity for select services in the face of failure), the components may reduce network congestion and further improve the user experience and/or the overall performance and functionality of the communication system 2400.

In the example illustrated in FIG. 24, the communication system 2400 includes a first LSU 2206*a* component in a first datacenter 2202*a*, and a second LSU 2206*b* component in a second datacenter 2202*b*. Each of the LSU 2206 components may include an LSU Frontend (FE) 2402 component. For example, in the illustrated example, the first LSU 2206*a* component includes a first LSU FE 2402*a* component, and the second LSU 2206*b* component includes a second LSU FE 2402*b* component. The communication system 2400 may also include RA 2252 components and enforcement components 2208, any or all of which may be included in, or independent of, the datacenters 2202*a*, 2202*b*. In various embodiments, all or portions of the RA 2252 components, enforcement components 2208, and application function (AF) 2204 components may be included in (or implemented as part of, represented via, etc.) a client 2410 component. In some embodiments, the LSU Frontend 2402 component may include or implement all or portions of a DCR component and/or a router 610 component (illustrated in FIGS. 8-12B, etc.). In various embodiments, all or portions of the LSU Frontend 2402 component may be included in, or independent of, the LSU 2206 components and/or datacenters 2202*a*, 2202*b*.

The datacenters 2202*a*, 2202*b* may be connected via the communication link 2254 between their respective RA 2252 components (i.e., between RA 2252*a* and RA 2252*b*). In addition, the LSU Frontend 2402 components (i.e., LSU FE 2402*a* and LSU FE 2402*b*) may be mated, coupled or paired, and configured to communicate session information via wired, wireless, direct or indirect second communications link 2404. As a result, LSU 2206*a* and LSU 2206*b* may be "mated LSUs."

The mated LSUs 2206 (i.e., LSUs 2206*a* and 2206*b*) may be configured to accomplish active-active geo-replication with very little (or a minimum amount of) data being replicated between them (e.g., via the link 2404 between LSU FEs 2402*a* and 2402*b*). Mated LSUs 2206 may also be configured to make business decisions (e.g., decisions regarding starting, continuing or terminating a VoLTE session, etc.) that require access to Rx and/or Gx session information, even when their respective application components (e.g., PMS, PCRF, etc.) do not have the relevant Gx and/or Rx session information stored in their session stores. For these and other reasons, the communication system 2400 may maintain session continuity for select services (e.g., VoLTE, etc.) even when a session store (e.g., session store 2210*a*, etc.), application component (e.g., PMS 2212*a*, etc.), LSU (e.g., LSU 2206*a*, etc.), and/or datacenter (e.g., NDC-A 2202*a*, etc.) fails.

In some embodiments, each LSU 2206 (e.g., LSUs 2206*a* and 2206*b*) may be configured to add new information and/or a new parameter, such as a session continuation/continuity (SC) parameter or a VoLTE-Session-Continuity Attribute-Value-Pair (APV), to messages that are communicated between the application components (e.g., PMS 2212, OCS, TDF, TSSF, etc.) and the LSU Frontend 2402 component (or any other component that communicates session information or the status of a session). The new information/parameter may be added to a message by adding a new information structure or structured field (e.g., a session continuity field, a session identification field, etc.) so that it may be extracted, decoded, interpreted and/or used by the components in the communication system 2400.

In some embodiments, the LSU Frontend 2402 component and PMS 2212 component may be configured to process Gx session creation messages, Gx session update messages, Gx session termination messages, Rx session creation messages, Rx session update messages, and Rx session termination messages. The LSU Frontend 2402 component may be configured to add new information and/or a new parameter to the Gx session update messages, Gx session termination messages, Rx session creation messages, Rx session update messages, and Rx session termination messages.

In some embodiments, the LSU Frontend 2402 component may be configured to add a common key (e.g., a value, AVP, information structure, etc.) to all the messages that it sends to the application components (e.g., PMS 2212 component, etc.). The LSU Frontend 2402 component may also be configured to add session continuity information (e.g., a SC parameter, VoLTE-Session-Continuity AVP, etc.) to Gx Credit-Control-Request-Update (CCR-U) messages, Rx Authentication Authorization Request (AAR) messages, Rx Session-Termination-Request (STR) messages, and Gx Credit-Control-Request-Terminate (CCR-T) messages.

In some embodiments, an application component (e.g., PMS 2212 component, etc.) may be configured to add a common key to all Rx and Gx server-initiated messages, such as Gx Re-Authorization Request (RAR) messages and Rx RAR messages, that it sends to the LSU Frontend 2402 component. The application component may also be configured to update the session continuity information (e.g., a SC parameter, VoLTE-Session-Continuity AVP, etc.) in Gx RAR messages.

In some embodiments, the added information/parameter (e.g., SC parameter, etc.) may include only a small subset of the full session information that is normally used by the application components or the LSU components. In some embodiments, the added information/parameter (e.g., common key, SC parameter, etc.) may be an order of magnitude (or more) less than the full session information used by the components (e.g., to maintain session continuity for the entire session, etc.). For example, if the full session information is 3.5 kilobytes (KB), the added information may be less than or equal to 0.35 KB. In an embodiment, the LSU 2206 may be configured to add less than or equal to 120 bytes of information to the messages when the full session information is approximately 3.5 KB or greater.

In some embodiments, the new/added parameter may include the Gx Session-Id of the session and/or an identifier for the enforcement component (e.g., a PCEF host and realm).

In some embodiments, the new/added parameter may include the Rx Session-Id of the session, an identifier for the enforcement component (e.g., a PCEF host and realm), and/or the names of the Rx-derived dynamic PCC Rules installed by the application component (e.g., PMS 2212, PCRF, etc.). In overview, Rx-derived dynamic PCC Rules are partial rules, where only a subset of the fields are configured or set as part of an application component's configuration. The missing parts (e.g., subscriber flow specific and QoS attributes, etc.) may be filled or derived from the fields that are present in Rx messages at runtime. This is also sometimes called PCC Rules authorization.

In some embodiments, the added information/parameter may include any information that may be used to maintain session continuity when backend or full session information is not available. For example, to maintain session continuity for a VoLTE session, the added information/parameter may be a VoLTE-Session-Continuity APV that includes an Rx Session-Id of the VoLTE session and the names of the Rx-derived dynamic Policy and Charging Control (PCC) Rules that the PMS 2212 component installed.

In some embodiments, the LSU 2206 and/or LSU Frontend 2402 components may be configured to receive messages, extract the added information/parameters from the received messages, and store them in an LSU Frontend cache memory (not illustrated separately in FIG. 24). The components may also be configured to replicate the information in the LSU Frontend cache, both locally and geographically. In an embodiment, each LSU Frontend cache may contain/store only the session binding information and a small amount of session information (e.g., VoLTE session data, etc.).

In some embodiments, the LSU Frontend 2402 may be configured to send the original messages (with the added parameter/information removed) to their intended destinations. In other embodiments, the LSU Frontend 2402 may be configured to send the updated or augmented messages that include the added information/parameters (e.g., common key, SC parameter, etc.) to the destination components. Leaving the added information in the message may be useful to the network operator. For example, the network operator may use the additional information/parameters for audit purposes and/or to track the messages as they flow or traverse through third party nodes in the network.

In some embodiments, mated LSU 2206 components may be configured to asynchronously replicate their LSU Frontend cache memories so that the same or similar information is available in different datacenters (e.g., NDC-A 2202*a* and NDC-B 2202*b*). In an embodiment, this may be accomplished via their respective LSU FE 2402*a*, 2402*b* components adding session information (e.g., the SC parameter, etc.) to messages that they send, and extracting for storage session information from the messages that they receive.

The various embodiments include methods, and systems and server computing devices configured to implement the methods, for providing VoLTE session continuity across mated LSUs 2206 in the case of an entire LSU 2206 failing, without the need for the session stores to be replicated. This may be accomplished via any combination of enabling the mated LSU Frontends to cache and replicate VoLTE-related information (as shown in FIG. 24), enabling the application components (e.g., PMS 2212, PCRFs) to provide VoLTE-related information to the LSU Frontends 2402, and enabling an LSU Frontend 2402 to include VoLTE-related information within the messages that it sends to the application components. The LSU Frontend cache (which contains session binding information and a small amount of VoLTE session data) may be replicated between the LSU Frontends (both locally and geographically).

In some embodiments, an application component (e.g., PMS 2212*a*, PCRF, etc.) may be configured to use the added information (e.g., a VoLTE-Session-Continuity AVP, etc.) in response to determining that a session store (e.g., 2210*a*, etc.) has failed. For example, the PMS 2212*a* component in NDC-A 2202*a* may be configured to use session information from the first LSU FE 2402*a* (e.g., the information in a VoLTE-Session-Continuity AVP) to generate a response message (e.g., an Rx response message, etc.) and maintain session continuity for select services (e.g., VoLTE, etc.) in response to determining that its corresponding session store 2210*a* (or the Gx or Rx session store for the relevant subscriber) has failed.

In some embodiments, an LSU 2206 component may be configured to use the added/additional information (e.g., a VoLTE-Session-Continuity AVP, etc.) in response to determining that an entire LSU or an entire datacenter has failed. For example, in response to determining that the first LSU 2206*a* component or NDC-A 2202*a* has failed, the second LSU 2206*b* component may retrieve session information from an LSU Frontend cache memory, and send this information to its application component (e.g., PMS 2212*b*,) so that it may generate a proper response (e.g., Rx response messages, etc.) and maintain session continuity for select services. In an embodiment, the second LSU 2206*b* component may be configured to determine that the first LSU 2206*a* component and/or NDC-A 2202*a* has failed in response to (or based on) receiving messages that would have otherwise been sent to the first LSU 2206*a* component or to NDC-A 2202*a*.

In some embodiments, an application component (e.g., PMS 2212, PCRF, etc.) and/or LSU Frontend 2402 component may be configured with processor executable instructions to perform select operations based the types of messages that are received and/or based on the presence of various states or conditions in the system. These operations are discussed in detail with reference to specific examples in the following paragraphs and/or with reference to FIGS. 25 through 31. For ease of reference, these examples are described with reference to a policy management system (PMS) component and VoLTE calls using IMS. However, it should be understood that any of a number of application components (e.g., PCRF, OCS, TDF, TSSF, etc.) could be used to maintain session continuity for a variety of different types of sessions or services. As such, nothing in the following examples should be used to limit the scope of the claims to any specific application component, session, or service unless specifically recited as such in the claims.

In some embodiments, a policy management system (e.g., PMS 2212 component) may be extended to process session store errors relating to Rx AAR/STR messages as follows. It does not send IP-CAN_SESSION_NOT_AVAILABLE (5065) Experimental-Result-Code errors in Rx AAA or STA messages if it cannot find the Gx session data. Instead, the policy management system may send DIAMETER_SUCCESS (2001) as the result code, and uses the session continuity AVP (e.g., common key, Gx Session-Id, PCEF host and realm etc.) to identify the gateway (e.g., EC, PCEF, etc.) to which it needs to send the Gx RAR message. The policy management system populates the VoLTE-Session-Continuity AVP with this information and sends it to the LSU Frontend in the Gx RAR message. The LSU Frontend (e.g., LSU Frontend 2402 component) may remove this parameter from the messages, store it within its cache, and send the original messages to their intended destinations. The LSU Frontend may also send the received messages (including the added/new parameter) to their intended destinations.

In the event of an LSU outage, the router agent (e.g., RA 2252 component) may route VoLTE IMS APN related messages to a mated LSU in a different network datacenter. The mated LSU Frontend may have sufficient VoLTE related information replicated to enable it to successful route incoming messages to the appropriate application component, along with the VoLTE session continuity information that it needs to process the messages. Furthermore, it may use common key routing techniques (described previously) in order to successfully perform Rx/Gx binding as part of the message routing operations.

The policy management system provides VoLTE-related information to LSU Frontend and uses the information received from the LSU Frontend to be more resilient in cases where the VoLTE session-related information cannot be found in the session store, or when the session store is not available.

In some embodiments, the policy management system may be extended to process VoLTE IMS call establishment or modification messages (i.e., the first Rx AAR message, an Rx AAR update message, etc.) as follows. If the policy management system cannot find the Gx session, it will not return an error. Instead it will return an Rx AAA with DIAMETER_SUCCESS (2001). The policy management system (e.g., the PCRF) will use the session continuity information (e.g., common key, Gx Session-Id, PCEF identifiers) to deduce the Gx Session-Id and the PCEF Diameter host and realm, so that it can construct a Gx RAR correctly and send it to the PCEF that has the underlying Gx session. The Gx RAR may contain information suitable for causing the installation of the authorized policy and charging rules, thus effectively controlling the flows and the QoS of the media components/sub-components. The policy management system (e.g., the PCRF) populates the VoLTE session continuity data and sends the Gx RAR with this AVP to the LSU Frontend (which then sends it to the PCEF or EC via the RA). Note that the policy management system (e.g., the PCRF) will not attempt to store Rx session store records if the session store is unable to find the Gx session store record. This is to avoid increasing complexity by introducing partial Rx and Gx session store records that may not be linked correctly.

The policy management system may be extended to process VoLTE IMS call termination messages (i.e., an Rx STR message, etc.) as follows: if the policy management system (e.g., the PCRF) cannot find the Rx and/or Gx session in the session store, it will not return an error (i.e., it will send an Rx STA with DIAMETER_SUCCESS (2001)). It will use the session continuity information passed from LSU Frontend (e.g., common key Gx Session-Id, PCEF identifiers) to deduce the Gx Session-Id and the PCEF Diameter host and realm, so that it can construct a Gx RAR correctly and send it to the PCEF that has the underlying Gx session. Using the VoLTE session continuity data, the Gx RAR will cause the removal of the previously authorized policy and charging rules that were installed to control the data flows and set the QoS of the media components/sub-components. The policy management system (e.g., the PCRF) clears the VoLTE session continuity data and sends the Gx RAR with this AVP to the LSU Frontend. Note that the policy management system (e.g., the PCRF) will not attempt to remove Rx session and update Gx session records if the session store is unable to find the Gx session store record. This is to avoid increasing complexity by introducing partial Rx and Gx session store records that may not be linked correctly.

The policy management system may be extended to process GX session termination message (i.e., Gx CCR-T) as follows: if the policy management system (e.g., the PCRF) cannot find the Gx session in the session store or the session store database is not available, then it will use the VoLTE session continuity information passed to it by the LSU Frontend, and deduce the active Rx Session-Id(s) and the AF (e.g., P-CSCF) Diameter host and realm. It will send an Rx Abort-Session-Request (ASR) message to the AF for the Rx session. It will clear the VoLTE session continuity data it sends in the Rx ASR message to the LSU Frontend. The LSU Frontend delays the deletion of its cache entry for this common key so that an Rx STR message from the AF which follows the Rx ASR/ASA message exchange can be handled correctly by the LSU Frontend. Note that the policy management system (e.g., the PCRF) will not attempt to remove Rx and Gx session records if the session store is unable to find the Rx and/or Gx session store records.

Figure 25:
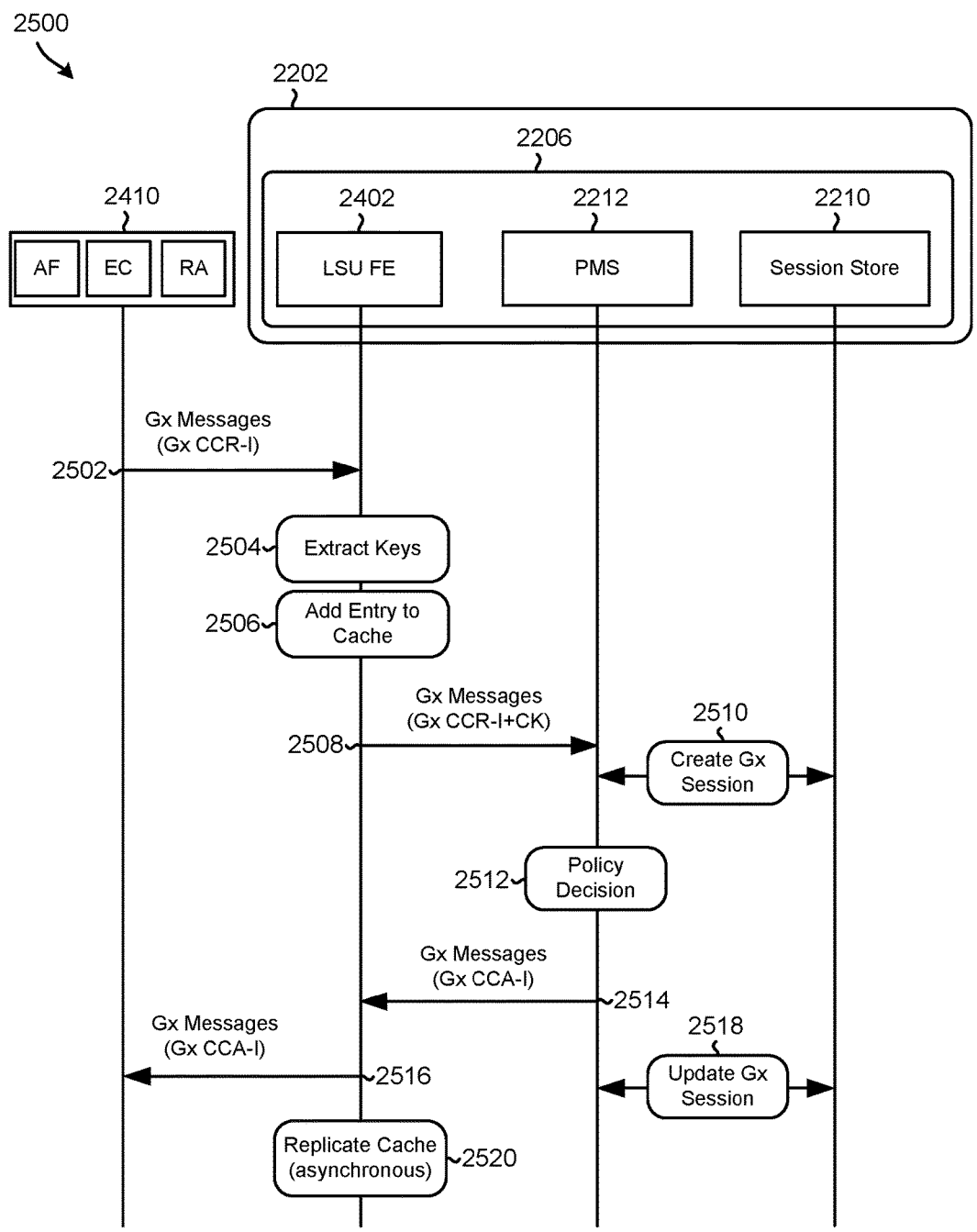
FIG. 25 is a block diagram illustrating logical components and example message flows in a communication system that includes LSUs in accordance with various embodiments.

FIG. 25 illustrates logical components and example message flows in a communication system 2500 that includes LSUs configured to communicate messages in accordance with the various embodiments. The communication system 2500 may be an elastically scalable telecommunication network that includes any or all of the components and configurations discussed in this application. In the example illustrated in FIG. 25, the communication system 2500 includes a client 2410 component, which may include or represent a gateway or enforcement component (e.g., EC 2208, PCEF, etc.), an AF component (e.g., AF 2204, etc.), and a DCR, DRA, router, or RA component (e.g., RA 2252, etc.). The communication system 2500 also includes a datacenter 2202 that includes an LSU 2206 component. The LSU 2206 component includes an LSU Frontend 2402 component, a policy management system (PMS) 2212 component, and a session store 2210 component.

The message flows illustrated in FIG. 25 may occur when a Gx session (or IP_CAN session) is created on behalf of a user equipment device. Generally, a Gx session is created by the user equipment device on behalf of the subscriber (or application running on the user equipment device) when the device needs to establish or use a data connection. While various embodiments are described below with reference to Gx sessions, it should be understood that the same or similar operations may be performed for IP CAN sessions.

In operation 2502, the client 2410 component may send a Gx message (e.g., Gx CCR-I request message discussed above with reference to FIG. 9A, etc.) to the LSU Frontend 2402 component. The Gx message may be sent, for example, in response to a user booting the user equipment device (or when the user equipment device otherwise needs to establish or use a data connection, establish a Gx session, etc.). The Gx message may include subscriber identifiers (e.g., MSISDN, FIA+APN, etc.) that uniquely identify a subscriber.

In operation block 2504, the LSU Frontend 2402 component may receive the Gx message, and extract or determine various keys and/or parameters (e.g., IMSI, MSISDN, IPv4, IPv6, MSISDN, FIA+APN, Gx/Rx Session-ID, etc.) from the received Gx message for use as a common key (or as part of a common key, to determine a common key, etc.). In operation block 2506, the LSU Frontend 2402 component may add an entry to its cache (e.g., its LSU Frontend cache, etc.). In various embodiments, the LSU Frontend 2402 component may store all or portions of the extracted or determined keys or parameters (e.g., Gx/Rx Session-ID, etc.) as part of the a session continuity (SC) parameter or Session-Continuity AVP in the LSU Frontend cache in operation block 2506.

In operation 2508, the LSU Frontend 2402 component may update the received Gx messages to include the common key, and send the updated Gx messages (e.g., Gx CCR-I+CK) to the PMS 2212 component. Alternatively, the LSU Frontend 2402 component may generate a new communication message based on information included in the received Gx messages, and send this new communication message (which includes the common key) to the PMS 2212 component in operation 2508.

In operation block 2510, the PMS 2212 component may create a Gx session for the subscriber in the session store 2210 (or in a Gx session store within the session store 2210). In operation block 2512, the PMS 2212 component may perform various policy and charging operations and/or make a policy and/or charging decision. In operation 2514, the PMS 2212 component may generate and send Gx messages (e.g., Gx CCA-I or "CCA Gx response" message discussed above with reference to FIG. 9A, etc.) to the LSU Frontend 2402 component. In operation 2516, the LSU Frontend 2402 component may receive and send the Gx messages to the client 2410 component (e.g., to the gateway or EC component).

In operation block 2518, the PMS 2212 component may update the Gx session in response to the performance of the policy/charging operations and/or the policy/charging decision(s) (or in response to another event or condition, a change in circumstances, an update request, etc.). In operation block 2520, the LSU Frontend 2402 component may asynchronously replicate its cache. For example, in operation block 2520, the LSU Frontend 2402 component may send all or portions of the extracted or determined information (e.g., common key, Gx Session-Id, PCEF identifiers etc.) that was stored in the LSU Frontend cache (e.g., as part of operation 2506) to its mated LSU Frontend component in another LSU in a different datacenter.

Figure 26:
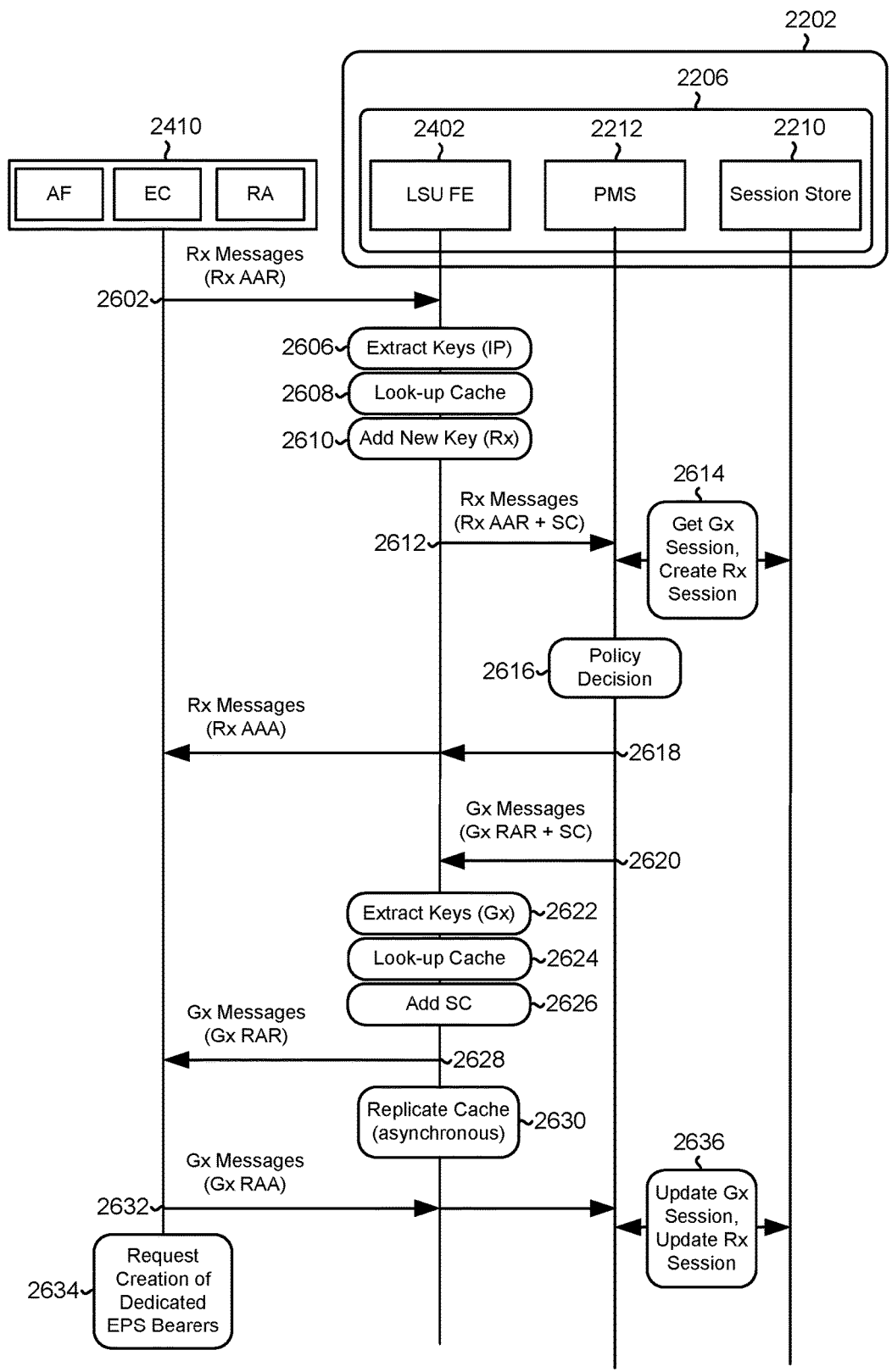
FIG. 26 is a block diagram illustrating logical components and example message flows when a VoLTE call is successfully established in a communication system that includes LSUs in accordance with various embodiments.

FIG. 26 illustrates logical components and example message flows in the communication system 2500 when an Rx session (e.g., for a VoLTE call, etc.) is successfully established in accordance with various embodiments. In operation 2602, the client 2410 may generate and send Rx messages (e.g., Rx AAR message discussed above with reference to FIG. 9B, etc.) to the LSU Frontend 2402 component. For example, the client 2410 may generate and send one or more Rx messages in operation 2602 in response to the user equipment accepting an incoming VoLTE call request. These Rx messages may identify the subscriber/session via a different field, value or identifier than that which is used in the Gx messages (e.g., Gx CCR-I request messages) received in operation block 2504 illustrated in FIG. 25.

Returning to FIG. 26, in operation block 2606, the LSU Frontend 2402 component may extract or determine various keys and parameters (e.g., IP, FIA+APN, IMSI, MSISDN, IPv4, IPv6, Gx/Rx Session-ID, etc.) from the received Rx messages. In operation block 2608, the LSU Frontend 2402 component may use the extracted/determined keys to look up or identify the application component that is associated with the cache memory or relevant Gx session store. For example, the LSU Frontend 2402 component may use the keys to determine or identify a common key (or common surrogate key), and use the common key and/or various secondary keys (e.g., the Subscriber-Id, MSISDN, etc.) to identify the PMS 2212 component as being associated with the Gx session store that was created for the subscriber as part of operation 2510 (illustrated in FIG. 25). In an embodiment, in operation block 2608, the LSU Frontend 2402 component may use an FIA+APN value included in the received Rx messages to retrieve the common surrogate key, use the common surrogate key to retrieve a record from a data locality table, and use the retrieved record to determine that the PMS 2212 component is associated the subscriber identified in the received Rx messages. Using the common key and/or secondary keys to identify the application component in operation block 2608 may eliminate the need for the LSU 2206 to perform message destination hunting operations. In an embodiment, in operation block 2608, the LSU Frontend 2402 component may use the common key and/or various secondary keys (e.g., the Subscriber-Id, MSISDN, etc.) to retrieve the session continuity information from the cache memory. This session continuity information will contain the Gx session information (e.g., Gx Session-Id, PCEF identifiers etc.), If the Rx session already exists (i.e., the Rx AAR message received in step 2602 was a session update message), then the session continuity information will also contain the Rx session information (e.g., Rx Session-Id, PCEF identifiers, policy and charging rules, etc.).

In operation block 2610, the LSU Frontend 2402 component may add a new key, such as a secondary key (FIA+APN) associated with the common key (CK), to the cache memory. For example, the LSU Frontend 2402 may identify the common key, associate it with new Rx key identifiers included in the received message (e.g., FIA+APN), and update the LSU FE cache to include the common key and/or Rx Key identifiers. In operation 2612, the LSU Frontend 2402 component may update the received Rx messages to include the session continuity information (e.g., common key, Gx Session-Id, PCEF identifiers, etc.), and send the updated Rx messages (e.g., Rx AAR+SC message) to the identified PMS 2212 component. Alternatively, in operation 2612, the LSU Frontend 2402 component may generate a new communication message based on information included in the received Rx messages, and send this new communication message (which includes the session continuity information) to the PMS 2212 component.

In operation block 2614, the PMS 2212 component may retrieve Gx session information from the session store 2210. Also in operation block 2614, the PMS 2212 component may create an Rx session in the session store 2210 (or in an Rx session store in the session store 2210). In operation block 2616, the PMS 2212 component may perform various policy or charging operations and make a policy and/or charging decision. In operation 2618, the PMS 2212 component may generate and send Rx messages (e.g., AAA Rx message discussed above with reference to FIG. 9B, etc.) to the LSU Frontend 2402 component, which may forward/send the Rx messages to the client 2410 component (e.g., the AF component, etc.). In operation 2620, the PMS 2212 component may generate Gx messages (e.g., Gx RAR messages, etc.), update the generated Gx messages to include session continuity information (e.g., common key, Rx Session-Id, PCEF identifiers, policy and charging rules), and send the generated/updated Gx messages (e.g., Gx RAR+SC messages, etc.) to the LSU Frontend 2402 component.

In operation block 2622, the LSU Frontend 2402 component may receive the Gx message, and extract keys (e.g., common key, secondary keys, etc.) and session continuity information (e.g., Rx Session-Id, PCEF identifiers, policy and charging rules, etc.) from the received Gx message. In operation block 2624, the LSU Frontend 2402 component may use the extracted keys (e.g., common key (CK), Gx Session-Id, etc.) to look up the cache memory or session store that stores (or should store) the relevant session information. In operation block 2626, the LSU Frontend 2402 component may add the session continuity information to the cache memory. If the Rx session already exists (i.e., the Rx AAR message received in step 2602 was a session update message), then the LSU Frontend 2402 component may update the existing session continuity information in the cache memory.

In operation 2628, the LSU Frontend 2402 component may send Gx messages (e.g., Gx RAR messages, Gx RAR+SC messages, etc.) to the client 2410 component. In an embodiment, the LSU Frontend 2402 component may update the Gx messages so that they do not include the added or additional session continuity information (e.g., common key, Rx Session-Id, PCEF identifiers, policy and charging rules) before sending them to the client 2410 component. In another embodiment, the LSU Frontend 2402 component may forward the Gx messages (including the added or additional session continuity information) to the client 2410 component. In operation block 2630, the LSU Frontend 2402 component may asynchronously replicate its cache memory (e.g., to the cache memory of its mated LSU Frontend component, etc.).

In operation 2632, the client 2410 component may generate and send Gx messages, such as Gx Re-Authorization Answer (RAA) messages, to the LSU Frontend 2402 component, which may forward them to the PMS 2212 component. In operation block 2634, the client 2410 component (e.g., the EC, PCEF, etc.) may request creation of dedicated EPS bearers.

In operation block 2636, the PMS 2212 component may update the Gx session information in the session store 2210 based on the information included in the received Gx messages (e.g., Gx RAA messages). The PMS 2212 component may also update the Rx session information in operation block 2636.

Figure 27:
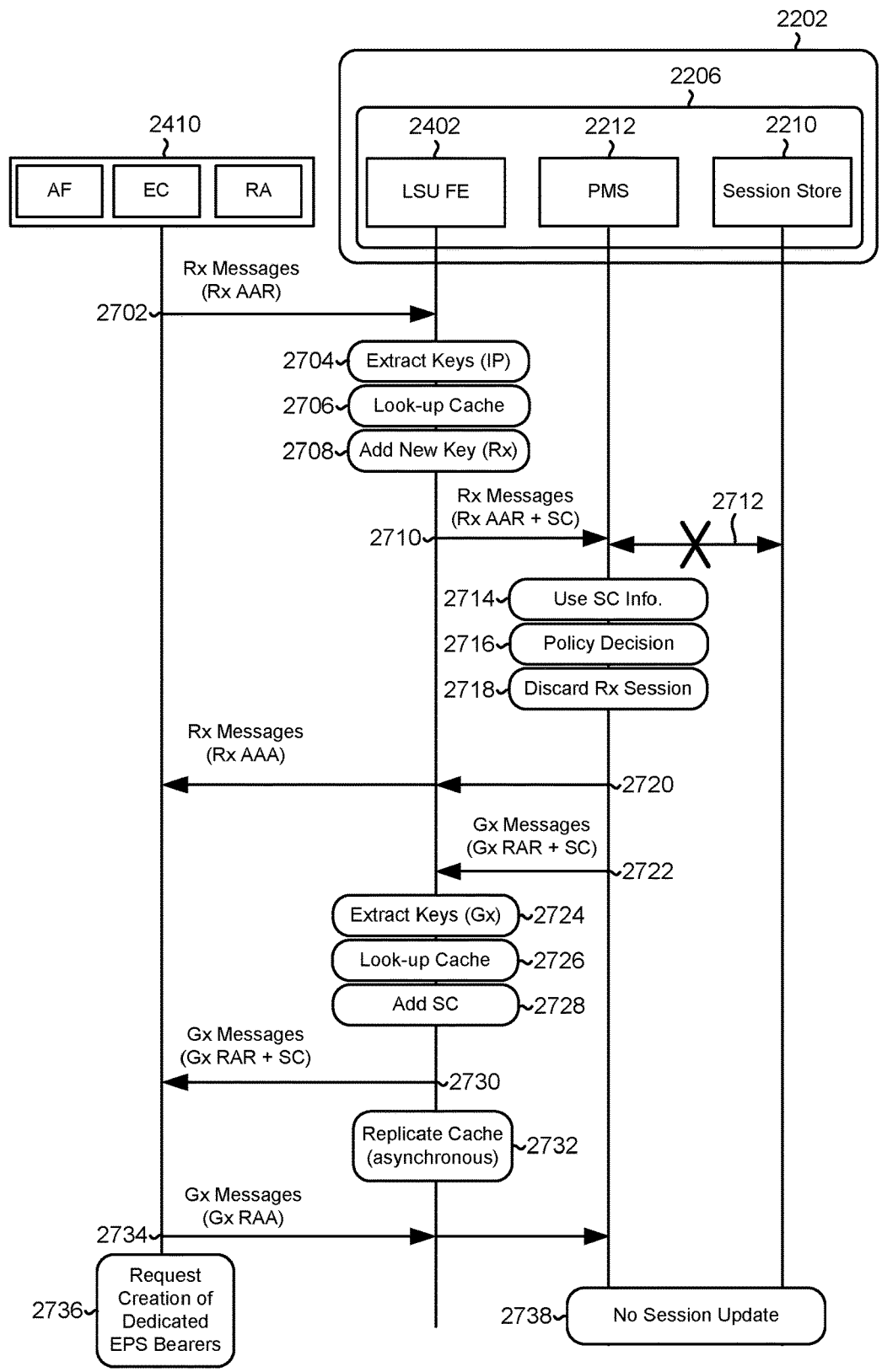
FIG. 27 is a block diagram illustrating logical components and example message flows when a VoLTE call is successfully established, despite a session not being found in the session store, in a communication system that includes LSUs in accordance with various embodiments.

FIG. 27 illustrates logical components and example message flows in the communication system 2500 when a VoLTE call is successfully established, despite a session not being found in the session store, in accordance with an embodiment.

In operations 2702 through 2710, the components in the system 2500 may perform the same or similar operations as those performed in operations 2602-2612 described above with reference to FIG. 26. For example, in operation 2702, the client 2410 may generate and send Rx messages (e.g., Rx AAR request messages) to the LSU Frontend 2402 component. In operation block 2704, the LSU Frontend 2402 component may extract or determine various keys and parameters from the received Rx messages. In operation block 2706, the LSU Frontend 2402 component may use the extracted/determined keys to determine or identify a common key, and use the common key and various secondary keys to identify the application component that is associated with the relevant Gx session store. The LSU Frontend 2402 component may use the common key and/or various secondary keys to retrieve the session continuity information from the cache memory. In operation block 2708, the LSU Frontend 2402 component may add a new key (e.g., Rx key identifiers contained in the received message, such as FIA+APN, etc.) to the cache memory. For example, the LSU Frontend 2402 may identify the common key, associate it with new Rx key identifiers included in the received message (e.g., FIA+APN), and update the LSU FE cache to include the common key and/or Rx Key identifiers. In operation 2710, the LSU Frontend 2402 component may update the received Rx messages to include the session continuity information, and send the updated Rx messages (e.g., Rx AAR+CK messages, etc.) to the identified PMS 2212 component.

In operation 2712, the PMS 2212 component does not find the relevant Gx session store (e.g., due to the session information being stored in a session store or datacenter that has failed, etc.). However, unlike the example illustrated in FIG. 23, the PMS 2212 component does not enter an error state or send error messages. Rather, in operation block 2714, the PMS 2212 component uses the session continuity information (which includes the Gx Session-Id and the PMS (or PCEF) identifier) to deduce the Gx Session-Id, and the PMS host and realm. If the realm contains dots, the PMS 2212 component may be configured with the network datacenter realms (e.g., as wildcards) so that they may be parsed correctly. As a result, the PMS 2212 component may have access to sufficient session information so that session continuity may be maintained for select services (e.g., VoLTE). In operation block 2716, the PMS 2212 component may perform various policy and charging operations and/or make a policy and/or charging decision (e.g., based on the session information).

In operation block 2718, the PMS 2212 component may discard or disregard any of Rx session information that was used for the policy decision. That is, the PMS 2212 component will not attempt to store the Rx session information (or an Rx session store record) if the session store 2210 is unable to find the corresponding Gx session information (or a corresponding Gx session store record). This is because doing so may cause unnecessary complexity by introducing partial Rx and Gx session store records that are challenging to link correctly.

In operation blocks 2720 through 2736, the components in the system 2500 may perform the same or similar operations as in operations 2618 through 2634 described above with reference to FIG. 26. For example, in operation block 2720, the PMS 2212 component may generate and send Rx messages (e.g., AAA Rx messages, etc.) to the LSU Frontend 2402 component, which may forward the Rx messages to the client 2410 component (e.g., the AF component, etc.). In operation 2722, the PMS 2212 component may generate Gx messages (e.g., Gx RAR messages), update the generated Gx messages to include updated session continuity information (e.g., Rx Session-Id, PCEF identifiers, policy and charging rules, etc.), and send the generated/updated Gx messages (e.g., Gx RAR+SC messages) to the LSU Frontend 2402 component. In operation block 2724, the LSU Frontend 2402 component may receive the Gx messages, and extract keys (e.g., common key, secondary keys, etc.) and session continuity information from the received Gx messages. In operation block 2726, the LSU Frontend 2402 component may use the extracted keys (e.g., Gx Session-Id, etc.) to look up or identify the cache memory that stores the relevant session information. In operation block 2728, the LSU Frontend 2402 component may add the updated session continuity information to the cache memory.

In operation 2730, the LSU Frontend 2402 component may send the Gx messages (e.g., Gx RAR+SC messages) to the client 2410 component. In operation block 2732, the LSU Frontend 2402 component may asynchronously replicate its cache (e.g., to its mated LSU Frontend component, etc.). In operation 2734, the client 2410 component may generate and send Gx messages (e.g., Gx RAA messages, etc.) to the LSU Frontend 2402 component, which may receive and send them to the PMS 2212 component. In operation 2736, the client 2410 component may request creation of dedicated EPS bearers.

Unlike the example described above with reference to FIG. 26, in operation block 2738, the PMS 2212 component does not attempt to update the session information. This is because doing so may cause unnecessary complexity by introducing partial Rx and Gx session store records that are challenging to link.

Figure 28:
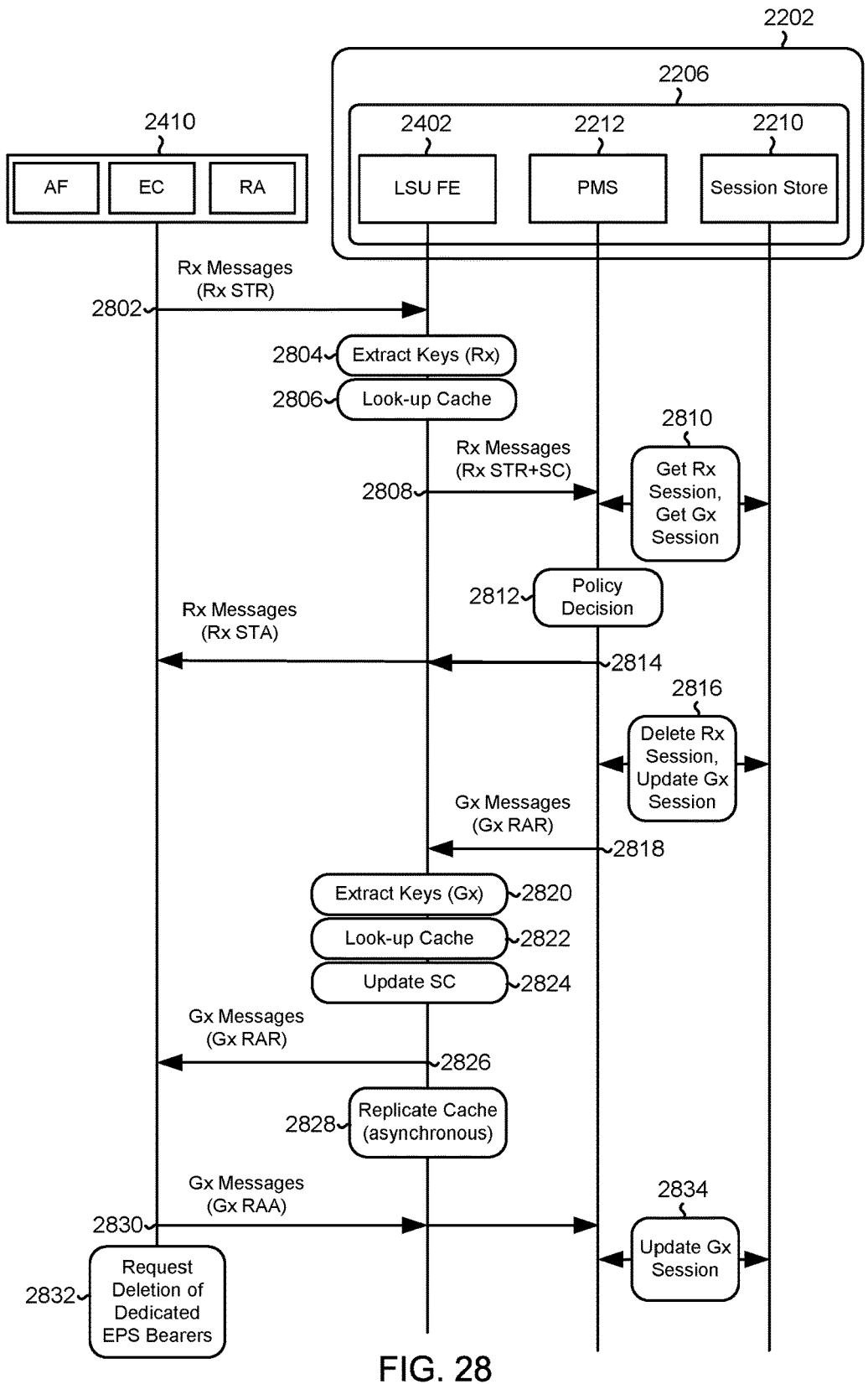
FIG. 28 is a block diagram illustrating logical components and example message flows when a VoLTE call is successfully terminated in a communication system that includes LSUs in accordance with various embodiments.

FIG. 28 illustrates logical components and example message flows when a VoLTE call is successfully terminated in a communication system that includes LSUs in accordance with various embodiments. In operation 2802, the client 2410 may generate and send Rx messages (e.g., Rx STR messages) to the LSU Frontend 2402 component. The client 2410 may send the Rx messages in response to determining that a subscriber wants to terminate an IMS application, such as an existing VoLTE call.

In operation block 2804, the LSU Frontend 2402 component may extract or determine various keys and parameters from the received Rx messages. In operation block 2806, the LSU Frontend 2402 component may use the extracted/determined keys to determine or identify a common key, and use the common key and/or various secondary keys to identify the PMS 2212 component that is associated with the relevant session store 2210. The LSU Frontend 2402 component may also use the common key and/or various secondary keys to retrieve the session continuity information from the cache memory. In operation 2808, the LSU Frontend 2402 component may add the common key and session continuity information to the received Rx messages, and send the updated Rx messages (e.g., Rx STR+SC Messages) to the identified PMS 2212 component.

In operation block 2810, the PMS 2212 component may retrieve Gx session information and Rx session information from the session store 2210 (or from a Gx session store and an Rx session store in the session store 2210). In operation block 2812, the PMS 2212 component may perform various policy or charging operations, and make a policy and/or charging decision. In operation 2814, the PMS 2212 component may generate and send Rx messages, such as Rx Session-Termination-Answer (STA) messages, to the LSU Frontend 2402 component, which may forward them to client 2410 component. In operation block 2816, the PMS 2212 component may delete the Rx session information from the session store 2210. Also in operation block 2816, the PMS 2212 component may update the Gx session information in the session store 2210.

In operation 2818, the PMS 2212 component may generate Gx messages (e.g., Gx RAR messages), and send the Gx messages to the LSU Frontend 2402 component. In operation block 2820, the LSU Frontend 2402 component may receive the Gx messages, and extract keys (e.g., common key, secondary keys, etc.) from the received Gx messages. In operation block 2822, the LSU Frontend 2402 component may use the extracted keys (e.g., a secondary key such as the Gx Session-Id, etc.) to look up the relevant cache memory. In operation block 2824, the LSU Frontend 2402 component may update the session continuity information (e.g., SC parameter, VoLTE-S-C parameter, etc.) in the cache memory. In operation 2826, the LSU Frontend 2402 component may send the Gx messages (e.g., Gx RAR messages) to the client 2410 component. In operation block 2828, the LSU Frontend 2402 component may asynchronously replicate its cache (e.g., to its mated LSU Frontend component, etc.).

In operation 2830, the client 2410 component may generate and send Gx messages (e.g., Gx RAA messages, etc.) to the LSU Frontend 2402 component, which may forward them to the PMS 2212 component. In operation block 2832, the client 2410 component (e.g., the EC or PCEF) may request deletion of dedicated EPS bearers. In operation block 2834, the PMS 2212 component may update the Gx session information in the session store 2210.

Figure 29:
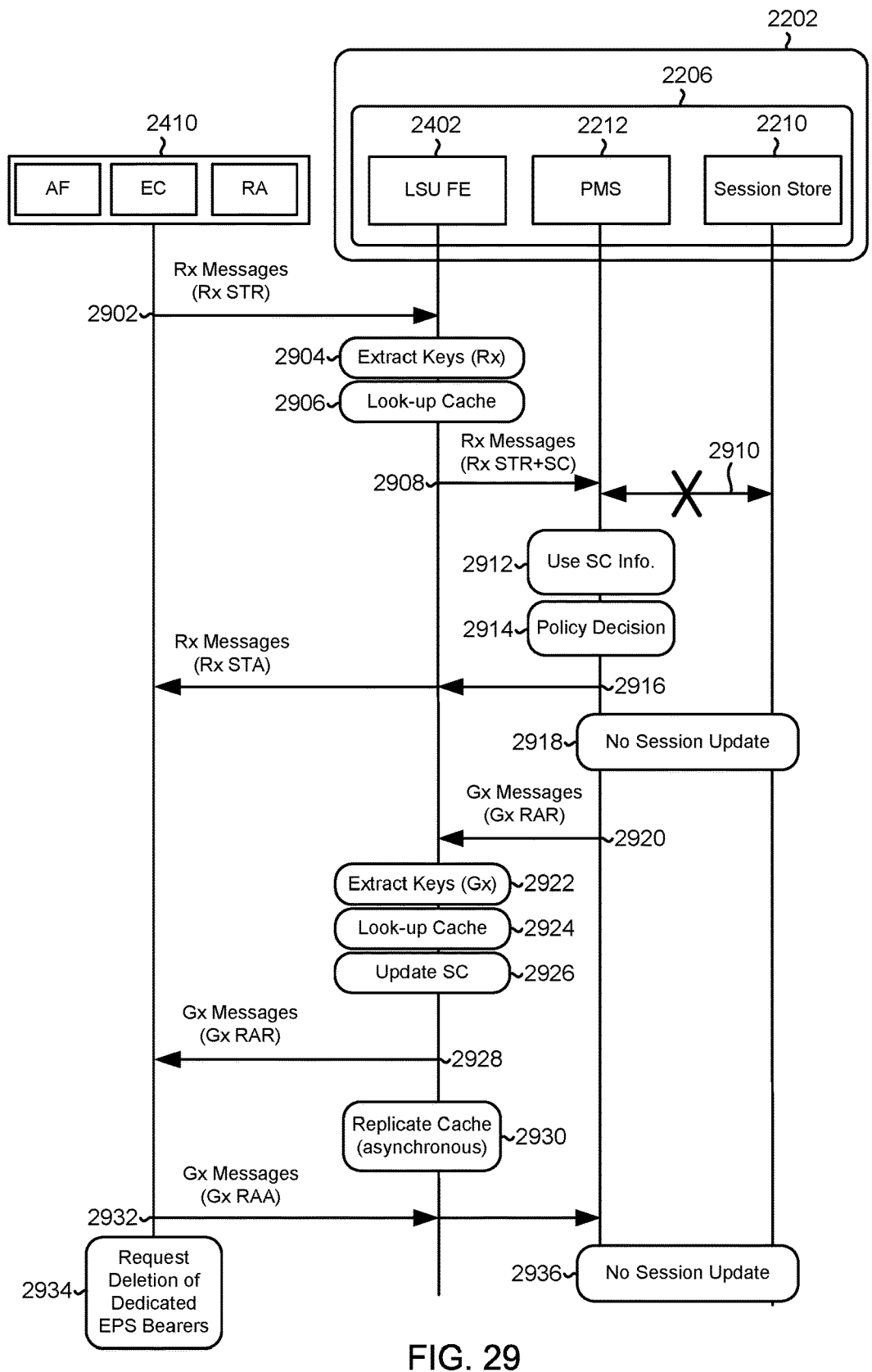
FIG. 29 is a block diagram illustrating logical components and example message flows when a VoLTE call is successfully terminated, despite a session not being found in the session store, in a communication system that includes LSUs in accordance with various embodiments.

FIG. 29 illustrates logical components and example message flows when a VoLTE call is successfully terminated, despite a session not being found in the session store, in a communication system 2500 that includes LSUs in accordance with various embodiments.

In operations 2902 through 2908, the components in the system 2500 may perform the same or similar operations as in operations 2802 through 2808 described above with reference to FIG. 28. For example, in operation 2902, the client 2410 may generate and send Rx messages (e.g., Rx STR request messages, etc.) to the LSU Frontend 2402 component. In operation block 2904, the LSU Frontend 2402 component may extract or determine various keys and parameters from the received Rx messages. In operation block 2906, the LSU Frontend 2402 component may use the extracted/determined keys to determine or identify a common key, and use the common key and/or various secondary keys to identify the PMS 2212 component that is associated with the relevant session store 2210. In operation 2908, the LSU Frontend 2402 component may add the common key and session continuity information to the received Rx Messages, and send the updated/augmented Rx Messages (e.g., Rx STR+SC) to the identified PMS 2212 component.

In operation 2910, the PMS 2212 component may attempt to get or retrieve Gx and/or Rx session information, and fail due to the session information being stored in a session store or datacenter that has failed. It should be noted that if the application component (PMS 2212) cannot find the Gx and/or Rx session, it will not enter an error state or send error messages.

In operation block 2912, the PMS 2212 component may retrieve/extract the common key and the session continuity information included in the received Rx messages, and use this information to obtain (or as) the Rx and/or Gx session information. In operation block 2914, the PMS 2212 component may perform various policy or charging operations and makes a policy decision (e.g., based on the Rx and/or Gx session information). In operation 2916, the PMS 2212 component may generate Rx messages (e.g., Rx STA messages) based on the Rx and/or Gx session information, and send the generated Rx messages to the LSU Frontend 2402 component, which forwards them to the client 2410 component. In operation block 2818, the PMS 2212 component may discard or disregard the session information (i.e., it does not update the session stores).

In operations 2920 through 2934, the components in the system 2500 may perform the same or similar operations as operations 2818 through 2832 described above with reference to FIG. 28. For example, in operation 2920, the PMS 2212 component may generate Gx messages (e.g., Gx RAR messages), and send the Gx messages to the LSU Frontend 2402 component. In operation block 2922, the LSU Frontend 2402 component may receive the Gx messages, and extract keys (e.g., common key, secondary keys, etc.) from the received Gx messages. In operation block 2924, the LSU Frontend 2402 component may use the extracted keys to look up the relevant cache memory. In operation block 2926, the LSU Frontend 2402 component may update the session continuity information in the cache memory. In operation 2928, the LSU Frontend 2402 component may send the Gx messages (e.g., Gx RAR messages, etc.) to the client 2410 component. In operation block 2930, the LSU Frontend 2402 component may asynchronously replicate its cache. In operation 2932, the client 2410 component may generate and send Gx messages (e.g., Gx RAA messages, etc.) to the LSU Frontend 2402 component, which may forward them to the PMS 2212 component. In operation block 2934, the client 2410 component (e.g., the EC or PCEF) may request deletion of dedicated EPS bearers.

Unlike the example described above with reference to FIG. 28, in operation block 2936, the PMS 2212 component does not update the Gx session information in the session store 2210. This is because doing so may cause unnecessary complexity by introducing partial Rx and Gx session store records that are challenging to link.

Figure 30:
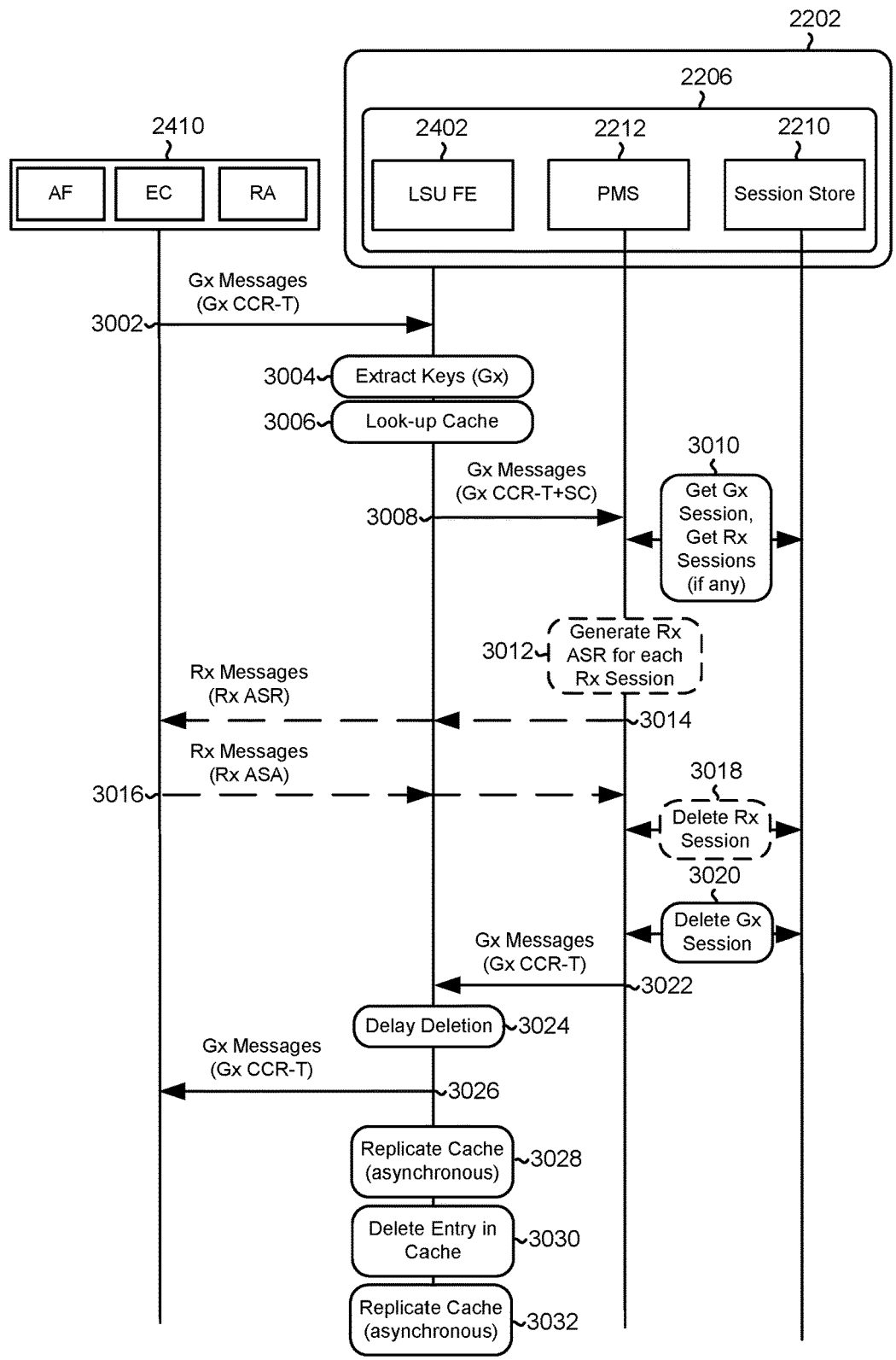
FIG. 30 is a block diagram illustrating logical components and example message flows when a Gx session is successfully terminated in a communication system that includes LSUs in accordance with various embodiments.

FIG. 30 illustrates logical components and example message flows when a Gx session is successfully terminated in a communication system 2500 that includes LSUs in accordance with various embodiments. In operation 3002, the client 2410 component may send Gx session termination messages (e.g., Gx CCR-T messages, etc.) to the LSU Frontend 2402 component. In operation block 3004, the LSU Frontend 2402 component may receive the Gx messages, and extract or determine various keys and/or parameters (e.g., IMSI, MSISDN, IPv4, IPv6, Gx/Rx Session-ID) from the received Gx message for use as a common key. In operation block 3006, the LSU Frontend 2402 component may use the extracted/determined keys to determine or identify a common key, and use the common key (and/or various secondary keys) to identify the PMS 2212 component that is associated with the relevant session store 2210. In operation 3008, the LSU Frontend 2402 component may update the received Gx messages to include the common key and session continuity information, and send the updated Gx messages (e.g., Rx STR+SC messages, etc.) to the PMS 2212 component.

In operation block 3010, the PMS 2212 component may retrieve the Gx session information from the session store 2210. Also in operation block 3010, the PMS 2212 component may determine whether the session store 2210 includes Rx session information, and retrieve any or all of the Rx session information that is stored in the session store 2210. Generally, the session store 2210 will not include Rx session information if there were no previous Rx sessions created and/or if all the previous Rx sessions terminated successfully.

The system components (e.g., PMS 2212, etc.) may be configured to perform the operations illustrated in operation blocks 3012 through 3018 in response to determining that the session store 2210 includes Rx session information. In operation block 3012, the PMS 2212 component may generate Rx messages (e.g., Rx ASR messages, etc.) for each Rx session that is stored in the session store 2210. In operation 3014, the PMS 2212 component may send the generated Rx messages to the LSU FE 2402 component, which forwards them to the client 2410 component. In operation 3016, the client 2410 component may generate and send Rx messages, such as Rx Abort-Session-Answer (ASA) messages, to the LSU FE 2402 component. The LSU FE 2402 component forwards these messages to the PMS 2212 component. In operation block 3018, the PMS 2212 component may delete the Rx session information from the session store 2210 (e.g., in response to receiving the Rx ASA messages, etc.).

In operation block 3020, the PMS 2212 component may delete the Gx session information from the session store 2210. In operation 3022, the PMS 2212 component may generate and send Gx messages (e.g., Gx CCR-T messages, etc.) to the LSU Frontend 2402 component.

In operation block 3024, the LSU Frontend 2402 component may delay the deletion of entries from the cache for a number of seconds. In operation 3026, the LSU Frontend 2402 component may send the Gx messages to the client 2410 component (e.g., to the gateway, EC, PCEF, etc.). In operation block 3028, the LSU Frontend 2402 component may asynchronously replicate its cache memory. In operation block 3030, the LSU Frontend 2402 component may delete the relevant session continuity information from its cache memory. In operation block 3032, the LSU Frontend 2402 component may again asynchronously replicate its cache memory.

Thus, the LSU Frontend 2402 receives the Gx messages in operation 3022, and delays deletion of the cache entry for a number of seconds in operation block 3024. This is so that any Rx or Sy STR messages sent by the client 2410 (e.g., AF component, etc.) or an application component (e.g., a charging system) as a response after the Rx or Sy message exchange (e.g., after the ASR/AS-A message exchange, etc.) may still be routed through the LSU Frontend 2402 with the session continuity information retrieved from the cache memory. In addition, the LSU Frontend 2402 may remove stale cache entries (e.g., in operation block 3032) even if no Gx response messages (e.g., Gx CCR-T messages) are sent or received.

Figure 31:
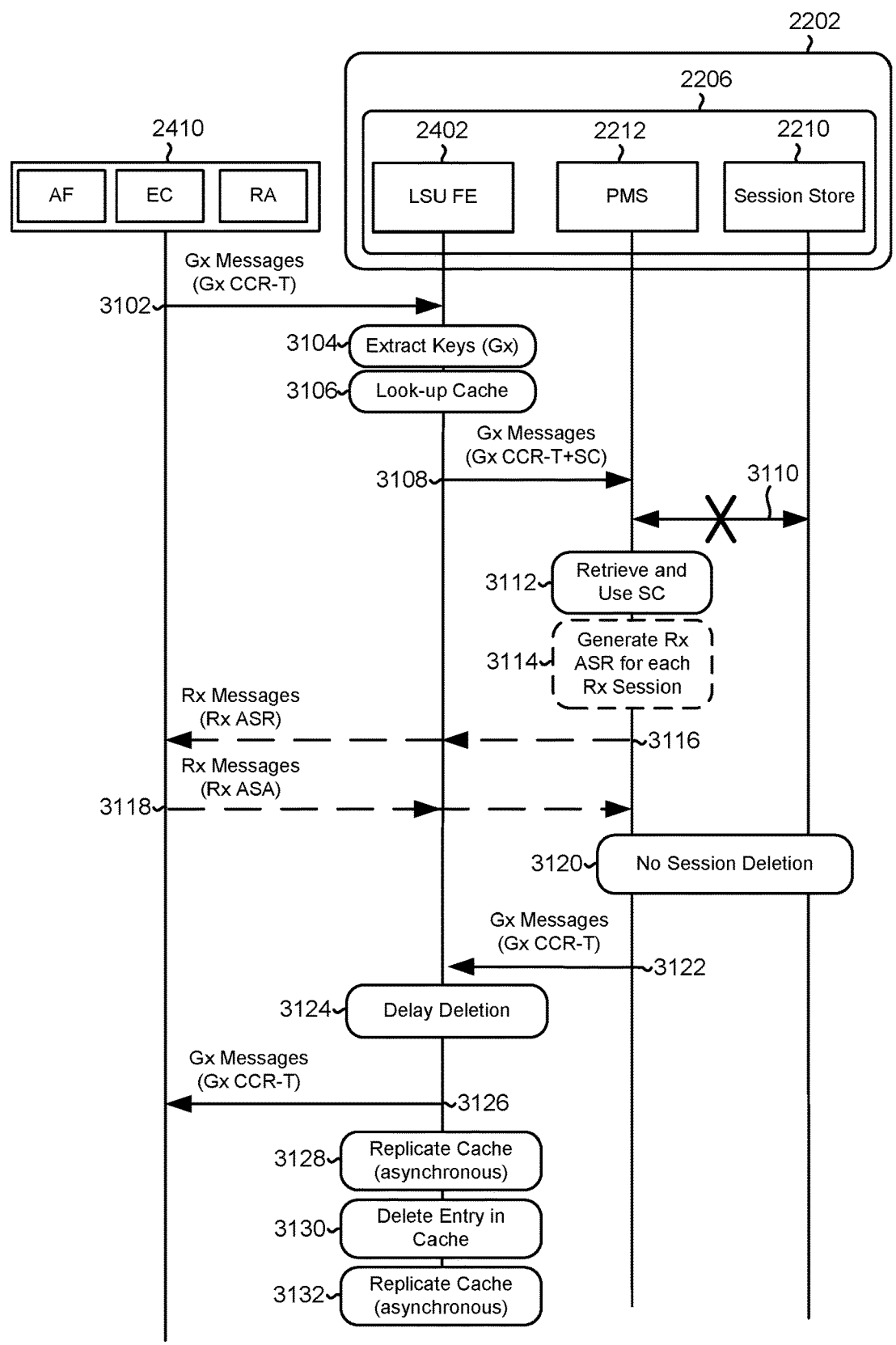
FIG. 31 is a block diagram illustrating logical components and example message flows when a Gx session is successfully terminated, despite a session not being found in the session store, in a communication system that includes LSUs in accordance with various embodiments.

FIG. 31 illustrates logical components and example message flows when a Gx session is successfully terminated, despite a session not being found in the session store, in a communication system 2500 that includes LSUs in accordance with various embodiments.

In operations 3102 through 3108, the components in the system 2500 may perform the same or similar operations as in operations 3002-3008 described above with reference to FIG. 30. For example, in operation 3102, the client 2410 component may send Gx messages (e.g., Gx CCR-T messages) to the LSU Frontend 2402 component. In operation block 3104, the LSU Frontend 2402 component may receive the Gx message, and extract or determine various keys and/or parameters from the received Gx message for use as a common key. In operation block 3106, the LSU Frontend 2402 component may use the extracted/determined keys to determine or identify a common key, and use the common key (and/or various secondary keys) to identify the PMS 2212 component that is associated with the session store 2210. The LSU Frontend 2402 component may also use the common key and/or various secondary keys to retrieve the session continuity information from the cache memory. In operation 3108, the LSU Frontend 2402 component may update the received Gx messages to include the common key and the session continuity information, and send the updated Gx messages (e.g., Gx-T+SC messages) to the PMS 2212 component.

In operation 3110, the PMS 2212 component fails to retrieve information (i.e., Rx or Gx session information) from the session store due to a session store failure, datacenter failure, etc. In operation block 3112, the PMS 2212 component may retrieve and use the session continuity information from the received message to maintain session continuity.

The system components (e.g., PMS 2212, etc.) may be configured to perform the operations illustrated in optional operation blocks 3114 through 3118 in response to determining that the session continuity information (e.g., SC parameter) includes Rx session information. In operation block 3114, the PMS 2212 component may generate Rx messages (e.g., Rx ASR messages, etc.) for each Rx session. In operation 3116, the PMS 2212 component may send the generated Rx messages to the LSU FE 2402 component, which forwards them to the client 2410 component. In operation 3118, the client 2410 component may generate and send Rx messages (e.g., Rx ASA messages, etc.) to the LSU FE 2402 component, which forwards them to the PMS 2212 component.

Unlike the example illustrated in FIG. 30, in operation block 3120, the PMS 2212 component does not delete any session information from the session store, since it failed to retrieve any session information from the session store.

In operations 3122 through 3132, the components in the system 2500 may perform the same or similar operations as operations 3022 through 3032 described above with reference to FIG. 30. For example, in operation 3122, the PMS 2212 component may generate and send Gx messages (e.g., Gx CCR-T messages, etc.) to the LSU Frontend 2402 component. In operation block 3124, the LSU Frontend 2402 component may delay the deletion of entries from the cache for a number of seconds. In operation 3126, the LSU Frontend 2402 component may send the Gx messages to the client 2410 component. In operation block 3128, the LSU Frontend 2402 component may asynchronously replicate its cache. In operation block 3130, the LSU Frontend 2402 component may delete the session continuity information from its cache. In operation block 3132, the LSU Frontend 2402 component may again asynchronously replicate its cache.

The various embodiments may support high availability (HA) locally by using two LSU Frontends running on separate and independent hardware. One LSU Frontend may be a primary LSU Frontend, and the other the LSU Frontend may be a secondary LSU Frontend. Thus, together they form a cluster of two nodes. If the primary LSU frontend is off-line, then the secondary LSU Frontend is promoted to become the new primary LSU Frontend. If both the primary and secondary LSU Frontends of a single LSU are off-line, then they will need to be restarted and then allowed to re-synchronize their caches from their remote mated LSU Frontends. The primary and secondary LSU Frontends of an LSU may process messages from a RA (or DRA, DCR, etc.) in either an active-passive or an active-active configuration.

Figure 32:
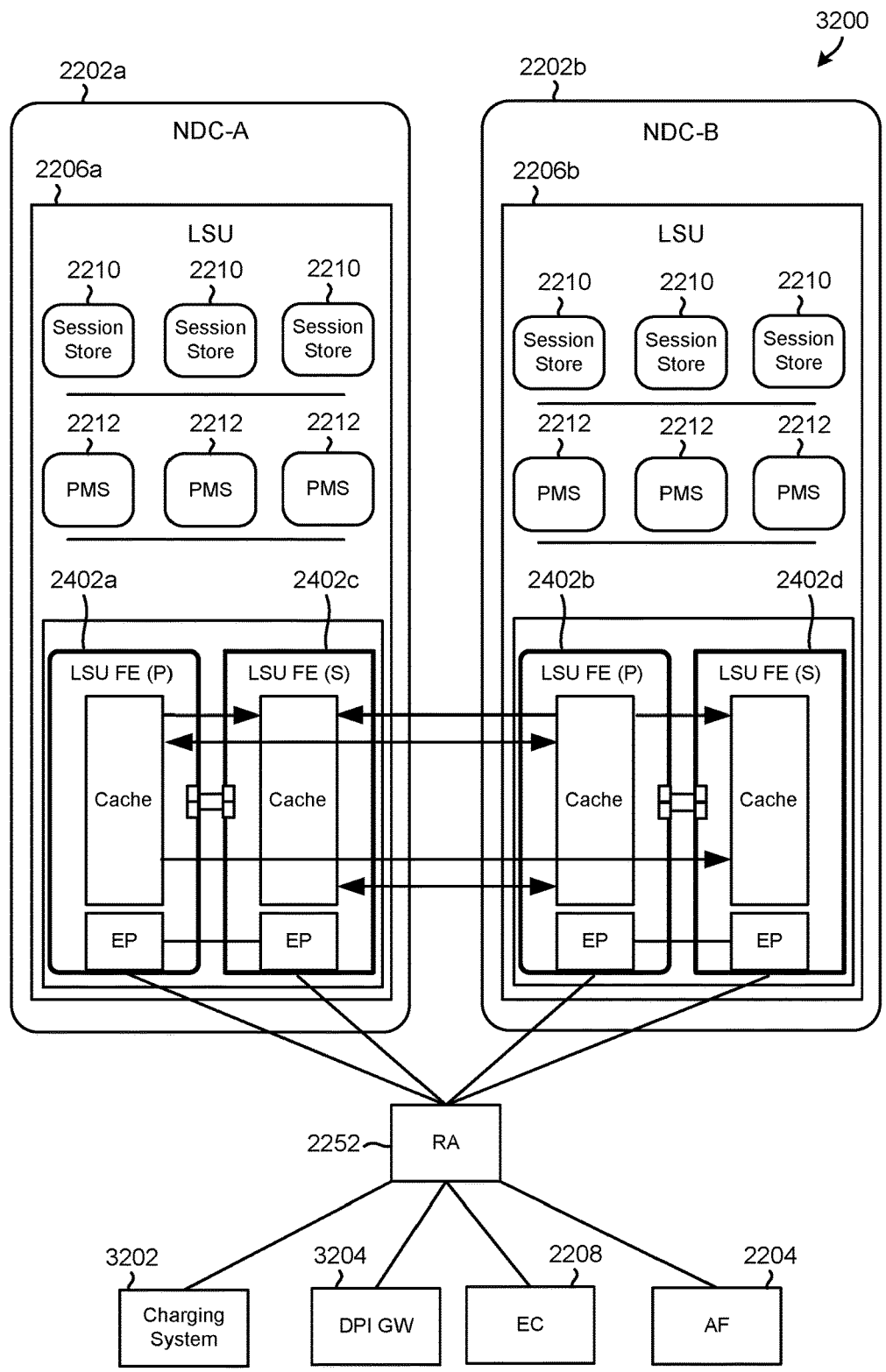
FIG. 32 is a block diagram illustrating the communication links and logical and functional components in an embodiment telecommunication system having two network data centers, each containing a single LSU with two LSU Frontends, three policy management systems (i.e., PCRF CTEs), and three session stores (i.e., Session DBs).

FIG. 32 is a block diagram illustrating the communication links and logical and functional components in an embodiment telecommunication system 3200 having two network data centers, each containing a single LSU 2206 with two LSU Frontends 2402, three policy management systems 2212, and three session stores 2210. The LSU Frontends 2402 are coupled to a RA 2252 component via communication links. The RA 2252 component is coupled to a charging system 3202, a deep packet inspector gateway 3204, an enforcement component 2208, and an application function 2204 component.

Each LSU Frontend provides a single endpoint (e.g., a Diameter endpoint) to the RA (or DRA, DCR, etc.) for use with multiple applications. The two LSU Frontends in the LSU also maintain separate connections (e.g., Diameter connections) for inter-LSU Frontend routing. Application components (e.g., PCRFs, etc.) within the LSU connect to both LSU Frontends. In an embodiment, the primary LSU Frontend may route all received messages to application components within the LSU (e.g., using the CKR-DLT, CKR-DPA, IKR-DLT, and IKR-DPA methods described above). The secondary LSU Frontend may route all received messages to the primary LSU Frontend. In this configuration, only the primary LSU Frontend updates and accesses the cache when processing messages. The LSU Frontend cache may be replicated to other LSU Frontends—both locally within the LSU and to other LSU Frontends in mated LSUs within geographically remote network data centers, as shown in FIG. 32.

The various embodiments may require the LSU Frontends to maintain an in-process and in-memory cache. A shared entry with a unique common key is created in the cache when the Gx (or IP_CAN) session is established. Secondary keys are extracted from received Diameter messages and inserted into the entry so that they can be used at a later time (e.g., when a Gx or Rx message is received) to retrieve the common key. The entry may also include the session continuity information that it receives in responses from the application components (e.g., the PCRFs). The cache is relatively small, and it typically only stores the minimum amount of information that is necessary for VoLTE session operations (e.g., creation, updating, and termination). These session continuity entries are typically less than 120 bytes, in contrast to the typical Gx and Rx session store entries that are thousands of bytes.

Figure 33:
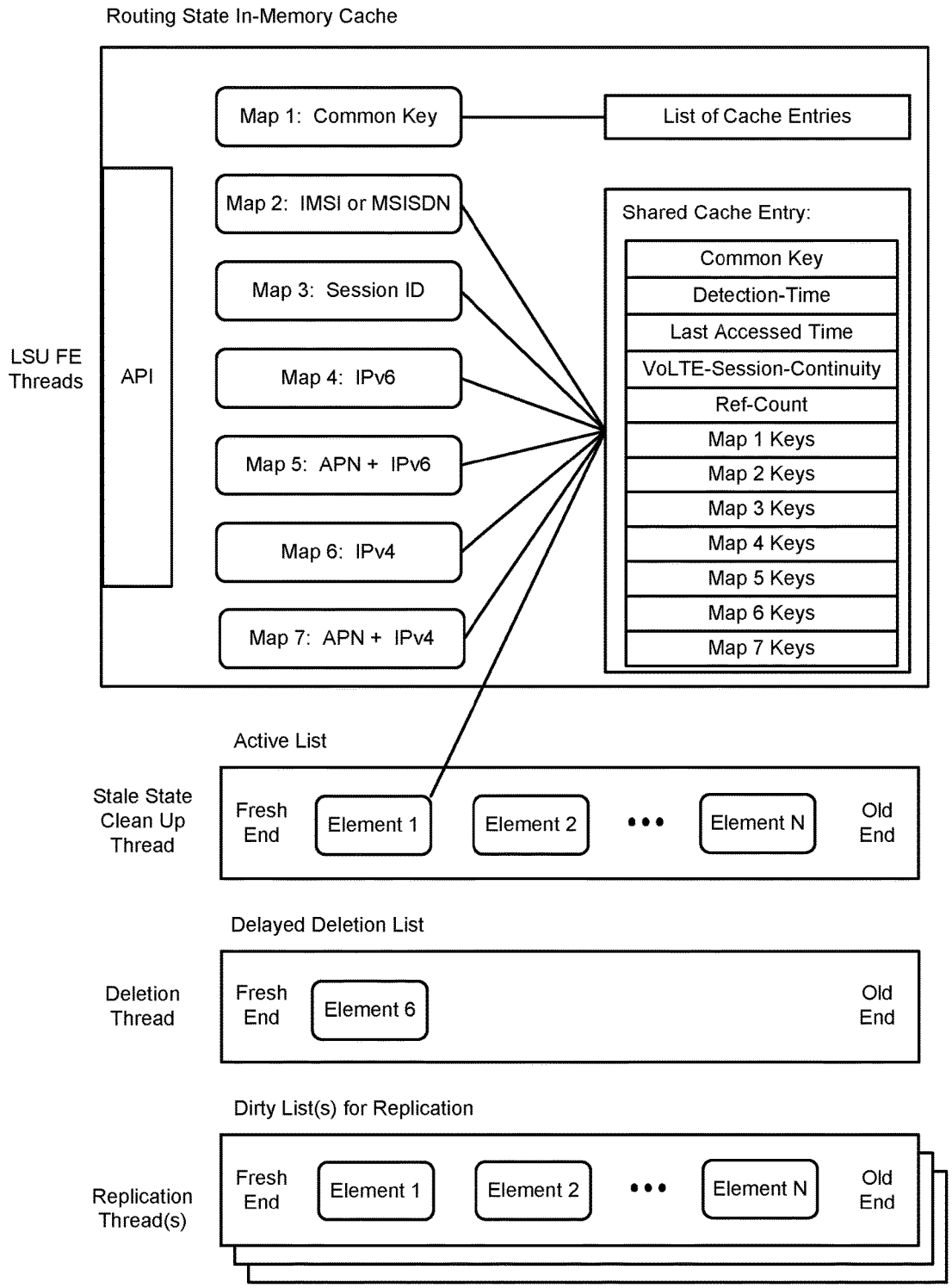
FIG. 33 is a block diagram illustrating a cache containing a shared entry with a single common key and multiple secondary keys in an embodiment system.

FIG. 33 is a block diagram illustrating a cache containing a shared entry with a single common key and multiple secondary keys in accordance with an embodiment system. It contains cache entries in three different types of lists: the active list, the delayed deletion list, and the dirty lists for replication. The entries in the active list are kept in temporal order. Each time that an entry is "touched" (i.e., modified, updated) it is moved to the back of the list. A copy of the entry is also added to the dirty lists for replication, and it is subsequently removed from the dirty list once it has been replicated.

The cache is replicated between the LSU Frontends in a full mesh topology. Only the primary LSU Frontends access or update the cache when processing Diameter messages. Secondary LSU Frontends keep their caches up-to-date from replication streams. The cache is active-active in systems providing geographical redundancy between network data centers, and it may be updated by either primary LSU Frontend. The cache replication may use a simple customized TCP-based protocol such that when the LSU Frontends start-up they try to connect to each other, and they mutually establish a single TCP connection. If the connection is severed, both LSU Frontends try to reconnect and re-synchronize their caches. Re-synchronization is done by rebuilding the dirty list based upon the active list for the LSU Frontend. A split-brain scenario is allowed, and a simple merge is subsequently performed on recovery.

In overview, a split-brain scenario may involve a condition in which a cluster of nodes that replicate information are partitioned (e.g. network connectivity fails between them, etc.). As a result, the nodes cannot communicate but have to continue updating their caches on their own. The "brain" (overall information) is now split into two or more partitions. After the connectivity is restored, there is a mechanism to recover from the split-brain, such as by merging conflicting records.

In an enhanced embodiment, the LSU Frontends will delay the deletion of the common key and its associated session continuity information for a configurable time (e.g., 2 minutes). This will make it possible to route Diameter Rx, Sd, Sy, Gy, Sh, and S9 messages with the common key even after the Gx or Gxx CCR-T message is received. This may help the application component handle the situation where the primary Gx or Gxx session is terminated (e.g., the Gx or IP_CAN session is terminated due to loss of connectivity with the user equipment) but there are still related sessions in other nodes (e.g., the AF, TDF, OCS) that send Diameter Rx, Sd, and Sy messages later. With the deletion of the common key delayed, the LSU Frontend can still include the common key in the diameter messages that it sends to the application components, so that they can perform effective session store database operations using the common key for partitioning without resorting to multi-partition queries even though it might have removed the related session information.

In an enhanced embodiment, the LSU Frontend may be used to lock on the common key of all related messages (e.g., Diameter messages). This effectively serializes them. In scenarios where there are concurrent Diameter requests for the same common key, the LSU Frontend will create a lock with an identity on the first message, and include the associated lock identity within the message that is sent to the application component (e.g., in a Lock-Id AVP) The application component can use this lock identity to send a server initiated Diameter request (e.g., an Sy Spending-Limit-Request (SLR) or AAR) and pass the common key and the same lock identity back to the LSU Frontend, indicating that this server initiated request is part of the same locked common key. This may enable the LSU Frontend to continue sending these messages to their destinations without creating a deadlock situation because it already holds the lock on the common key.

With this enhancement, the LSU Frontend can give control over the locking to the application component, and thus the application component can set transaction level locking (i.e., messages relating to the same common key and lock identity that are part of a single transaction). Other messages that have the same common key, but do not have a lock identity) are queued by the LSU Frontend until the current locked transaction is completed and the next lock identity can be allocated. For example, Gx or Gy CCR-Us and Sy SURs that are related to the same common key are serialized by the LSU Frontend.

The LSU Frontend replicates the lock and pending queue status to the other LSU Frontends, so that they can potentially continue in the event that the LSU Frontend fails.

Figure 34:
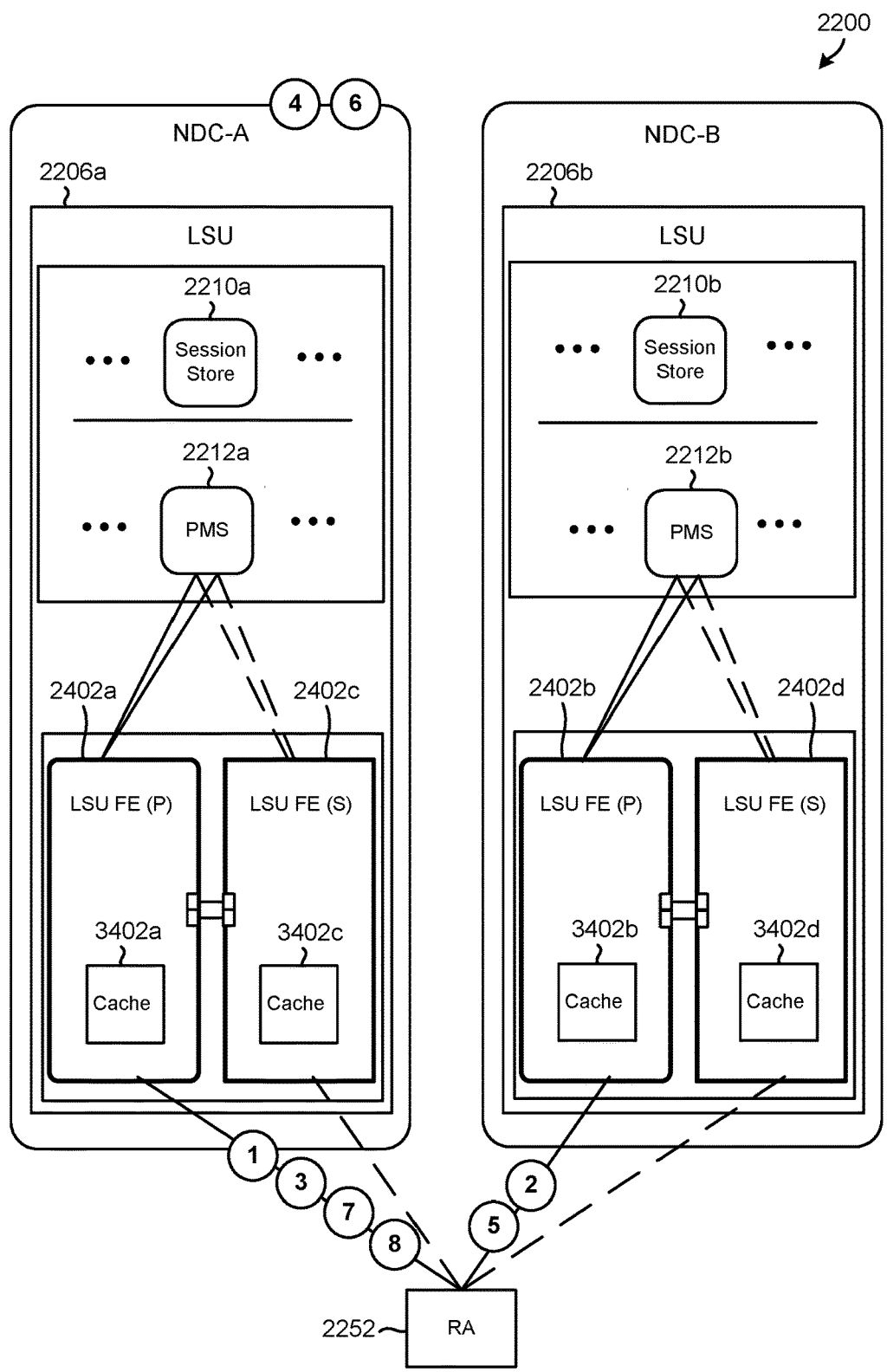
FIG. 34 is a block diagram illustrating the communication links and logical and functional components in an example embodiment telecommunication system.

Consider the following simplified example scenario consisting of a RA 2252, two LSUs 2206a and 2206b—each of which include two LSU Frontends (LSU FEs 2402a-d) and an application component (PMSs 2212a and 2212b), with reference to the block diagram shown in FIG. 34. First, all seven of these components/nodes (i.e., RA 2252, LSU FE 2402a, LSU FE 2402b, LSU FE 2402c, LSU FE 2402d, PMS 2212a, and PMS 2212b) are brought online and are operating. The LSU Frontend caches 3402a-d and the session stores 2210a and 2210b are empty.

In operation 1, the RA 2252 may send a Gx CCR-I message for Subscriber 1 to NDC-A. At this stage the gateway (e.g., the EC or PCEF) has allocated a unique IPv4 address to Subscriber 1's Gx session for this APN. Note that the LSU Frontend cache in NDC-A will have a new entry for Subscriber 1, and the entry will contain a common key for this session with at least a Gx Session-Id secondary key. This cache entry will subsequently be replicated to the LSU Frontends in NDC-B. The session store in NDC-A will have a session for Subscriber 1, and the session store in NDC-B will be empty.

In operation 2, the RA 2252 may send a Gx CCR-I message for Subscriber 2 to NDC-B. At this stage the gateway (e.g., the PCEF) has allocated a unique IPv4 address to Subscriber 2's Gx session for this APN. Note that the LSU Frontend cache in NDC-B will have a new entry for Subscriber 2, and the entry will contain a common key for this session with at least a Gx Session-Id secondary key. This cache entry will subsequently be replicated to the LSU Frontends in NDC-A. The session store in NDC-A will have a session for Subscriber 1, and the session store in NDC-B will have a session for Subscriber 2.

Figure 35B:
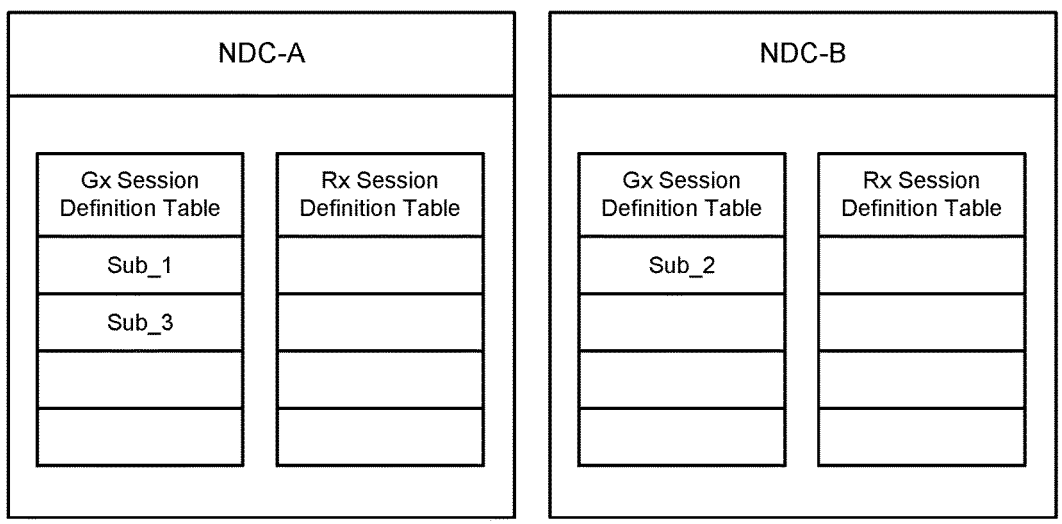
FIGS. 35A through 38B are block diagrams illustrating the contents of the LSU Frontend caches and the LSU session stores at various stages of an exemplary message flow.

In operation 3, the RA 2252 may send a Gx CCR-I for Subscriber 3 to NDC-A. FIG. 35A shows the total number of entries in the LSU Frontend cache (i.e., 3), and the contents of the entry for Subscriber 3. FIG. 35B shows the contents of the LSU session stores for NDC-A and NDC-B. Note that the session store in NDC-A has sessions for Subscriber 1 and Subscriber 3, and that the session store in NDC-B only has a session for Subscriber 2.

In operation 4 of FIG. 34, NDC-A goes offline. In operation 5, the RA 2252 sends an Rx AAR message for Subscriber 3 to NDC-B emulating a VoLTE call being established using IMS. The LSU Frontend will look up the common key using the IPv4 address and send the session continuity information containing the common key, the Gx Session Id, and the Gx Client Id as part of the Rx AAR message to the PMS 2212b. At this stage, the VoLTE session continuity fields (e.g., RxClientId) may be empty. The LSU Frontend 2402b will also update its cache entry and shared value with the Rx Session-Id so that the common key can be retrieved later on using the Rx Session-Id as the look up key (i.e., the secondary key). The primary LSU Frontend 2402b will replicate the cache updates to its local secondary LSU Frontend 2402d only—the remote primary and secondary Frontends 2402a and 2402x are off-line. The PMS 2212b receives the Rx AAR message from the LSU Frontend 2402b. The PMS 2212b attempts to, but will be unable to, find the Gx session entry in its session store. This would normally trigger a IP-CAN_SESSION_NOT_AVAILABLE (5065) Experimental-Result-Code error, but the PMS 2212b will ignore this. Instead, the PMS 2212b continues and extracts the Gx Session-Id and GxClientID from the Session Continuity APV. In an embodiment, the PMS 2212b may obtain PCEF host and realm information directly from the Session Continuity APV. The PMS 2212b goes through the policy and charging rule authorizations without the Gx session information from the session store, but instead using the Rx AAR content (Media-Component-Description specifically) and policy configuration cache for IMS application, Rx-type partial policy and charging rules, etc. The PMS 2212b returns a Gx RAR message to the LSU Frontend 2402b with the Rx-type partial policy and charging rules fully defined and installed, the Gx Session-Id and GxClientID as they were received, and the VoLTE session continuity information including the Rx Session-Id, RxClientID, and the concatenated list of installed Rx-type policy and charging rule names. The format of this AVP may be "rx-sess=<rx-session-id>:rx-rules=<rx-rule-name1>,<rx-rule-name2>". The LSU Frontend 2402b will store the VoLTE session continuity information in its cache for Subscriber 3 using the common key.

Figure 36B:
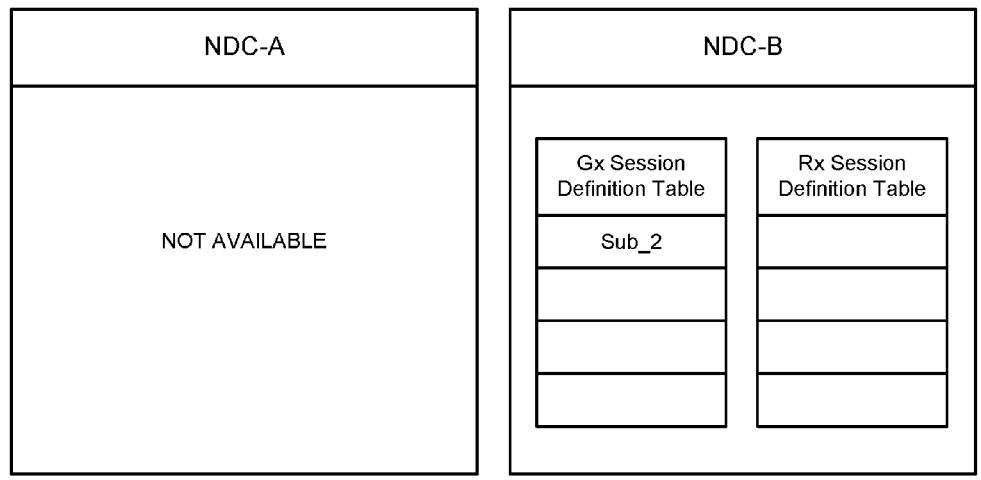

FIG. 36A shows the total number of entries in the LSU Frontend cache, and the contents of the entry for Subscriber 3. Note that it contains Rx session continuity information. The primary LSU Frontend may replicate the cache updates to its local secondary only—the remote primary and secondary are off-line. FIG. 36B shows the contents of the LSU session stores for NDC-A and NDC-B. Note that the session store in NDC-A is not available, and that the session store in NDC-B only has a session for Subscriber 2.

In operation 6 of FIG. 34, NDC-A comes online. The primary and secondary LSU Frontends 2402a and 2402c will reconnect to the primary and secondary LSU Frontends 2402b and 2402d in NDC-B, and they will retrieve the complete cache.

In operation 7, the RA 2252 may send an Rx STR message for Subscriber 3 to NDC-A emulating a VoLTE call terminating using IMS to the LSU Frontend. This message will not contain the IPv4 address of Subscriber 3. The LSU Frontend will look up the common key (Gx Session-Id value) using the Rx Session-Id as key and send the Rx STR with the Common-Key AVP (CK) containing the common key and the session continuity information from the cache to the PMS 2212a. The PMS 2212a will not find either the Gx or Rx session entry in the session store. However, it will ignore this problem, and continue by sending back an Rx STA message with Result Code=DIAMETER_SUCCESS (2001). Previously, it would have sent a IP-CAN_SESSION_NOT_AVAILABLE (5065) Experimental-Result-Code error. The PMS 2212a then extracts the Gx Session-Id, Rx Session-Id, GxClientID, and RxClientID from the session continuity information. The PMS 2212a then uses the received session continuity information to remove the Rx-type policy and charging rules. The PMS 2212a sends a Gx RAR message with the Rx-type partial policy and charging rules removed, the Common-Key AVP as it was received, and the Rx session continuity information reset (e.g., with an empty value). The LSU Frontend 2402a will store the session continuity information in its cache for Subscriber 3's cache entry for this common key. The primary LSU Frontend 2402a will replicate the cache updates to its local secondary LSU Frontend 2402c, and to the remote primary and secondary LSU Frontends 2402b and 2402d. The LSU Frontend 2402a sends the Gx RAR message to the PMS 2212a, and the PCEF responds with a Gx RAA message containing the Result Code=DIAMETER_SUCCESS (2001). The VoLTE call session has now been terminated because the PCEF received the Gx RAR message and it deleted the dedicated EPS bearer for the packetized voice data (Real-time Transport Protocol (RTP) and RTP Control Protocol (RTCP) flows, etc.) releasing GBR resources in the network.

Figure 37B:
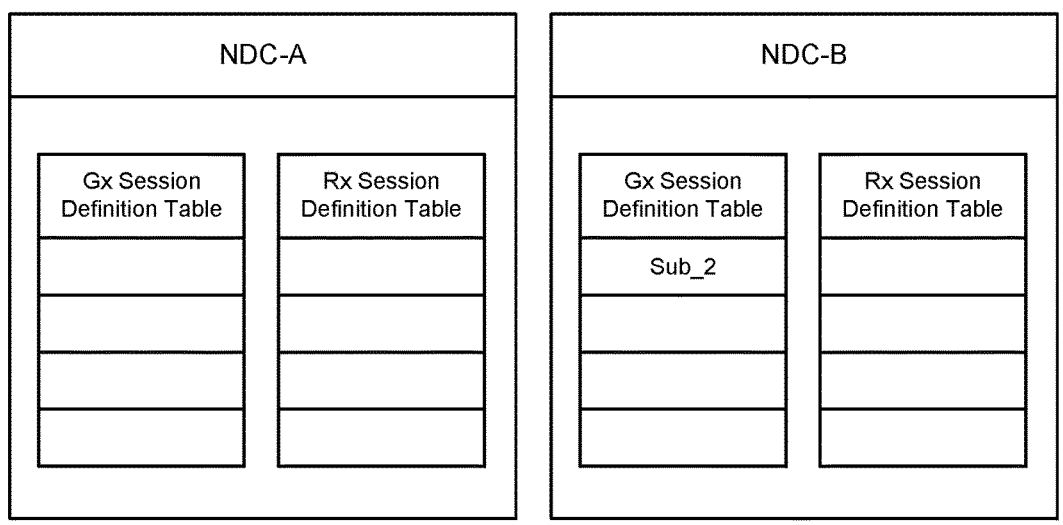

FIG. 37A shows the total number of entries in the LSU Frontend cache, and the contents of the entry for Subscriber 3. Note that the Rx session continuity information (e.g., the Rx Session-Id, RxClientID) has been deleted. FIG. 37B shows the contents of the LSU session stores for NDC-A and NDC-B. Note that the session store in NDC-A is available, but it does not contain any session information.

In operation 8 of FIG. 34, the RA 2252 may send a Gx CCR-T message for Subscriber 3 to NDC-A. The LSU Frontend 2402a will look up the common key using the Gx Session-Id as a secondary key and sends the Gx CCR-T with the session continuity information to the PMS 2212a. The PMS 2212a will attempt to delete the Gx session entry in the database for Subscriber 3 (and fail because the session information does not exist due to the previous failure). As there is no live Rx session(s) for Subscriber 3, there is no need to send any Rx ASRs to the AF. The PMS 2212a sends back a Gx CCA-T message with Result Code=DIAMETER_SUCCESS (2001). The LSU Frontend 2402a removes the session continuity information cache entry for Subscriber 3's common key. The primary LSU Frontend 2402a will replicate the cache updates to its local secondary LSU Frontend 2402c, and to the remote primary and secondary LSU Frontends 2402b and 2402d.

Figure 38A:
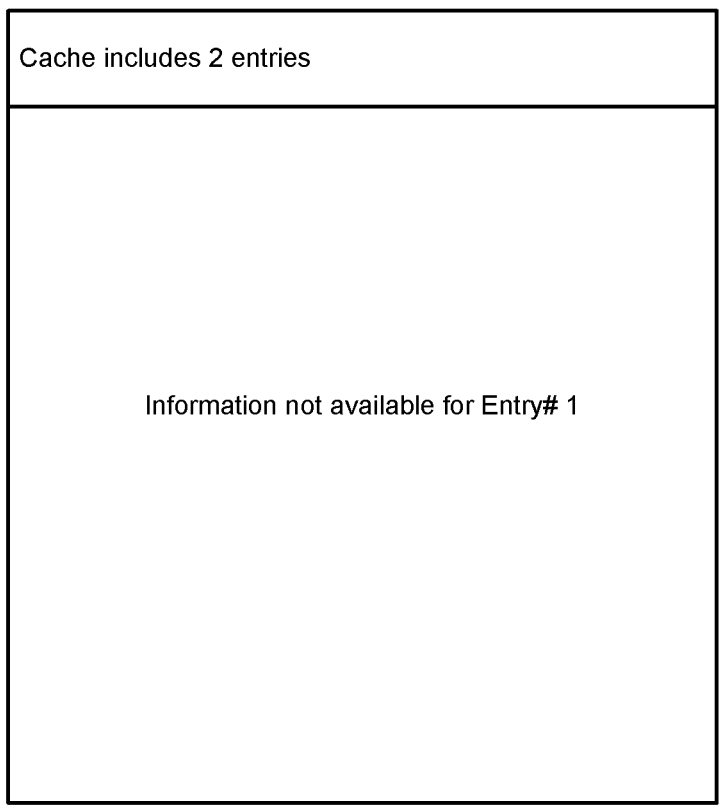
Figure 38B:
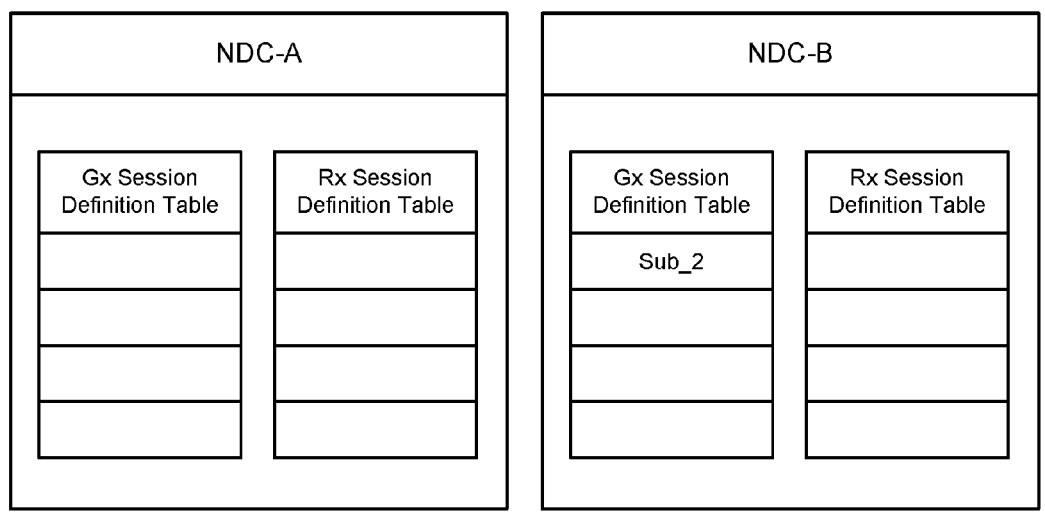

FIG. 38A shows that the LSU Frontend cache no longer contains an entry for Subscriber 3. The two remaining entries are for Subscriber 1 and Subscriber 2. FIG. 38B shows the contents of the LSU session stores for NDC-A and NDC-B.

Figure 39:
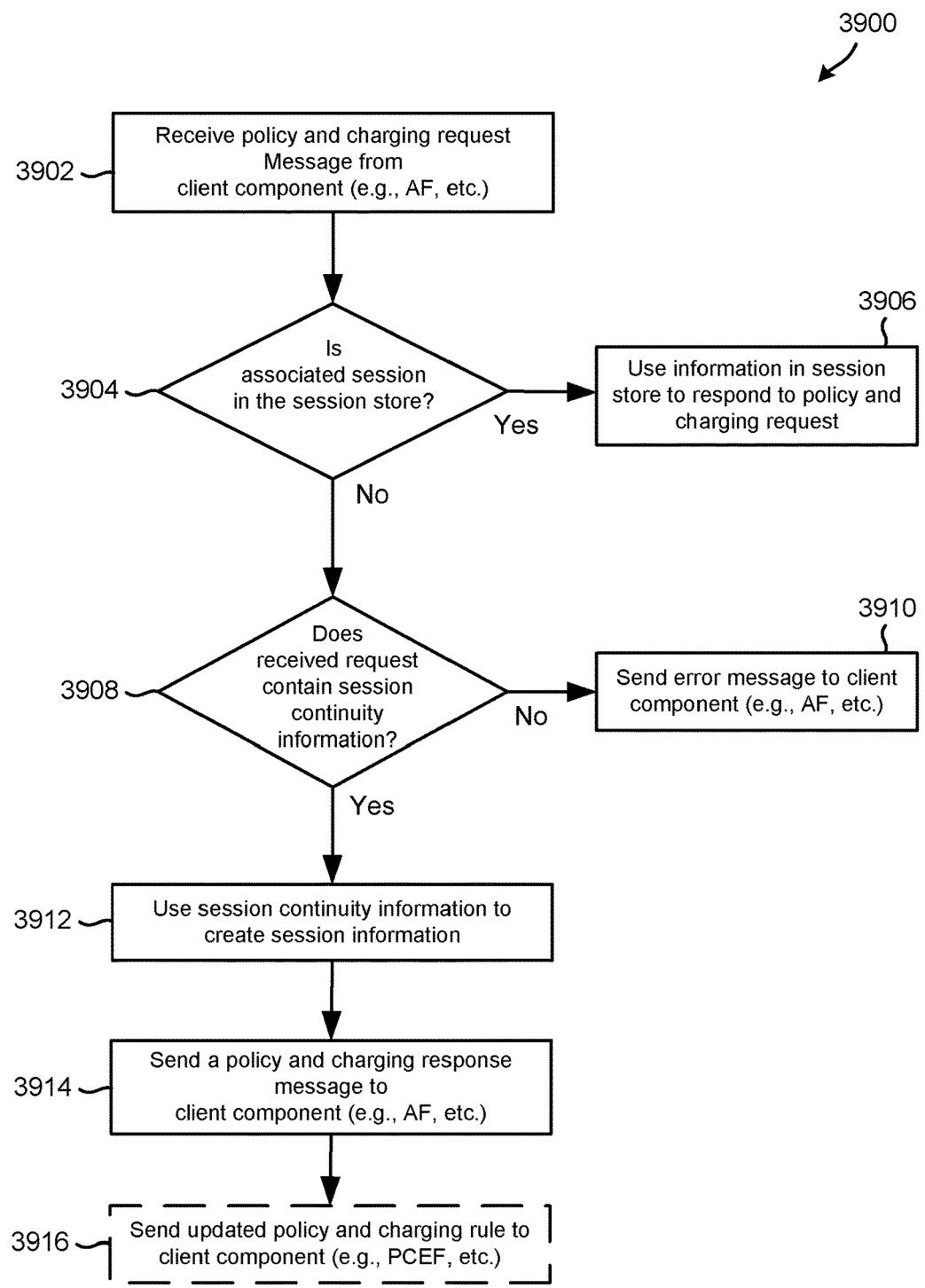
FIG. 39 is a process flow diagram illustrating a method for a policy management system to respond to a policy and charging request from an application function in accordance with an embodiment.

FIG. 39 is a process flow diagram illustrating a method 3900 for a policy management system (e.g., PMS 2212, PCRF) to respond to a policy and charging request from a client component (e.g., PCEF, AF, RA, etc.) in accordance with an embodiment. Method 3900 may be performed by a processor in a server computing device (or multiprocessor computing system, etc.) that implements all or portions of a PMS 2212a component. In block 3902, the processor may receive a policy and charging request relating to a VoLTE call from the client component (e.g., AF, etc.). In determination block 3904, the processor may determine whether there is a session associated with the VoLTE call in its session store. In response to determining that there is a session associated with the VoLTE call in its session store (i.e., determination block 3904="Yes"), in block 3906 the processor may respond to the policy and charging request. In response to determining that there is no session associated with the VoLTE call in its session store (i.e., determination block 3904="No"), in determination block 3908 the processor may determine whether there is session continuity information in the request. In response to determining that there is no session continuity information in the request (i.e., determination block 3908="No"), in block 3910 the processor may respond to the policy and charging request with an error message. In response to determining that there is session continuity information in the request (i.e., determination block 3908="Yes"), in block 3912 the processor may use the session continuity information in the request to create session information. In block 3914, the processor may respond to the policy and charging request. In optional block 3916, the processor may send a policy and charging request containing updated rules to the client component (e.g., gateway, EC, PCEF, etc.).

In an embodiment, the LSU failover techniques described herein may be used when performing live upgrades of LSUs, or of the application components within the LSUs, to ensure that the system does not need to be taken offline.

Figure 40:
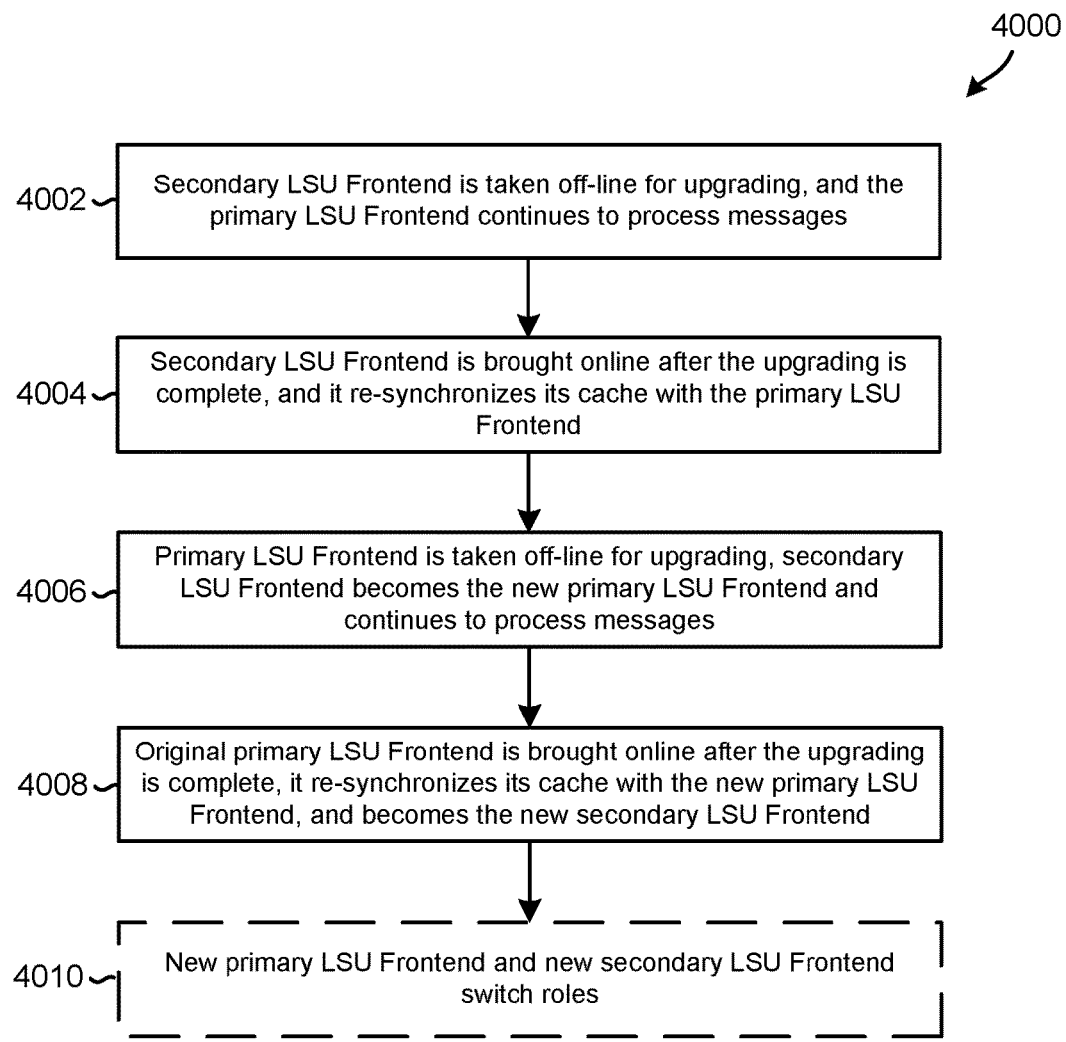
FIG. 40 is a process flow diagram illustrating a method for a performing failover operations in accordance with an embodiment.

FIG. 40 illustrates a method 400 of performing LSU failover operations to ensure that the system does not need to be taken offline in accordance with an embodiment. In block 4002, the secondary LSU Frontend is taken off-line for upgrading, and the primary LSU Frontend will continue to process messages. In block 4004, the secondary LSU Frontend is brought online after the upgrading is complete. It will then re-synchronize its cache with the primary LSU Frontend. In block 4006, the primary LSU Frontend is taken off-line for upgrading. The secondary LSU Frontend will become the primary LSU Frontend, and it will continue to process messages. In block 4008, the original primary LSU Frontend is brought online after the upgrading is complete. It will then re-synchronize its cache with the new primary LSU Frontend, and it will become the new secondary LSU Frontend. In optional block 4010, the new primary LSU Frontend and the new secondary LSU Frontend may switch roles to restore them to their original roles.

Figure 41A:
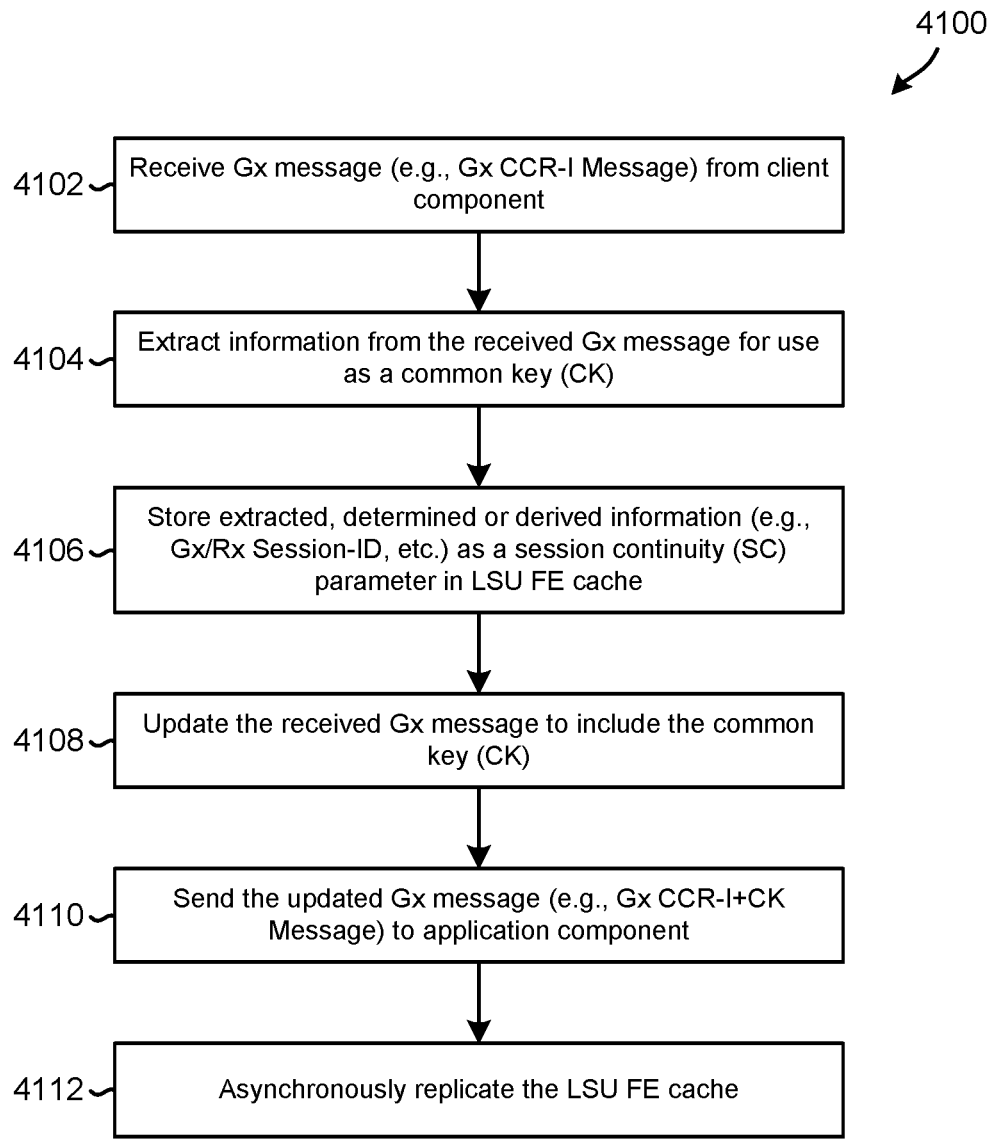
FIG. 41A is a process flow diagram illustrating an LSU Frontend (LSU FE) method for communicating a Gx session creation message (e.g., Gx CCR-I message) in accordance with an embodiment.

FIG. 41A illustrates an LSU FE method 4100 for communicating and processing a Gx session creation message in accordance with an embodiment. Method 4100 may be performed by a processor in a server computing device (or multiprocessor computing system, etc.) that implements all or portions of an LSU Frontend component (e.g., LSU FE 2402, etc.). In block 4102, the processor may receive a Gx request message (e.g., Gx CCR-I or "CCR Gx request" Message) from a client component.

In block 4104, the processor may extract information from the received Gx request message for use in determining a common key (CK). In some embodiments, the processor may generate or determine the common key (CK) based on subscriber identifiers (e.g., MSISDN, FIA+APN, etc.) included in the received Gx request message. In some embodiments the common key (CK) may include or be associated with information that may be used to identify the gateway (e.g., EC, PCEF, etc.) to which Gx RAR messages are to be sent.

In block 4106, the processor may store information that is extracted, determined or derived from the information that is included in the received Gx request message (e.g., common key, Gx/Rx Session-ID, names of PCC Rules, etc.) as a session continuity (SC) parameter (or value, field, AVP, etc.) in its LSU FE cache.

In block 4108, the processor may update the received Gx request message to include the common key (CK). That is, in block 4108, the processor may generate an updated Gx request message (e.g., Gx CCR-I+CK Message). In various embodiments, this may be accomplished by adding a common key field or AVP (e.g., an information structure that includes information such as Gx/Rx Session-Id, etc.) to the received Gx request message, creating a new message that includes a common key field, etc.

In block 4110, the processor may send the updated Gx request message (e.g., Gx CCR-I+CK Message) to an application component (e.g., PMS 2212 component, etc.). In block 4110, the processor may asynchronously replicate its LSU FE cache (e.g., to a mated LSU or LSU FE component, etc.).

Figure 41B:
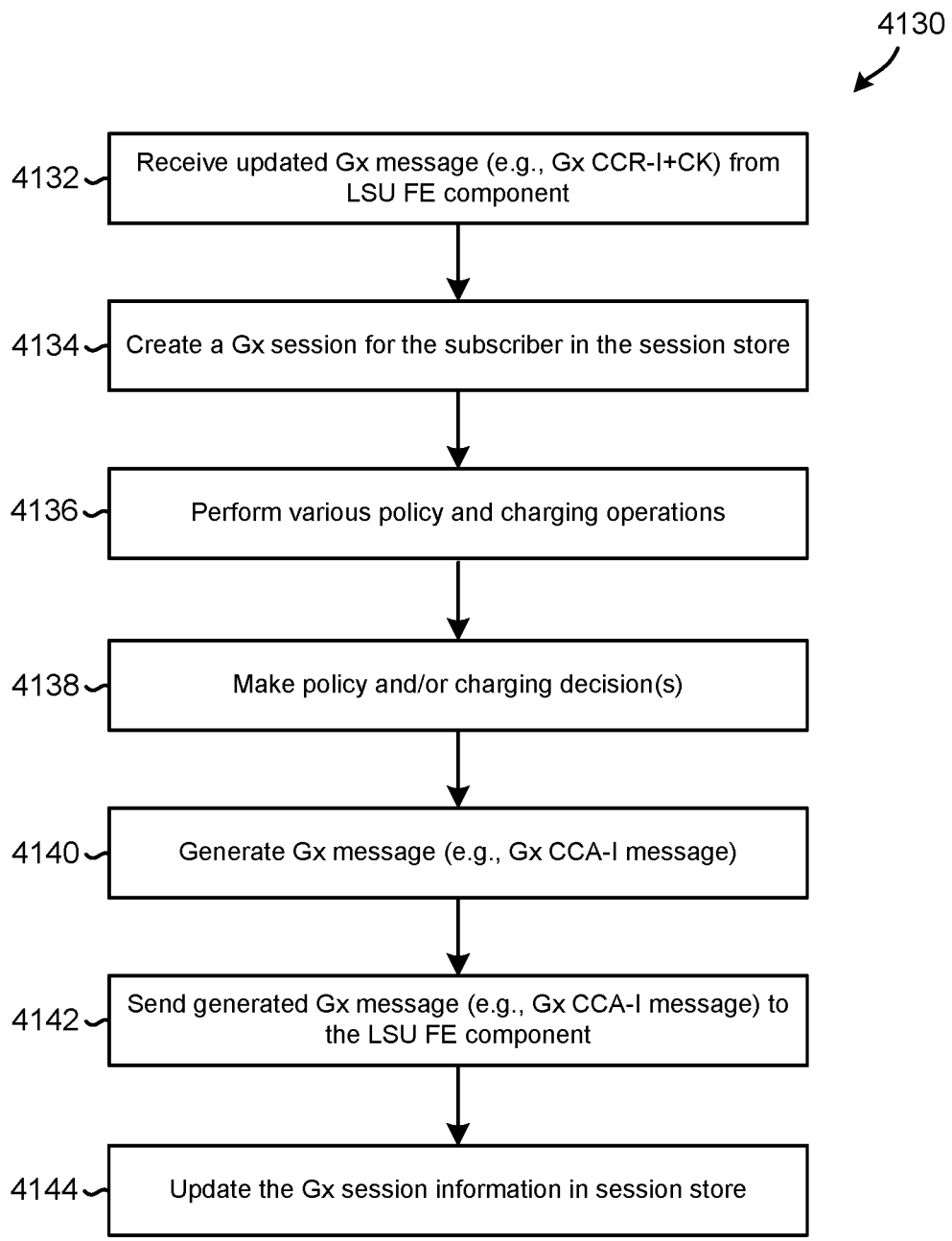
FIG. 41B is a process flow diagram illustrating an application component method for communicating a Gx session creation message (e.g., Gx CCR-I message) in accordance with an embodiment.

FIG. 41B illustrates an application component method 4130 for communicating and processing a Gx session creation message in accordance with an embodiment. Method 4130 may be performed by a processor in a server computing device (or multiprocessor computing system, etc.) that implements all or portions of an application component, such as a PMS 2212 component, PCRF component, charging component, etc.

In block 4132, the processor may receive an updated Gx request message (e.g., Gx CCR-I+CK Message) from an LSU FE component (e.g., the Gx request message sent in block 4110 illustrated in FIG. 41A). The updated Gx request message may include subscriber identifiers (e.g., MSISDN, FIA+APN, etc.) that uniquely identify a subscriber. The updated Gx request message may also include a common key (CK) that includes information that may be used to identify the gateway (e.g., EC, PCEF, etc.) to which Gx RAR messages are to be sent.

In block 4134, the processor may create a Gx session for a subscriber in a session store based on the information included in the received Gx request message (e.g., Gx CCR-I+CK Message).

In block 4136, the processor may perform various policy and/or charging operations. In block 4138, the processor may make policy and/or charging decision(s) based on the information included in the received Gx request message (e.g., Gx CCR-I+CK Message) and/or the results of the policy/charging operations.

In block 4140, the processor may generate a Gx answer message (e.g., Gx CCA-I Message). In block 4142, the processor may send the generated Gx answer message (e.g., Gx CCA-I Message) to the LSU FE component. In block 4144, the processor may update the Gx session information in the session store.

Figure 42A:
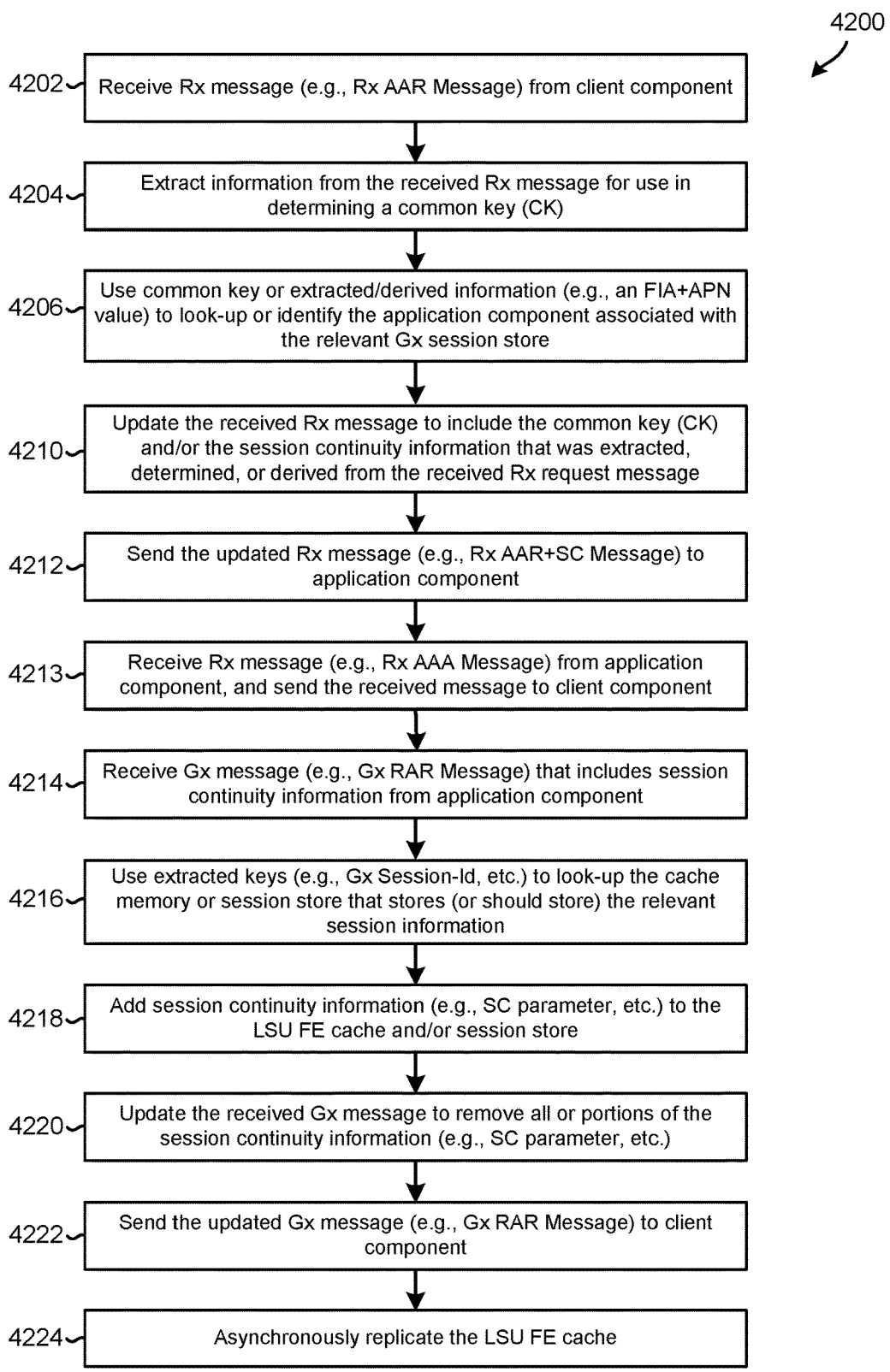
FIG. 42A is a process flow diagram illustrating an LSU FE method for communicating an Rx session creation message (e.g., Rx AAR message) in accordance with an embodiment.

FIG. 42A illustrates an LSU Frontend method 4200 for communicating and processing an Rx session creation message in accordance with an embodiment. Method 4200 may be performed by a processor in a server computing device (or multiprocessor computing system, etc.) that implements all or portions of an LSU Frontend component.

In block 4202, the processor may receive an Rx request message (e.g., Rx AAR Message) from a client component. The Rx request message may include an FIA+APN field that identifies a subscriber (or group of subscribers) and/or a session identifier. In block 4204, the processor may extract information from the received Rx message for use in determining a common key (CK). For example, the processor may extract a FIA+APN value from the received Rx message, and use the FIA+APN value to retrieve a common key (CK) from a common key table.

In block 4206, the processor may use the common key (CK) and/or other extracted or derived information (e.g., FIA+APN value, Gx/Rx Session-Id, etc) to look-up or identify an application component that is associated with the relevant Gx session store (or corresponding Gx session). The common key (CK) may also be used to retrieve session continuity information (e.g., the identity of the gateway (e.g., EC, PCEF, etc.) to which Gx RAR messages are to be sent) from the cache memory (LSU FE cache).

In block 4210, the processor may update the received Rx request message to include the common key (CK) and/or the session continuity information that was extracted, determined, or derived from the received Rx request message. That is, in block 4210, the processor may generate an updated Rx request message (e.g., Rx AAR+SC Message) that includes additional information. In block 4212, the processor may send the updated Rx request message (e.g., Rx AAR+SC Message) to the identified application component. In block 4213, the processor may receive a Rx answer message (e.g., Rx AAA Message) from the identified application component, and send/forward the received message to the client component.

In block 4214, the processor may receive a Gx request message (e.g., Gx RAR Message) that includes session continuity information from the application component. In block 4216, the processor may use extracted keys (e.g., Gx Session-Id, etc.) to look-up the cache memory (e.g., LSU FE cache) that stores (or should store) the relevant session continuity information. In block 4218, the processor may add the received session continuity information to the session continuity information in its LSU FE cache. For example, the processor may add Rx session information (e.g., information identifying an Rx session, an enforcement component associated with the Rx session, and one or more rules associated with the enforcement component, etc.) to the Gx session information (e.g., information identifying a Gx session and an enforcement component associated with the Gx session, etc.) stored in the LSU FE cache.

In block 4220, the processor may update the received Gx request message to remove all or portions of the session continuity information. In block 4222, the processor may send the updated Gx request message (e.g., Gx RAR Message) to the client component. In block 4224, the processor may asynchronously replicate the LSU FE cache (e.g., in a mated LSU or LSU FE component, etc.).

Figure 42B:
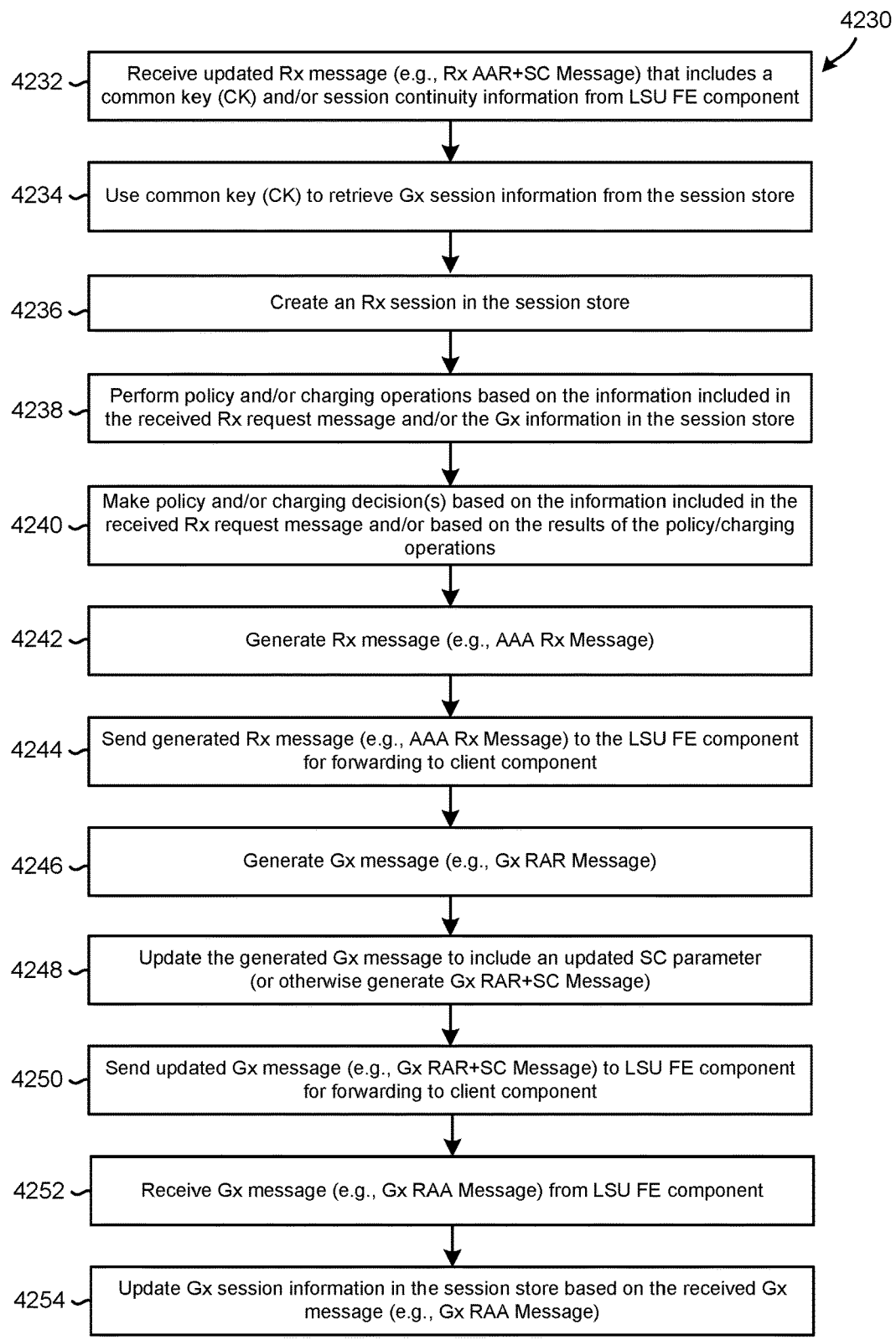
FIG. 42B is a process flow diagram illustrating an application component method for communicating an Rx session creation message in accordance with an embodiment.

FIG. 42B illustrates an application component method 4230 for communicating and processing an Rx session creation message in accordance with an embodiment. Method 4230 may be performed by a processor in a server computing device (or multiprocessor computing system, etc.) that implements all or portions of an application component, such as a PMS component, PCRF component, charging component, etc.

In block 4232, the processor may receive an updated Rx request message (e.g., Rx AAR+SC Message) that includes a common key (CK) and/or session continuity information from an LSU FE component (e.g., the Rx request message sent in block 4212 illustrated in FIG. 42A). In block 4234, the processor may use the common key (CK) to retrieve the corresponding Gx session information from a session store. In block 4236, the processor may create an Rx session in the session store (e.g., based on information included in the received Rx request message).

In block 4238, the processor may perform policy and/or charging operations based on the information included in the received Rx request message and/or the Gx information in the session store (Gx session store). In block 4240, the processor may make a policy and/or charging decision based on the information included in the received Rx request message and/or based on the results of the policy/charging operations. In block 4242, the processor may generate an Rx answer message (e.g., AAA Rx Message). In block 4244, the processor may send the generated Rx answer message (e.g., AAA Rx Message) to the LSU FE component for forwarding to the client component.

In block 4246, the processor may generate a Gx request message (e.g., Gx RAR Message). In block 4248, the processor may update the generated Gx request message to include updated session continuity information (or otherwise generate a Gx RAR+SC Message). In block 4250, the processor may send the updated Gx request message (e.g., Gx RAR+SC Message) to the LSU FE component for forwarding to the client component.

In block 4252, the processor may receive a Gx answer message (e.g., Gx RAA Message) from the LSU FE component (e.g., in response to sending the updated Gx answer message, etc.). In block 4254, the processor may update the Gx session information in the session store based on the information included in the received Gx answer message (e.g., Gx RAA Message).

Figure 42C:
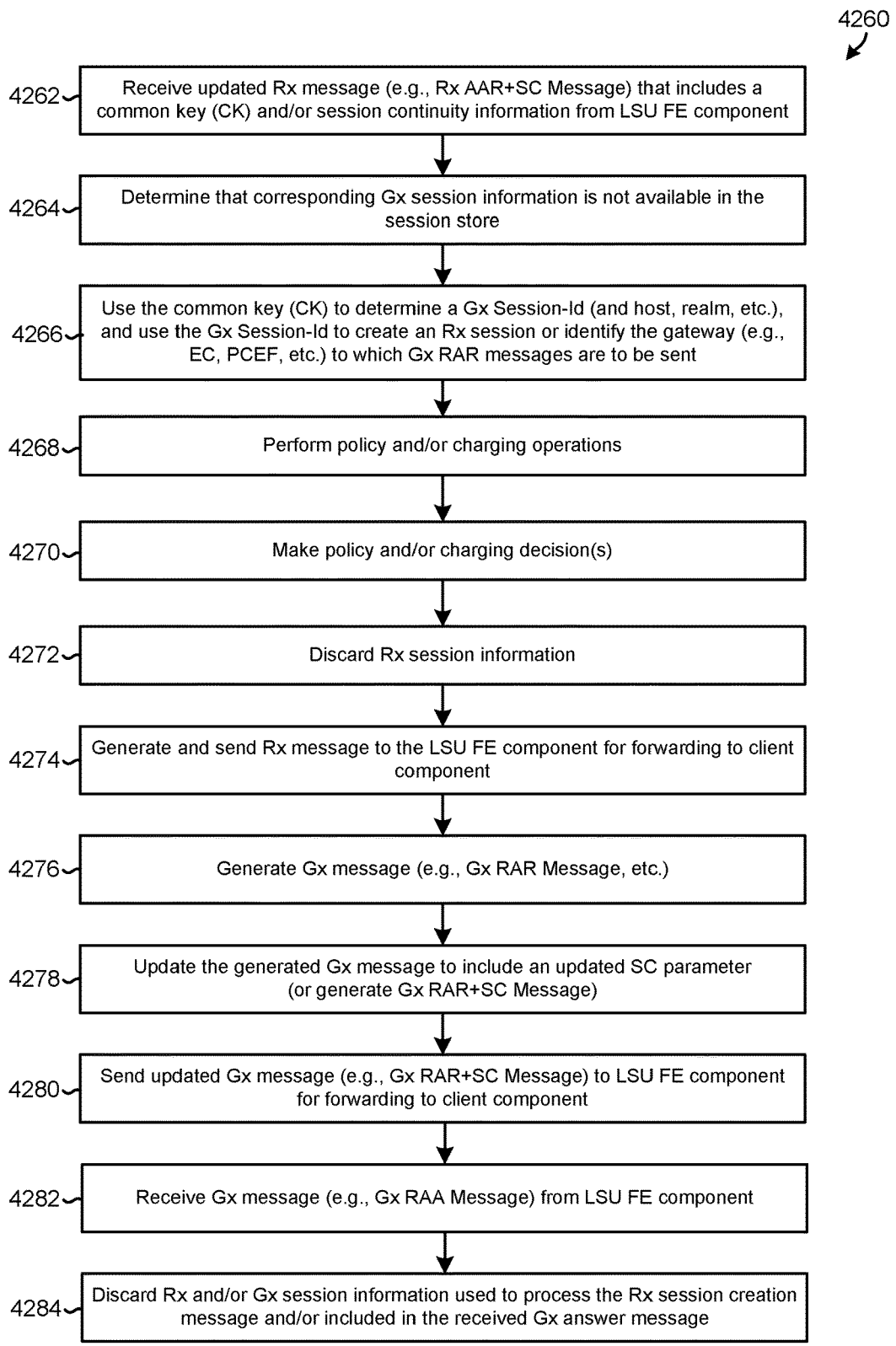
FIG. 42C is a process flow diagram illustrating an application component method for communicating an Rx session creation message in the face of a failure in accordance with an embodiment.

FIG. 42C illustrates an application component method 4260 for communicating and processing an Rx session creation message in the face of a failure in accordance with an embodiment. Method 4260 may be performed by a processor in a server computing device (or multiprocessor computing system, etc.) that implements all or portions of an application component, such as a PMS component, PCRF component, charging component, etc.

In block 4262, the processor may receive an updated Rx request message (e.g., Rx AAR+SC Message) that includes a common key (CK) and/or session continuity information from an LSU FE component (e.g., the Rx request message sent in block 4212 illustrated in FIG. 42A).

In block 4264, the processor may determine that information is not available in the session store for a corresponding Gx session. In block 4266, the processor may use the common key (CK) and/or session continuity information to determine a Gx Session-Id (and host, realm, etc.), and use the Gx Session-Id to create an Rx session or identify the gateway (e.g., EC, PCEF, etc.) to which Gx RAR messages are to be sent. In block 4268, the processor may perform policy and/or charging operations based on the information included in the received Rx request message and/or information derived from the session continuity information. In block 4270, the processor may make policy and/or charging decision(s) based on the information included in the received Rx request message and/or based on the results of the policy/charging operations. In block 4272, the processor may discard the Rx session information.

In block 4274, the processor may generate and send an Rx answer message (e.g., Rx AAA Message) to the LSU FE component for forwarding to client component. In block 4276, the processor may generate a Gx request message (e.g., Gx RAR Message, etc.). In block 4278, the processor may update the generated Gx request message to include updated session continuity information (or generate Gx RAR+SC Message). In block 4280, the processor may send the updated Gx request message (e.g., Gx RAR+SC message) to the LSU FE component for forwarding to client component. The client component may receive and use the updated Gx request message (e.g., Gx RAR+SC message) to create dedicated bearers for selected services. As a result, the client is able to maintain session continuity for selected services.

In block 4282, the processor may receive a Gx answer message (e.g., Gx RAA Message) from LSU FE component. In block 4284, the processor may discard any Rx and/or Gx session information used to process the Rx session creation message and/or included in the received Gx answer message.

Figure 43A:
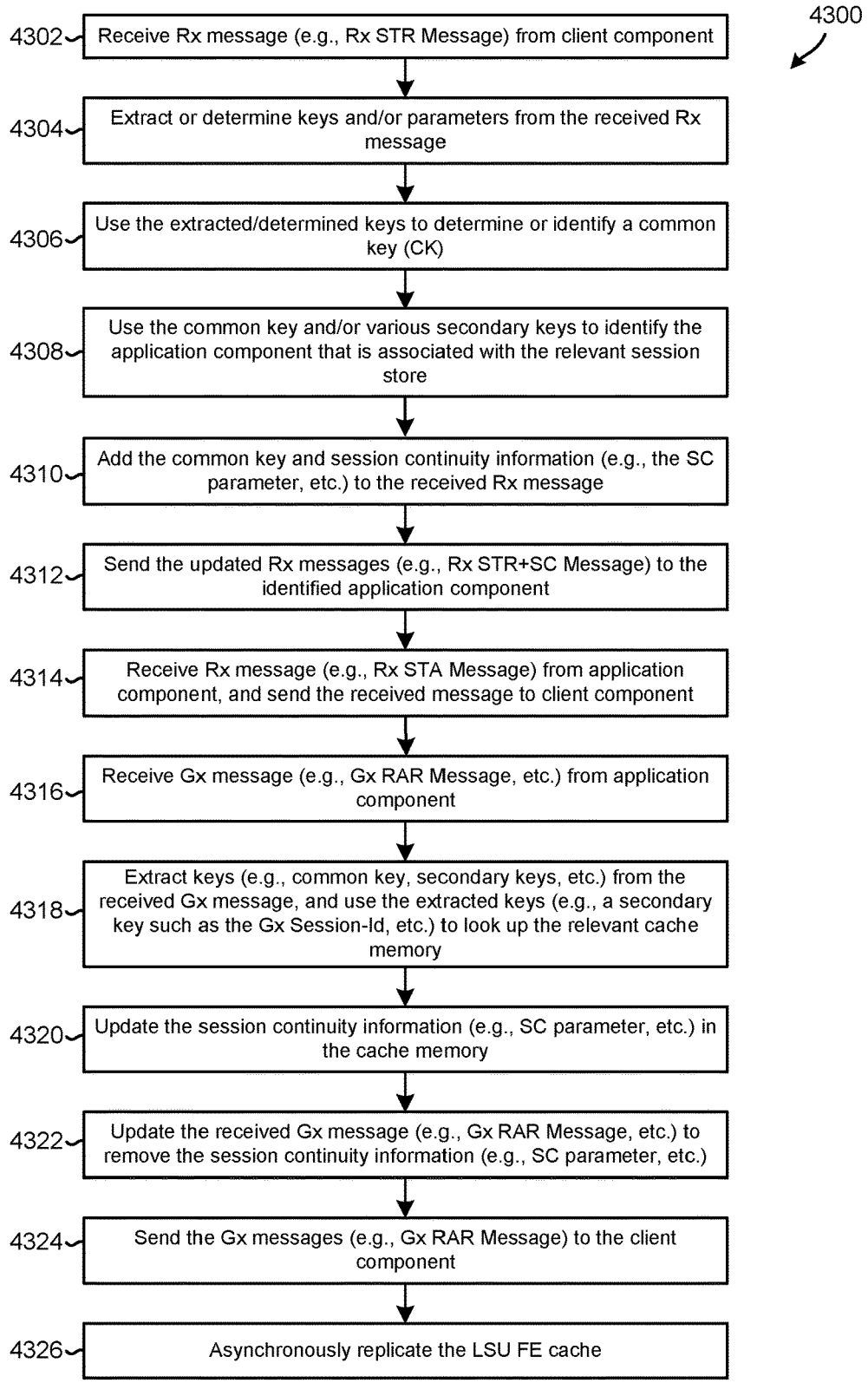
FIG. 43A is a process flow diagram illustrating an LSU FE method for communicating an Rx session termination message (e.g., Rx STR message) in accordance with an embodiment.

FIG. 43A illustrates an LSU Frontend method 4300 for communicating and processing an Rx session termination message in accordance with an embodiment. Method 4300 may be performed by a processor in a server computing device (or multiprocessor computing system, etc.) that implements all or portions of an LSU Frontend component.

In block 4302, the processor may receive an Rx request message (e.g., Rx STR Message) from a client component. In block 4304, the processor may extract or determine various keys and parameters from the received Rx request message. In block 4306, the processor may use the extracted/determined keys to determine or identify a common key (CK). In block 4308, the processor may use the common key and/or various secondary keys to identify the application component that is associated with the relevant session store. The common key (CK) may also be used to retrieve session continuity information. In block 4310, the processor may add the common key and session continuity information (SC parameter, etc.) to the received Rx request message. In block 4312, the processor may send the updated Rx request message (e.g., Rx STR+SC Message) to the identified application component. In block 4314, the processor may receive an Rx response message (e.g., Rx STA Message) from the application component, and send the received Rx response message to the client component.

In block 4316, the processor may receive a Gx request message (e.g., Gx RAR Message) from the application component. In block 4318, the processor may extract keys (e.g., common key, secondary keys, etc.) from the received Gx request message (e.g., Gx RAR Message), and use the extracted keys (e.g., a secondary key such as the Gx Session-Id, etc.) to look up the relevant cache memory. In block 4320, the processor may update the session continuity information in the cache memory (LSU FE cache). In block 4322, the processor may update the received Gx request message (e.g., Gx RAR Message) to remove the session continuity information (e.g., SC parameter, etc.). In block 4324, the processor may send the updated Gx request messages (e.g., Gx RAR Message) to the client component. In block 4326, the processor may asynchronously replicate its cache (e.g., to its mated LSU Frontend component, etc.).

Figure 43B:
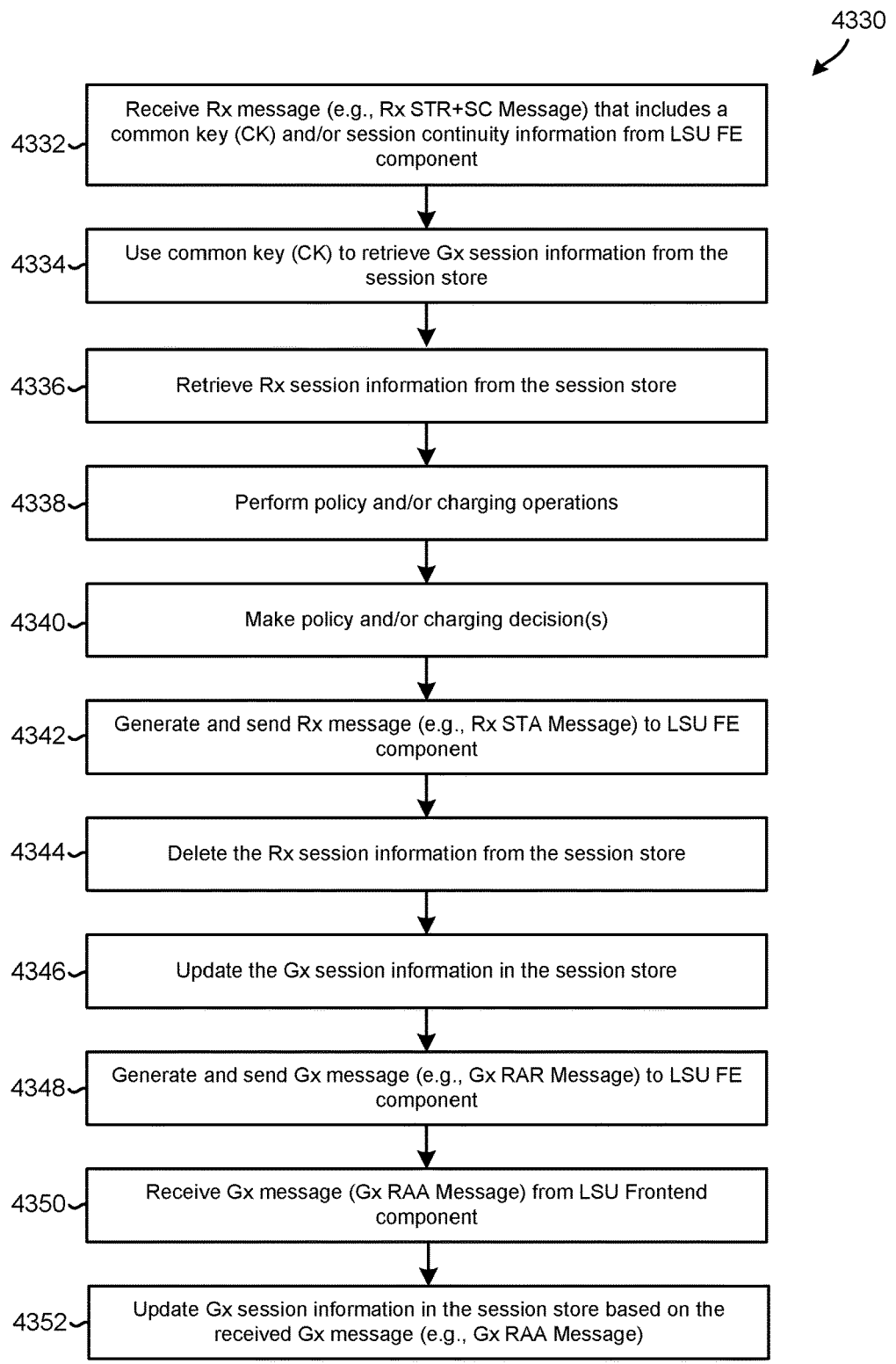
FIG. 43B is a process flow diagram illustrating an application component method for communicating an Rx session termination message in accordance with an embodiment.

FIG. 43B illustrates an application component method 4330 for communicating and processing a Rx session termination message in accordance with an embodiment. Method 4330 may be performed by a processor in a server computing device (or multiprocessor computing system, etc.) that implements all or portions of an application component, such as a PMS 2212 component, PCRF component, charging component, etc.

In block 4332, the processor may receive an Rx request message (e.g., Rx STR+SC Message) that includes a common key (CK) and/or session continuity information from a LSU FE component. In block 4334, the processor may use common key (CK) to retrieve Gx session information from the session store. In block 4336, the processor may retrieve Rx session information from the session store. In block 4338, the processor may perform policy and/or charging operations. In block 4340, the processor may make policy and/or charging decision(s). In block 4342, the processor may generate and send a Rx answer message (e.g., Rx STA Message) to the LSU FE component. In block 4344, the processor may delete the Rx session information from the session store.

In block 4346, the processor may update the Gx session information in the session store. In block 4348, the processor may generate and send a Gx request message (e.g., Gx RAR Message) to the LSU FE component. In block 4350, the processor may receive a Gx answer message (Gx RAA Message) from the LSU FE component. In block 4352, the processor may update Gx session information in the session store based on the received Gx answer message (e.g., Gx RAA message).

Figure 43C:
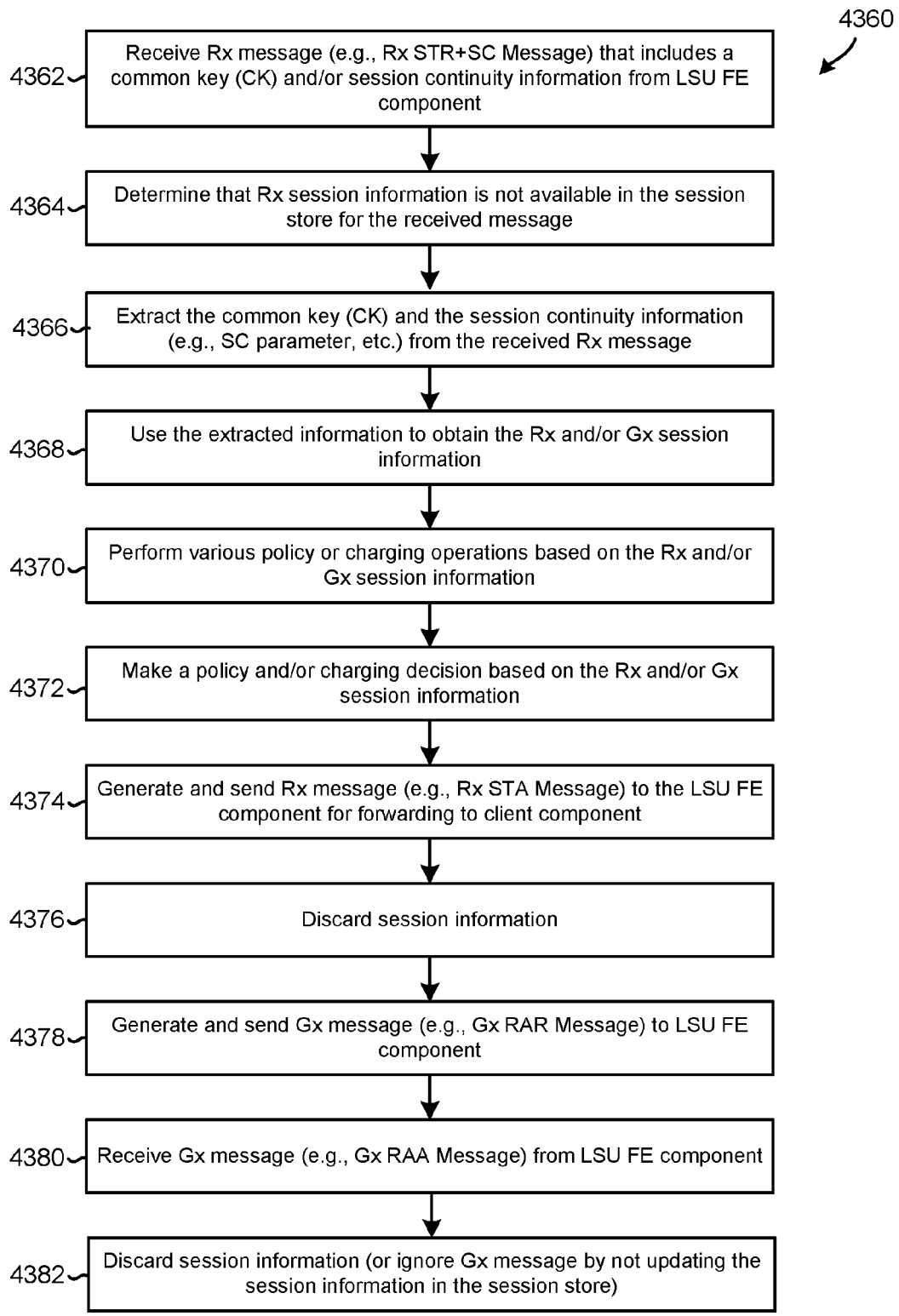
FIG. 43C is a process flow diagram illustrating an application component method for communicating an session termination message in the face of a failure in accordance with an embodiment.

FIG. 43C illustrates an application component method 4360 for communicating and processing an Rx session termination message in the face of a failure in accordance with an embodiment. Method 4360 may be performed by a processor in a server computing device (or multiprocessor computing system, etc.) that implements all or portions of an application component, such as a PMS component, PCRF component, charging component, etc.

In block 4362, the processor may receive an Rx request message (e.g., Rx STR+SC Message) that includes a common key (CK) and/or session continuity information from a LSU FE component. In block 4364, the processor may determine that Rx session information is not available in the session store for the received message. In block 4366, the processor may extract the common key (CK) and the session continuity information from the received message. In block 4368, the processor may use the extracted information to obtain the Rx and/or Gx session information. In block 4370, the processor may perform various policy or charging operations based on the Rx and/or Gx session information. In block 4372, the processor may make a policy and/or charging decision based on the Rx and/or Gx session information. In block 4374, the processor may generate and send an Rx answer message (e.g., Rx STA Message) to the LSU FE component for forwarding to client component. In block 4376, the processor may discard the session information.

In block 4378, the processor may generate and send a Gx request message (e.g., Gx RAR Message) to LSU FE component. In block 4380, the processor may receive a Gx answer message (e.g., Gx RAA Message) from the LSU FE component. In block 4382, the processor may discard the session information (or ignore Gx message by not updating the session information in the session store).

Figure 44A:
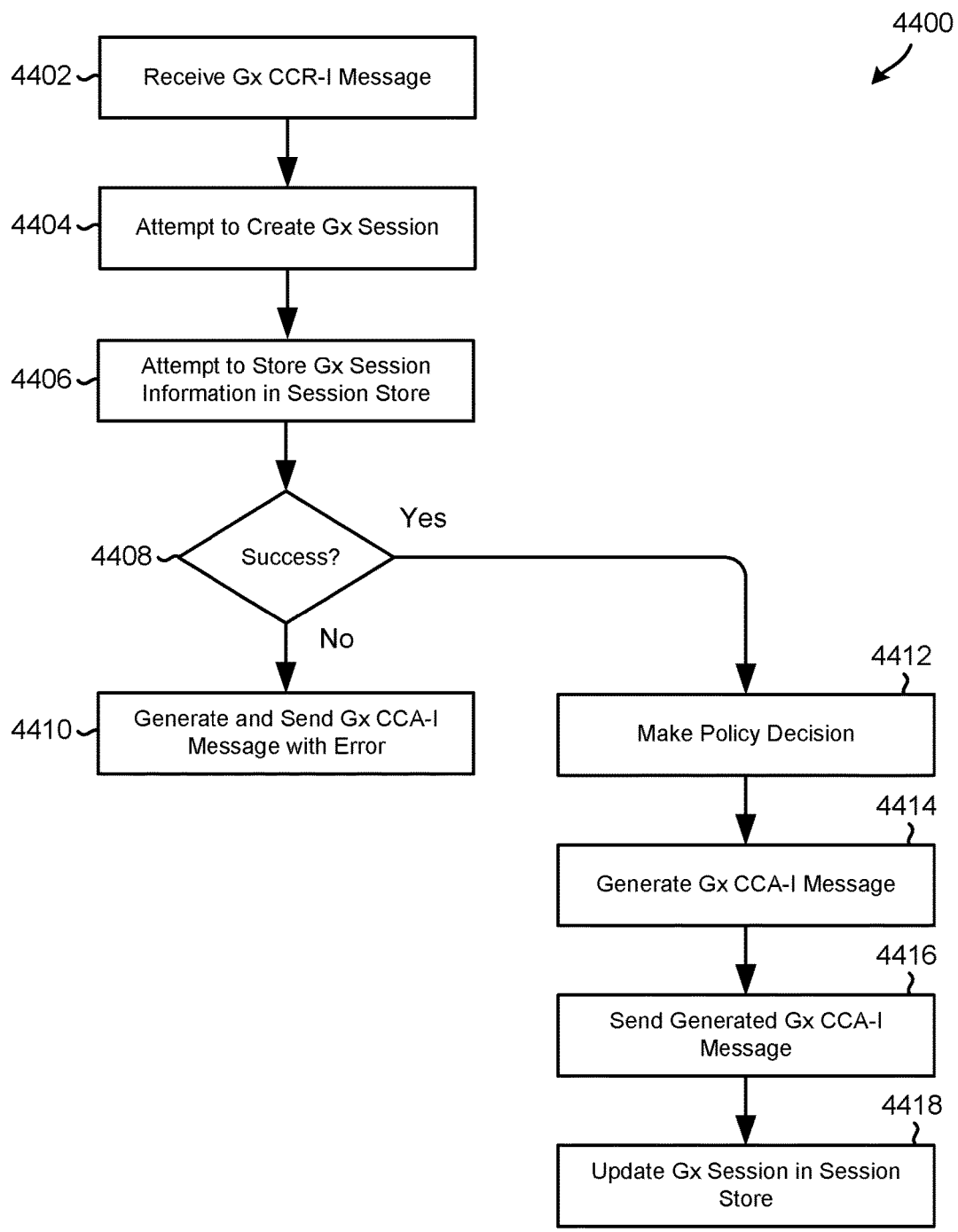
FIGS. 44A and 44B are process flow diagrams that illustrate method for communicating Gx and Rx messages in accordance with an embodiment.
Figure 44B:
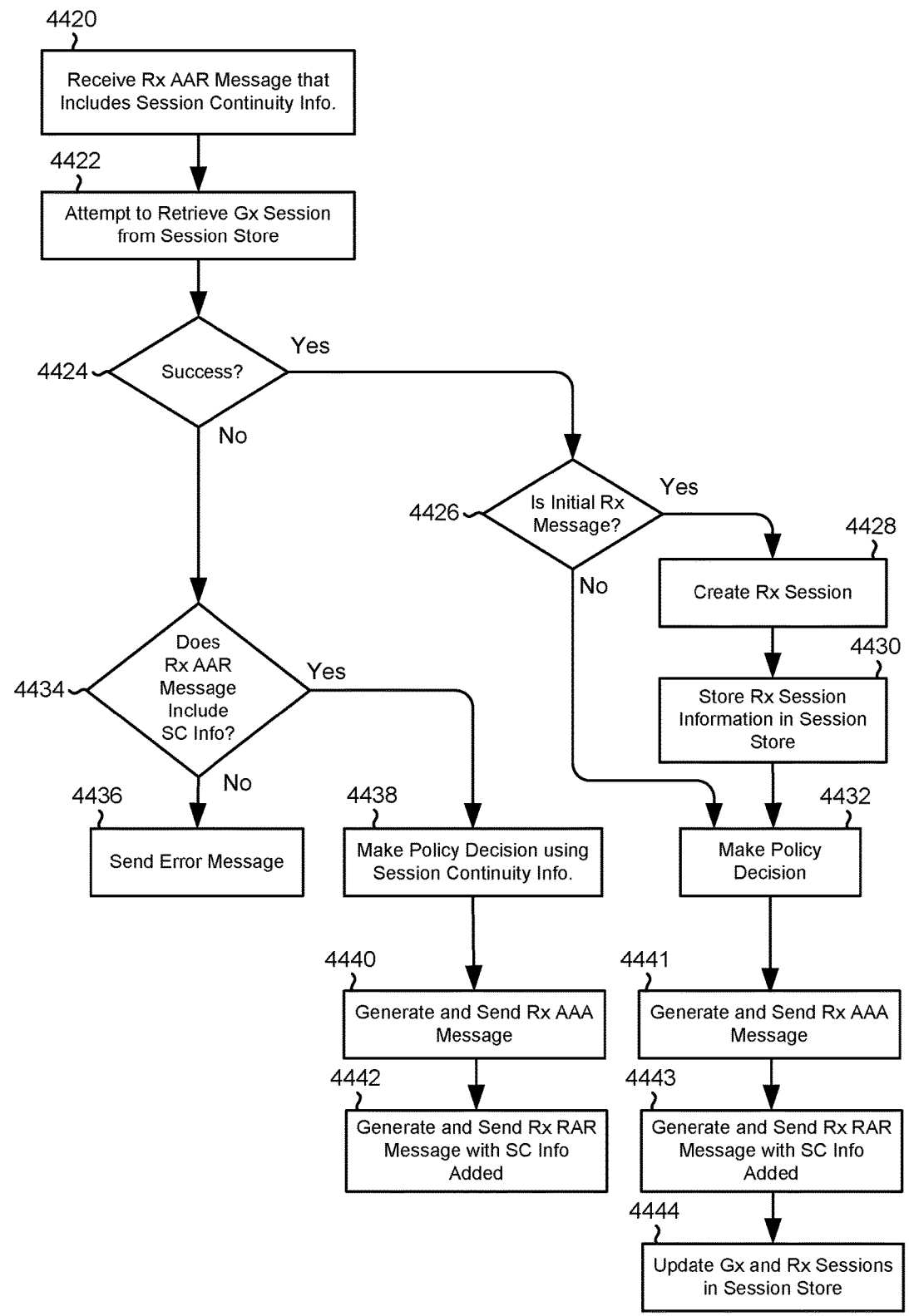

FIGS. 44A and 44B illustrate a method 4400 for processing a Gx session creation request message and a subsequent Rx message in accordance with an embodiment. Method 4400 may be performed by a processor in a server computing device (or multiprocessor computing system, etc.) that implements all or portions of an LSU component.

With reference to FIG. 44A, in block 4402, the processor may receive a Gx session creation request message (e.g., Gx CCR-I Message) from a client component. In block 4404, the processor may perform various operations to create a Gx session. In block 4406, the processor may attempt to store Gx session information in a session store. In determination block 4408, the processor may determine whether it was able to successfully create the Gx session and store the Gx session information in the session store. In response to determining that it was not able to successfully create the Gx session and store the Gx session information in the session store (i.e., determination block 4408="No"), in block 4410, the processor may generate and send an error message (e.g., Gx CCA-I Message with Error) to the client component. In response to determining that it was able to successfully create the Gx session and store the Gx session information in the session store (i.e., determination block 4408="Yes"), in block 4412, the processor may perform various policy or charging operations and make a policy or charging decision. In block 4414, the processor may generate a Gx answer message (e.g., Gx CCA-I message). In block 4416, the processor may send the Gx answer message (e.g., Gx CCA-I message) to the client component. In block 4414, the processor may update the Gx session in the session store.

With reference to FIG. 44B, in block 4420, the processor may receive an Rx message that includes session continuity information (e.g., Rx AAR+SC Message). In block 4422, the processor may attempt to retrieve corresponding Gx session information from the session store. In determination block 4424, the processor may determine whether it was able to successfully retrieve the Gx session information from the session store.

In response to determining that it was able to successfully retrieve the Gx session information from the session store (i.e., determination block 4424="Yes"), in block 4426 the processor may determine whether the received Rx message is an initial Rx message. In response to determining that the received Rx message is not the initial Rx message (i.e., determination block 4426="No"), in block 4432, the processor may attempt to retrieve corresponding Rx session information from the session store and make a policy decision. In response to determining that the received Rx message is the initial Rx message (i.e., determination block 4426="Yes"), in block 4428 the processor may create an Rx session. In block 4430, the processor may store Rx session information in the session store. In block 4432, the processor may make policy decision. In block 4441, the processor may generate and send an Rx answer message (e.g., Rx AAA Message, etc.) to the client component. In block 4443, the processor may generate and send a Gx or Rx message with added session continuity information (e.g., Rx RAR+SC Message, etc.) to the client component. In block 4444, the processor may update the Gx and/or Rx session information in the session store.

In response to determining that it was not able to successfully retrieve the Gx session information from the session store (i.e., determination block 4424="No"), in determination block 4434, the processor may determine whether the received Rx message includes relevant session continuity information. In response to determining that the received Rx message does not include relevant session continuity information (i.e., determination block 4434="No"), the processor may send an error message in block 4436. In response to determining that the received Rx message includes relevant session continuity information (i.e., determination block 4434="Yes"), in block 4438 the processor may make a policy decision using the session continuity information (which may include a common key). In block 4440, the processor may generate and send an Rx answer message (e.g., Rx AAA Message, etc.) to the client component. In block 4442, the processor may generate and send a Gx or Rx message with added session continuity information (e.g., Rx RAR+SC Message, etc.) to the client component.

Figure 45:
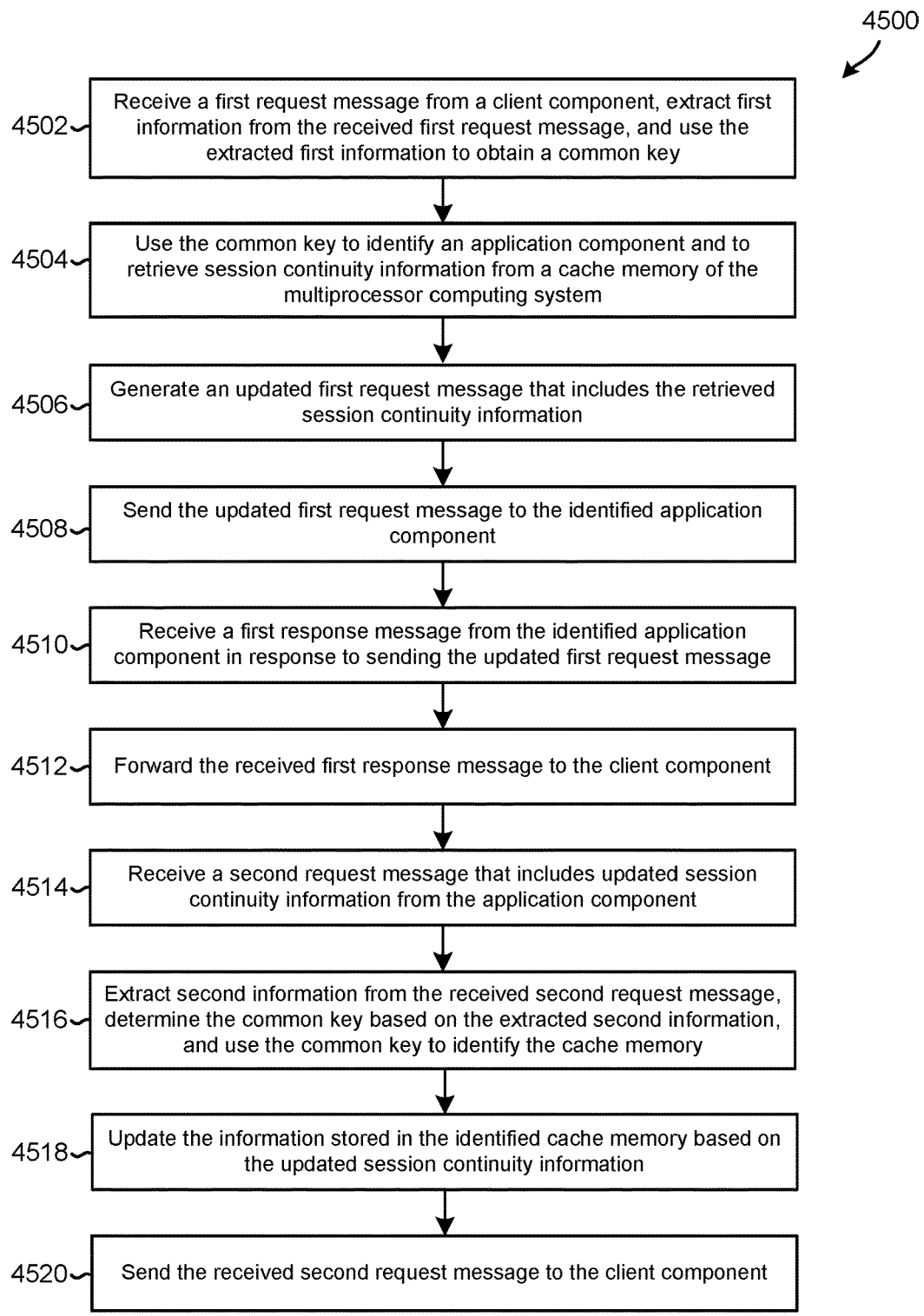
FIG. 45 is a process flow diagram illustrating an LSU FE method for communicating messages in a communication system in accordance with an embodiment.

FIG. 45 illustrates a method of communicating messages in communication system in accordance with an embodiment. Method 4500 may be performed by a processor in a server computing device (or multiprocessor computing system, etc.) that implements all or portions of an LSU component. In an embodiment, method 4500 may be performed by a processor in a multiprocessor computing system that implements all or portions of an LSU Frontend component (e.g., LSU FE 2402, etc.).

In block 4502, the processor may receive a first request message (e.g., an Rx message generated in response to a VoLTE call request, etc.) from a client component, extract first information (e.g., keys, parameters, etc.) from the received first request message, and use the extracted first information to obtain a common key. In block 4504, the processor may use the common key to identify an application component (e.g., PMS, PCRF, etc.). Also in block 4504, the processor may use the common key to retrieve session continuity information (e.g., SC parameter, etc.) from a cache memory of the multiprocessor computing system. In an embodiment, the processor may retrieve Gx session information identifying a Gx session and an enforcement component associated with the Gx session in block 4504. In block 4506, the processor may generate an updated first request message that includes the retrieved session continuity information (e.g., SC parameter, common key, etc.). In an embodiment, generating the updated first request message that includes the retrieved session continuity information may include generating the updated first request message to include Gx session information and the common key. In a further embodiment, generating the updated first request message that includes the retrieved session continuity information may further include generating the updated first request message to include Rx session information (e.g., information identifying an Rx session, information identifying an enforcement component associated with the Rx session, information identifying one or more rules associated with the enforcement component, etc.).

In block 4508, the processor may send the updated first request message to the identified application component. In block 4510, the processor may receive a first response message from the identified application component in response to sending the updated first request message. In block 4512, the processor may forward the received first response message to the client component.

In block 4514, the processor may receive a second request message that includes updated session continuity information from the application component. In an embodiment, receiving the second request message that includes updated session continuity information may include receiving a message that includes Rx session information that identifies an Rx session, an enforcement component associated with the Rx session, and one or more rules associated with the enforcement component. In block 4516, the processor may extract second information from the received second request message, determine the common key based on the extracted second information, and use the common key to identify the cache memory. In block 4518, the processor may update the information stored in the identified cache memory based on the updated session continuity information. In an embodiment, updating the information stored in the identified cache memory based on the updated session continuity information may include deleting information from the identified cache memory. In a further embodiment, deleting information from the identified cache memory may include delaying deletion for a period of time so that a subsequent termination request message is processed correctly. In an embodiment, in block 4518, the processor may also generate an updated second request message that does not include the updated session continuity information (included in the received second request message). In block 4520, the processor may send the received second request message to the client component. In an embodiment, sending the received second request message to the client component may include sending the updated second request message (that does not include the session continuity information) to the client component.

Figure 46:
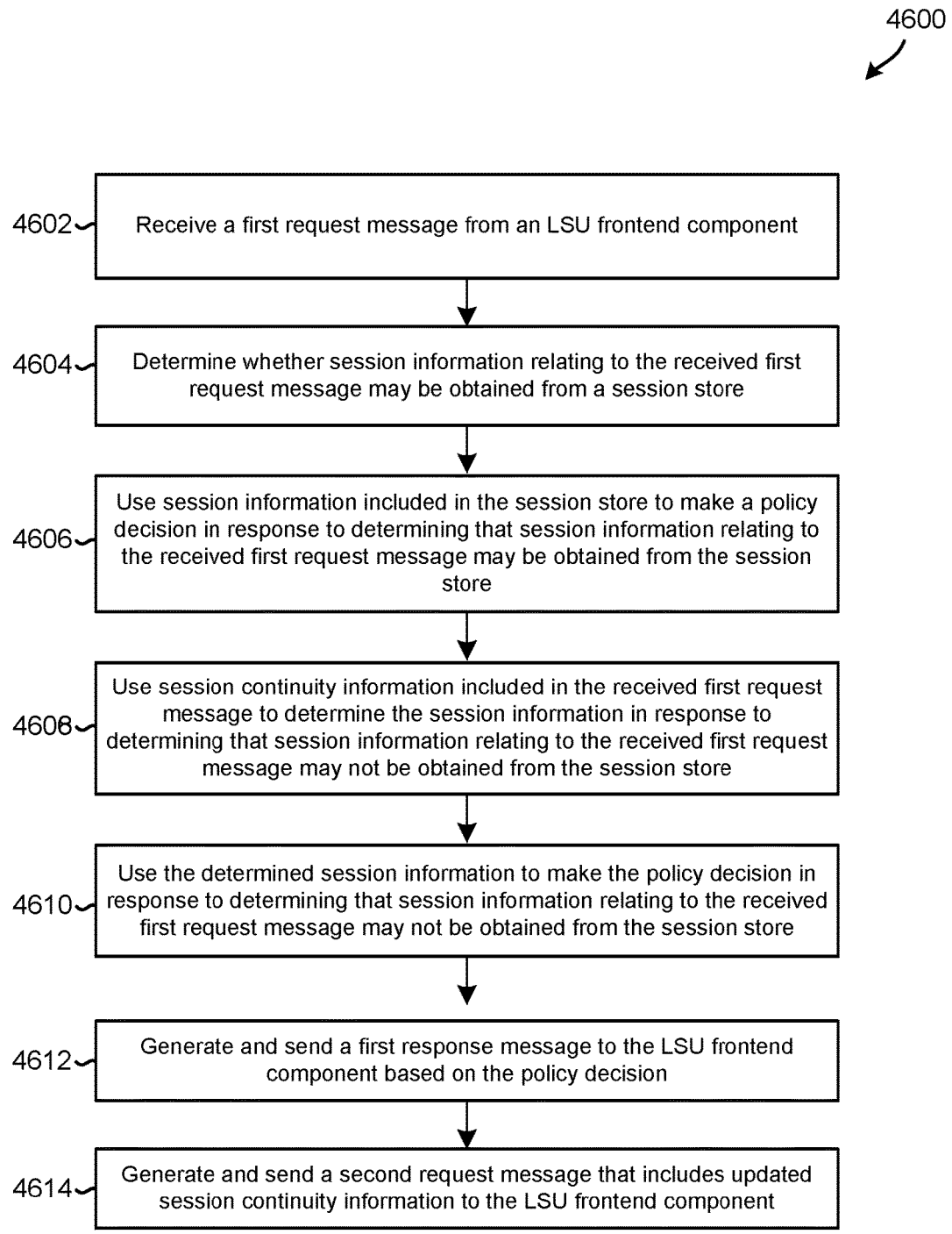
FIG. 46 is a process flow diagram illustrating an application component method for communicating messages in a communication system in accordance with an embodiment.

FIG. 46 illustrates a method of communicating messages in communication system in accordance with an embodiment. Method 4600 may be performed by a processor in a server computing device (or multiprocessor computing system, etc.) that implements all or portions of an LSU component. In an embodiment, method 4600 may be performed by a processor in a multiprocessor computing system that implements all or portions of an application component (e.g., PMS 2212, etc.).

In block 4602, the processor may receive a first request message (e.g., an Rx message generated in response to a VoLTE call request, etc.) from an LSU frontend component. In block 4604, the processor may determine whether session information relating to the received first request message may be obtained from a session store (e.g., determine whether the session store has failed, etc.). In block 4606, the processor may use session information included in the session store to make a policy decision in response to determining that session information relating to the received first request message may be obtained from the session store.

In blocks 4608 and 4610, the processor may use session continuity information included in the received first request message to determine the session information, use the determined session information to make the policy decision, in response to determining that session information relating to the received first request message may not be obtained from the session store. Using the session continuity information included in the received first request message to determine the session information may include using Gx session information identifying a Gx session and an enforcement component associated with the Gx session. Using the session continuity information included in the received first request message to determine the session information may include using Rx session information identifying an Rx session, an enforcement component associated with the Rx session, and one or more rules associated with the enforcement component.

In block 4612, the processor may generate and send a first response message to the LSU frontend component based on the policy decision. For example, the process may generate and send a message that includes Rx session information identifying an Rx session, an enforcement component associated with the Rx session, and one or more rules associated with the enforcement component. In block 4614, the processor may generate and send a second request message that includes updated session continuity information to the LSU frontend component. For example, the processor may send a Gx message that was generated in response to a VoLTE call request.

The embodiments described above (e.g., with reference to FIGS. 24-31, 39-44B, etc.) may be implemented in systems that are configured to communicate the messages using common key routing and data locality tables.

For example, the communication system 2500 may include a distributed database system in which the physical location of stored information changes frequently (as the elastically scalable telecommunication network scales) and a plurality of independent logical scalable units that each include a database memory of the distributed database system that stores unique subscriber data. In addition, the communication system 2500 may include components that are configured to route communication messages by performing operations that include receiving a first communication message in a router processor of a multiprocessor computing system (the first communication message having a first message type and including subscriber identifiers that uniquely identify a subscriber), selecting by the router processor a first table based on the first message type, identifying by the router processor a common key based on the selected first table and the subscriber identifiers included in the first communication message, updating a second table associated with a second message type based on the identified common key and the subscriber identifiers included in the first communication message, identifying in the router processor a first logical scalable unit that includes a first database memory that stores subscriber data relating to the subscriber using the identified common key, identifying a first application processor in the multiprocessor computing system that is part of the identified first logical scalable unit, and sending the first communication message from the router processor to the identified first application processor.

In an embodiment, the operations may further include receiving the first communication message in the first application processor, retrieving the subscriber data from the first database memory, performing application-level operations using the retrieved subscriber data and the received first communication message, generating a second communication message based on the retrieved subscriber data, and sending the second communication message from the first application processor to the router processor. In a further embodiment, the operations may include receiving the second communication message in the router processor, and routing the second communication message to another component or sub-system in the elastically scalable telecommunication network.

In a further embodiment, the operations may include receiving in the router processor information identifying that the subscriber data relating to the subscriber is now stored in a second database memory as a result of scaling operations in the elastically scalable telecommunication network, and updating at least one data locality table in response to receiving the information identifying the second database memory as storing the subscriber data. In a further embodiment, the operations may include receiving in the router processor a third communication message, identifying the common key using information included in the third communication message, identifying in the router processor a second logical scalable unit that includes the second database memory that stores the subscriber data using the common key, identifying a second application processor in the multiprocessor computing system that is part of the second logical scalable unit, and sending the third communication message from the router processor to the second application processor.

In a further embodiment, receiving in the router processor the third communication message may include receiving a communication message that includes a subset of the subscriber identifiers included in the first communication message. In a further embodiment, receiving in the router processor the third communication message may include receiving a communication message that identifies the subscriber using a different identifier than the subscriber identifiers included in the first communication message.

In a further embodiment, the operations may include receiving the third communication message in the second application processor, retrieving the subscriber data from the second database memory, performing application-level operations using the retrieved subscriber data and the received third communication message, generating a fourth communication message based on the retrieved subscriber data, and sending the fourth communication message from the second application processor to the router processor. In a further embodiment receiving the first communication message in the router processor may include receiving a Gx communication message having the first message type in the router processor, and receiving the third communication message in the router processor may include receiving an Rx communication message having the second message type in the router processor.

The embodiments described above (e.g., with reference to FIGS. 24-31, 39-42C, etc.) may also be implemented in systems that are configured to communicate messages using common key routing and proxies. For example, communication system 2500 may include components that are configured to route communication messages by performing operations that include receiving a first communication message (which may include two or more subscriber identifiers that uniquely identify a subscriber) in a processor of a multiprocessor computing system, generating in the processor a common key based on the subscriber identifiers, identifying in the processor a first logical scalable unit (of a plurality of independent logical scalable units in the elastically scalable telecommunication network) that includes a first database memory of the distributed database system that stores subscriber data relating to the subscriber (the first logical scalable unit may be identified via a database API and the common key), and storing by the processor the first communication message in the first database memory included in the first logical scalable unit.

In an embodiment, storing the first communication message in the first database memory included in the first logical scalable unit may include storing the first communication message in a memory that is remote to the processor. In an embodiment, the operations may further include updating a local request table of a first application component to include a reference to the first communication message by a first application processor in response to the processor storing the first communication message in the first database memory. In an embodiment, the operations may further include retrieving the first communication message from the first database memory by the first application component, retrieving the subscriber data from the first database memory, performing application-level operations using the subscriber data retrieved from the first database memory and the retrieved first communication message, generating a second communication message based on the subscriber data retrieved from the first database memory, and sending the second communication message from the first application processor to the processor.

In an embodiment, the operations may further include receiving the second communication message in the processor, and routing the second communication message to another component or sub-system in the elastically scalable telecommunication network. In an embodiment, the operations may further include receiving in the processor a third communication message, identifying the common key using information included in the third communication message, identifying in the processor a second logical scalable unit in the plurality of independent logical scalable units that includes a second database memory of the distributed database system that stores the subscriber data as a result of a scaling operation in the elastically scalable telecommunication network that changes the physical location in which the subscriber data is stored (the second logical scalable unit may be identified via database API and common key), and storing by the processor the third communication message in the second database memory in the second logical scalable unit.

In a further embodiment, receiving the third communication message may include receiving a communication message that includes a subset of the two or more subscriber identifiers included in the first communication message. In a further embodiment, receiving in the processor the third communication message may include receiving a communication message that identifies the subscriber using a different identifier than the two or more subscriber identifiers included in the first communication message.

In an embodiment, the operations may further include retrieving the third communication message from the second database memory by a second application component of a second application processor, retrieving the subscriber data from the second database memory, performing application-level operations using the subscriber data retrieved from the second database memory and the retrieved third communication message, generating a fourth communication message based on the subscriber data retrieved from the second database memory, and sending the fourth communication message from the second application processor to the processor. In a further embodiment, receiving the first communication message in the processor may include receiving a Gx communication message in the processor, and receiving the third communication message in the processor may include receiving a Rx communication message in the processor.

The embodiments described above (e.g., with reference to FIGS. 24-31, 39-42C, etc.) may also be implemented in systems that are configured to communicate the messages using independent key routing and data locality tables. For example, communication system 2500 may include components that are configured to route communication messages by performing operations that include receiving a first communication message in a processor of a multiprocessor computing system from a component in the elastically scalable telecommunication network (the received first communication message including subscriber identifiers that uniquely identify a subscriber), generating a plurality of keys for a plurality of message types based on the subscriber identifiers included in the received first communication message, identifying a first logical scalable unit that includes a first database memory that stores a first type of data relating to the subscriber by using a first key of the generated plurality of keys to query a data locality table, identifying a first application processor in the multiprocessor computing system that is part of the identified first logical scalable unit, and sending the received first communication message and the generated plurality of keys from the processor to the identified first application processor.

In an embodiment, sending the received first communication message from the processor to the first application processor may include sending the received first communication message to a first application component in the first application processor. In an embodiment, the operations may further include receiving the first communication message and the plurality of keys in the first application processor, identifying in the first application processor a second logical scalable unit that includes a second database memory that stores a second type of data relating to the subscriber via a second key of the plurality of keys, storing the first key in the second database memory, retrieving subscriber data from the first database memory, performing application-level operations using the subscriber data retrieved from the first database memory and the first communication message, generating a second communication message based on the subscriber data retrieved from the first database memory, and sending the second communication message from the first application processor to the processor.

In an embodiment, the operations may further include receiving the second communication message in the processor, and routing the second communication message to another component or sub-system in the elastically scalable telecommunication network. In an embodiment, the operations may further include receiving in the processor information identifying that the first type of data relating to the subscriber is now stored in a third database memory as a result of scaling operations in the elastically scalable telecommunication network, and updating at least one data locality table in response to receiving the information identifying the third database memory as storing the first type of data.

In an embodiment, the operations may further include receiving in the processor a third communication message, identifying a second key in the plurality of keys for the third communication message based on information included in the third communication message, determining whether a second logical scalable unit includes a second database memory that stores a second type of data by using the second key to query the data locality table, identifying a second application processor in the multiprocessor computing system that is part of the second logical scalable unit, and sending the third communication message from the processor to the second application processor.

In an embodiment, the operations may further include receiving the third communication message in the second application processor, retrieving the first key from the second database memory, identifying a third logical scalable unit that includes a third database memory that stores the first type of data based on the first key, retrieving subscriber data from the third database memory, performing application-level operations using the subscriber data retrieved from the third database memory, generating a fourth communication message based on the subscriber data retrieved from the third database memory, and sending the fourth communication message from the second application processor to the processor. In an embodiment, receiving the first communication message in the processor may include receiving a Gx communication message in the processor, and receiving the third communication message in the processor includes receiving an Rx communication message in the processor.

The embodiments described above (e.g., with reference to FIGS. 24-31, 39-42C, etc.) may also be implemented in systems that are configured to communicate the messages using independent key routing and proxies. For example, communication system 2500 may include components that are configured to route communication messages by performing operations that include receiving a first communication message in a processor of a multiprocessor computing system from a component in the elastically scalable telecommunication network (the first communication message including subscriber identifiers that uniquely identify a subscriber), generating a plurality of keys for a plurality of message types based on the subscriber identifiers, identifying a first logical scalable unit that includes a first database memory that stores a first type of data relating to the subscriber via a database API and a first key of the plurality of keys (generated based on the subscriber identifiers included in the received first communication message), identifying a second logical scalable unit that includes a second database memory that stores a second type of data relating to the subscriber via the database API and a second key of the plurality of keys (generated based on the subscriber identifiers included in the received first communication message), identifying a first application processor in the multiprocessor computing system that is part of the first logical scalable unit, identifying a second application processor in the multiprocessor computing system that is part of the second logical scalable unit, storing the received first communication message and the first key in the first database memory (included in the first logical scalable unit identified via the first key), and storing the first key in the second database memory (included in the second logical scalable unit identified via the second key).

In an embodiment, storing the first communication message and the first key in the first database memory included in the first logical scalable unit may include storing the first communication message in a memory that is remote from the processor. In an embodiment, the operations of storing the first communication message and the first key in the first database memory and storing the first key in the second database memory are performed concurrently. In an embodiment, the operations may further include updating a local request table of a first application component to include a reference to the first communication message by the first application processor in response to the processor storing the first communication message in the first database memory. In an embodiment, the operations may further include retrieving the first communication message from the first database memory by the first application component, retrieving subscriber data from the first database memory, performing application-level operations using the subscriber data retrieved from the first database memory and the retrieved first communication message, generating a second communication message based on the subscriber data retrieved from the first database memory, and sending the second communication message from the first application processor to the processor.

In an embodiment, the operations may further include receiving in the processor a third communication message, identifying the second key based on information included in the third communication message, determining that the second database memory in the second logical scalable unit stores the second type of data via the database API and the second key, and storing the third communication message in the second database memory in the second logical scalable unit. In an embodiment, the operations may further include retrieving the third communication message and the first key from the second database memory by a second application component of the second logical scalable unit, identifying a third logical scalable unit that includes a third database memory that stores the first type of data via the database API and the first key (the third database memory stores the first type of data as a result of a scaling operation within the elastically scalable telecommunication network), and retrieving subscriber data from the third database memory.

In an embodiment, the operations may further include performing application-level operations using the subscriber data retrieved from the third database memory, generating a fourth communication message based on the subscriber data retrieved from the third database memory, and sending the fourth communication message from the second application processor to the processor. In an embodiment, receiving the first communication message in the processor may include receiving a Gx communication message in the processor, and receiving the third communication message in the processor may include receiving a Rx communication message in the processor.

The embodiments described above (e.g., with reference to FIGS. 24-31, 39-42C, etc.) may also be implemented in systems that are configured to perform various additional operations to improve the performance of the scalable computing environment. For example, communication system 2500 may include components that are configured to perform operations that include monitoring a level of traffic throughput within the telecommunication network to determine whether an increase in throughput capacity is needed or a decrease in the throughput capacity is acceptable, increasing the throughput capacity of the telecommunication network (in response to determining that an increase in the throughput capacity is needed) by adding a logical scalable unit to the telecommunication network (the logical scalable unit including a minimum combination of logical components required to provide in a single multiprocessor system a complete set of telecommunication functionalities for a subset of users in the telecommunication network), and decreasing the throughput capacity of the telecommunication network (in response to determining that a decrease in the throughput capacity is acceptable) by removing an existing logical scalable unit from the telecommunication network.

In an embodiment, increasing the throughput capacity of the telecommunication network by adding a logical scalable unit may include adding a multiprocessor computing system configured to provide a portion of a functionality of an online charging system (OCS) and a portion of a functionality of a policy control and charging rules function (PCRF). In an embodiment, increasing the throughput capacity of the telecommunication network by adding a logical scalable unit to the telecommunication network may include adding a multiprocessor computing system configured to provide complete functionality of an online charging system (OCS) and a policy control and charging rules function (PCRF) for a small subset of the users in the telecommunication network. In an embodiment, increasing the throughput capacity of the telecommunication network by adding a logical scalable unit to the telecommunication network may include adding a multiprocessor computing system configured to provide complete functionality of an online charging system (OCS) and a policy control and charging rules function (PCRF) for a single user of the telecommunication network. In an embodiment, the multiprocessor computing system may be a single server rack within a datacenter. In an embodiment, the multiprocessor computing system may be included in a single computing device.

In an embodiment, monitoring the level of traffic throughput within the telecommunication network may include monitoring a number of sessions within the telecommunication network, and increasing the throughput capacity of the telecommunication network by adding a logical scalable unit to the telecommunication network may include adding a new logical scalable unit in response detecting an increase in the number of sessions within the telecommunication network.

In an embodiment, decreasing the throughput capacity of the telecommunication network (by removing an existing logical scalable unit from the telecommunication network) may include terminating transmissions of new communication messages to a selected logical scalable unit, waiting for existing sessions of the selected logical scalable unit to expire, and removing the selected logical scalable unit from the telecommunication network in response to determining that the existing sessions have expired. In an embodiment, decreasing the throughput capacity may include terminating transmissions of new communication messages to a selected logical scalable unit, transferring existing sessions of the selected logical scalable unit to another logical scalable unit, and removing the selected logical scalable unit from the telecommunication network in response to determining that the existing sessions have been transferred.

In an embodiment, increasing the throughput capacity of the telecommunication network by adding one or more logical scalable units to the telecommunication network may include adding a logical scalable unit that includes both a virtualized data plane component and a virtualized control plane component. In an embodiment, adding a logical scalable unit that includes both a data plane component and a control plane component may include adding a logical scalable unit that includes one or more of a router, a policy server, an online charging server, an offline charging server, a mobile application server, and a deep packet inspector (DPI).

In an embodiment, increasing the throughput capacity of the telecommunication network by adding one or more logical scalable units to the telecommunication network may include adding a logical scalable unit that is configured to provide machine to machine (M2M) functionality. In an embodiment, increasing the throughput capacity of the telecommunication network by adding one or more logical scalable units to the telecommunication network may include configuring a server with processor executable instructions to perform functions of two or more of a virtualized router, a policy server, an online charging server, an offline charging server, a mobile application server, and a deep packet inspector (DPI). Increasing the throughput capacity may further include connecting the server to the telecommunication network, and transmitting new communication messages to the logical scalable unit implemented in the server.

A further embodiment may include a method of routing VoLTE session requests, which may include receiving in an LSU Frontend component a policy and charging request message associated with a VoLTE call from a router, extracting at least one secondary key from the received message, generating a common key associated with the at least one secondary key, creating session information associated with the common key, adding the session information to a cache, generating a new policy and charging request message containing the received policy and charging request message and the session information, and sending the generated policy and charging request message to a policy management system. In an embodiment, the method may further include replicating the session information to caches in geographically remote LSU Frontend components. In a further embodiment, the method may include receiving a policy and charging request message associated with the VoLTE call from a policy management system, determining whether the received message contains VoLTE session continuity information, removing the VoLTE session continuity information in response to determining that it is contained in the received message, adding the removed VoLTE session continuity information to the cache, and sending the updated policy and charging request message to a router.

A further embodiment may include a method of responding to VoLTE session requests, which may include receiving in a policy management system a policy and charging request message associated with a VoLTE call from an LSU Frontend component, determining whether a session store contains information relating to the received request, determining whether the received request message contains session information in response to determining that the session store does not contain information relating to the received request, and generating a policy and charging response message associated with the VoLTE call in response to determining that the received request message contains session information. In an embodiment, the method may further include generating in the policy management system a policy and charging request message associated with the VoLTE call using the session information contained in the received request message, and sending the generated policy and charging request message associated with the VoLTE call to an LSU Frontend. In a further embodiment, determining whether the received request contains session information may include determining whether the received request contains non-standard information that has been inserted by an LSU Frontend component. In a further embodiment, generating a policy and charging response message associated with the VoLTE call in response to determining that the received request message contains session information may include generating a policy and charging response message using the session information contained in the received request message.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module, which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of communicating messages in a communication system, comprising:
   receiving at least one of an Authentication Authorization Request (AAR) message or a Session Termination Request (STR) message from a first client component, wherein the received message was sent in response to the first client component determining that a user equipment set-up, modified, or terminated a VoLTE call;
   extracting first information from the received message, and using the extracted first information to obtain a common key;
   using the obtained common key to:
      identify an application component, and
      retrieve session continuity information from a cache memory, wherein the session continuity information includes at least one of Gx session information, a session continuation (SC) parameter, or a VoLTE-Session-Continuity Attribute-Value-Pair (AVP);
   generating an updated AAR or STR message that includes the retrieved session continuity information and sending the updated message to the identified application component;
   receiving an Authentication Authorization Answer (AAA) message or an Session-Termination-Answer (STA) message from the identified application component and forwarding the received message to the first client component;
   receiving a Re-Authorization Request (RAR) message that includes updated session continuity information from the identified application component, extracting second information from the received RAR message, and determining the common key based on the extracted second information;
   using the determined common key to identify the cache memory that stores the session continuity information;

updating the information stored in the identified cache memory based on the updated session continuity information included in the RAR message; and sending the received RAR message to a second client component.

2. The method of claim 1, further comprising:

generating an updated RAR message that excludes the updated session continuity information that was included in the received RAR message, wherein sending the received RAR message to the second client component comprises sending the updated RAR message that excludes the updated session continuity information to the second client component.

3. The method of claim 1, wherein using the obtained common key to retrieve session continuity information from the cache memory comprises using the obtained common key to retrieve Gx session information identifying:

a Gx session; and an enforcement component associated with the Gx session.

4. The method of claim 1, wherein generating the updated AAR or STR message that includes the retrieved session continuity information comprises generating the updated AAR or STR message to include:

Gx session information; and the common key obtained using the extracted first information.

5. The method of claim 4, wherein generating the updated AAR or STR message that includes the retrieved session continuity information further comprises generating the updated AAR or STR message to include Rx session information.

6. The method of claim 1, wherein receiving the RAR message that includes updated session continuity information from the identified application component comprises:

receiving a message that includes Rx session information, wherein the Rx session information identifies:

an Rx session, an enforcement component associated with the Rx session, and one or more rules associated with the identified enforcement component.

7. The method of claim 1, wherein updating the information stored in the identified cache memory based on the updated session continuity information included in the RAR message comprises deleting information from the identified cache memory.

8. The method of claim 7, wherein deleting information from the identified cache memory comprises delaying deletion for a period of time so that a subsequent termination request message is processed correctly.

9. The method of claim 1, wherein receiving the AAR or STR message comprises receiving an Rx message having an Rx message type.

10. The method of claim 1, further comprising:

receiving the updated AAR or STR message in the identified application component;

determining whether session information relating to the received updated AAR or STR message may be obtained from a session store;

extracting the session continuity information from the received updated AAR or STR message in response to determining that session information relating to the received AAR or STR message may not be obtained from a session store;

using the extracted session continuity information to make a policy decision; and generating the updated session continuity information based on the policy decision.

11. A server computing device, comprising:

cache memory;

a processor coupled to the cache memory, wherein the processor is configured with processor-executable instructions to perform operations comprising:

receiving at least one of an Authentication Authorization Request (AAR) message or a Session Termination Request (STR) message from a first client component, wherein the received message was sent in response to the first client component determining that a user equipment set-up, modified, or terminated a VoLTE call;

extracting first information from the received message, and using the extracted first information to obtain a common key;

using the obtained common key to:

identify an application component, and retrieve session continuity information from the cache memory, wherein the session continuity information includes at least one of Gx session information, a session continuation (SC) parameter, or a VoLTE-Session-Continuity Attribute-Value-Pair (AVP);

generating an updated AAR or STR message that includes the retrieved session continuity information and sending the updated message to the identified application component;

receiving an Authentication Authorization Answer (AAA) message or an Session-Termination-Answer (STA) message from the identified application component and forwarding the received first message to the first client component;

receiving a Re-Authorization Request (RAR) message that includes updated session continuity information from the identified application component, extracting second information from the received RAR message, and determining the common key based on the extracted second information;

using the determined common key to identify the cache memory that stores the session continuity information;

updating the information stored in the identified cache memory based on the updated session continuity information included in the RAR message; and sending the received RAR message to a second client component.

12. The server computing device of claim 11, wherein the processor is configured with processor-executable instructions to perform operations such that using the obtained common key to retrieve session continuity information from the cache memory comprises:

using the obtained common key to retrieve Gx session information identifying:

a Gx session; and an enforcement component associated with the Gx session.

13. The server computing device of claim 11, wherein the processor is configured with processor-executable instructions to perform operations such that generating the updated AAR or STR message that includes the retrieved session continuity information comprises:

generating the updated AAR or STR message to include:

Gx session information,

Rx session information, and the common key.

14. The server computing device of claim 11, wherein the processor is configured with processor-executable instructions to perform operations such that receiving the RAR message that includes updated session continuity information from the identified application component comprises:
receiving a message that includes Rx session information, wherein the Rx session information identifies:
an Rx session,
an enforcement component associated with the Rx session, and
one or more rules associated with the identified enforcement component.

15. The server computing device of claim 11, wherein the processor is configured with processor-executable instructions to perform operations such that updating the information stored in the identified cache memory based on the updated session continuity information included in the RAR message comprises:
deleting information from the identified cache memory after waiting a period of time so that a subsequent termination request message may be processed correctly.

16. A non-transitory computer readable storage medium having stored thereon processor-executable software instructions configured to cause a processor of a server computing device to perform operations comprising:
receiving at least one of an Authentication Authorization Request (AAR) message or a Session Termination Request (STR) message from a first client component, wherein the received message was sent in response to the first client component determining that a user equipment set-up, modified, or terminated a VoLTE call;
extracting first information from the received message, and using the extracted first information to obtain a common key;
using the obtained common key to:
identify an application component, and
retrieve session continuity information from a cache memory, wherein the session continuity information includes at least one of Gx session information, a session continuation (SC) parameter, or a VoLTE-Session-Continuity Attribute-Value-Pair (AVP);
generating an updated AAR or STR message that includes the retrieved session continuity information and sending the updated message to the identified application component;
receiving an Authentication Authorization Answer (AAA) message or an Session-Termination-Answer (STA) message from the identified application component and forwarding the received message to the first client component;
receiving a Re-Authorization Request (RAR) message that includes updated session continuity information from the identified application component, extracting second information from the received RAR message, and determining the common key based on the extracted second information;
using the determined common key to identify the cache memory that stores the session continuity information;
updating the information stored in the identified cache memory based on the updated session continuity information included in the RAR message; and
sending the received RAR message to a second client component.

17. The non-transitory computer readable storage medium of claim 16, wherein the stored processor-executable software instructions are configured to cause a processor to perform operations such that using the obtained common key to retrieve session continuity information from the cache memory comprises:
using the obtained common key to retrieve Gx session information identifying:
a Gx session, and
an enforcement component associated with the Gx session.

18. The non-transitory computer readable storage medium of claim 16, wherein the stored processor-executable software instructions are configured to cause a processor to perform operations such that generating the updated AAR or STR message that includes the retrieved session continuity information comprises:
generating the updated AAR or STR message to include:
Gx session information,
Rx session information, and
the common key.

19. The non-transitory computer readable storage medium of claim 16, wherein the stored processor-executable software instructions are configured to cause a processor to perform operations such that receiving the RAR message that includes updated session continuity information from the identified application component comprises:
receiving a message that includes Rx session information, wherein the Rx session information identifies:
an Rx session,
an enforcement component associated with the Rx session, and
one or more rules associated with the enforcement component.

20. The non-transitory computer readable storage medium of claim 16, wherein the stored processor-executable software instructions are configured to cause a processor to perform operations such that updating the information stored in the identified cache memory based on the updated session continuity information included in the RAR message comprises:
deleting information from the identified cache memory after waiting a period of time so that a subsequent termination request message may be processed correctly.

21. The method of claim 1, wherein:
using the determined common key to identify the cache memory that stores the session continuity information comprises using the determined common key to identify the cache memory that stores the session continuity information included in an updated Rx request message that was sent to the to the identified application component; and
updating the information stored in the identified cache memory based on the updated session continuity information included in the RAR message comprises updating the information stored in the identified cache memory based on the updated session continuity information included in a Gx request message that was received from the identified application component.

22. The method of claim 1, wherein:
receiving at least one of the AAR message or STR message from the first client component comprises receiving an Rx message from the first client component; and
receiving the RAR messages that includes updated session continuity information from the identified application component comprises receiving is a Gx message that includes updated session continuity information from the identified application component.

23. The method of claim 1, wherein:
receiving at least one of the AAR message or STR message from the first client component comprises receiving an Rx AAR message; and
the RAR message is a Gx RAR message.

24. The method of claim 23, wherein:
receiving the AAA message or STA message from the identified application component comprises receiving an Rx AAR message from the identified application component; and
generating an updated AAR or STR message that includes the retrieved session continuity information comprises generating an Rx AAR message that includes:
a session continuation (SC) parameter; or
a VoLTE-Session-Continuity Attribute-Value-Pair (APV).

25. A system, comprising:
a first client component comprising at least one of a router agent (RA) component, an enforcement component, or an application function (AF) component;
a second client component; and
a logical scalable unit (LSU) component comprising:
a LSU frontend component;
one or more session stores; and
one or more policy management system (PMS) components,
wherein a client processor in the first client component is configured with processor-executable instructions to perform operations comprising:
determining whether a user equipment device accepted an incoming VoLTE call request; and
sending one or more Rx messages to the LSU component in response to determining that the user equipment device accepted the incoming VoLTE call request, wherein the one or more Rx messages include an Rx Authentication Authorization Request (Rx AAR) message;
wherein the LSU frontend processor is configured with processor-executable instructions to perform operations comprising:

receiving the Rx AAR message from the first client component;
using information included in the received Rx AAR message to obtain a common key, using the obtained common key to identify a PMS component, and using the obtained common key to retrieve at least one of Gx session information, a session continuation (SC) parameter, or a VoLTE-Session-Continuity Attribute-Value-Pair (AVP) from a session store in the one or more session stores;
generating an updated Rx AAR message that includes the Gx session information, the SC parameter or the VoLTE-Session-Continuity APV, and sending the updated Rx AAR message to the identified PMS component;
receiving a Rx Authentication Authorization Answer (Rx AAA) message from the identified PMS component and forwarding the received Rx AAA message to the first client component;
receiving from the identified PMS component a Gx Re-Authorization Request (Gx RAR) message that includes an Rx session identifier that identifies the relevant Rx session, an enforcement identifier that identifies an enforcement component associated with the relevant Rx session, and one or more rules associated with the identified enforcement component;
identifying the common key based on the Rx session identifier included in the received RAR message, and using the identified common key to identify the session store in the one or more session stores that stores the at least one of Gx session information, SC parameter, or VoLTE-Session-Continuity APV;
updating the information stored in the identified session store based on the information included in the received Gx RAR message; and
sending the received Gx RAR message to the second client component.

* * * * *